US011900527B2

(12) United States Patent
Rockel et al.

(10) Patent No.: US 11,900,527 B2
(45) Date of Patent: *Feb. 13, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Philipp Rockel, San Francisco, CA (US); Gary I. Butcher, Los Gatos, CA (US); Dorian D. Dargan, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,119

(22) Filed: Dec. 29, 2022

(65) Prior Publication Data
US 2023/0143827 A1 May 11, 2023

Related U.S. Application Data

(63) Continuation of application No. 17/483,730, filed on Sep. 23, 2021, now Pat. No. 11,562,528.

(60) Provisional application No. 63/083,816, filed on Sep. 25, 2020.

(51) Int. Cl.
*G06T 15/10* (2011.01)
*G06T 19/00* (2011.01)
*G06F 3/01* (2006.01)

(52) U.S. Cl.
CPC .............. *G06T 15/10* (2013.01); *G06F 3/011* (2013.01); *G06T 19/006* (2013.01)

(58) Field of Classification Search
None
See application file for complete search history.

(56) References Cited

U.S. PATENT DOCUMENTS 10,481,755 B1 11/2019 Ngo et al.
11,096,006 B1 8/2021 Robinson
(Continued)

FOREIGN PATENT DOCUMENTS

EP 3361352 A1 8/2018
JP 2002073246 A 3/2002
(Continued)

OTHER PUBLICATIONS

Ballendat et al., "Proxemic Interaction: Designing for a Proximity and Orientation-Aware Environment", Dept. of Computer Science, University of Calgary, 2500 University Drive NW, Calgary, AB, T2N, IN4, Canada, Nov. 7, 2010, 10 pages.
(Continued)

*Primary Examiner* — Christopher J Kohlman
(74) *Attorney, Agent, or Firm* — Morgan, Lewis & Bockius LLP

(57) ABSTRACT

A computer system displays a first computer-generated experience that includes displaying one or more virtual elements in a three-dimensional environment with a first appearance. While displaying the one or more virtual elements with the first appearance, the computer system receives biometric data corresponding to respiration of a first user. In response to receiving the biometric data: in accordance with a determination that the biometric data corresponding to the respiration of the first user meets first criteria, the computer system displays the one or more virtual elements in the three-dimensional environment with a second appearance that is different from the first appearance; and in accordance with a determination that the biometric data corresponding to the first user does not meet the first criteria, the computer system continues to display the one or more virtual elements in the three-dimensional environment with the first appearance.

48 Claims, 25 Drawing Sheets

(56) References Cited

U.S. PATENT DOCUMENTS

| | | | |
|---|---|---|---|
| 2012/0139935 A1 | 6/2012 | Miyasaka et al. | |
| 2012/0194554 A1 | 8/2012 | Kaino et al. | |
| 2012/0257035 A1 | 10/2012 | Larsen | |
| 2014/0282105 A1 | 9/2014 | Nordstrom | |
| 2014/0292665 A1 | 10/2014 | Lathrop et al. | |
| 2014/0313119 A1 | 10/2014 | Cho et al. | |
| 2017/0109936 A1 | 4/2017 | Powderly et al. | |
| 2017/0329404 A1 | 11/2017 | Keskin et al. | |
| 2017/0357398 A1 | 12/2017 | Alonso-Ruiz | |
| 2018/0066956 A1* | 3/2018 | Kim | G06T 19/006 |
| 2018/0292906 A1 | 10/2018 | Kato et al. | |
| 2019/0182355 A1 | 6/2019 | Clement et al. | |
| 2020/0051335 A1 | 2/2020 | Antypov | |
| 2020/0142475 A1 | 5/2020 | Paez et al. | |
| 2020/0387228 A1 | 12/2020 | Ravasz et al. | |
| 2021/0158715 A1* | 5/2021 | Kim | G09B 9/00 |
| 2022/0091722 A1 | 3/2022 | Faulkner et al. | |
| 2022/0101593 A1 | 3/2022 | Rockel et al. | |
| 2022/0214743 A1 | 7/2022 | Dascola et al. | |
| 2023/0147148 A1 | 5/2023 | Rockel et al. | |

FOREIGN PATENT DOCUMENTS

| | | |
|---|---|---|
| JP | 2013025369 A | 2/2013 |
| WO | WO 2019/067470 A1 | 4/2019 |

OTHER PUBLICATIONS

Office Action, dated Jul. 21, 2022, received in U.S. Appl. No. 17/481,187 (7698), 22 pages.

Notice of Allowance, dated Sep. 8, 2022, received in U.S. Appl. No. 17/483,730 (7702), 10 pages.

Invitation to Pay Additional Fees, dated Jan. 10, 2022, received in International Patent Application No. PCT/US2021/051498 (7698WO), which is in correspondence with U.S. Appl. No. 17/481,187, 12 pages.

International Search Report and Written Opinion, dated Mar. 3, 2022, received in International Patent Application No. PCT/US2021/051498 (7698WO), which is in correspondence with U.S. Appl. No. 17/481,187, 42 pages.

Invitation to Pay Additional Fees, dated Jan. 27, 2022, received in International Patent Application No. PCT/US2021/052027 (7702WO), which corresponds with U.S. Appl. No. 17/483,730, 14 pages.

International Search Report and Written Opinion, dated Mar. 22, 2022, received in International Patent Application No. PCT/US2021/052027 (7702WO), which corresponds with U.S. Appl. No. 17/483,730, 38 pages.

International Search Report and Written Opinion, dated Apr. 26, 2022, received in International Patent Application No. PCT/US2021/065537 (7703WO), which corresponds with U.S. Appl. No. 17/563,864, 19 pages.

Final Office Action, dated Apr. 11, 2023, received in U.S. Appl. No. 17/481,187 U698), 22 pages.

Office Action, dated Sep. 14, 2023, received in U.S. Appl. No. 17/481,187 (7698), 22 pages.

Office Action, dated Aug. 3, 2023, received in U.S. Appl. No. 17/563,864 (7703), 16 pages.

Notice of Allowance, dated Jun. 28, 2023, received in U.S. Appl. No. 18/091,154 (7924), 10 pages.

* cited by examiner

— 9000

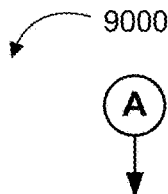

9006 In response to detecting the at least one of movement of the first user in the first physical environment and movement of the first object in the second physical environment:

9008 Display a second view of the three-dimensional environment corresponding to a second viewpoint

9010 Display the first user interface object in the second view of the three-dimensional environment, including:

9012 In accordance with a determination that the respective position of the first user interface object in the three-dimensional environment that corresponds to the respective location of the first object in the second physical environment in the first manner is more than a threshold distance from a respective position in the three-dimensional environment that corresponds to the second viewpoint associated with the second view of the three-dimensional environment, display the first user interface object at a first display position in the second view of in the three-dimensional environment, wherein the first display position is the respective position of the first user interface object in the three-dimensional environment

9014 In accordance with a determination that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment, display the first user interface object at a second display position in the second view of the three-dimensional environment, wherein the second display position is offset from the respective position of the first user interface object in the three-dimensional environment

Figure 9B

DEVICES, METHODS, AND GRAPHICAL USER INTERFACES FOR INTERACTING WITH THREE-DIMENSIONAL ENVIRONMENTS

RELATED APPLICATIONS

This application is a continuation application of U.S. application Ser. No. 17/483,730, filed Sep. 23, 2021, which claims priority to U.S. Provisional Patent Application 63/083,816, filed Sep. 25, 2020, which are incorporated by reference in their entirety.

TECHNICAL FIELD

This disclosure relates generally to computer systems with a display generation component and one or more input devices that provide computer generated reality (CGR) experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component and one or more first input devices. The method includes: displaying a first user interface object in a first view of a three-dimensional environment, wherein the three-dimensional environment is at least partially shared between a first user and a second user, wherein the first user interface object is displayed with a first set of appearance properties at a first position in the first view of the three-dimensional environment; while displaying the first user interface object with the first set of appearance properties at the first position in the first view of the three-dimensional environment, detecting a first user input provided by the first user, wherein the first user input is directed to the first user interface object. The method further includes: in response to detecting the first user input that is directed to the first user interface object: in accordance with a determination that the second user is not currently interacting with the first user interface object, performing a first operation with respect to the first user interface object in accordance with the first user input; and in accordance with a determination that the second user is currently interacting with the first user interface object: displaying a visual indication that the first user interface object is not available for interaction with the first user, wherein displaying the visual indication includes changing at least one of an appearance of the first user interface object or a position of the first user interface object in the first view of the three-dimensional environment; and forgoing performing the first operation with respect to the first user interface object in accordance with the first user input.

In accordance with some embodiments, a method is performed at a computer system that is in communication with a first display generation component and one or more first input devices, including: while a first user is at a first location in a first physical environment, displaying a first view of a three-dimensional environment corresponding to a first viewpoint that is associated with the first location in the first physical environment, wherein the first view of the three-dimensional environment includes a first user interface object that represents a first object in a second physical environment different from the first physical environment, wherein a respective position of the first user interface object in the three-dimensional environment corresponds to a respective location of the first object in the second physical environment in a first manner; detecting at least one of movement of the first user in the first physical environment and movement of the first object in the second physical environment; and in response to detecting the at least one of movement of the first user in the first physical environment and movement of the first object in the second physical environment: displaying a second view of the three-dimensional environment corresponding to a second viewpoint; and displaying the first user interface object in the second view of the three-dimensional environment. Displaying the first user interface object in the second view of the three-dimensional environment includes: in accordance with a determination that the respective position of the first user interface object in the three-dimensional environment that corresponds to the respective location of the first object in the second physical environment in the first manner is more than a threshold distance from a respective position in the three-dimensional environment that corresponds to the second viewpoint associated with the second view of the three-dimensional environment, displaying the first user interface object at a first display position in the second view of in the three-dimensional environment, wherein the first display position is the respective position of the first user interface object in the three-dimensional environment; and in accordance with a determination that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment, displaying the first user interface object at a second display position in the second view of the three-dimensional environment, wherein the second display position is offset from the respective position of the first user interface object in the three-dimensional environment.

In accordance with some embodiments, a method is performed at a computer system that is in communication with a first display generation component and one or more first input devices, including: displaying a first computer-generated experience with a first level of immersion; while displaying the first computer-generated experience with the first level of immersion, receiving biometric data corresponding to a first user; and in response to receiving the biometric data corresponding to the first user: in accordance with a determination that the biometric data corresponding to the first user meets first criteria, displaying the first computer-generated experience with a second level of immersion, wherein the first computer-generated experience displayed with the second level of immersion occupies a larger portion of a field of view of the first user than the first computer-generated experience displayed with the first level of immersion; and in accordance with a determination that the biometric data corresponding to the first user does not meet the first criteria, continuing to display the first computer-generated experience with the first level of immersion.

In accordance with some embodiments, a method is performed at a computer system that is in communication with a first display generation component and one or more first input devices, including: displaying a first view of a physical environment, wherein the first view of the physical environment includes a first representation of a first portion of the physical environment; while displaying the first view of the physical environment, detecting a first user input that corresponds to a request to activate a first type of computer-generated sensory adjustment of two or more types of computer-generated sensory adjustments; and in response to detecting the first user input, displaying a second view of the physical environment, wherein the second view of the physical environment includes a second representation of the first portion of the physical environment, wherein the second representation of the first portion of the physical environment has a first display property that is adjusted relative to the first representation of the first portion of the physical environment in accordance with the first type of computer-generated sensory adjustment; while displaying the second view of the physical environment, detecting a second user input that corresponds to a request to activate a second type of computer-generated sensory adjustment of the two or more types of computer-generated sensory adjustments, wherein the second type of computer-generated sensory adjustment is different from the first type of computer-generated sensory adjustment; and in response to detecting the second user input, displaying a third view of the physical environment, wherein the third view of the physical environment incudes a third representation of the first portion of the physical environment, wherein the third representation of the first portion of the physical environment has the first display property that is adjusted relative to the first representation of the first portion of the physical environment in accordance with the first type of computer-generated sensory adjustment, and a second display property that is adjusted relative to the second representation of the physical environment in accordance with the second type of computer-generated sensory adjustment.

In accordance with some embodiments, a method is performed at a computer system that is in communication with a first display generation component and one or more first input devices, including: displaying a first view of a three-dimensional environment, wherein the first view of the three-dimensional environment includes a first representation of a first portion of a physical environment; while displaying the first view of the three-dimensional environment including the first representation of the first portion of the physical environment, detecting movement of a first user from a first location to a second location of the physical environment; and in response to detecting the movement of the first user from the first location to the second location: in accordance with a determination that the movement to the second location meets first criteria, wherein the first criteria include a first requirement that the second location corresponds to a location associated with a first type of exercise in order for the first criteria to be met, displaying a second view of the three-dimensional environment, wherein the second view of the three-dimensional environment includes a first set of virtual content corresponding to the first type of exercise, wherein the first set of virtual content replaces at least a portion of a second representation of a second portion of the physical environment that includes the second location; and in accordance with a determination that the movement to the second location meets second criteria, different from the first criteria, wherein the second criteria include a second requirement that the second location corresponds to a location associated with a second type of exercise in order for the second criteria to be met, wherein the second type of exercise is different from the first type of exercise, displaying a third view of the three-dimensional environment, wherein the third view of the three-dimensional environment includes a second set of virtual content corresponding to the second type of exercise, wherein the second set of virtual content is different from the first set of virtual content, and wherein the second set of virtual content replaces at least a portion of a third representation of a third portion of the physical environment that includes the second location.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9B are a flowchart of a method of displaying a representation of a physical object relative to a viewpoint of a currently displayed view of a three-dimensional environment in different manners, where the viewpoint moves in accordance with movement of the user in a first physical environment, the representation of the physical object moves in accordance with movement of the physical object in a second physical environment different from the first physical environment, and where a change in the manner of displaying the representation is triggered in response to a spatial relationship between the representation of the physical object and the viewpoint meeting preset criteria, in accordance with some embodiments.

DESCRIPTION OF EMBODIMENTS

Figure 1:
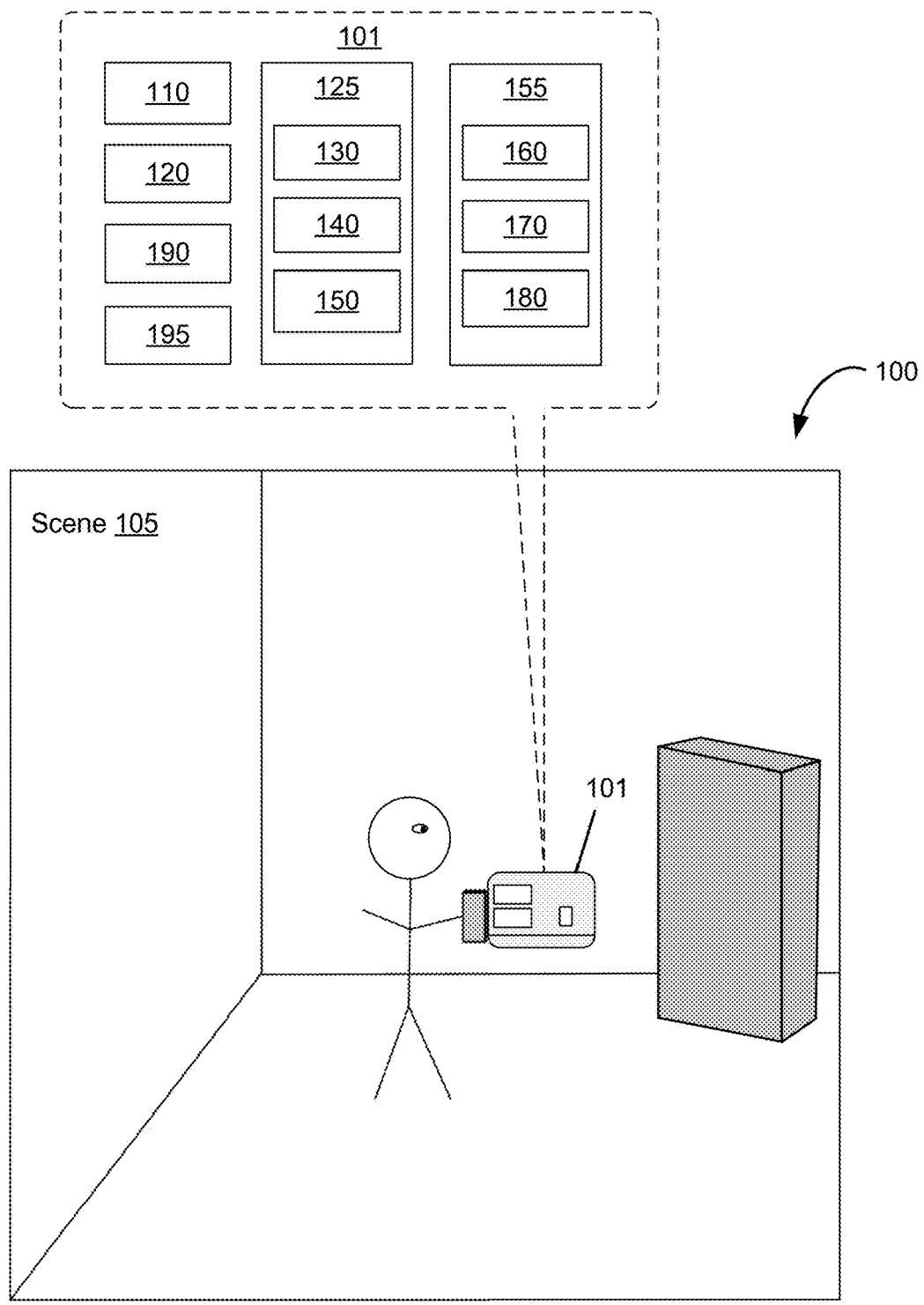
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, the computer system permits multiple users to have the right to access a first user interface object displayed in a three-dimensional environment, but prevents a user from accessing the first user interface object while another user is interacting with the first user interface object. When displaying a view of the three-dimensional environment including the first user interface object via a first display generation component used by a first user, the computer system detects a first user input that is directed to the first user interface object. In response to detecting the first user input, the computer system, depending whether or not the first user interface object is available for interaction with the first user at the time, performs a first operation corresponding to the first user input with respect to the first user interface object, or displays a visual indication that the first user interface object is not available for interaction with the first user and forgoes performance of the first operation. The computer system provides the visual indication and forgoes performance of the first operation in accordance with a determination that another user has control of the first user interface object at the time (e.g., another user is interacting with the first user interface object, is interacting with the first user interface object in a manner that excludes the first user's contemporaneous interaction, and/or has a lock on the first user interface object for the type of action that the first user is attempting to perform, etc.). In some embodiments, displaying the visual indication includes moving the first user interface object in the view of the three-dimensional environment shown to the first user to maintain a preset distance between the first user interface object and the approaching representation of the hand of the first user. In some embodiments, displaying the visual indication includes changing the visual appearance of the first user interface object in the view of the three-dimensional environment shown to the first user. In some embodiments, when the first user interface object is released to the first user by the controlling user (e.g., by a throw gesture, a toss gesture, etc.), the computer system rotates the first user interface object such that the first user interface object is displayed with a preset orientation relative to the viewpoint of the currently displayed view of the three-dimensional environment shown to the first user. In some embodiments, the computer system provides controlling access to the first user interface object by displaying a representation of the first user interface object at a position at or near the representation of a portion of the first user (e.g., in the representation of the hand of the first user, within an arm's reach of the virtual position of the user's face, etc.). Displaying a visual indication indicating that the first user interface object is not available for interaction with the first user in the view of the three-dimensional environment displayed via the display generation component used by the first user, in response to the first user's attempt to interact with the first user interface object, provides intuitive and timely feedback at the time of attempted interaction, and reduces unnecessary visual clutter in the view of the three-dimensional environment. Also, the same visual indication does not need to be displayed to other users that is sharing the environment with the first user, which reduces user confusion and improves efficiency of the man-machine interface.

In some embodiments, the computer system displays a view of a three-dimensional environment that includes a representation of a physical object (e.g., a second user, an animal, a moving drone, etc.) that is located in a different physical environment from the physical environment of a first user (and a first display generation component used by the first user to view the three-dimensional environment). The computer system, optionally, moves the viewpoint corresponding to the currently displayed view of the three-dimensional environment in accordance with the movement of the first user (and/or the first display generation component) in their physical environment. The computer system determines the position and movement path of the representation of the physical object in the three-dimensional environment based on a location and movement path of the physical object in its physical environment. The computer system utilizes a first type of correspondence (e.g., mapping and conversion relationships; optionally, different mapping and conversion relationships for the viewpoint, the physical object, and the first user, etc.) between positions in the three-dimensional environment and locations in a respective physical environment (e.g., the physical environment of the first user and the first display generation component, the physical environment of the physical object, etc.). Under some conditions (e.g., due to movement of the first user, and/or movement of the physical object, etc.), the position of the representation of the physical object would be within a threshold distance (e.g., an arm's length, three feet, a user-specified distance, etc.) of the position of the viewpoint of the currently displayed view of the three-dimensional environment shown via the first display generation component, if the position(s) are determined using the first type of correspondence between positions in the three-dimensional environment and locations in the physical environments. Under such conditions, the computer system displays the representation of the physical object at an adjusted position that is offset from the position determined based on the first type of correspondence. In some embodiments, the adjusted position is determined based on a second type of correspondence that is different from the first type of correspondence and ensures that the adjusted position remains more than the threshold distance from the position of the viewpoint of the currently displayed view of the three-dimensional environment shown via the first display generation component. The computer system continues to use the second type of correspondence to determine the adjusted position of the representation of the physical object, until the unadjusted position calculated based on the first type of correspondence is more than the threshold distance away from the position of the viewpoint of the currently displayed view of the three-dimensional environment shown via the first display generation component. By monitoring the relative distance between the position of the representation of the physical object and the position of the viewpoint of the currently displayed view of the three-dimensional environment shown via the first display generation component, the computer can timely adjust the displayed position of the representation of the physical object, such that visual collision between the viewpoint and the representation of the physical object can be avoided. This improves the user's visual experience, and reduces user confusion and mistakes when the user interacts with the three-dimensional environment.

In some embodiments, the computer system changes the level of immersion with which a computer-generated experience (e.g., visual experience, audio-visual experience, virtual reality experience, augmented reality experience, etc.) is presented to a user in accordance with biometric data corresponding to the user. For example, when the user is adjusting his/her physical and emotional states, e.g., proactively or under the influence of the computer-generated content, after the computer-generated experience is started, the computer system may detect changes in the biometric data (e.g., heart rate, blood pressure, breathing rate, etc.) corresponding to the user. In accordance with the changes in the biometric data relative to respective sets of preset criteria associated with different levels of immersion, the computer system increases or decreases the level of immersion with which the computer-generated experience is provided to the user (e.g., by changing the visual prominence (e.g., including spatial extent, visual depth, color saturation, visual contrast, etc.) of virtual content relative to the visual prominence of the representation of the physical environment (e.g., by enhancing complexity, spatial extent, and/or visual characteristics of the virtual content, and/or reducing the visual clarity, blur radius, opacity, color saturation, etc. of the representation of the physical environment, etc.). Adjusting the level of immersion with which a computer-generated experience is provided to a user based on changes in the biometric data corresponding to the user helps the computer system to provide a smoother transition between a less immersive experience and a more immersive experience that better corresponds to the perceptive state of the user for the computer-generated experience, thereby reducing user confusion and improving the efficacy of the computer-generated experience.

In some embodiments, the computer system provides multiple types of sensory adjustment functions that enhance the user's ability to perceive different aspects of a physical environment that may not be easily perceivable without the aid of special equipment or the computer system. Instead of allowing the user to only use a single type of sensory adjustment function when viewing a portion of a physical environment at a time, the computer system aggregates the effects of two or more types of sensory enhancement functions on a representation of the portion of the physical environment, such that features and characteristics present in the portion of the physical environment that were previously hidden in the view of the physical environment provided by the computer system may be revealed. Allowing the effects of multiple types of sensory adjustment functions to be aggregated on the representation of the same portion of the physical environment and presented in a view of a three-dimensional environment that includes the representation of the portion of the physical environment enables the user to better perceive and understand the physical environment, and improves the usefulness of the computer-generated view of the physical environment.

In some embodiments, the computer system displays virtual content (e.g., virtual scenery, visual and functional enhancements of the exercise equipment, user interfaces, health and score boards, etc.) that corresponds to a respective type of exercise in accordance with a determination that the physical location represented in a view of a three-dimensional environment is associated with the respective type of exercise. For example, as the user and the display generation component move from location to location in the real world, the virtual content shown in the view of the three-dimensional environment is adjusted to correspond to the type of exercise that is associated with the current location of the user and the display generation component. In some embodiments, when a location is associated with multiple types of exercise, the computer system selects a type of exercise from the multiple types of exercises that are associated with the location based on other contextual information (e.g., movement of the user, engagement of the user with the objects at the location, etc.), and displays the visual content corresponding to the selected type of exercise. Automatically selecting and/or changing the virtual content based on the respective type of exercise that is associated with the location of the user and the display generation component reduces the number, extent, and/or nature of the inputs from a user to achieve a desired outcome (e.g., selecting the suitable virtual content for a type of exercise, starting particular modes of exercise, etc.), thereby creating a more efficient human-machine interface.

FIGS. 1-6 provide a description of example computer systems for providing CGR experiences to users. FIGS. 7A-7C are block diagrams illustrating interaction with a user interface object in a computer-generated three-dimensional environment that is shared between two or more users, in accordance with some embodiments. FIGS. 7D-7F are block diagrams illustrating a method of displaying a representation of a physical object relative to a viewpoint of a currently displayed view of a three-dimensional environment in different manners, where the viewpoint moves in accordance with movement of the user in a first physical environment, the representation of the physical object moves in accordance with movement of the physical object in a second physical environment different from the first physical environment, and where a change in the manner of displaying the representation is triggered in response to a spatial relationship between the representation of the physical object and the viewpoint meeting preset criteria, in accordance with some embodiments. FIGS. 7G-7J are block diagrams illustrating changing a level of immersion with which an environment of a computer-generated experience is displayed in accordance with changing biometric data of a user that is received by the computer system, in accordance with some embodiments. FIGS. 7K-7M are block diagrams illustrating aggregating the effects of multiple types of the sensory adjustment provided by a computer system when displaying a view of an environment that includes a representation of a physical environment, in accordance with some embodiments. FIGS. 7N-7P are block diagrams illustrating selectively displaying virtual content that corresponds to a respective type of exercise in a view of a three-dimensional environment in accordance with a determination that the portion of the physical environment in the view of the three-dimensional environment corresponds to the respective type of exercise, in accordance with some embodiments. The user interfaces in FIGS. 7A-7P are used to illustrate the processes in FIGS. 8-12, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint)

different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
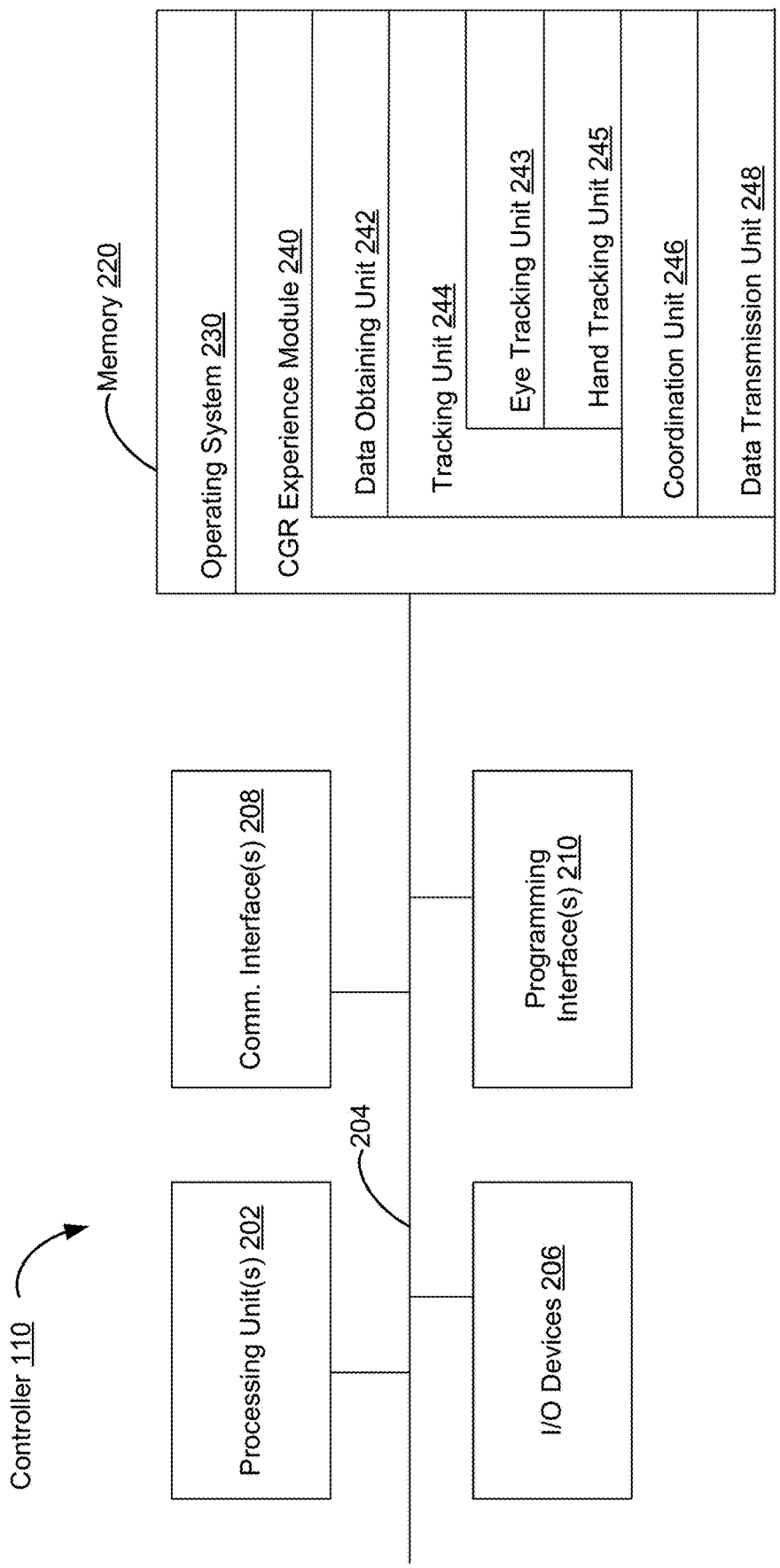
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
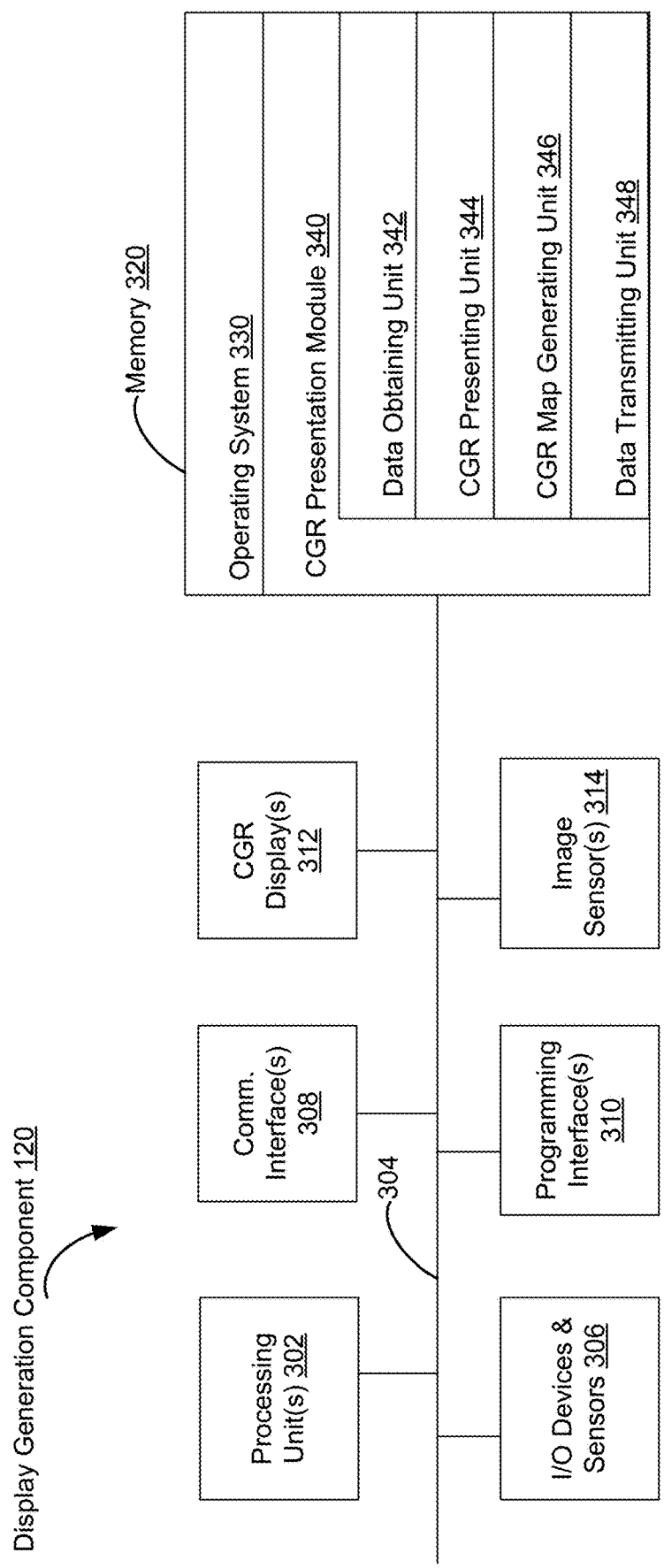
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
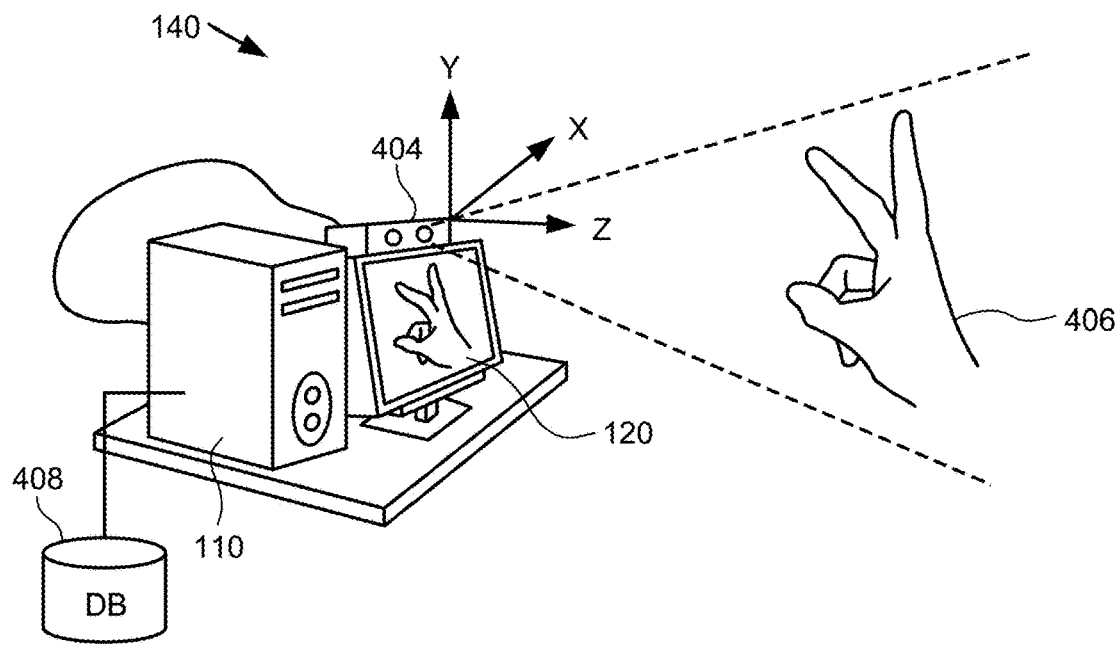
FIG. 4 is a block diagram illustrating a hand tracking unit of a computer system that is configured to capture gesture inputs of the user in accordance with some embodiments.
Figure 4:
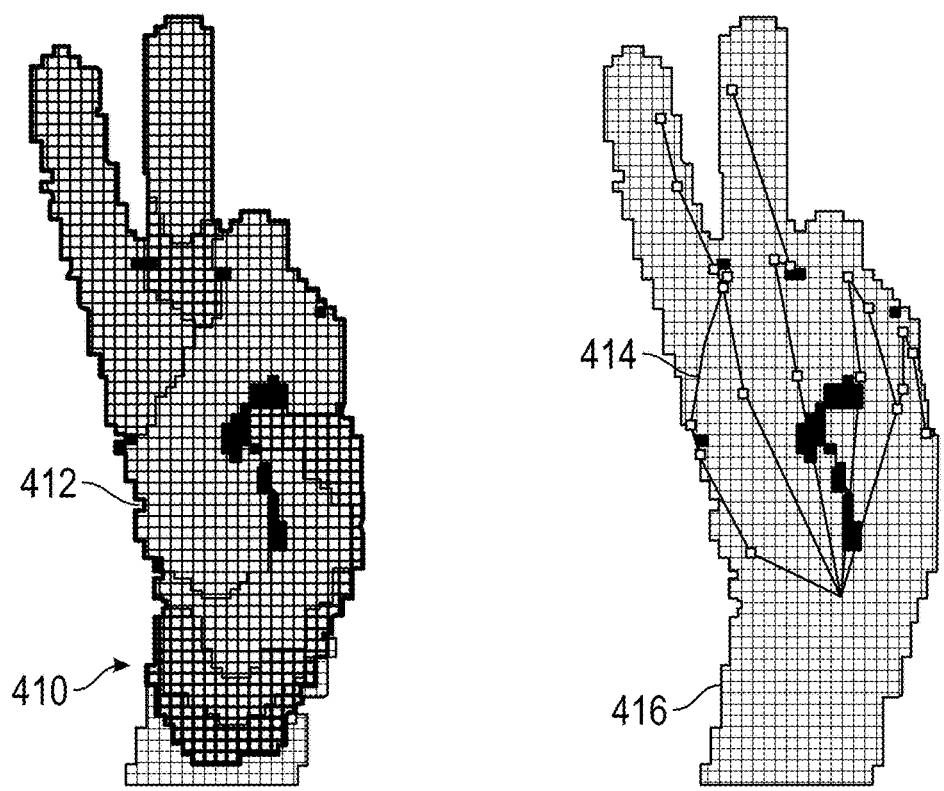

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
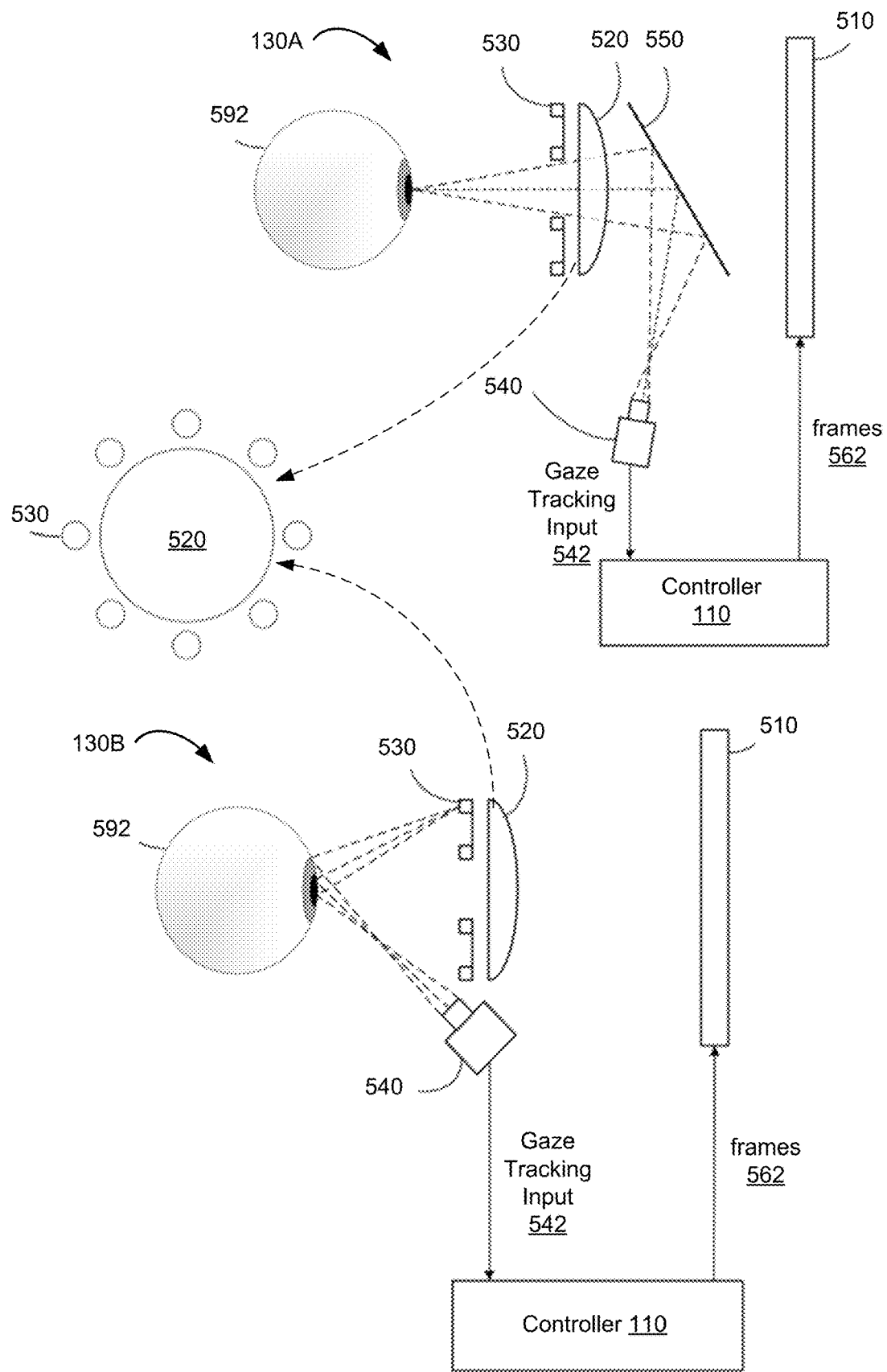
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
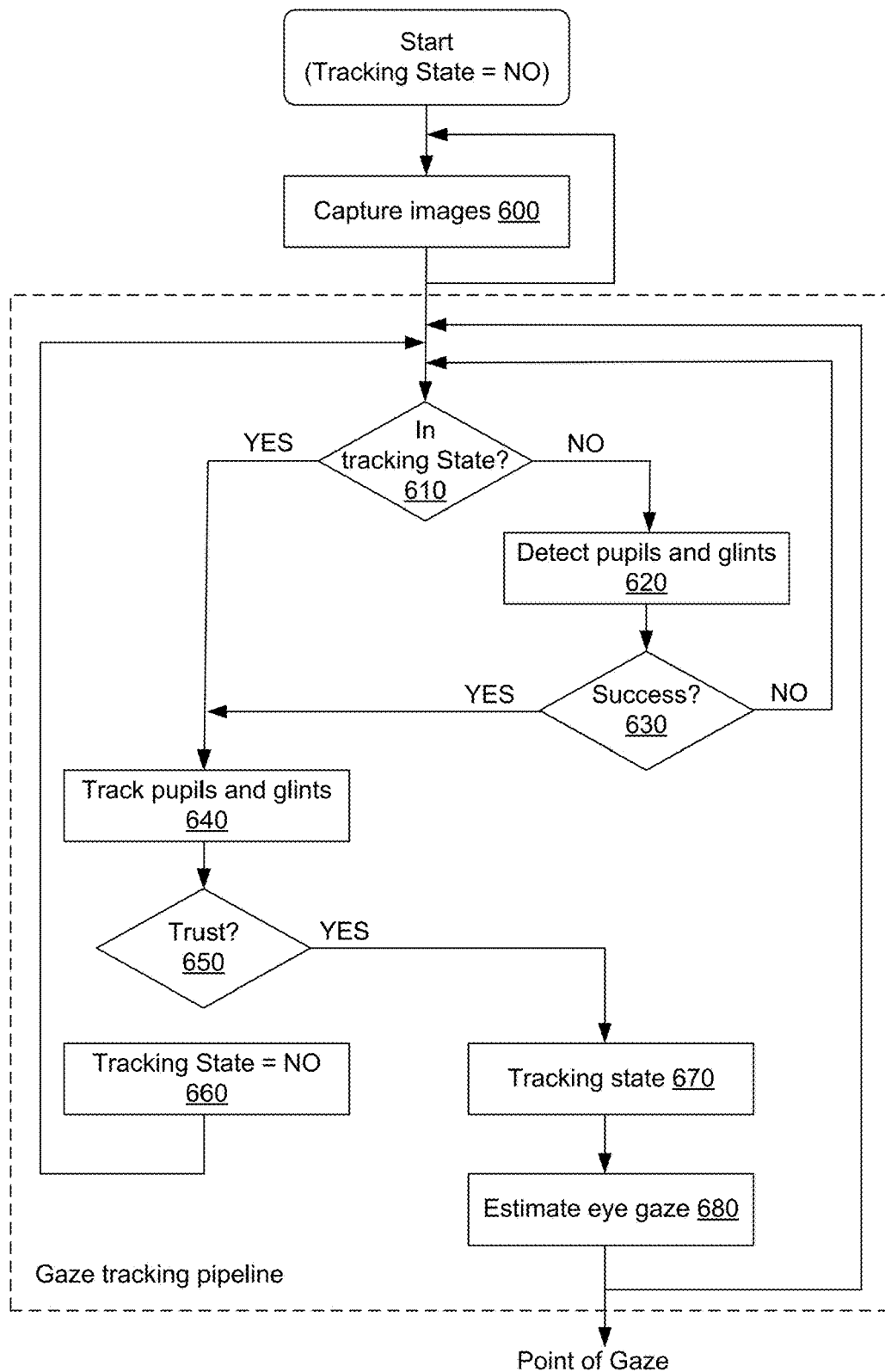
FIG. 6 is a flowchart illustrating a glint-assisted gaze tracking pipeline in accordance with some embodiments.
Figure 7A:
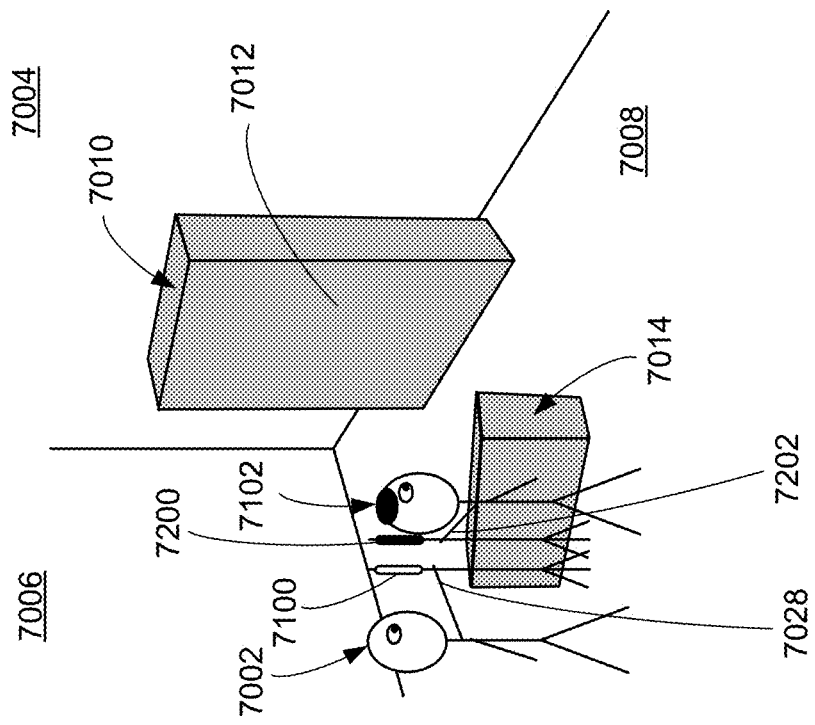
FIGS. 7A-7C are block diagrams illustrating interaction with a user interface object in a computer-generated three-dimensional environment that is shared between two or more users, in accordance with some embodiments.
Figure 7B:
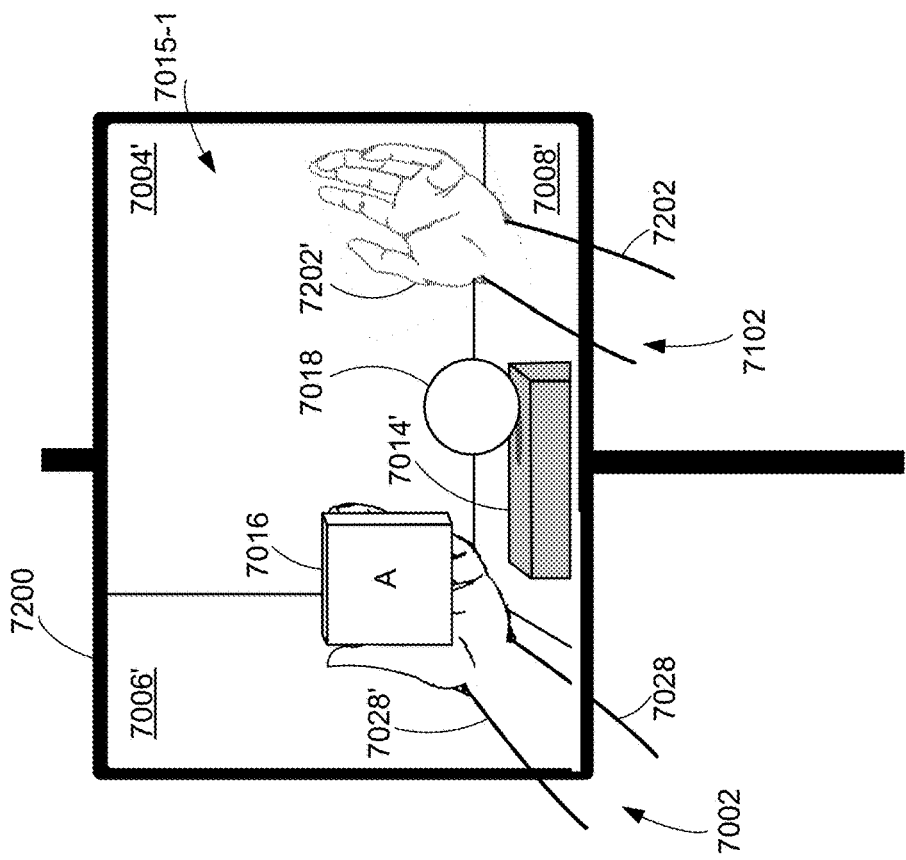
Figure 7B:
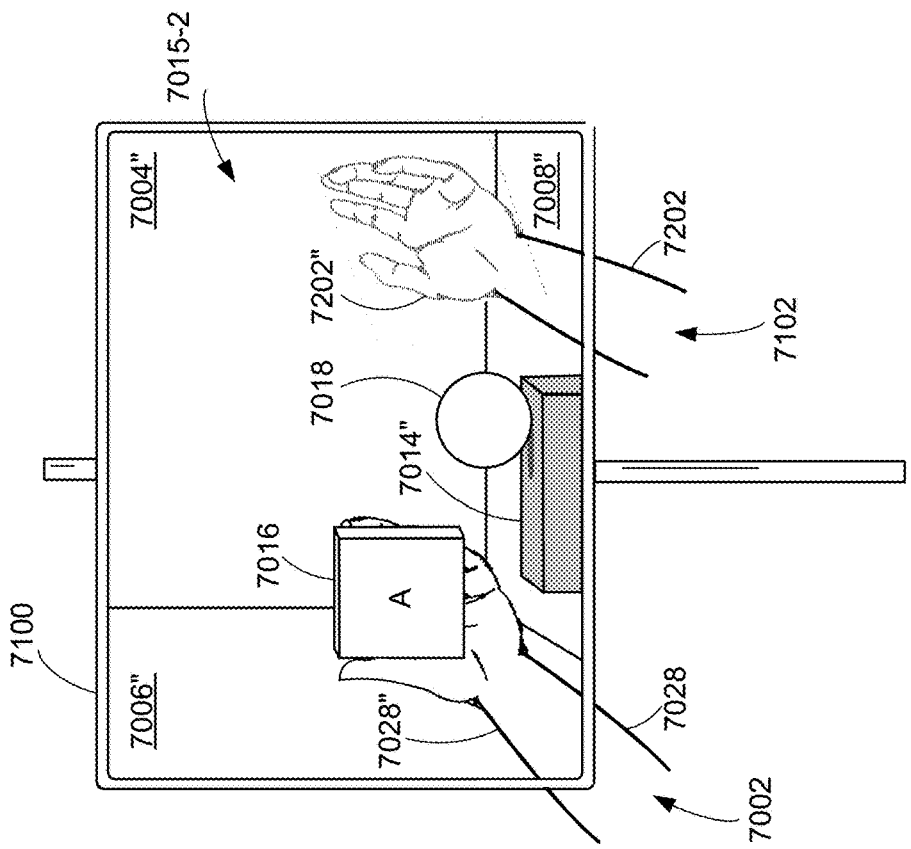
Figure 7C:
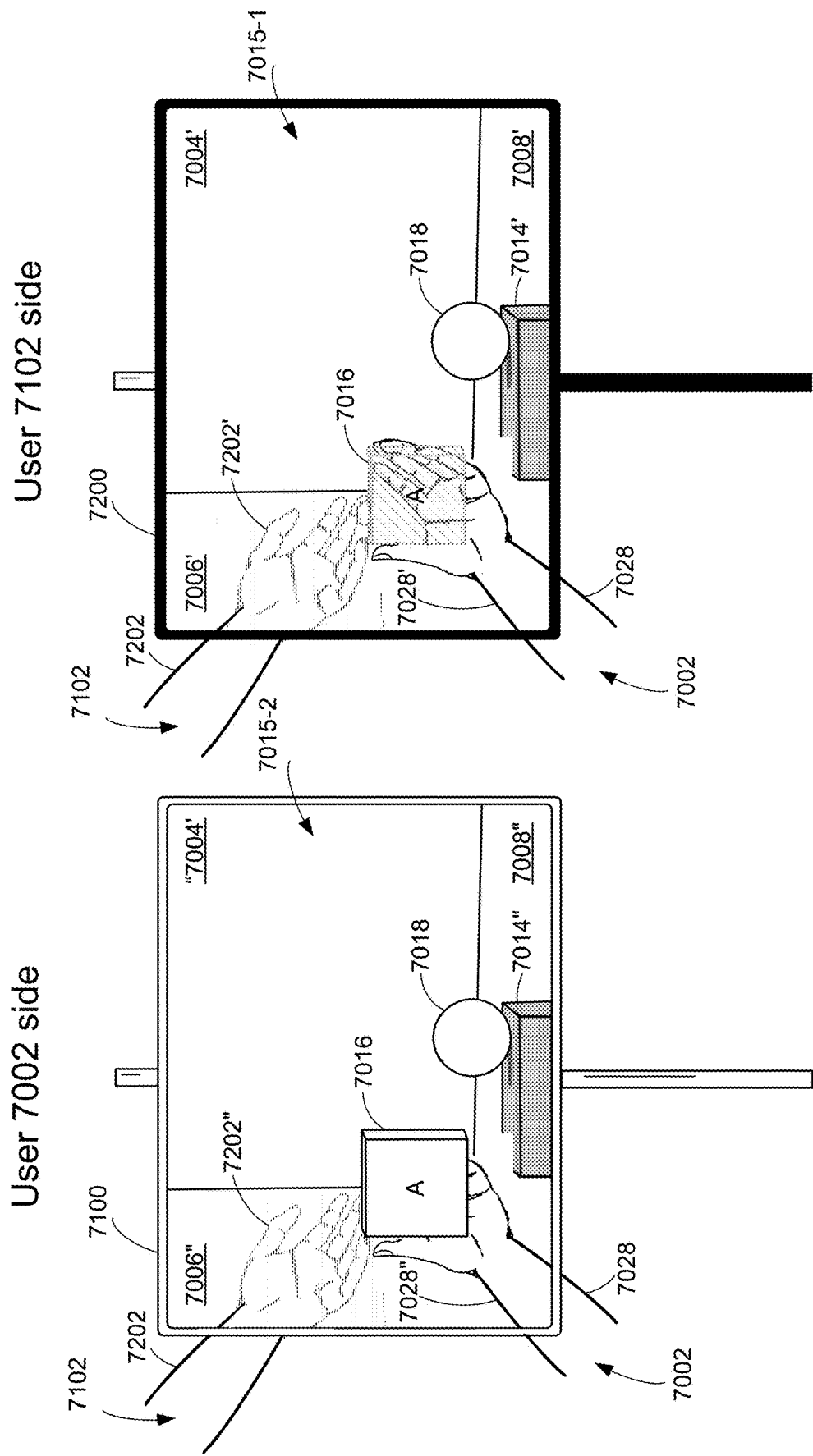
Figure 7D:
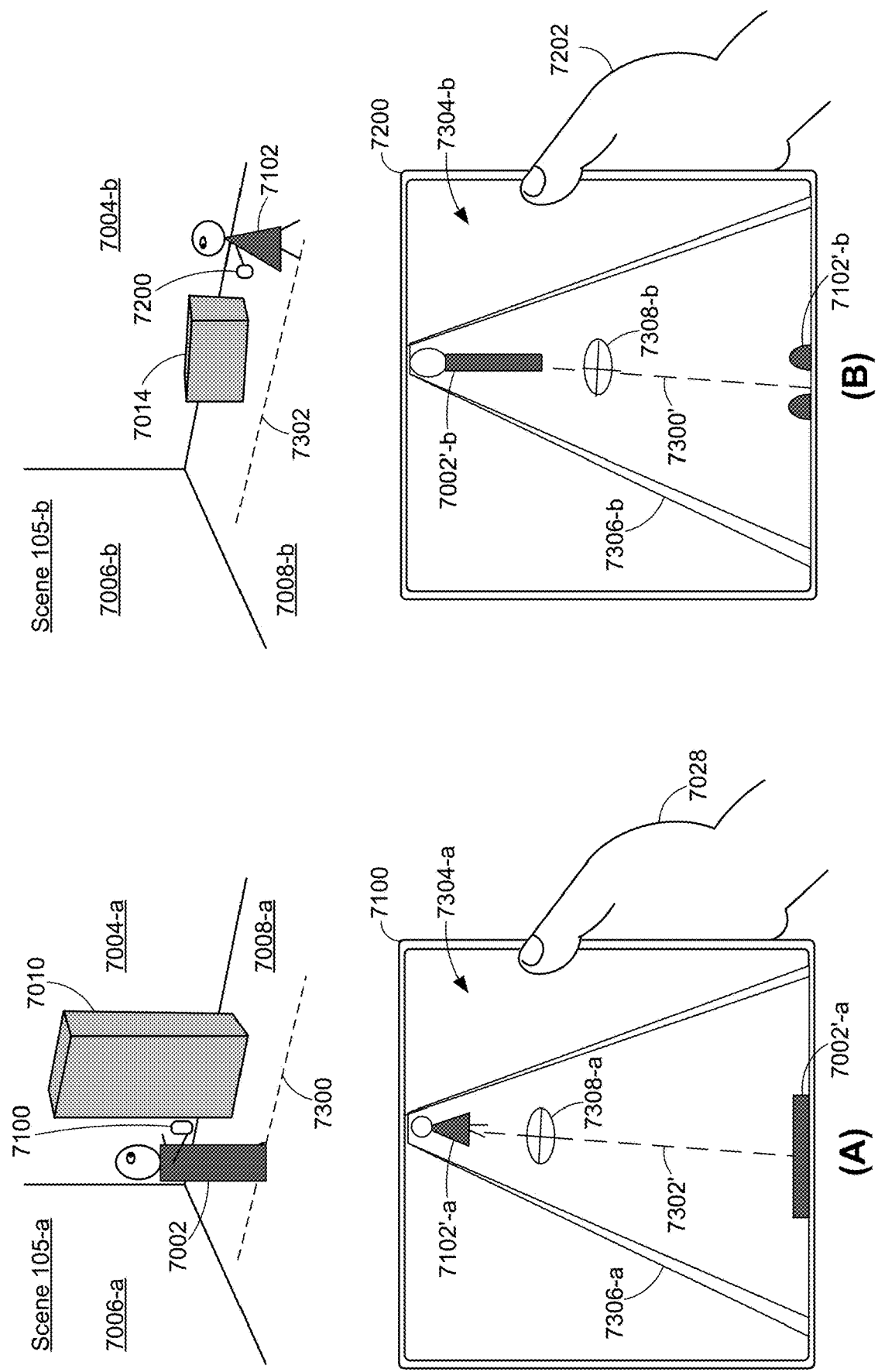
FIGS. 7D-7F are block diagrams illustrating a method of displaying a representation of a physical object relative to a viewpoint of a currently displayed view of a three-dimensional environment in different manners, where the viewpoint moves in accordance with movement of the user in a first physical environment, the representation of the physical object moves in accordance with movement of the physical object in a second physical environment different from the first physical environment, and where a change in the manner of displaying the representation is triggered in response to a spatial relationship between the representation of the physical object and the viewpoint meeting preset criteria, in accordance with some embodiments.
Figure 7E:
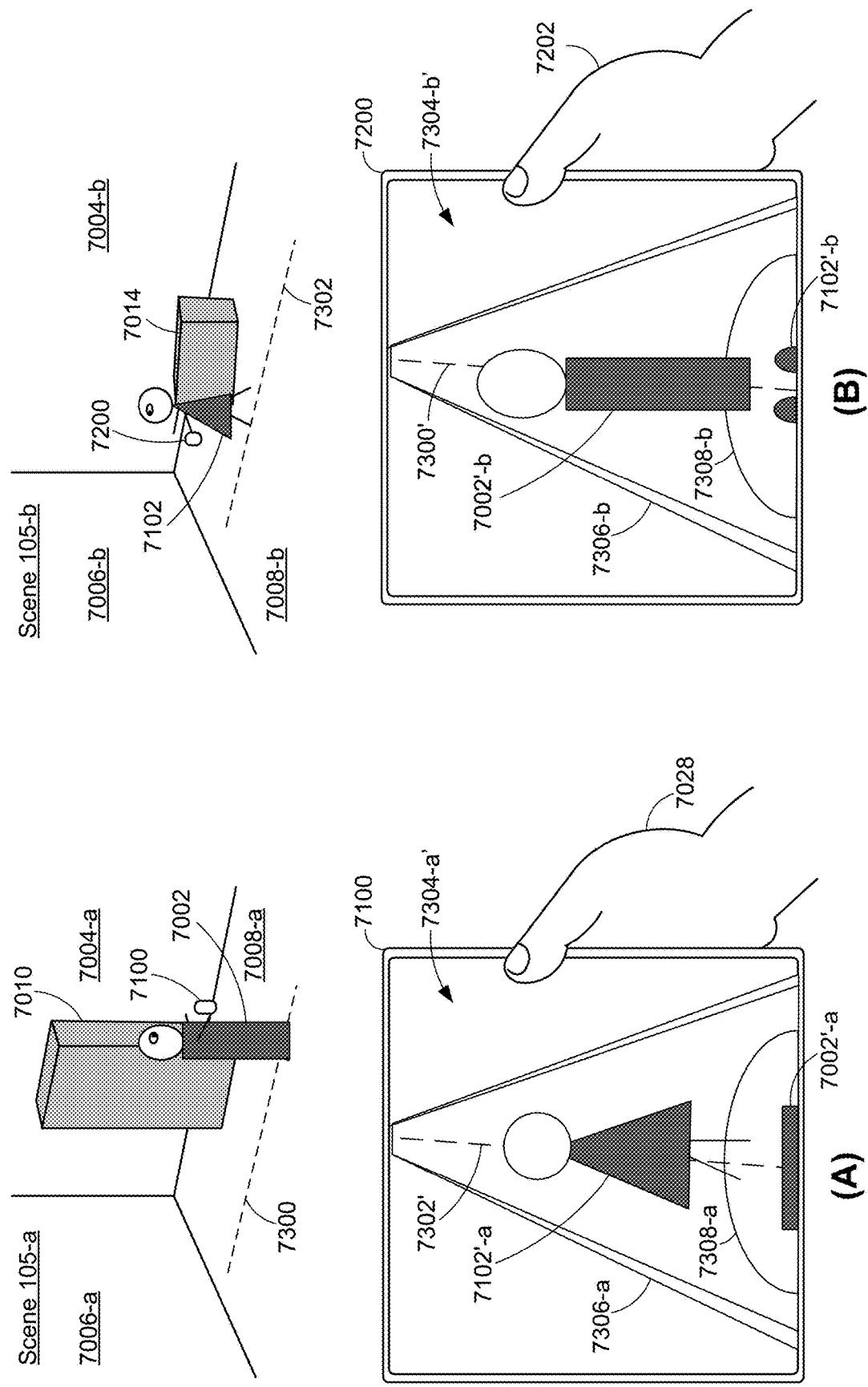
Figure 7F:
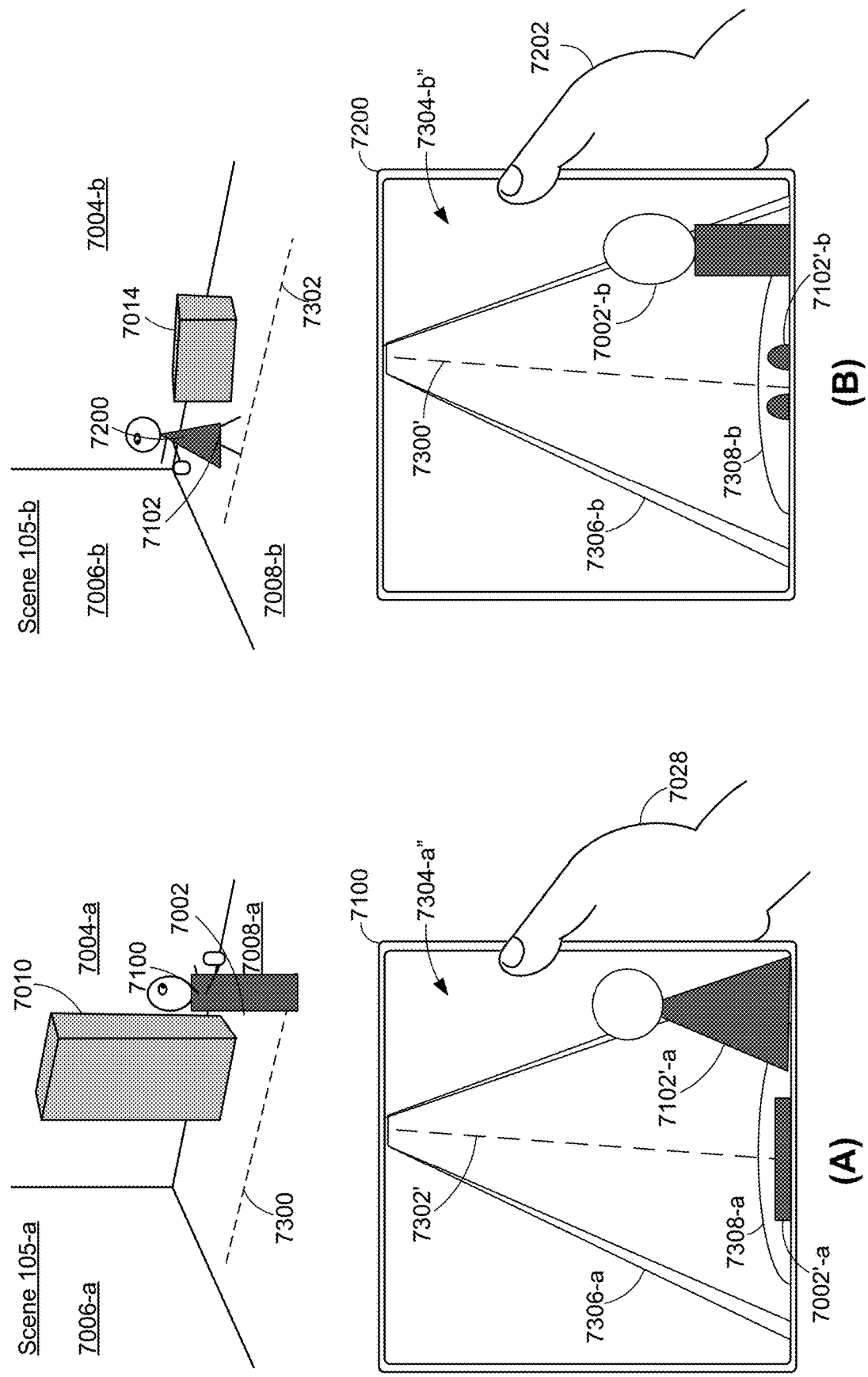
Figure 7H:
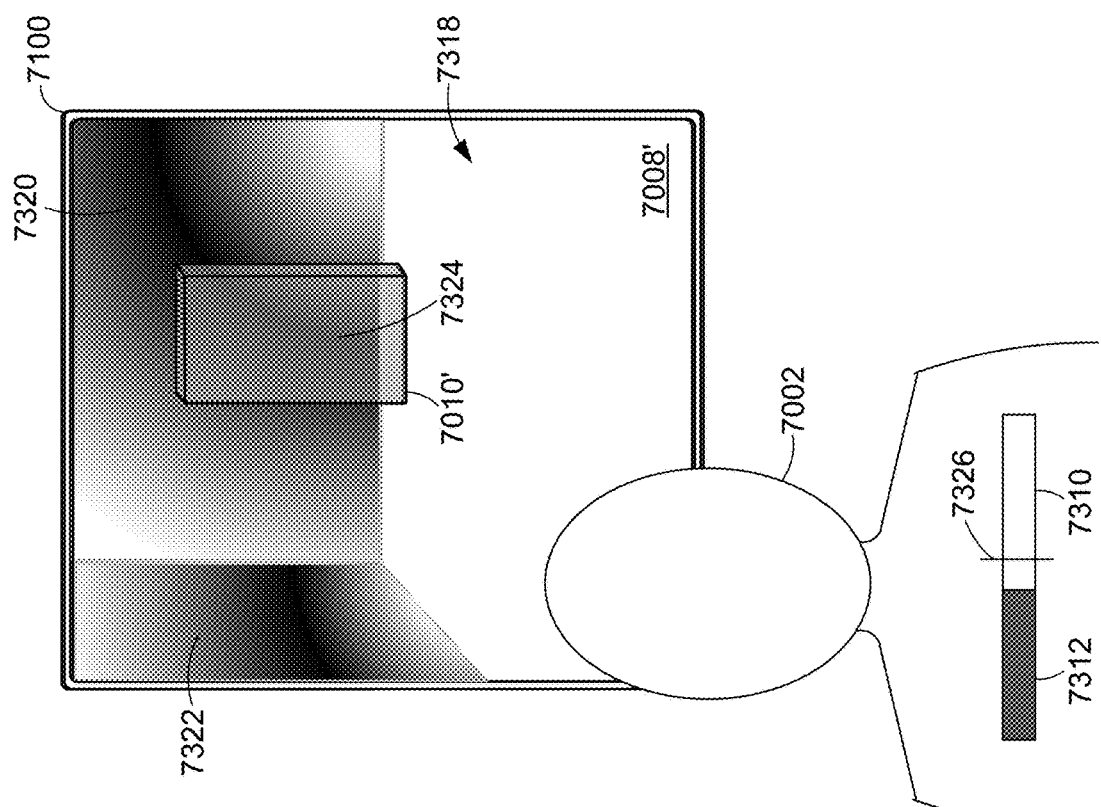
FIGS. 7G-7J are block diagrams illustrating changing a level of immersion with which an environment of a computer-generated experience is displayed in accordance with changing biometric data of a user that is received by the computer system, in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7P illustrate three-dimensional environments displayed via a display generation component (e.g., a display generation component 7100, display generation component 7200, a display generation component 120, etc.) and interactions that occur in the three-dimensional environment caused by user inputs directed to the three-dimensional environment and/or inputs received from other computer systems and/or sensors. In some embodiments, the inputs are directed to a virtual object within the three-dimensional environment by a user's gaze detected at the positions of the virtual object, by a hand gesture performed at a location in the physical environment that corresponds to the position of the virtual object, by a hand gesture that is performed at a location in the physical environment that is independent of the position of the virtual object while the virtual object has input focus (e.g., selected by a concurrently and/or previously detected gaze input, selected by a concurrently or previously detected pointer input, selected by a concurrently and/or previously detected gesture input, etc.), by a input device that has positioned a focus selector object (e.g., a pointer object, selector object, etc.) at the position of the virtual object, etc. In some embodiments, the inputs are directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.). In some embodiments, the computer system displays changes the three-dimensional environment (e.g., displaying additional virtual content, or ceasing to display existing virtual content, transitioning between different levels of immersion with which visual content is being displayed, etc.) in accordance with inputs from sensors (e.g., image sensors, temperature sensors, biometric sensors, motion sensors, proximity sensors, etc.) and contextual conditions (e.g., location, time, presence of others in the environment, etc.). In some embodiments, the computer system displays changes the three-dimensional environment (e.g., displaying additional virtual content, or ceasing to display existing virtual content, transitioning between different levels of immersion with which visual content is being displayed, etc.) in accordance with inputs from other computers used by other users that are sharing the computer-generated environment with the user of the computer system (e.g., in a shared computer-generated experience, in a shared virtual environment, in a shared virtual or augmented reality environment of a communication session, etc.).

In some embodiments, the three-dimensional environment that is displayed via the display generation component is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion, adjusting the relative prominence of audio/visual sensory inputs from the virtual content and from the representation of the physical environment, etc.) based on user inputs and/or contextual conditions.

In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., in a virtual reality environment, a mixed reality environment, an augmented reality environment, etc.), at least some of the virtual objects are displayed in placed of (e.g., replacing display of) a portion of the live view (e.g., a portion of the physical environment captured in the live view) of the cameras. In some embodiments, at least some of the virtual objects and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that changes the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, gestures performed by movement of one portion of the hand relative to another portion of the hand, etc.) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD, etc.), etc., relative to the physical environment causes corresponding movement of the viewpoint (e.g., with corresponding movement direction, movement distance, movement speed, and/or change in orientation, etc.) relative to the three-dimensional environment, resulting in corresponding change in the currently displayed view of the three-dimensional environment. In some embodiments, when a virtual object has a preset spatial relationship relative to the viewpoint, movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement (e.g., the display generation component and/or other location sensing component of the computer system rotating around a fixed location of the user in the physical environment).

In some embodiments, the views of the three-dimensional environment shown in FIGS. 7A-7P include representation(s) of a user's hand(s), arm(s), and/or wrist(s). In some embodiments, the representation(s) are part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view or transparent pass-through portion), real-time visual representations (e.g., stylize representations or segmented camera images) of one or both arms, wrists, and/or hands of the user may still be displayed in the virtual environment.

FIGS. 7A-7C are block diagrams illustrating interaction with a user interface object in a computer-generated three-dimensional environment that is shared between two or more users, in accordance with some embodiments.

In some embodiments, the computer system permits multiple users (e.g., the first user 7102, the second user 7002, another user, etc.) to have the right to access a first user interface object (e.g., first user interface object 7016, another user interface object, a control panel, a virtual menu, a media object, etc.) displayed in a three-dimensional environment (e.g., a three-dimensional environment 7015, another virtual environment or augmented reality environment, etc.), but prevents a user (e.g., the first user 7102, or another user different from the first user 7102, etc.) from accessing the first user interface object while another user (e.g., the second user 7002, another user different from the second user 7002, etc.) is interacting with the first user interface object. When displaying a view of the three-dimensional environment including the first user interface object via a first display generation component (e.g., display generation component 7200, a different type of display generation component such as an HMD, etc.) used by a first user (e.g., the first user 7102), the computer system detects a first user input (e.g., a gaze input, a hand movement, a combination of a gaze input and a movement of the user's hand, etc.) that is directed to the first user interface object. In response to detecting the first user input, the computer system, depending whether or not the first user interface object is available for interaction with the first user at the time, performs a first operation corresponding to the first user input with respect to the first user interface object (e.g., moving the first user interface object or a representation thereof to the representation 7202' of the first user's hand 7202, performing a function associated with the first user interface object that changes the three-dimensional environment (e.g., causes display or dismissal of virtual content in the three-dimensional environment, changing other virtual content in the three-dimensional environment, etc.), etc.), or displays a visual indication that the first user interface object is not available for interaction with the first user and forgoes performance of the first operation. The computer system provides the visual indication and forgoes performance of the first operation in accordance with a determination that another user (e.g., the second user 7002) has control of the first user interface object at the time (e.g., another user is interacting with the first user interface object, is interacting with the first user interface object in a manner that excludes the first user's contemporaneous interaction, and/or has a lock on the first user interface object for the type of action that the first user is attempting to perform, etc.). In some embodiments, displaying the visual indication includes moving the first user interface object in the view of the three-dimensional environment shown to the first user to maintain a preset distance between the first user interface object and the approaching representation of the hand of the first user. In some embodiments, displaying the visual indication includes changing the visual appearance of the first user interface object in the view of the three-dimensional environment shown to the first user (e.g., as shown in FIG. 7C, the view on the user 7102 side). In some embodiments, when the first user interface object is released to the first user by the controlling user (e.g., by a throw gesture, a toss gesture, etc.), the computer system rotates the first user interface object such that the first user interface object is displayed with a preset orientation relative to the viewpoint of the currently displayed view of the three-dimensional environment shown to the first user (e.g., with content side or control side facing toward the first user 7102). In some embodiments, the computer system provides controlling access of the first user interface object to the first user by displaying a representation of the first user interface object at a position at or near the representation of a portion of the first user (e.g., in the representation of the hand 7202 of the first user 7102, within an arm's reach of the virtual position of the user's face, etc.).

In the example shown in FIGS. 7A-7C, the three-dimensional environment 7015 is shared between the first user 7102 and the second user 7002 in response to a request that is initiated from one of the users 7102 and 7002 using a computer system controlled by said one user, and accepted by another of the users 7102 and 7002 using a computer system controlled by said another user, in accordance with some embodiments. In some embodiments, both users have received and accepted the request to share the three-dimensional environment using their respective computer systems from the computer system used by a third user. In some embodiments, both users have sent requests to share the three-dimensional environment to a server using their respective computer systems, where their requests were accepted by the server. When sharing the computer-generated three-dimensional environment, the locations and orientations of the users and of their respective heads, eyes, hands, arms, and/or wrists are captured in real-time or periodically by sensors (e.g., cameras, motion sensors, etc.) and the location and orientation data is provided to one or both of the computer systems controlled by the users, and/or to a server that is in communication with the computer systems. The location data is used by the computer systems and/or server to determine the respective positions and orientations of the users and of their respective heads, eyes, hands, arms, and/or wrists in the computer-generated three-dimensional environment, and correspondingly, the respective positions of the representations of the users including their respective heads, arms, hands, and/or wrists in the views of the three-dimensional environment provided via the different display generation components associated with the users, as well as the viewing perspectives and viewpoints of the views of the three-dimensional environment provided via the different display generation components associated with the users.

In some embodiments, when two or more users share a computer-generated environment (e.g., a virtual conference call, a chat session, a multi-player game, a shared computer-generated experience (e.g., group meditation, exercise, game, collaborative work, etc.), etc.), they may wish to control and/or manipulate the same user interface object (e.g., a virtual ball, a virtual control panel, a document or media content, a virtual menu, a user interface, etc.) present in the computer-generated environment. This sometimes creates difficulty for the computer system to consistently prioritize the different user's actions with respect to the user interface object and the resulting change in the three-dimensional environment may be confusing to the users. As disclosed herein, the computer system provides visual feedback in response to a first user 7102's attempt to interact with a first user interface object 7016 that is already in the control of a second user 7002 in the environment by changing a set of appearance properties of the first user interface object in the view 7015-1 of the environment presented to the first user 7102, thereby reducing conflict between the actions of the users and reducing user confusion when they interact with the first user interface object 7016. In some embodiments, the first user interface object 7016 presented in the view 7015-2 of the three-dimensional environment shown to the second user 7002 that has control of the first user interface object is not changed as a result of the first user's attempt to interact with the first user interface object, and does not cause distraction to the second user 7002 when the second user 7002 interacts with the first user interface object 7016.

FIG. 7A illustrates an exemplary physical environment (e.g., scene 105, another indoor or outdoor physical environment, etc.). In some embodiments, as shown in FIG. 7A, two or more users (e.g., the user 7102, the user 7002, etc.) are present in the same physical environment. The first user 7102 is viewing a first view 7015-1 of the three-dimensional environment 7015 (e.g., an augmented reality environment, a virtual environment, etc.) via a first display generation component (e.g., the display generation component 7200, another type of display generation component such as an HMD, etc. used by the first user, etc.). The second user 7002 is viewing a second view 7015-2 of the same three-dimensional environment 7015 via a second display generation component (e.g., the display generation component 7100, another type of display generation component such as an HMD, etc. used by the second user, etc.). In some embodiments, the three-dimensional environment 7015 (e.g., labeled as 7015-1 when presented via the first display generation component 7200, labeled as 7015-2 when presented via the second display generation component 7100, etc.) is an environment of a shared computer-generated experience, a communication session, an application environment, a game, a movie, etc.

In some embodiments, the first user 7102 and the second user 7002 are not necessarily located in the same physical environment at the same time, and may be separately located in two different physical environment. In some embodiments, the three-dimensional environment 7015 includes a representation of the physical environment of the first user and not of the second user, and the first user and the second user have a shared experience in the three-dimensional environment based on the physical environment of the first user. In some embodiments, the three-dimensional environment 7015 includes a representation of the physical environment of the second user and not of the first user, and the first user and the second user have a shared experience in the three-dimensional environment based on the physical environment of the second user. In some embodiments, the three-dimensional environment 7015 includes a representation of a third physical environment that is not the physical environment of the first user or the physical environment of the second user, and the first user and the second user have a shared experience in the three-dimensional environment based on the third physical environment (e.g., the physical environment of a third user that is participating in the shared experience, another physical environment that is not associated with a user or that is associated with a user who is not participating in the shared experience, etc.). In some embodiments, the three-dimensional environment 7015 includes a virtual three-dimensional environment, and the first user and the second user have a shared experience in the virtual three-dimensional environment. In some embodiments, the positions and movements of the first user and the second user in their respective physical environments (e.g., same physical environment, different physical environments, etc.) are mapped (e.g., using the same mapping relationship, or different mapping relationship, etc.) to positions and movements in the same three-dimensional environment, but the appearance of the three-dimensional environments may be adjusted (e.g., with different wallpapers, color schemes, with different virtual furniture, etc.) to tailor to a respective user in the view of the three-dimensional environment shown to the respective user.

In some embodiments, the computer system determines that the three-dimensional environment is at least partially shared between the first user 7102 and the second user 7002 in accordance with a determination that at least a spatial portion of the environment 7015 (e.g., a spatial portion of the environment that corresponds to the living room, but not the kitchen; a spatial portion of the environment that corresponds to the portion of physical space in front of the first user, but no the portion of physical space behind the first user, etc.) is shared. In some embodiments, the computer system determines that the three-dimensional environment is at least partially shared between the first user and the second user in accordance with a determination that at least a spatial portion of the environment 7015 is shared during at least a period of time (e.g., during a communication session between the first user and the second user, during the morning, during working hours, when both users are online, etc.). In some embodiments, the computer system determines that the three-dimensional environment 7105 is at least partially shared between the first user and the second user in accordance with a determination that the objects in the environment 7015 are shared fully or partially (e.g., simultaneously viewable and accessible, simultaneously viewable but not simultaneously accessible, viewable but not accessible when others have control (e.g., said others can be viewing or not viewing the object, etc.). In some embodiments, the computer system determines that the three-dimensional environment 7015 is at least partially shared between the first user and the second user in accordance with a determination that at least a portion of the three-dimensional environment 7015 (e.g., the portion shown in the first view 7015-1 of the three-dimensional environment, another portion of the three-dimensional environment 7015, etc.) is displayed for viewing by both the first user and the second user at the same time. In some embodiments, the computer system determines that the three-dimensional environment 7015 is at least partially shared between the first user and the second user in accordance with a determination that some or all of the virtual objects in the three-dimensional environment are concurrently displayed in the three-dimensional environment to both the first user and the second user.

In FIGS. 7B and 7C, the computer system displays the first view 7015-1 of the three-dimensional environment 7015 that is at least partially shared between the first user 7102 and the second user 7002, via the first display generation component 7200; and at substantially the same time (e.g., adjusted for network delays, processing time delays, etc.), the computer system or another computer system in communication with the computer system displays the second view 7015-2 of the three-dimensional environment 7105 via the second display generation component 7100. The first view 7015-1 and the second view 7015-2 both include at least a first portion of the three-dimensional environment (e.g., a respective portion that corresponds to the same portion of the physical environment represented in the three-dimensional environment, a respective portion that corresponds to the same portion of the virtual environment of the three-dimensional environment, etc.), in accordance with some embodiment. In some embodiments, the first portion of the three-dimensional environment is optionally shown from different viewing angles in the first view 7015-1 and the second view 7015-2 of the three-dimensional environment 7105 (e.g., based on the respective spatial relationships between the first user and his/her physical environment, and/or the respective spatial relationships between the first user and his/her physical environment, etc.)

In some embodiments, the first view 7015-1 has a first viewpoint with a position that corresponds to the current location of the first user 7102 in his/her physical environment, and the position moves in the three-dimensional environment 7015 in accordance with the movement of the first user 7102 in the physical environment of the first user 7102 (e.g., scene 105, another physical environment, etc.). In some embodiments, the second view 7015-2 has a second viewpoint with a position in the three-dimensional environment 7015 that corresponds to the current location of the second user 7002 in his/her physical environment, and the position moves in the three-dimensional environment 7015 in accordance with the movement of the second user 7002 in the physical environment of the second user (e.g., scene 105, another physical environment, etc.). In some embodiments, the viewpoint of a currently displayed view of the three-dimensional environment 7015 that is shown via a respective display generation component (e.g., the first display generation component 7200, the second display generation component 7100, etc.) has a position in the three-dimensional environment 7015 that corresponds to the current location of the respective display generation component, and the position moves in the three-dimensional environment 7015 in accordance with the movement of the respective display generation component in the physical environment of the respective display generation component (e.g., scene 105, another physical environment, etc.). In some embodiments, the viewpoint of a currently displayed view of the three-dimensional environment 7015 that is shown via a respective display generation component (e.g., the first display generation component 7200, the second display generation component 7100, etc.) has a position in the three-dimensional environment that corresponds to the current location of one or more cameras associated with the respective display generation component, and the position moves in the three-dimensional environment 7015 in accordance with the movement of the one or more cameras associated with the respective display generation component in the physical environment of the respective display generation component (e.g., scene 105, another physical environment, etc.). In the example shown in FIGS. 7A-7C, even though the first view 7015-1 and the second view 7015-2 appear to have the same viewpoint, it is to be understood that the respective views shown via the first display generation component 7200 and the second display generation 7100 component and their corresponding viewpoints are separately and independently determined based on the spatial relationships and movements existing in the respective physical environments of the first display generation component (and the first user) and the second display generation component (and second user), and do not have to be exactly the same at a given time.

In FIGS. 7B and 7C, the first view 7015-1 and the second view 7015-2 of the three-dimensional environment 7015 include one or more user interface objects (e.g., the first user interface object 7016, a second user interface object 7018, other user interface objects, virtual three-dimensional objects, etc.), and optionally, one or more surfaces (e.g., representations 7004' or 7004" of the wall 7004, representations 7006' or 7006" of the wall 7006, representation 7008' or 7008" of the floor 7008, virtual surfaces such as virtual walls, virtual screens, virtual windows, virtual scenery, etc.), and/or representations of one or more physical objects (e.g., representation 7014' or 7014" of a physical object 7014 in the physical environment 7014, representations of other physical objects in another physical environment represented in the three-dimensional environment 7015, etc.). In some embodiments, the first view 7015-1 and the second view 7015-2 do not include a representation of a physical environment and includes a virtual three-dimensional environment (e.g., a virtual conference room, a game environment, a virtual experience, a virtual sports arena, etc.).

In some embodiments, the first user interface object 7016 is a representation of an application, and interaction with the first user interface object that meets preset criteria causes the computer system to start the application in the three-dimensional environment or perform an application function of the application. In some embodiments, the first user interface object 7016 is a user interface that includes a plurality of user interface objects (e.g., selectable avatars, selectable menu items, selectable device controls, selectable content items, slider controls, buttons, etc.). In some embodiments, the first user interface object 7016 is a virtual three-dimensional object that can be manipulated (e.g., deformed, separated into parts, rotated, moved, etc.) in the three-dimensional environment in accordance with the user's hand movement in the physical environment. In some embodiments, the first user interface object 7016 is a single control or a control panel that includes multiple controls corresponding to different functions or operations. In some embodiments, the first user interface object 7016 is an information item, a notification, an alert, etc. In some embodiments, the first user interface object 7016 is a media item or a document, etc.

In some embodiments, as shown in FIGS. 7B and 7C, the first view 7015-1 includes a representation 7202' of a hand 7202 of the first user 7102, and a representation 7028' of a hand 7028 of the second user 7002; and the second view 7015-2 includes a representation 7202" of the hand 7202 of the first user 7102, and a representation 7028" of the hand 7028 of the second user 7002. In the scenario shown in FIGS. 7B and 7C, the second user 7002 has control of the first user interface object 7016 in exclusion of contemporaneous interaction between the first user 7102 and the first user interface object 7016. For example, in some embodiments, when the first user interface object 7016 is in the control of the first user 7002, the first user interface object 7016 is displayed at a position in the three-dimensional environment 7015 that corresponds to a location of the hand 7028 of the second user 7002 in the physical environment of the second user 7002. In some embodiments, when the first user interface object 7016 is in the control of the second user 7002, a representation of the first user interface object 7016 is displayed at a position in the three-dimensional environment 7015 that corresponds to the location of the hand 7028 of the second user 7002 in the physical environment of the second user 7002, while the first user interface object 7016 is displayed at another position that is separate from the position of the representation of the first user interface object 7016. In this example, the second user 7002 has control of the first user interface object 7016, and the first user interface object 7016 is displayed at a position in the three-dimensional environment 7015 that corresponds to the location of the second user's hand 7028. In some embodiments, when the first user interface object 7016 is in the control of the second user 7002, the first user interface object 7016 is oriented in the three-dimensional environment 7105 such that a preset surface (e.g., a front surface A, a content presenting surface, an interactive surface, etc.) of the first user interface object 7016 faces toward the viewpoint corresponding to the currently displayed second view 7015-2 of the three-dimensional environment 7015 (e.g., the view that is shown to the second user 7002 who has control of the first user interface object 7016, the view that is displayed by the second display generation component 7100, etc.). In some embodiments, the first user interface object 7016 can be reoriented in the three-dimensional environment by the second user 7002 who has control of the first user interface object 7016, such that the preset surface of the first user interface object 7016 faces toward the viewpoint corresponding to the currently displayed first view 7015-1 of the three-dimensional environment (e.g., the view that is shown to the first user 7102 who does not have control of the first user interface object 7016 at the time, the view that is displayed by the first display generation component 7200, etc.). In some embodiments, at least some of the content on the first user interface object 7016 is only shown in the second view 7015-2 of the three-dimensional environment, and not show in the first view 7015-1 of the three-dimensional environment, when the first user interface object 7016 is in the control of the second user 7002 and not shared with the first user 7102 (e.g., even if the content displaying side of the first user interface object 7016 is within the first view 7015-1 of the three-dimensional environment that is presented to the first user 7102 by the first display generation component 7200). In some embodiments, the second user 7002 can make the hidden content of the first user interface object 7016 visible to the first user 7102 by re-orientating the first user interface object 7016, such that the content presenting side of the first user interface object 7016 is faced away from the viewpoint of the second view 7015-2.

In FIGS. 7B and 7C, the first view 7015-1 and the second view 7015-2 both include a respective representation (e.g., representation 7202' or 7202") of the first user's hand 7202 and a respective representation (e.g., representation 7028' or 7028") of the second user's hand 7028. In some embodiments, the computer system displays the representations of the hands based on camera views of the users' hands. In some embodiments, the computer system provides a view of the representations of the hands through a transparent portion of the display generation component(s). In some embodiments, the computer system generates stylistic representations of the user's hands based on sensor information received from one or more sensors located in the physical environment(s) of the first user and the second user. In some embodiments, the position and configuration of the representations of the user's hand(s) change in accordance with the location(s) and configuration(s) of the user's hand(s) in the physical environment(s) of the users. In some embodiments, the computer system displays the representations of the hands based on camera views of the users' hands. In some embodiments, the computer system displays the representation of the hand of one user, but not the representation of the hand of the other user, at a given time. For example, when the second user 7002 has control of the first user interface object 7016, the representation of the second user's hand 7028 is, optionally, displayed only in the second view 7015-2 shown to the second user 7002, and not in the first view 7015-1 shown to the first user 7102. In another example, the representation of a user's hand may move in and out of the field of view provided via a respective display generation component, due to the movements of the first user and/or the second user (and/or their respective display generation components or cameras, etc.) in their respective physical environments.

In FIGS. 7B and 7C, in the second view 7015-2 of the three-dimensional environment that is displayed via the second display generation component 7100 used by the second user 7002 who has control of the first user interface object 7016, the first user interface object 7016 is displayed with a first set of appearance properties (e.g., the normal appearance (e.g., first shape, first size, first color, first opacity, first level of saturation, first level of luminance, etc.) of the first user interface object as displayed by the second display generation component to the second user). The first user interface object 7016 maintains the first set of appearance properties in the control of the second user 7002, irrespective of whether or not the first user 7102 is attempting to access the first user interface object 7016 with a respective movement or input directed to the first user interface object. The first user interface object 7016 may change its appearance in a respective way in accordance with the interaction between the second user 7002 and the first user interface object 7016 through the computer system used by the second user 7002. These changes in the appearance caused by the interaction between the second user 7002 and the first user interface object 7016 are optionally shown in both the first view 7015-1 and the second view 7015-2 at any given time that the changes occur.

In FIG. 7B, when the first user 7002 is not attempting to access or gain control of the first user interface object 7016 (e.g., via movement of a portion of the user such as the hand of the user, via a gaze input, via an in-air gesture, via a gesture that involves movement of one portion of a hand relative to another portion of the hand, via an input provided via a control object, etc.) while the first user interface object 7016 is in the control of the second user 7002, the first user interface object 7016 is displayed with the same first set of appearance properties in the first view 7015-1 as in the second view 7015-2 of the three-dimensional environment (optionally, from a different viewing perspective, and/or with redaction of hidden content, etc.). The movement of the first user's hand 7202 in the physical environment of the first user 7102 may be represented in both the first view 7015-1 and the second view 7015-2 if the first view and the second view both captures the portion of the three-dimensional environment that corresponds to the location of the physical space that includes the first user's hand 7202.

In contrast, in FIG. 7C, the computer system detects a first user input provided by the first user 7102 that is directed to the first user interface object 7016. For example, in some embodiments, the computer system detects movement of a portion of the first user 7102 (e.g., the user's hand 7202, another hand of the first user, etc.) to a location in the physical environment of the first user 7102 that corresponds to the position of the first user interface object 7016 in the three-dimensional environment 7015. In some embodiments, the computer system detects a gaze input directed to the first user interface object 7016 and a control input (e.g., a finger movement gesture, an in air gesture, an input provided by a controller, etc.) that is detected in conjunction with the gaze input. In the example shown in FIG. 7C, the first user input is movement of the first user's hand 7202 to a location corresponding to the position of the first user interface object 7016, and, optionally, with a movement or posture to grab the first user interface object 7016 in the three-dimensional environment. In some embodiments, the representation of the movement, position, and/or posture of the hand 7202 of the first user 7102 is shown in both the first view 7015-1 and the second view 7015-2. In some embodiments, the representation of the movement, position, and/or posture of the hand 7202 of the first user 7102 is shown in only the first view 7015-1 and not in the second view 7015-2. In some embodiments, by not showing the movement, position, and/or posture of the hand 7202 of the first user 7102 in the second view 7015-2, the computer system used by the second user 7002 reduces the distraction to the second user 7002 when the second user 7002 interacts with the first user interface object 7016.

In FIG. 7C, in response to detecting the first user input that is directed to the first user interface object 7016 and in accordance with a determination that the second user 7002 is currently interacting with the first user interface object (e.g., has control of the first user interface object 7016, has control of the first user interface object in exclusion of a requested interaction by the first user 7102, etc.), the computer system displays a visual indication that the first user interface object 7016 is not available for interaction with the first user 7102. In some embodiments, displaying the visual indication includes changing at least one of an appearance of the first user interface object 7016 or a position of the first user interface object 7016 in the first view 7015-1 of the three-dimensional environment 7015.

In some embodiments, the computer system determines that the second user 7002 is currently interacting with the first user interface object 7016 in accordance with a determination that the first user interface object 7016 has a preset spatial relationship to a virtual position of the second user 7002 in the three-dimensional environment (e.g., the first user interface object 7016 is in the representation of the second user's palm or hand 7028, the first user interface object 7016 is within the second user's private space that is within the first view 7015-1 of the three-dimensional environment, etc.). In some embodiments, the computer system determines that the second user 7002 is currently interacting with the first user interface object 7016 in accordance with a determination that the second user 7002 is controlling, selecting, moving, modifying, and/or otherwise interacting with the first user interface object 7016 through a computer system that displays the second view 7015-2 of the three-dimensional environment via the second display generation component 7100.

In some embodiments, to display the visual indication in the first view 7015-1 of the three-dimensional environment 7015 to indicate that the first user interface object 7016 is not available for interaction with the first user 7102, the computer system displays the first user interface object 7016 with a second set of appearance properties (e.g., second shape, second size, second color, second opacity, second level of saturation, second level of luminance, etc.) that are different from the first set of appearance properties (e.g., the second set of appearance properties provide a visual indication that the first user interface object is in control of the second user at this moment, and is not available for interacting with the first user). For example, the first user interface object 7016 shown in the first view 7015-1 in FIG. 7C is more translucent than that shown in the second view 7015-2 in FIG. 7C. In some embodiments, to display the visual indication in the first view 7015-1 of the three-dimensional environment 7015 to indicate that the first user interface object 7016 is not available for interaction with the first user 7102, the computer system moves the first user interface object 7016 out of the way when the first user 7102 tries to grab it. In some embodiments, the first user interface object 7016 maintains its appearance and/or position in the second view 7015-2 displayed to the second user 7002, as the visual indication only needs to be displayed to the first user 7102. In some embodiments, if the first user input provided by the first user 7102 corresponds to a request to perform a first operation with respect to the first user interface object 7016, the computer system, in accordance with a determination that the second user 7002 is currently interacting with the first user interface object 7016 (e.g., has control of the first user interface object 7016, has control of the first user interface object in exclusion of a requested interaction by the first user 7102, etc.), does not perform the first operation with respect to the first user interface object 7016. For example, in some embodiments, the computer system does not show the first user interface object 7106 being grabbed by the representation 7202' of the first user's hand 7202. In some embodiments, the computer system does not show a ghost image or another representation of the first user interface object 7016 moving into the representation 7202' of the first user's hand 7202.

In some embodiments, in response to detecting the first user input that is directed to the first user interface object 7106 and in accordance with a determination that the second user 7002 is not currently interacting with the first user interface object 7016, the computer system performs the first operation with respect to the first user interface object in accordance with the first user input. In some embodiments, performing the first operation includes showing the first user interface object 7016 being grabbed or moved by the first user 7102 in accordance with the first user input (e.g., moved toward a virtual position of the first user 7102 in the three-dimensional environment, moved in accordance with the movement of the first user input, etc.). In some embodiments, performing the first operation includes showing a ghost image or other representation of the first user interface object 7016 being grabbed and/or moving into a representation 7202' of the first user's hand 7202. In some embodiments, the first user interface object 7106 continues to be displayed with the first set of appearance properties (e.g., at its original location or in a representation of the first user's hand, etc.) in accordance with a determination that the second user 7002 was not interacting with the first user interface object 7016 when the first user input from the first user 7102 was detected.

In some embodiments, when the first user 7102 attempts to grab the first user interface object 7016 or otherwise interact with the first user interface object while the second user 7002 is interacting with the first user interface object, the computer system changes the appearance of the first user interface object, such as fading out the first user interface object in the first view 7015-1 displayed to the first user 7102 as the first user 7102 tries to grab the first user interface object 7016. For example, the computer system changes at least one of the first set of appearance properties of the first user interface object 7016 (e.g., increasing a transparency level, reducing color saturation, reducing opacity, blurring, darkening, reducing resolution, shrinking in size, etc. of the first user interface object, optionally, while maintaining the appearance of the surrounding environment of the first user interface object 7016 (e.g., not changing the appearance and/or visual prominence of the surrounding environment), etc.) to reduce visual prominence of the first user interface object 7016 in the first view 7015-1 of the three-dimensional environment. In some embodiments, in response to detecting that the first user 7102 has ceased to attempt to interact with the first user interface object 7016, the computer system restores (e.g., to the level existed immediately prior to detecting the first user input, or prior to changes being made in response to detecting the first user input, etc.) at least one (e.g., some, all, etc.) of the first set of appearance properties of the first user interface object that was changed in response to the first user's attempts to grab the first user interface object or otherwise interact with the first user interface object, to restore the visual prominence of the first user interface object.

In some embodiments, if the first user interface object 7016 is moved away from the position that corresponds to the location of the first user's hand 7202 (e.g., moved away from the representation 7202' of the hand 7202 in the three-dimensional environment 7015 by the action of the second user 7002, and/or in accordance with other events that occurred in the three-dimensional environment (e.g., events that are unrelated to the attempt for interaction by the first user 7102), etc.), the computer system restores (e.g., to the level existed immediately prior to detecting the first user input, or prior to changes being made in response to detecting the first user input, etc.) at least one of (e.g., some of, all of, etc.) the first set of appearance properties of the first user interface object that was changed in response to the first user's attempt to grab the first user interface object or otherwise interact with the first user interface object, to restore the visual prominence of the first user interface object.

In some embodiments, after the visual indication that the first user interface object 7016 is not available for interaction with the first user 7102 is displayed in the first view 7015-1, the computer system continues to display the visual indication until the computer system detects that the second user 7002 is no longer interacting with the first user interface object and/or has relinquished control of the first user interface object, such that the first user interface object is available for interaction with the first user 7102. In some embodiments, after the visual indication that the first user interface object 7016 is not available for interaction with the first user 7102 is displayed in the first view 7015-1, the computer system continues to display the visual indication for a preset period of time (e.g., ten seconds, five seconds, etc.) after the first user has ceased to attempt to interact with the first user interface object 7106 via the first user input or another input.

In some embodiments, the first user interface object 7016 can be sent to a position that corresponds to the location of the first user (e.g., a position that corresponds to the hand 7202 of the first user 7102, a position that corresponds to a private space surrounding the first user 7102, etc.) in accordance with a gesture input (e.g., a toss gesture, a throw gesture, a push gesture, etc.) provided by the second user 7002 who has control of the first user interface object 7016. In some embodiments, the first user interface object 7016 rotates (e.g., reorients, changes a facing direction, etc.) while traveling from a first position to a second position in the three-dimensional environment 7015 as a result of the gesture input provided by the second user 7002. In some embodiments, the first user interface object 7016 can also be sent to a position that corresponds to the location of the second user 7002 in accordance with a gesture input (e.g., a toss gesture, a throw gesture, a push gesture, etc.) provided by the first user 7102 after the first user 7102 has gained control of the first user interface object 7016. In some embodiments, the first user interface object 7016 rotates (e.g., reorients, changes a facing direction, etc.) while traveling from the second position to a third position in the three-dimensional environment 7015 as a result of the gesture input provided by the first user 7102. In some embodiments, the first user interface object 7106 rotates to have its content presenting side or interactive side facing toward the recipient of the first user interface object.

In some embodiments, the first user interface object 7016 can be sent to a position in the three-dimensional environment where the first user interface object can be seen by both the first user and the second user with a better view (e.g., displayed in the center of the three-dimensional environment 7015, displayed at a position that corresponds to a wall of the physical environment 105, displayed at a virtual surface in the three-dimensional environment 7015, etc.) in response to a gesture input (e.g., a toss gesture, a throw gesture, a push gesture, etc.) provided by the user who has control of the first user interface object. In some embodiments, the first user interface object rotates (e.g., reorients, changing a facing direction, etc.) while traveling to the position in the three-dimensional environment, such that when it arrives at the position in the three-dimensional environment, it will have an orientation that enables both the first user and the second user to view its content and/or interactive side and/or have a preset spatial relationship (e.g., overlaying, parallel to, at an angle relative to, perpendicular to, upright relative to, etc.) to a surface (e.g., a representation of a wall surface, table surface, a virtual surface, a virtual screen, a virtual tabletop, etc.) at the position of the three-dimensional environment.

In some embodiments, the computer system changes the position of the first user interface object 7016 in the first view 7015-1 of the three-dimensional environment as the visual indication that the first user interface object 7016 is not available for interaction with the first user 7102. In some embodiments, changing the position of the first user interface object in the first view 7015-1 of the three-dimensional environment includes moving the first user interface object 7016 from the original position of the first user interface object to maintain at least a preset distance between the first user interface object and a representation 7202' of the hand 7202 of the first user 7102 that provided the first user input (e.g., the first user interface object appears to move in one or more directions to avoid the representation 7202' of the hand 7202 of the first user 7102 that tries to grab the first user interface object). In some embodiments, the movement of the first user interface object 7016 is accompanied by changes made to the appearance of the first user interface object (e.g., the first user interface object appears to be faded or dimmed while moving to avoid the representation 7202' of the hand of the first user 7102 getting too close to itself).

In some embodiments, if the first user interface object 7016 is not in the control of the second user 7002, and is available for interaction with the first user 7102, the computer system moves the first user interface object 7016 toward the representation 7202' of the first user's hand 7202 in the first view 7015-1 of the three-dimensional environment 7015, and optionally, also in the second view 7015-2 of the three-dimensional environment.

In some embodiments, the first user input provided by the first user 7102 includes (e.g., is, includes, starts with, ends with, etc.) a predefined selection gesture (e.g., the selection gesture is a pinch gesture that includes touch-down of an index finger on a thumb of the same hand (optionally, followed by lifting off of the index finger from the thumb, or flick of the wrist connected to the hand, or translation of the whole hand, etc.), a gesture that includes an index finger and a thumb of the same hand pulling apart from each other from a touching posture, a pinch gesture, a pinch and drag gesture, a pinch and flick gesture, etc.). In some embodiments, the computer system selects the first user interface object 7016 as a target for a subsequent input (e.g., a drag gesture while the pinch gesture is maintained, a flick gesture while the pinch gesture is maintained, a drag gesture after the predefined selection gesture is terminated, etc.) received from the first user 7102, in response to detecting the first user input while the second user 7002 is not interacting with the first user interface object 7016. In some embodiments, in conjunction with selecting the first user interface object 7016 as a target for a subsequent input received from the first user 7102, the computer system displays a representation of the first user interface object 7016 (e.g., a duplicate of the first user interface object, a ghost image of the first user interface object, etc.) at a position that corresponds to a location of the hand 7202 of the first user 7102, while maintaining the first user interface object 7106 at the first position in the first view 7015-1 of the three-dimensional environment (e.g., the first user interface object remains at its original location, but can be "remotely" controlled by the first user 7102 in accordance with interaction between the first user 7102 and the representation of the first user interface object). In some embodiments, the representation of the first user interface object is displayed near the representation 7202' of the first user's hand 7202, but does not go to the position that corresponds to the location of the first user's hand until the computer system detects another selection input provided by the first user 7102. In some embodiments, the computer system changes the shape of the representation of the first user interface object in accordance with a determination that the first user 7102 is providing an input that is consistent with the requirements of the selection input, and the change in the shape of the representation of the first user interface object optionally provides visual guidance about the requirements for completing the selection input. In some embodiments, user interactions with the representation of the first user interface object is translated into interaction with the first user interface object, and causes the computer system to perform operations with respect to the first user interface object in accordance with the interaction between the first user 7102 and the representation of the first user interface object. In some embodiments, the representation of the first user interface object remains displayed at the position of the representation 7202' of the first user's hand 7202 to indicate that the first user 7102 has control of the first user interface object, optionally, in exclusion of interaction of other users that are sharing the three-dimensional environment with the first user.

In some embodiments, some or all the features described above with respect to the behaviors of the computer systems, the first display generation component 7200 and the second display generation component 7100 in FIGS. 7A-7C are equally applicable to other scenarios where the roles of the first user 7102 and the second user 7002 with respect to the first user interface object 7016 are reversed. In such other scenarios, the operations of the computer systems and display generation components used by the first user and the second user may be reversed accordingly in a particular scenario. The features described above are still valid, and therefore not repeated herein in the interest of brevity.

FIGS. 7D-7F are block diagrams illustrating a method of displaying a representation of a physical object relative to a viewpoint of a currently displayed view of a three-dimensional environment in different manners, where the viewpoint moves in accordance with movement of the user in a first physical environment, the representation of the physical object moves in accordance with movement of the physical object in a second physical environment different from the first physical environment, and where a change in the manner of displaying the representation is triggered in response to a spatial relationship between the representation of the physical object and the viewpoint meeting preset criteria, in accordance with some embodiments.

In some embodiments, the computer system displays a view of a three-dimensional environment 7304 that includes a representation of a physical object (e.g., a second user 7102, an animal, a moving drone, etc.) that is located in a different physical environment (e.g., scene 105-b, or another indoor or outdoor physical environment, etc.) from the physical environment (e.g., scene 105-a, or another indoor or outdoor physical environment, etc.) of a first user (and of a first display generation component 7100 used by the first user 7002 to view the three-dimensional environment 7204). The computer system, optionally, moves the viewpoint corresponding to the currently displayed view of the three-dimensional environment 7304 in accordance with the movement of the first user 7002 (and/or the first display generation component 7100) in their physical environment (e.g., scene 105-a, or another physical environment, etc.). The computer system determines the position and movement path of the representation of the physical object (e.g., representation 7102'-a of the second user 7102, representation of another physical object, etc.) in the three-dimensional environment 7204 based on a location and movement path of the physical object in its physical environment (e.g., scene 105-b, or another physical environment, etc.). The computer system utilizes a first type of correspondence (e.g., mapping and conversion relationships; optionally, different mapping and conversion relationships for the viewpoint, the physical object, and the first user, etc.) between positions in the three-dimensional environment 7304 and locations in a respective physical environment (e.g., the physical environment 105-a of the first user 7002 and the first display generation component 7100, the physical environment of the physical object (e.g., physical environment 105-b of the second user 7102, another physical environment of the physical object, etc.), etc.). Under some conditions (e.g., due to movement of the first user 7002, and/or movement of the physical object (e.g., a physical object represented by the second user 7102 in this example), etc.), the position of the representation of the physical object would be within a threshold distance (e.g., an arm's length, three feet, a user-specified distance, etc.) of the position of the viewpoint of the currently displayed view (e.g., view 7304-a, 7304-a', etc.) of the three-dimensional environment 7304 shown via the first display generation component 7100, if the position(s) are determined using the first type of correspondence between positions in the three-dimensional environment 7304 and locations in the physical environments (e.g., scenes 105-a, 105-b, etc.). Under such conditions, the computer system displays the representation of the physical object (e.g., representation 7102'-a, in this example) at an adjusted position that is offset from the position determined based on the first type of correspondence (e.g., as shown in FIG. 7F). In some embodiments, the adjusted position is determined based on a second type of correspondence that is different from the first type of correspondence and ensures that the adjusted position remains more than the threshold distance from the position of the viewpoint of the currently displayed view of the three-dimensional environment shown via the first display generation component (e.g., view 7304-a", subsequent views shown via the first display generation component 7100, etc.). The computer system continues to use the second type of correspondence to determine the adjusted position of the representation of the physical object (e.g., representation 7102'-a, in this example), until the unadjusted position calculated based on the first type of correspondence is more than the threshold distance away from the position of the viewpoint of the currently displayed view of the three-dimensional environment shown via the first display generation component (e.g., view 7304-a", subsequent views shown via the first display generation component 7100, etc.).

In some embodiments, when a computer system provides a view of a three-dimensional environment 7304 to a first user 7002, and the position of the viewpoint corresponding to the currently displayed view of the three-dimensional environment 7304 is based on the location of the first user's head, body, or eyes, in the physical environment of the first user 7002, the computer system sometimes displays representations of other physical objects (e.g., a physical object represented by the second user 7102 in this example, but may be an inanimate object or an animate object that is not sharing the computer-generated environment 7304 with the first user 7002, etc.) at positions corresponding to locations of the physical objects in their respective physical environment. In some circumstances, even though there is no danger or possibility of actual physical collision or uncomfortable spatial proximity between the first user 7002 and the other physical objects in the real world, the positions of the representations of the physical objects may collide with or get too close to the position of the viewpoint corresponding to the view shown to the first user (e.g., if not specifically adjusted, otherwise addressed, etc.), and making the visual experience of the first user in the three-dimensional environment uncomfortable or jarring to the first user at times.

As disclosed herein, the computer system determines the position for a representation of a physical object located in a different physical environment from the first user based on a first type of correspondence or mapping relationship between positions in the three-dimensional environment and corresponding locations in a physical environment the physical object, when the position of the representation of the physical object determined based on the first type of correspondence is not within a threshold range of the viewpoint corresponding to the currently displayed view of the three-dimensional environment shown to the first user. That means, if the representation of the physical object is at a distance from the virtual position of the viewpoint, the movement of the representation of the physical object in the three-dimensional environment can correspond to the movement of the physical object in a manner that mimics movement and spatial relationships in the real world and the representation of the physical object would not invade the sense of personal space of the first user. However, if the representation of the physical object is very close from the virtual position of the viewpoint, the movement of the representation of the physical object that correspond to the movement of the physical object in the same manner (e.g., accordance with the first type of correspondence or mapping relationship) would cause the representation of the physical object to be displayed with an unreasonable size, overlap with the viewpoint, and/or invade the sense of personal space of the first user. Accordingly, in accordance with a determination that the representation of the physical object would be within a threshold distance from the viewpoint based on the first type of correspondence or mapping relationship, the computer system uses a second type of correspondence or mapping relationship between positions in the three-dimensional environment and corresponding locations in the physical environment of the physical object to calculate an adjusted position for the representation of the physical object, such that the representation of the physical object can be displayed at the adjusted position and/or move in a manner to avoid being displayed with an unreasonable size, overlapping with the viewpoint, and/or invading the sense of personal space of the first user.

FIG. 7D illustrates a scenario in which two users, e.g., the first user 7002 and the second user 7102 are sharing a computer-generated three-dimensional environment 7304, in accordance with some embodiments. In some embodiments, the first user 7002 is located in a first physical environment 105-*a*, and the second user 7102 is located in a second physical environment 105-*b*. In some embodiments, the first physical environment and the second physical environment are parts of the same physical environment that may overlap with each other. In some embodiments, the first physical environment and the second physical environment are separate physical environments that do not overlap with each other. In some embodiments, the first physical environment and the second physical environment are optionally indoor environments, outdoor environments, one indoor and one outdoor environment, a mix of indoor and outdoor environments, etc. In this example, the first physical environment includes physical surfaces (e.g., walls 7004-*a* and 7006-*a*, floor 7008-*a*, etc.) and physical objects (e.g., physical object 7010, other physical objects, etc.); and the second physical environment includes physical surfaces (e.g., walls 7004-*b* and 7006-*b*, floor 7008-*b*, etc.) and physical objects (e.g., physical object 7014, other physical objects, etc.). The first user 7002 is a user of the first display generation component 7100 and is provided with a first view 7304-*a* (and subsequently updated first views 7304-*a*', 7304-*a*'', etc.) of the shared three-dimensional environment 7304 via the first display generation component 7100. The second user 7102 is a user of the second display generation component 7200 and is provided with a second view 7304-*b* (and subsequently updated first views 7304-*b*', 7304-*b*'', etc.) of the shared three-dimensional environment 7304 via the second display generation component 7200. For illustrative purposes, the first user 7002 moves forward along a straight line 7300 in the first physical environment 105-*a*, and the second user 7102 moves forward along a straight line 7302 in the second physical environment 105-*b*, where the representation 7300' of the straight line 7300 in the second view 7304-*b* of the three-dimensional environment 7304 passes through the viewpoint of the second view 7304-*b*; and the representation 7302' of the straight line 7302 in the first view 7304-*a* of the three-dimensional environment 7304 passes through the viewpoint of the first view 7304-*a*. In some embodiments, there is no requirement that the movement paths of the first user 7002 and the second user 7102 should be straight lines, and the paths may be in any shapes and/or have any spatial extents suitable in their physical environments. In some embodiments, there is no requirement that the first user and the second user both move in their respective physical environment. In some embodiments, the viewpoint of the currently displayed view of the three-dimensional environment provided via a respective display generation component may not be stationary, and/or may move in accordance with the movement of the respective display generation component and/or the movement of the respective user of the respective display generation component. In some embodiments, there is no requirement that the three-dimensional environment is a shared environment between the first user and the second user. For example, in some embodiments, from the perspective of the first display generation component 7100, the second user 7102 in this example is merely a representation of a physical object (e.g., an animal, a drone, a person that is not using or providing input to the three-dimensional environment, etc.) in the second physical environment. Similarly, in some embodiments, from the perspective of the second display generation component, the first user 7002 in this example is merely a representation of a physical object (e.g., an animal, a drone, a person that is not using or providing input to the three-dimensional environment, etc.) in the first physical environment. In some embodiments, only one of the display generation components (e.g., the first display generation component, the second display generation component, etc.) is used, and the other display generation component does not exist or participate in the processes described herein.

In the example shown in FIG. 7D, the three-dimensional environment 7304 is shared between the user 7002 and the user 7102 in response to a request that is initiated from one of the users 7002 and 7102 using a computer system controlled by said one user, and accepted by another of the users 7002 and 7102 using a computer system controlled by said another user, in accordance with some embodiments. In some embodiments, both users have received and accepted the request to share the three-dimensional environment using their respective computer systems from the computer system used by a third user. In some embodiments, both users have sent requests to share the three-dimensional environment to a server using their respective computer systems, where their requests were accepted by the server. When sharing the computer-generated three-dimensional environment, the locations and orientations of the users and of their respective heads, eyes, hands, arms, and/or wrists are captured in real-time or periodically by sensors (e.g., cameras, motion sensors, etc.) and the location and orientation data is provided to one or both of the computer systems controlled by the users, and/or to a server that is in communication with the computer systems. The location data is used by the computer systems and/or server to determine the respective locations and orientations of the users and of their respective heads, eyes, hands, arms, and/or wrists in the computer-generated three-dimensional environment, and correspondingly, the respective positions of the representations of the users including their respective heads, arms, hands, and/or wrists in the views of the three-dimensional environment provided via the different display generation components associated with the users, as well as the viewing perspectives of the views of the three-dimensional environment provided via the different display generation components associated with the users. In some embodiments, the computer-generated environment shared by the users is an environment of a virtual conference call, a chat session, a multi-player game, a shared computer-generated experience (e.g., group meditation, exercise, game, collaborative work, etc.), etc. In some embodiments, the representation of the users are respective avatars of the users. In some embodiments, the representations of the users optionally are not attached to or supported by a surface in the three-dimensional environment.

In FIG. 7D, part (A), the computer system displays the first view 7304-*a* of the three-dimensional environment 7304 via the first display generation component 7100. In the first view 7304-*a* of the three-dimensional environment, a representation 7102'-*a* of the second user 7102 is displayed at a position that corresponds to the current location of the second user 7102 in the second physical environment 105-*b*. There are other objects in the first view 7304-*a* of the three-dimensional environment, such as a virtual path 7306-*a*, a virtual object 7308-*a*, etc. The respective appearances and display positions of the representation 7102'-*a* of the second user 7102, the virtual object 7308-*a*, and the virtual path 7306-*a* in the first view 7304-*a* are based on their respective positions in the three-dimensional environment relative to the position of the viewpoint of the currently displayed first view 7304-*a* of the three-dimensional environment shown via the first display generation component 7100. In some embodiments, a representation 7002'-*a* of the first user 7002 is, optionally, visible in the first view 7304-*a* of the three-dimensional environment, at a position that corresponds to the virtual position of the first user 7002 and/or the viewpoint of the currently displayed first view 7304-*a* in the three-dimensional environment. In this example, as shown in FIG. 7D, part (A), the computer system displays movement of the representation 7102'-*a* along the representation 7302' of the straight line 7302 toward the virtual position of the viewpoint of the first view 7304-*a*. In the moment depicted in FIG. 7D, the representation 7102'-*a* is displayed at a position that is calculated in accordance with the first type of correspondence between the positions in the three-dimensional environment 7304 and the locations in the second physical environment (e.g., scene 105-*b*, or another physical environment of the second user 7102, etc.). The representation 7102'-*a* of the second user 7102 is shown to move toward and approach the viewpoint of the first view 7304-*a* as the second user 7102 moves forward along the line 7302 in the second physical environment.

In some embodiments, as shown in FIG. 7D, part (B), the computer system or another computer system that is in communication with the computer system, optionally, displays the second view 7304-*b* of the three-dimensional environment 7304 via the display generation component 7200. In the second view 7304-*b* of the three-dimensional environment, a representation 7002'-*b* of the first user 7002 is displayed at a position that corresponds to the current location of the first user 7002 in the first physical environment (e.g., scene 105-*a*, or another physical environment of the first user, etc.). There are other objects in the second view 7304-*b* of the three-dimensional environment, such as a virtual path 7306-*b* (e.g., same virtual path as the virtual path 7306-*a* but viewed from the viewpoint of the second view 7304-*b*), a virtual object 7308-*b* (e.g., the same virtual object as the virtual object 7308-*a* but viewed from the viewpoint of the second view 7304-*b*), etc. The respective appearances and display positions of the representation 7002'-*b* of the first user 7002, the virtual object 7308-*b*, and the virtual path 7306-*b* in the second view 7304-*b* are based on their respective positions in the three-dimensional environment relative to the position of the viewpoint of the currently displayed second view 7304-*b* of the three-dimensional environment shown via the second display generation component 7200. In some embodiments, a representation 7102'-*b* of the second user 7102 is visible in the second view 7304-*b* of the three-dimensional environment, at a position that corresponds to the virtual position of the second user 7102 and/or the viewpoint of the currently displayed second view 7304-*b*. In this example, as shown in FIG. 7D, part (B), the computer system displays movement of the representation 7002'-*b* along the representation 7300' of the straight line 7300 toward the virtual position of the viewpoint of the second view 7304-*b*. In the moment depicted in FIG. 7D, the representation 7002'-*b* is displayed at a position that is calculated in accordance with the first type of correspondence between the positions in the three-dimensional environment 7304 and the locations in the first physical environment (e.g., the scene 105-*a*, or another physical environment of the first user, etc.). The representation 7002'-*b* of the first user 7002 is shown to move toward and approach the virtual position of the viewpoint of the second view 7304-*b* as the first user 7002 moves forward along the line 7300 in the first physical environment.

FIG. 7E illustrates a point in time where either or both the first user 7002 and the second user 7102 have moved in their respective physical environments such that the respective positions of the first user and the second user in the three-dimensional environment 7304 as calculated in accordance with the first type of correspondence (e.g., the first type of correspondence between the positions in the three-dimensional environment 7304 and the locations in the first physical environment, the first type of correspondence between the positions in the three-dimensional environment 7304 and the locations in the second physical environment, etc.) are at a respective preset threshold distance of each other in the three-dimensional environment 7304. In some embodiments, at this time, as illustrated in FIG. 7E, part (A), the respective position of the representation 7102'-*a* of the second user 7102 and the position of the viewpoint of the updated first view 7304-*a*' as calculated in accordance with the first type of correspondence between the positions in the three-dimensional environment 7304 and the locations in the second physical environment is at a first threshold distance of each other in the three-dimensional environment 7304. In some embodiments, optionally, as illustrated in FIG. 7E, part (B), the respective position of the representation 7002'-*b* of the first user 7002 and the position of the viewpoint of the updated second view 7304-*b*' as calculated in accordance with the first type of correspondence between the positions in the three-dimensional environment 7304 and the locations in the first physical environment is at a second preset threshold distance (e.g., the same as the first preset threshold distance, at a different preset threshold distance, etc.) of each other in the three-dimensional environment. In some embodiments, the first threshold distance is different from the second threshold distance, depending on the respective personal settings and other characteristics (e.g., size, shape, posture, activity, etc.) of the first user and the second user.

In FIG. 7E, part (A), in response to detecting the movement of the first user 7002 and the second user 7102 in his/her physical environment, the computer system displays an updated first view 7304-*a*' of the three-dimensional environment with a viewpoint that is moved in accordance with the movement of the first user 7002 in the first physical environment. In some embodiments, the viewpoint of the updated first view 7304-*a*' is stationary in the three-dimensional environment if the first user 7002 and/or the first display generation component 7100 did not move in the first physical environment. In some embodiments, in accordance with a determination that the respective position of the representation 7102'-*a* of the second user 7102 in the three-dimensional environment that is calculated based on the current location of the second user in the second physical environment in accordance with the first type of correspondence is more than or not less than the first preset threshold distance from a respective position in the three-dimensional environment that corresponds to the viewpoint associated with the updated first view 7304-*a*' of the three-dimensional environment, the computer system displays the representation 7102'-*a* at a first display position in the updated first view 7304-*a*' of the three-dimensional environment, where the first display position is the respective position of the representation 7102'-*a* in the three-dimensional environment.

In some embodiments, the first preset threshold distance is an arm's length, a preset radius of a personal space for the first user 7002 in the three-dimensional environment 7304, defined by a preset boundary surface surrounding a virtual position of the first user 7002 in the three-dimensional environment (e.g., the virtual surface of the representation of the first user 7002, or a bounding box surrounding the virtual position of the first user 7002).

In some embodiments, optionally, as shown in FIG. 7E, part (B), in response to detecting the movement of the second user 7102 in his/her physical environment, the computer system of the second user 7102 displays an updated second view 7304-*b*' of the three-dimensional environment 7304 with a viewpoint that is moved in accordance with the movement of the second user 7102 in the second physical environment. In some embodiments, the viewpoint of the updated second view 7304-*b*' is stationary in the three-dimensional environment if the second user 7102 and/or the second display generation component 7200 did not move in the second physical environment. In some embodiments, in accordance with a determination that the respective position of the representation 7002'-*b* of the first user 7002 in the three-dimensional environment that is calculated based on the current location of the first user 7002 in the first physical environment in accordance with the first type of correspondence is more than or not less than the second preset threshold distance from a respective position in the three-dimensional environment that corresponds to the viewpoint associated with the updated second view 7304-*b*' of the three-dimensional environment, the computer system of the second user 7102 displays the representation 7002'-*b* at a second display position in the updated second view 7304-*b*' of the three-dimensional environment, where the second display position is the respective position of the representation 7002'-*b* in the three-dimensional environment.

In some embodiments, the second preset threshold distance is an arm's length, a preset radius of a personal space for the second user 7102 in the three-dimensional environment, defined by a preset boundary surface surrounding a virtual position of the second user 7102 in the three-dimensional environment (e.g., the virtual surface of the representation of the second user 7102, a bounding box surrounding the virtual position of the second user 7102, etc.), etc.

In FIG. 7F, the next moment after that shown in FIG. 7E, as the movement of either or both the first user 7002 and the second user 7102 continued in their respective physical environments such that the respective positions of the first user and the second user in the three-dimensional environment as calculated in accordance with the first type of correspondence (e.g., the first type of correspondence between the positions in the three-dimensional environment 7304 and the locations in the first physical environment, the first type of correspondence between the positions in the three-dimensional environment 7304 and the locations in the second physical environment, etc.) are within the respective preset threshold distance of each other in the three-dimensional environment. In some embodiments, at this time, the respective position of the representation of the second user 7102 and the position of the viewpoint of the further updated first view 7304-*a*" as calculated in accordance with the first type of correspondence between the positions in the three-dimensional environment 7304 and the locations in the second physical environment is less than the first preset threshold distance of each other in the three-dimensional environment.

In FIG. 7F, part (A), in response to detecting the further movement of the first user 7002 and/or the second user 7102 in their respective physical environments, the computer system displays the further updated first view 7304-*a*" of the three-dimensional environment with a viewpoint that is moved in accordance with the further movement of the first user 7002 in the first physical environment. In some embodiments, the viewpoint of the further updated first view 7304-*a*" is stationary in the three-dimensional environment if the first user 7002 and/or the first display generation component 7100 did not move in the first physical environment. In some embodiments, in accordance with a determination that the respective position of the representation 7102'-*a* of the second user 7102 in the three-dimensional environment that is calculated based on the current location of the second user 7102 in the second physical environment in accordance with the first type of correspondence is less than the first preset threshold distance from a respective position in the three-dimensional environment that corresponds to the viewpoint associated with the further updated first view 7304-*a*" of the three-dimensional environment, the computer system displays the representation 7102'-*a* at an adjusted display position in the further updated first view 7304-*a*" of the three-dimensional environment, where the adjusted display position is offset from the respective position of the representation 7102'-*a* in the three-dimensional environment at this moment. For example, in FIG. 7F, part (A), instead of displaying the representation 7102'-*a* at a position that is straight in front of the representation 7002'-*a* or overlapping with the representation 7002'-*a* in the further updated first view 7304-*a*'', the adjusted display position of the representation 7002'-*a* is offset to the side (e.g., right side, or another side or direction, etc.) of the representation 7002'-*a* of the first user 7002. In general, instead of displaying the representation 7102'-*a* at a position that is within the first preset threshold distance of the viewpoint of the currently displayed first view 7304-*a*'', the computer system displays the representation 7102'-*a* at an adjusted display position that is offset from the unadjusted position calculated in accordance with the first type of correspondence. In some embodiments, the computer system continues to apply the adjustment to the display position of the representation 7102'-*a* during the movement of the first user 7002 and/or the second user 7102, until the distance between the position of the representation 7102'-*a* and the position of the viewpoint of the currently displayed first view 7304-*a*'' are no longer within the first preset threshold distance of each other.

In some embodiments, optionally, as illustrated in FIG. 7F, part (B), the respective position of the representation 7002'-*b* of the first user 7002 and the position of the viewpoint of the further updated second view 7304-*b*'' as calculated in accordance with the first type of correspondence between the positions in the three-dimensional environment 7304 and the locations in the first physical environment is less than the second preset threshold distance (e.g., the same as the first preset threshold distance, at a different preset threshold distance, etc.) of each other in the three-dimensional environment.

In FIG. 7F, part (B), in response to detecting the further movement of the first user 7002 and/or the second user 7102 in their respective physical environments, the computer system of the second user 7102 displays a further updated second view 7304-*b*'' of the three-dimensional environment with a viewpoint that is moved in accordance with the further movement of the second user 7102 in the second physical environment. In some embodiments, the viewpoint of the further updated second view 7304-*a*'' is stationary in the three-dimensional environment if the second user 7102 and/or the second display generation component 7200 did not move in the second physical environment. In some embodiments, in accordance with a determination that the respective position of the representation 7002'-*b* of the first user 7002 in the three-dimensional environment that is calculated based on the current location of the first user 7002 in the first physical environment in accordance with the first type of correspondence is less than the second preset threshold distance from a respective position in the three-dimensional environment that corresponds to the viewpoint associated with the further updated second view 7304-*b*'' of the three-dimensional environment, the computer system of the second user 7102 displays the representation 7002'-*b* at an adjusted display position in the further updated second view 7304-*b*'' of the three-dimensional environment, where the adjusted display position is offset from the respective position of the representation 7002'-*b* in the three-dimensional environment at this moment. For example, in FIG. 7F, part (B), instead of displaying the representation 7002'-*b* at a position that is straight in front of the representation 7102'-*b* or overlapping with the representation 7102'-*b* in the further updated second view 7304-*b*'', the adjusted display position of the representation 7002'-*b* is offset to the side (e.g., to the right, to another side or direction, etc.) of the representation 7102'-*b* of the second user 7102. In general, instead of displaying the representation 7002'-*b* at a position that is within the second preset threshold distance of the viewpoint of the currently displayed second view 7304-*b*'', the computer system of the second user 7102 displays the representation 7002'-*b* at an adjusted display position that is offset from the unadjusted position calculated in accordance with the first type of correspondence. In some embodiments, the computer system of the second user 7102 continues to apply the adjustment during the movement of the first user and/or the second user, until the distance between the position of the representation 7002'-*b* and the position of the viewpoint of the currently displayed second view 7304-*b*'' are no longer within the preset second threshold distance of each other.

In some embodiments, in the above example, the first user 7002 is moving, and the second user 7102 is stationary. As a result, unless adjusted in the manner described above, the viewpoint of the currently displayed view 7304-*a*, 7304-*a*', and 7304-*a*'' have different positions in the three-dimensional environment; and the representations 7002'-*b* of the first user 7002 has the different positions in the three-dimensional environment (e.g., in the currently displayed first view 7304-*a*, 7304-*a*', and 7304-*a*'' and the currently displayed second view 7304-*b*, 7304-*b*', 7304-*b*'' in FIGS. 7D-7F). Unless as adjusted in the manner described above, the viewpoint of the currently displayed view 7304-*b*, 7304-*b*', and 7304-*b*'' have the same position in the three-dimensional environment; and the representations 7102'-*a* of the second user 7102 has the same position in the three-dimensional environment (e.g., in the currently displayed first view 7304-*a*, 7304-*a*', and 7304-*a*'' and the currently displayed second view 7304-*b*, 7304-*b*', 7304-*b*'' in FIGS. 7D-7F).

In some embodiments, in the above example, the first user 7002 is stationary, and the second user 7102 is moving in the second physical environment. As a result, unless adjusted in the manner described above, the viewpoint of the currently displayed view 7304-*b*, 7304-*b*', and 7304-*b*'' have different positions in the three-dimensional environment; and the representations 7102'-*a* of the second user 7102 has the different positions in the three-dimensional environment (e.g., in the currently displayed first view 7304-*a*, 7304-*a*', and 7304-*a*'' and the currently displayed second view 7304-*b*, 7304-*b*', 7304-*b*'' in FIGS. 7D-7F). Unless as adjusted in the manner described above, the viewpoint of the currently displayed view 7304-*a*, 7304-*a*', and 7304-*a*'' have the same position in the three-dimensional environment; and the representations 7002'-*b* of the first user 7002 has the same position in the three-dimensional environment (e.g., in the currently displayed first view 7304-*a*, 7304-*a*', and 7304-*a*'' and the currently displayed second view 7304-*b*, 7304-*b*', 7304-*b*'' in FIGS. 7D-7F).

In some embodiments, in the above example, the first user 7002 and the second user 7102 are both moving in their respective physical environments. As a result, the viewpoints of the currently displayed first view 7304-*b*, 7304-*b*', and 7304-*b*'', and the viewpoints of the currently displayed second view 7304-*a*, 7304-*a*', 7304-*a*'', all have different positions in the three-dimensional environment; the representations 7102'-*a* of the second user 7102 has the different positions in the three-dimensional environment in the currently displayed first view 7304-*a*, 7304-*a*', and 7304-*a*'' and the currently displayed second view 7304-*b*, 7304-*b*', and 7304-*b*'' in FIGS. 7D-7F; and the representations 7002'-*b* of the first user 7002 has the different positions in the three-dimensional environment in the currently displayed first view 7304-*a*, 7304-*a'*, and 7304-*a"* and the currently displayed second view 7304-*b*, 7304-*b'*, and 7304-*b"* in FIGS. 7D-7F.

In some embodiments, the representation 7002'-*b* of the first user 7002 and/or the representation 7102'-*a* of the second user 7102 are floating in space in the first view and the second view. For example, in some embodiments, the representation 7002'-*b* of the first user 7002 is a floating avatar of the first user 7002 that floats in the second view 7034-*b*, 7034-*b'*, and 7034-*b"*, etc. of the three-dimensional environment, and automatically moves out of the way as the viewpoint of the second view 7034-*b"* gets within the second preset threshold distance of the representation 7002'-*b*, due to movement of the first user and/or the movement of the second user. Similarly, in some embodiments, the representation 7102'-*a* of the second user 7102 is a floating avatar of the second user 7102 that floats in the first view 7034-*a*, 7034-*a'*, and 7034-*a"*, etc. of the three-dimensional environment, and automatically moves out of the way as the viewpoint of the first view 7034-*a"* gets within the first preset threshold distance of the representation 7102'-*a*, due to movement of the first user and/or the movement of the second user. In some embodiments, the avatars of the users in the three-dimensional environment have a level of realism that is selected based on the level of realism of the three-dimensional environment (e.g., photographic level of realism, cartoon level of realism, etc.). In some embodiments, in accordance with a determination that the three-dimensional environment 7304 is displayed with a first level of realism, the representations of the users are displayed with a first set of display properties (e.g., first resolution, first number of dimensions, first level of clarity, first color palette, without lighting effect, etc.) that corresponds to the first level of realism, and in accordance with a determination that the three-dimensional environment is displayed with a second level of realism that is different from (e.g., greater than, less than, etc.) the first level of realism, the representations of the users is displayed with a second set of display properties (e.g., second resolution, second number of dimensions, second level of clarity, second color palette, with lighting effect, etc.) that corresponds to the second level of realism, the second set of display properties are different from (e.g., greater than, less than, adding to, subtracting from, etc.) the first set of display properties.

In some embodiments, when the display position of the representation of a respective user is adjusted, the representation of the respective user moves with a movement component that does not correspond to movement of the respective user in the physical environment in the usual manner (e.g., in accordance with the first type of correspondence, without adjustment, etc.). In some embodiments, the amount of offset that is applied to the adjusted position of the respective representation of a respective user is variable based on the spatial relationship between the respective representation and the virtual position of the viewpoint in the three-dimensional environment. In some embodiments, the adjustment to the display position of the representation 7102'-*a* is optionally applied to the first view 7304-*a"* displayed to the first user 7002, and not to the second view 7304-*b"* displayed to the second user 7102. In some embodiments, the adjustment to the display position of the representation 7002'-*b* is optionally applied to the second view 7304-*b"* displayed to the second user 7102, and not to the first view 7304-*a"* displayed to the first user 7002.

In some embodiments, the three-dimensional environment 7304 includes a virtual three-dimensional environment or an augmented reality environment, and the first user and the second user have a shared experience in the virtual three-dimensional environment. In some embodiments, the positions and movements of the first user and the second user in their respective physical environments (e.g., same physical environment, different physical environments, etc.) are mapped (e.g., using the same mapping relationship, or different mapping relationship, etc.) to positions and movements in the same three-dimensional environment, but the appearance of the three-dimensional environments may be adjusted (e.g., with different wallpapers, color schemes, with different virtual furniture, etc.) to tailor to a respective user in the view of the three-dimensional environment shown to the respective user.

FIGS. 7G-7J are block diagrams illustrating changing a level of immersion with which an environment of a computer-generated experience is displayed in accordance with changing biometric data of a user that is received by the computer system, in accordance with some embodiments.

In some embodiments, the computer system changes the level of immersion with which a computer-generated experience (e.g., visual experience, audio-visual experience, virtual reality experience, augmented reality experience, etc.) is presented to a user in accordance with biometric data (e.g., biometric data represented by bar 7312, other biometric data, etc.) corresponding to the user (e.g., user 7002). For example, when the user is adjusting his/her physical and emotional states after the computer-generated experience is started, e.g., proactively and/or under the influence of the computer-generated content, the computer system may detect changes in the biometric data (e.g., heart rate, blood pressure, breathing rate, etc.) corresponding to the user. In accordance with the changes in the biometric data relative to respective sets of preset criteria associated with different levels of immersion (e.g., a threshold represented by indicator 7326, or other types of thresholds or criteria, etc.), the computer system increases or decreases the level of immersion with which the computer-generated experience is provided to the user (e.g., by changing the visual prominence (e.g., including spatial extent, visual depth, color saturation, visual contrast, etc.) of virtual content relative to the visual prominence of the representation of the physical environment (e.g., by enhancing complexity, spatial extent, and/or visual characteristics of the virtual content, and/or reducing the visual clarity, blur radius, opacity, color saturation, etc. of the representation of the physical environment, etc.).

In the example shown in FIG. 7G-7J, the computer system initially displays a view 7316 of a three-dimensional environment via a display generation component (e.g., display generation component 7100, or another type of display generation component such as an HMD, etc.). In some embodiments, the view 7316 of the three-dimensional environment is a pass-through view of a physical environment of the user 7002, and does not include virtual content or includes a minimal amount of virtual content (e.g., system controls, indicators, etc.) in peripheral portions of the field of view provided by the display generation component. The view 7316 corresponds to a low level of immersion with which a computer-generated experience is provided to a user, e.g., due to the minimal amount of virtual content that is displayed relative to the representation of the user's physical environment. In this example, the view 7316 of the three-dimensional environment includes representations of physical surfaces (e.g., representations 7004' and 7006' of two adjacent walls 7004 and 7006, a representation 7008' of a floor 7008, etc. in the physical environment 105 of the user 7002), and representations of physical objects (e.g., a representation 7010' of a physical object 7010, and representations of other physical objects, etc. in the physical environment 105 of the user 7002).

Figure 7G:
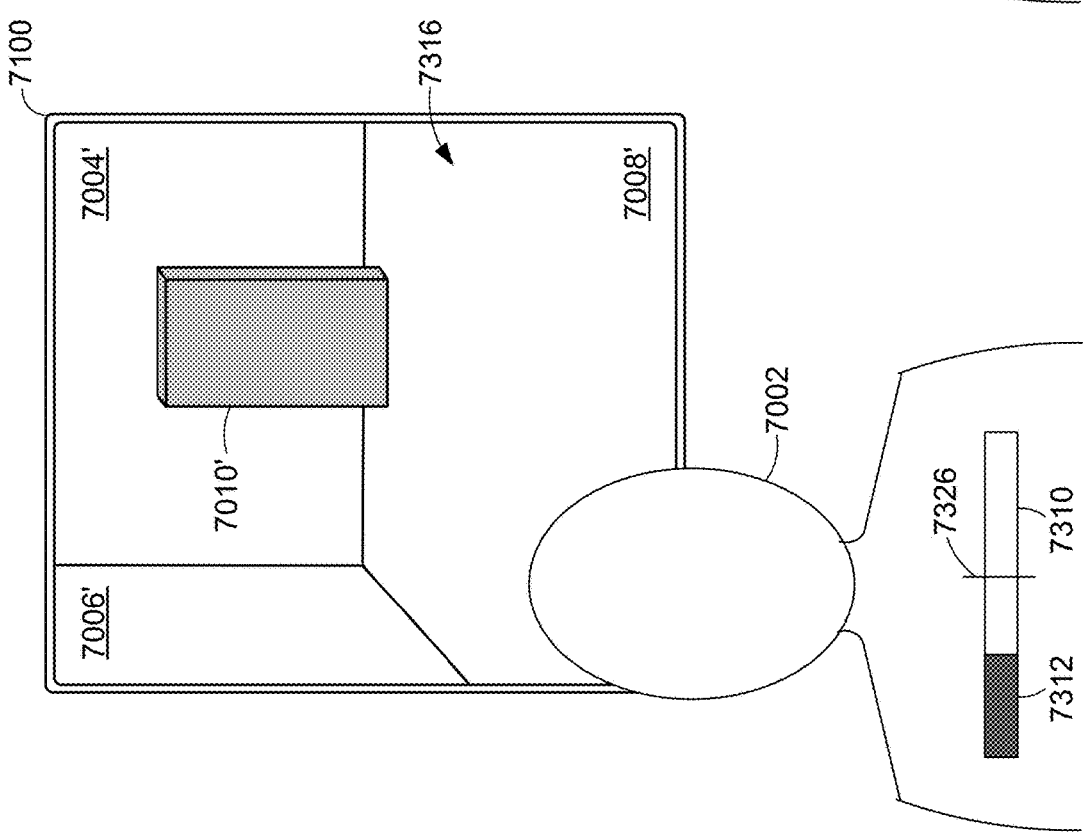

FIG. 7G also illustrates that, the computer system, while displaying the view 7316 of the three-dimensional environment with the low level of immersion (e.g., displaying a pass-through view of the physical environment, or displaying a representation of the physical environment with a minimal amount of virtual content, etc.), the computer system receives biometric data corresponding to the user 7002. In accordance with a determination that the biometric data of the user 7002 does not meet preset criteria corresponding to a next higher level of immersion, the computer system maintains display of the first view 7316 of the three-dimensional environment, without reducing visual prominence of the representation of the physical environment in the currently displayed view of the three-dimensional environment. For example, as illustrated in FIG. 7G, the biometric data has a value or set of values indicated by the length of the bar 7312 relative to a full range of value(s) for the biometric data, and threshold values corresponding to the preset criteria to transition into a different, higher level of immersion is indicated by the position of the indicator 7326 relative to the full range of values for the biometric data.

In some embodiments, the biometric data corresponding to the user 7002 include one or more of a heart rate, a breathing rate, a body temperature, a serum concentration of certain chemicals, medication, and/or hormones, etc., a blood pressure, brain waves, a focus level, a pupil size, a metabolic rate, a blood sugar level, etc., of the user 7002. In some embodiments, the biometric data corresponding the user 7002 include one or more types of biometric data (e.g., breathing rate, blood pressure, focus level, blood sugar level, etc.) that may vary over time during a user's engagement with the computer-generated experience. In some embodiments, the biometric data corresponding to the user include one or more types of biometric data that may vary through the user's physical actions (e.g., meditation, breathing pattern change, exercise, etc., as opposed to direct interaction with user interface elements or controls provided by the computer system during the user's engagement with the computer-generated experience). In some embodiments, the biometric data corresponding to the user includes one or more types of composite metrics of multiple types of biometric data that correspond to a user's mood, happiness, and/or stress level, etc. In some embodiments, the biometric data include real-time data that correspond to the physiological state of the user at the time or within a preset amount of time prior to the display of the current view of the three-dimensional environment via the display generation component. In some embodiments, the biometric data is collected continuously and/or periodically through one or more biometric sensors (e.g., various suitable medical devices, vibration sensors, cameras, thermal sensors, chemical sensors, etc.) connected to or pointed at the user, and continuously and/or periodically transmitted to the computer system. In some embodiments, the biometric data does not include non-transient characteristics of humans (e.g., fingerprint, iris pattern and color, facial features, voiceprint, etc.) that do not typically change over a period of time that an average user is engaged with the computer-generated experience.

Figures 7I, 7J:
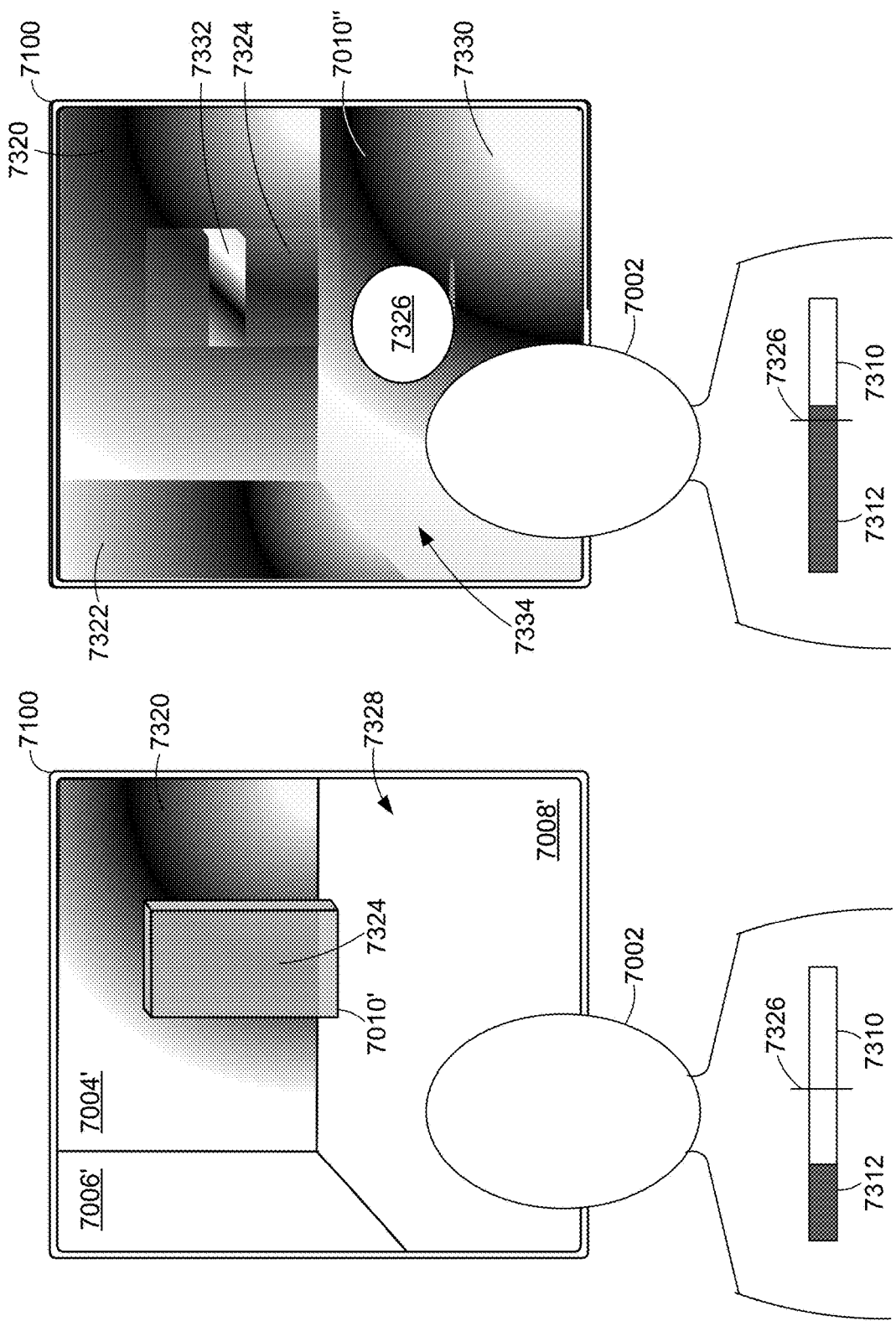
Figure 7L:
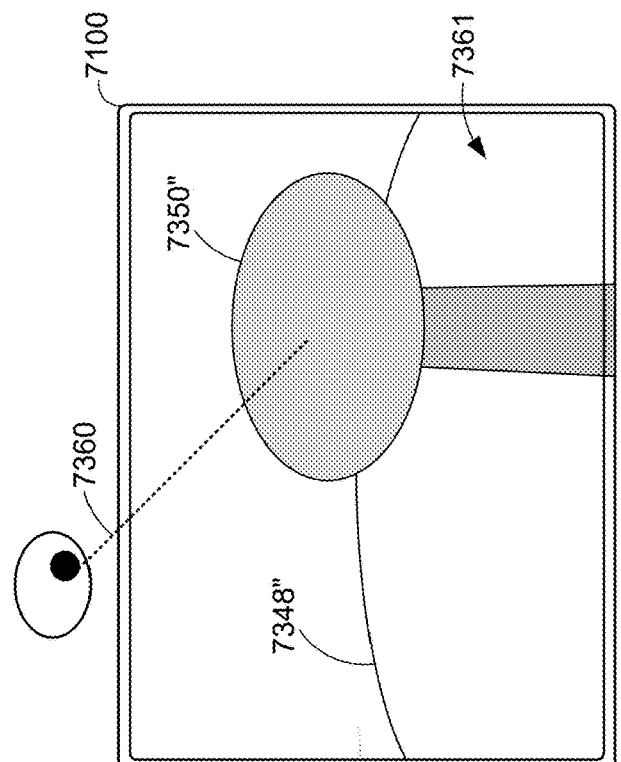
FIGS. 7K-7M are block diagrams illustrating aggregating the effects of multiple types of the sensory adjustment provided by a computer system when displaying a view of an environment that includes a representation of a physical environment, in accordance with some embodiments.
Figure 7K:
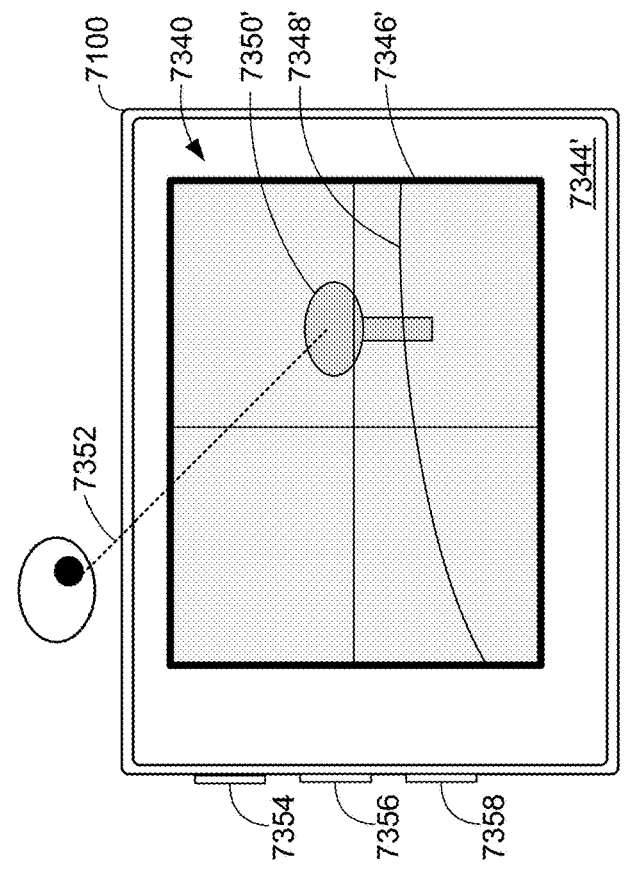
Figure 7M:
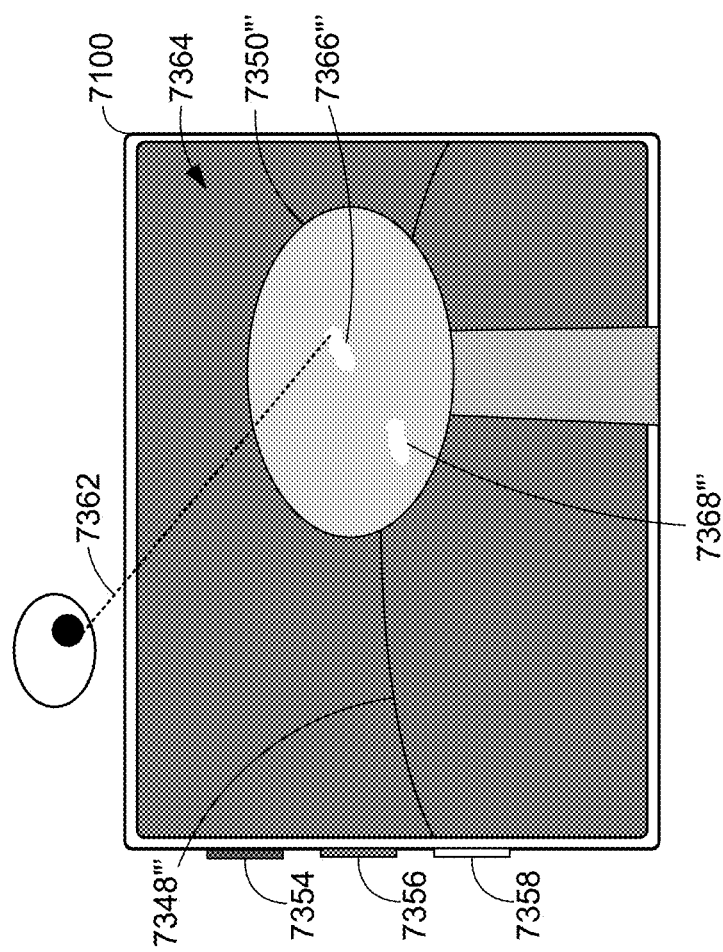
Figure 7N:
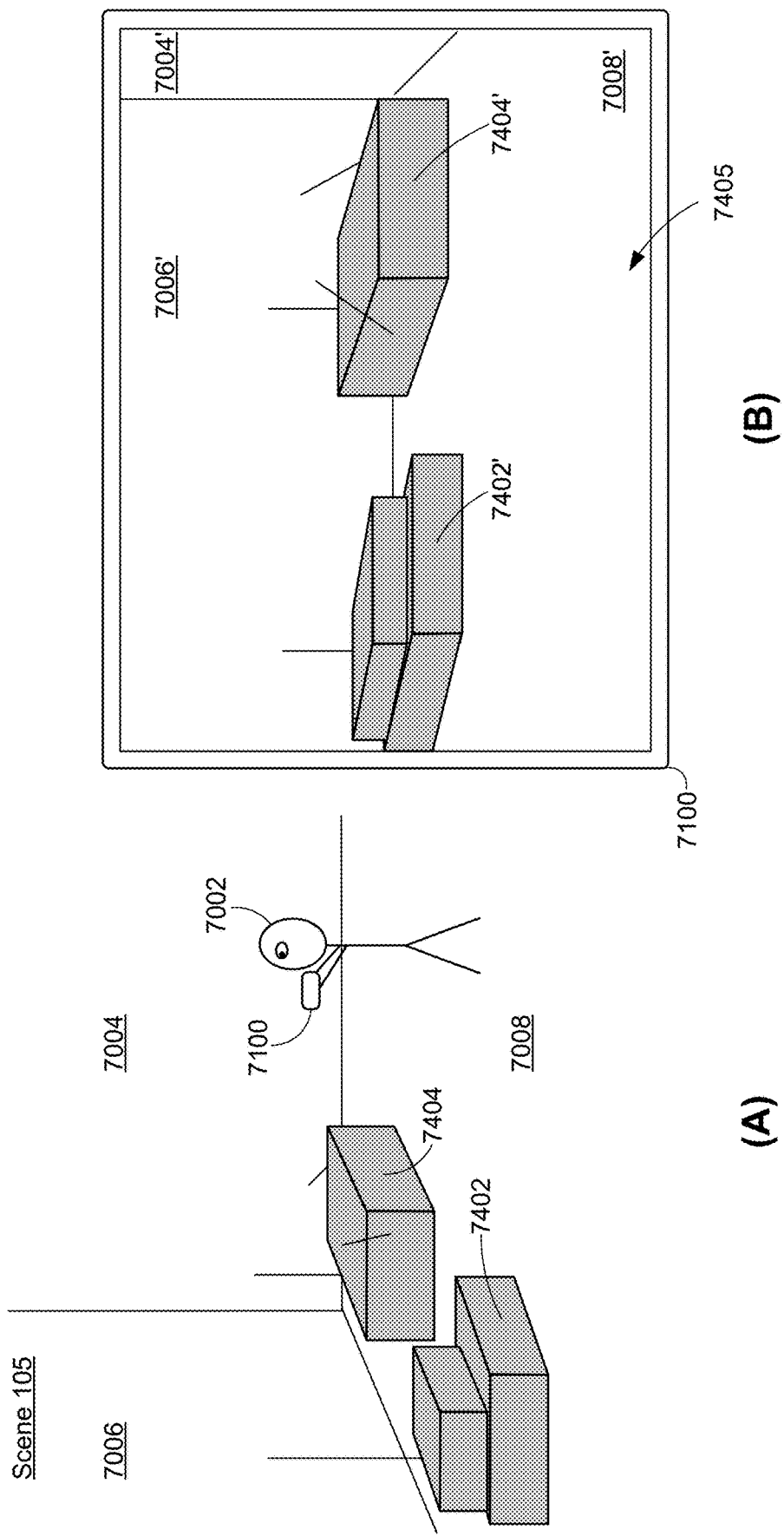
FIGS. 7N-7P are block diagrams illustrating selectively displaying virtual content that corresponds to a respective type of exercise in a view of a three-dimensional environment in accordance with a determination that the portion of the physical environment in the view of the three-dimensional environment corresponds to the respective type of exercise, in accordance with some embodiments.
Figure 7O:
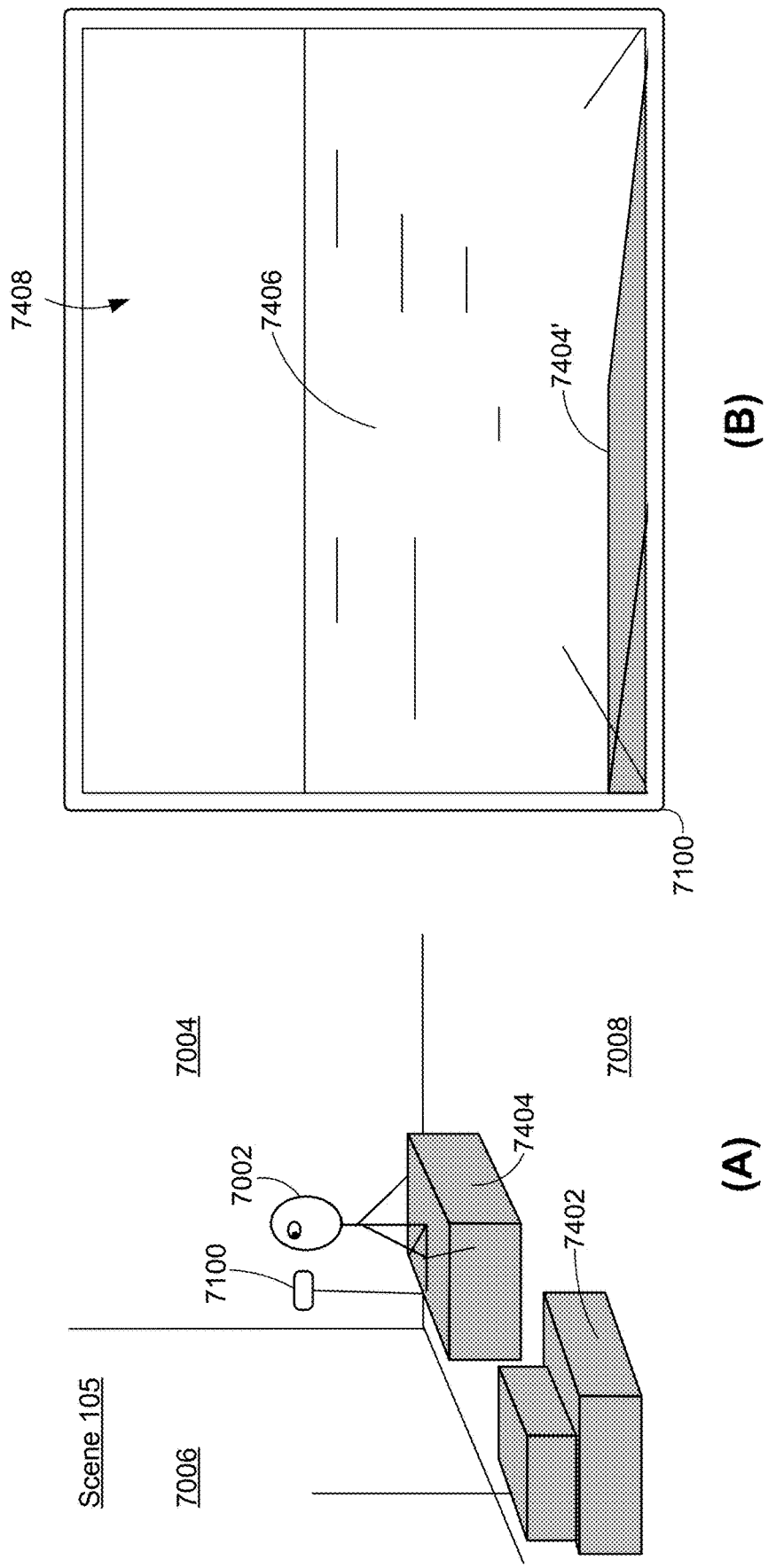
Figure 7P:
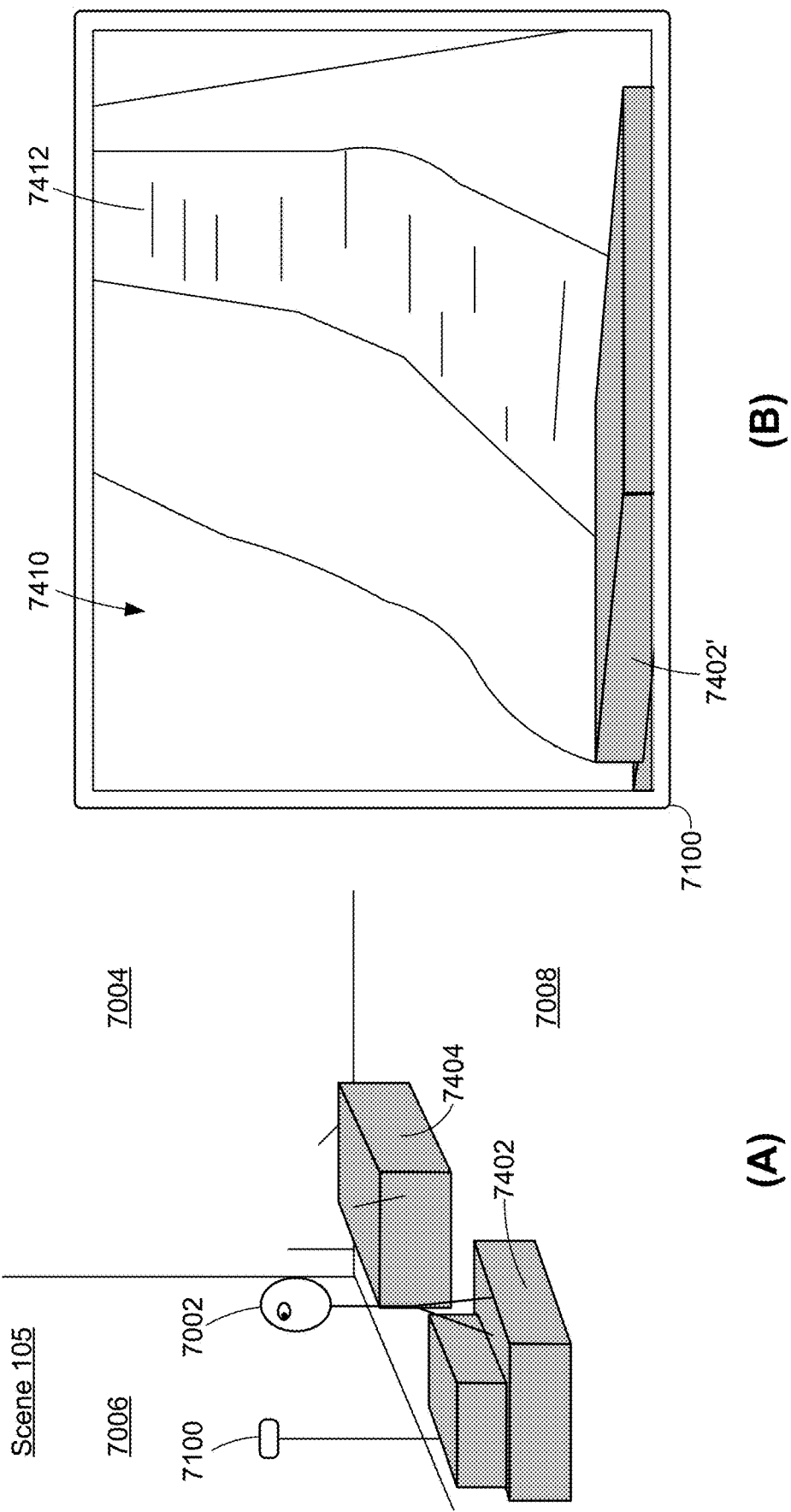

In some embodiments, the computer system determines that the biometric data does not meet the preset criteria for transitioning to displaying the computer-generated experience with a preset higher level of immersion in accordance with a determination that the heart rate is greater than a first threshold heart rate, the blood pressure is higher than a first threshold blood pressure, the movement of the user is more than a first threshold amount of movement during a threshold amount of time, the body temperature of the user is higher than a first threshold body temperature, the metric of stress level is above a first threshold stress level, the metric corresponding to the user's mood indicates that the user is agitated and unhappy, etc. In some embodiments, the computer system directly switches to displaying the three-dimensional environment with the preset higher level of immersion (e.g., as shown in FIG. 7J) when the preset criteria are met, without going through gradual transitions based on changes in the biometric data before the preset criteria are met. In some embodiments, optionally, the computer-generated experience includes visual and/or audio guidance (e.g., music, scenery, inspirational messages, guided medication recording, visual, audio, or verbal instructions on breathing, etc.) helping the user to enter into a state in which the corresponding biometric data received from the user will meet the preset criteria.

FIGS. 7H-7I illustrate that, in some embodiments, the computer system gradually adjust the level of immersion with which the computer-generated experience is provided to the user in accordance with the trend and/or magnitude of changes in the biometric data corresponding to the user. For example, in some embodiments, with the biometric data exhibits a change approaching satisfaction of the preset criteria for switching to the preset higher level of immersion (e.g., an augmented reality view, an augmented virtuality view, a virtual reality view, etc.), the computer system increase the visual prominence and/or amount of virtual content corresponding to the computer-generated experience, and reduces the visual prominence and/or amount of the representation of the physical environment in the currently displayed view of the three-dimensional environment. In some embodiments, the computer system changes the visual balance between the virtual content corresponding to the computer-generated experience and the representation of the physical environment by an amount that corresponds to the amount and/or nature of the change in the biometric data corresponding to the user. Similarly, in some embodiments, with the biometric data exhibiting a change away from satisfaction of the preset criteria for switching to the preset higher level of immersion, the computer system decreases the visual prominence and/or amount virtual content corresponding to the computer-generated experience and increases the visual prominence and/or amount of the representation of the physical environment in the currently displayed view of the three-dimensional environment.

In some embodiments, the computer system changes the visual balance between the virtual content and the representation of the physical environment by an amount that corresponds to the amount and/or nature of the change in the biometric data corresponding to the user. As shown in FIG. 7H, when the values of the biometric data change toward meeting the preset criteria (e.g., as indicated by the increased length of bar 7312 approaching the position of the indicator 7326), the amount of virtual content displayed in the view of the three-dimensional environment (e.g., view 7318 in 7H) is increased compared to an earlier state (e.g., view 7316 in FIG. 7G), and the visual prominence of the representation of the physical environment is decreased. More specifically, in FIG. 7H, the representations 7004' and 7006' of the walls 7004 and 7006 are replaced or obscured by the display of virtual content 7320 and 7322 (e.g., visual effects that visually obscures the portion of the representation of the physical environment to which the visual effects are applied, virtual surfaces, virtual objects, virtual scenery, etc.), and at least a portion of the surface of the representation 7010' is replaced or obscured by the display of the virtual content 7324 (e.g., visual effects that visually obscures the portion of the representation of the physical environment to which the visual effects are applied, virtual surfaces, virtual objects, virtual scenery, etc.) as well. As shown in FIG. 7I following FIG. 7H, when the values of the biometric data change away from meeting the preset criteria (e.g., as indicated by the decreased length of bar 7312 receding from the position of the indicator 7326), the amount of virtual content displayed in the view of the three-dimensional environment (e.g., view 7328 in 7I) is decreased compared to an earlier state (e.g., view 7318 in FIG. 7H), and the visual prominence of the representation of the physical environment is increased again (e.g., optionally, still lower than the state shown in FIG. 7G). More specifically, in FIG. 7I, the representation 7006' of the wall 7006 is redisplayed after the virtual content 7332 is removed, the representation 7004' of the wall 7004 is partially redisplayed when the virtual content 7320 is reduced in visual prominence (e.g., visual effects that visually obscures the portion of the representation of the physical environment to which the visual effects are applied are reduced in magnitude, virtual surfaces and virtual objects are shrunken, removed, reduced in number, or made more translucent, etc.). The visual prominence of the portion of the surface of the representation 7010' that was replaced or obscured by the display of the virtual content 7324 is increased by changes made to the virtual content 7324 (e.g., made more translucent, less opaque, includes less amount of distortion for the representation 7010', etc.) as well. In some embodiments, before the preset criteria for transitioning to the preset higher level of immersion are met (e.g., before the threshold indicated by the indicator 7326 is met by the biometric data corresponding to the user, or before other criteria are met by the biometric data, etc.), the computer system continuously or periodically adjust the visual balance between virtual content and the representation of the physical environment in the currently displayed view of the three-dimensional environment (e.g., increasing visual prominence of the virtual content relative to the representation of the physical environment, decreasing visual prominence of the virtual content relative to the representation of the physical environment, etc.) in accordance with the biometric data, as the biometric data is updated based on the current state of the user.

In FIG. 7J, the computer system detects that the updated biometric data corresponding to the user meets the preset criteria for transitioning into the preset higher level of immersion (e.g., an augmented reality environment, an augmented virtuality environment, a virtual reality environment, etc.) that has a higher level of immersion as compared to those displayed before the preset criteria are met by the biometric data (e.g., the views 7316, 7318, 7328 in FIGS. 7G-7I, etc.), and the computer system transitions to displaying the three-dimensional environment with the preset higher level of immersion (e.g., displaying the view 7334 in FIG. 7J, or another view of the three-dimensional environment with the preset higher level of immersion, etc.). In this example, as shown in FIG. 7J, the computer system has increased the visual prominence of virtual content, and further decreased the visual prominence of the representation of the physical environment, such that only hints of the physical environment are still visible in the three-dimensional environment (e.g., the structural relationships between the walls and floor, the presence of a physical object, etc.) through the visual characteristics of the virtual content (e.g., the virtual content 7322, 7320, 7330, and 7324 that visually obscures the representations 7006', 7004', 7008' and 7010' of the walls 7006, 7004, the floor 7008, and the physical object 7010 in the view 7334 in FIG. 7J). In some embodiments, the computer system further displays virtual objects in different positions in the three-dimensional environment. For example, a virtual object 7332 is displayed at a position that corresponds to the location of the physical object 7010 in the physical environment, a virtual object 7326 is displayed at a position that corresponds to a location on the floor 7008, and other virtual object may be displayed at positions that correspond to free space in the physical environment or independent of the state of the physical environment, etc. In some embodiments, after the preset criteria for transitioning into the preset higher level of immersion are met, the computer system abruptly increases the amount of virtual content in the currently displayed view of the three-dimensional environment or displays a completely new environment corresponding to the computer-generated experience (e.g., a new virtual world, a new scene, etc.). In some embodiments, after the preset criteria are met and the computer system displays the three-dimensional environment with the preset higher level of immersion, in accordance with a determination that the preset criteria are no longer met by the updated biometric data, the computer system gradually adjust the level of immersion by which the three-dimensional environment is displayed based on the changes in the biometric data, as show in FIGS. 7H and 7I. In some embodiments, after the preset criteria are met and the computer system displays the three-dimensional environment with the preset higher level of immersion, in accordance with a determination that the preset criteria are no longer met by the updated biometric data, the computer system abruptly switches back to displaying the three-dimensional environment with the lower level of immersion (e.g., as shown in FIG. 7G).

In some embodiments, the preset criteria are met in accordance with a determination that the heart rate is lower than a first threshold heart rate, the breathing rate is lower than a first threshold breathing rate, the blood pressure is lower than a first threshold blood pressure, movement of the user is below a first threshold amount of movement during the threshold amount of time, body temperature of the user is lower than a first threshold body temperature, a metric of stress level is below a first threshold stress level, a metric corresponding to user's mood indicates that the user is relaxed and happy, etc.

In some embodiments, the view of the three-dimensional environment that is shown with the low level of immersion (e.g., as shown in FIG. 7G, or another view of the three-dimensional environment, etc.) is displayed when the display generation component of the computer system is first turned on or put on the user's head or in front of the user's eyes, and no virtual elements or a minimal amount of virtual elements are displayed in the three-dimensional environment. This allows the user to start from a view of the three-dimensional environment that is very similar to the direct view of the real world without the display generation component blocking the user's eyes. In some embodiments, the view of the three-dimensional environment corresponding to the low level of immersion is a view of a user interface or environment (e.g., a two-dimensional environment, a three-dimensional environment, etc.) of an application or computer-generated experience that is displayed in a two-dimensional window or confined in a viewport displayed at a position relative to the representation of the physical environment. In some embodiments, the view of the three-dimensional environment that is shown with the low level of immersion (e.g., as shown in FIG. 7G, or another view of the three-dimensional environment, etc.) is displayed when the application or computer-generated experience is first launched or started by the user, and the full spatial extent of the application or experience are not yet displayed in the three-dimensional environment. This allows the user to start from a view of the three-dimensional environment that is not very immersive and viewed in the context of the view of the real world.

In some embodiments, the virtual content (e.g., virtual wallpaper, virtual objects, virtual surfaces, virtual scenery, virtual three-dimensional environment, etc.) that is displayed by the computer system at least partially blocks or obscures the view of the physical environment. In some embodiments, when displaying the view of the three-dimensional environment with the preset higher level of immersion, the computer system replaces or blocks the view of a first class of physical objects or surfaces (e.g., front wall, front wall and ceiling, etc.) with newly displayed virtual element or newly displayed portion of an existing virtual element. In some embodiments, an animated transition is displayed to show the virtual elements gradually expanding or becoming more opaque and saturated to cover or block the view of the first class of physical objects or surfaces. In some embodiments, when displaying the view of the three-dimensional environment with the preset higher level of immersion, the computer system adds virtual elements to the three-dimensional environment, without replacing any whole class of physical elements. In some embodiments, the virtual elements that are added include, optionally, a user interface object, such as a menu (e.g., menu of application, documents, etc.), a control (e.g., display brightness control, display focus control, etc.), or other objects (e.g., a virtual assistant, a document, media item, etc.) that can be manipulated by user inputs or provides information or feedback in the three-dimensional environment. In some embodiments, the virtual elements that are added include, optionally, non-interactive objects or surfaces that cannot be manipulated by user inputs, and serves to provide the look and feel of the three-dimensional environment that replaces the look and feel of the physical environment. In some embodiments, the virtual content that is displayed by the computer system includes a visual effect that at least partially blocks or obscures the view of the physical environment (e.g., fade out, blurs, dims, etc. the representation of the physical environment, etc.).

In some embodiments, in accordance with a determination that the biometric data is updated and the updated biometric data meets preset criteria for transitioning to displaying the three-dimensional environment with an even higher level of immersion, the computer system increases the visual prominence of the virtual content corresponding to the computer-generated experience and reduces visual stimuli from the physical environment to another level corresponding to the even higher level of immersion. For example, in some embodiments, the computer system causes an additional class of physical objects or surfaces to be replaced, obscured, and/or blocked by the newly displayed virtual element or newly displayed portion of an existing virtual element. In some embodiments, an animated transition is displayed to show the virtual elements gradually expanding or becoming more opaque and saturated to cover or block the view of the additional class of physical objects and surfaces.

In some embodiments, the three-dimensional environment is an environment of a computer-generated mediation experience, and as the biometric data indicates that the user has achieved the level of concentration, relaxation, focus, etc. required to enter a deeper state of meditative experience, the computer system transforms the currently displayed view of the environment into a more immersive environment, e.g., with expanded spatial range (e.g., width, depth, angle, etc.) and visual prominence of the virtual content corresponding to the meditative experience and reduced spatial range and visual prominence of the representation of the physical environment.

In some embodiments, with the increased level of immersion with which visual content of the computer-generated experience is displayed, the computer system also increases the level of suppression of sounds of the physical environment perceivable by the user through actions of the audio output devices of the computer system and/or increases the level of immersion of the audio content of the computer-generated experience (e.g., increasing volume, changing to a spatial audio output mode from a stereo audio output mode or surround sound output mode, or from a stereo audio output mode to a surround sound output mode, etc.) that is output by the audio output devices.

In some embodiments, the computing system is configured to display visual component of CGR content via a display generation component with two or more levels of immersion. In some embodiments, the computer system displays the visual component of the CGR content with at least a first level of immersion, a second level of immersion, and a third level of immersion. In some embodiments, the computer system displays the visual component of the CGR content with at least two levels of immersion, respectively providing a less immersive visual experience and a more immersive visual experience relative to each other. In some embodiments, the computing system causes the visual content displayed via the display generation component to transition between the different levels of immersion in response to the biometric data corresponding to the user meeting different sets of criteria. In some embodiments, the first, second, and third levels of immersion correspond to increasing amount of virtual content corresponding to the CGR experience that is present in the CGR environment and/or decreasing amount of representations of the surrounding physical environment present in the CGR environment. In some embodiments, first, second, and third levels of immersion correspond to different modes of content display that have increasing image fidelity (e.g., increasing pixel resolution, increasing color resolution, increasing color saturation, increasing luminance, increasing opacity, increasing image details, etc.) and/or spatial extent (e.g., angular extent, spatial depth, etc.) for the visual component of the computer-generated content, and/or decreasing image fidelity and/or spatial extent for the representation of the surrounding physical environment. In some embodiments, the first level of immersion is a pass-through mode where the physical environment is fully visible to the user through the display generation component (e.g., as a camera view of the physical environment or through a transparent or semi-transparent portion of the display generation component). In some embodiments, the visual CGR content presented in the pass-through mode includes the pass-through view of the physical environment with a minimal amount of virtual elements concurrently visible as the view of the physical environment or with only virtual elements that are peripheral (e.g., indicators and controls displayed in the peripheral region of the display) to the user's view of the physical environment. For example, a view of the physical environment occupies the central and majority region of the field of view provided by the display generation component, and only a few controls (e.g., the title of the movie, the progress bar, playback control (e.g., play button), etc.) are displayed in the peripheral region of the field of view provided by the display generation component. In some embodiments, the first level of immersion is a pass-through mode where the physical environment is fully visible to the first user through the display generation component (e.g., as a camera view of the physical environment or through a transparent portion of the display generation component), and the visual CGR content is displayed in a virtual window or frame that overlays, replacing display of, or blocking the view of, etc. a portion of the representation of the physical environment. In some embodiments, the second level of immersion is a mixed reality mode where the pass-through view of the physical environment is augmented with virtual elements generated by the computer system, where the virtual elements occupy the central and/or majority region of the user's field of view (e.g., the virtual content is integrated with the physical environment in the view of the computer-generated environment). In some embodiments, the second level of immersion is a mixed reality mode where the pass-through view of the physical environment is augmented with a virtual window, viewport, or frame that overlays, replacing display of, or blocking the view of, etc. a portion of the representation of the physical environment, and that has additional depth or spatial extent that are revealed when the display generation component is moved relative to the physical environment. In some embodiments, the third level of immersion is an augmented reality mode where virtual content is displayed in a three-dimensional environment with a representation of the physical environment, and virtual objects are distributed throughout the three-dimensional environment at positions corresponding to different locations of the physical environment. In some embodiments, the third level of immersion is a virtual reality mode where virtual content is displayed in a three-dimensional environment without a representation of the physical environment. In some embodiments, the different levels of immersion described above represents increasing levels of immersion relative to one another.

In some embodiments, the computer system selects the audio output mode for outputting the audio content of a computer-generated experience (e.g., an application, a communication session, a movie, a video, a game, etc.) in accordance with the level of immersion with which the visual content of the computer-generated experience is being displayed by the display generation component. In some embodiments, when the level of immersion with which the visual content is displayed increases (e.g., from the first level of immersion to the second level of immersion, from the first level of immersion to the third level of immersion, or from the second level of immersion to the third level of immersion, etc.), the computer system switches the audio output mode from a less immersive output mode to a more immersive output mode (e.g., from a first audio output mode to a second audio output mode, or from a first audio output mode to a third audio output mode, or from a second audio output mode to a third audio output mode, etc., where the first audio output mode, the second audio output mode, and the third audio output mode correspond to audio output with increasing levels of immersion). As described herein, a spatial audio output mode corresponds to a higher level of immersion than a stereo audio output mode and a mono audio output mode. A spatial audio output mode corresponds to a higher level of immersion than a surround sound output mode. A surround sound output mode corresponds to a higher level of immersion than a stereo audio output mode and a mono audio output mode. A stereo audio output mode corresponds to a higher level of immersion than a mono audio output mode. In some embodiments, the computer system selects an audio output mode from multiple available audio output modes, e.g., a mono audio output mode, a stereo audio output mode, a surround sound output mode, a spatial audio output mode, etc. based on the level of immersion with which visual content of a computer-generated experience is being provided via the display generation component.

FIGS. 7K-7M are block diagrams illustrating aggregating the effects of multiple types of the sensory adjustment provided by a computer system when displaying a view of an environment that includes a representation of a physical environment, in accordance with some embodiments.

In some embodiments, the computer system provides multiple types of sensory adjustment functions that enhance the user's ability to perceive different aspects of a physical environment that may not be easily perceivable without the aid of special equipment or the computer system. Instead of allowing the user to only use a single type of sensory adjustment function when viewing a portion of a physical environment at a time, the computer system aggregates the effects of two or more types of sensory enhancement functions on a representation of the portion of the physical environment, such that features and characteristics present in the portion of the physical environment that were previously hidden in the view of the physical environment provided by the computer system may be revealed.

In some embodiments, when the computer system displays a three-dimensional environment that includes a representation of a physical environment via a display generation component (e.g., display generation component 7100, or another type of display generation component such as an HMD, etc.), the computer system optionally uses sensor input or information that corresponds to the currently displayed portion of the physical environment to augment and adjust the representation of the physical environment, such that the user can perceive the portion of the physical environment with sensory information that is not available to the user when the user views the portion of the physical environment without the aid of the display generation component.

In FIG. 7K, the computer system displays a view 7340 of a three-dimensional environment that includes a first representation of a first portion of the physical environment. In the view 7340, the first representation of the first portion of the physical environment corresponds to an appearance of the first portion of the physical environment without sensory adjustments made by the computer system. In some embodiments, the first representation of the first portion of the physical environment corresponds to a view of the first portion of the physical environment that is captured by a color camera that has a first level of imaging sensitivity that corresponds to an average color and intensity detection within the range of normal human sensory perception. In some embodiments, the first representation of the first portion of the physical environment corresponds to a view of the first portion of the physical environment through a transparent portion of the display generation component and is not enhanced and adjusted by the computer system.

In some embodiments, the computer system provides a plurality of affordances (e.g., hardware controls 7354, 7356, and 7358, user interface elements that are displayed in the three-dimensional environment, etc.) for activating respective ones of a plurality of sensory adjustment functions provided by the computer system. In some embodiments, the computer system activates the respective ones of the plurality of sensory adjustment functions in a sequence or in combination, in accordance with a user's activation inputs (e.g., button press inputs, tap inputs, gesture inputs, touch inputs, gaze inputs, selection input, a combination thereof, etc.) directed to the affordances corresponding to the respective ones of the plurality of sensory adjustment functions. In some embodiments, a respective one of the plurality of sensory adjustment functions is optionally activated by a preset input (e.g., a gesture input, a touch input, a voice command, etc.) without requiring presence of a corresponding hardware affordance associated with the computer system or a corresponding user interface control in the three-dimensional environment.

In this example, as shown in FIG. 7K, the first representation of the first portion of the physical environment includes a view from inside of a room toward a window on a wall of the room. This example is non-limiting, and the first portion of the physical environment may be any indoor or outdoor environment, in accordance with various embodiments. In this example, the first representation of the first portion of the physical environment includes a representation 7344' of the wall, the representation 7346' of the window, a representation 7348' of a hill outside of the window at a first distance from the window, and a representation 7350' of a tree near the top of the hill at a second distance away from the window. The representation 7348' of the hill and the representation 7350' of the tree occupy a small portion of the field of view provided by the display generation component 7100 because the hill and the tree are at large distances away from the display generation component, and the representation 7348' of the hill and the representation 7350' of the tree are far away from the viewpoint corresponding to the currently displayed view of the three-dimensional environment (e.g., the respective distances between the viewpoint and the representations 7348' and 7350' correspond to the respective distances from the user's eyes (or the display generation component) to the hill and the tree).

In FIG. 7L, the computer system detects a user input that activates a first sensory adjustment function of a plurality of sensory adjustment functions provided by the computer system. For example, the computer system detects that the hardware affordance 7354 is activated by a user's input, that a user interface object corresponding to the first sensory adjustment function is activated or selected by a user's input, that a gesture input, voice command, and/or a touch input, etc. meeting the criteria for activating the first sensory adjustment function is provided by the user, etc. In response, the computer system displays a second view 7361 of the three-dimensional environment that includes a second representation of a second portion of the physical environment, where the second portion of the physical environment is included within the first portion of the physical environment (e.g., is all or a sub-portion of the first portion of the physical environment shown in FIG. 7K, or a portion of the physical environment that was shown before the detection of the input that activated the first sensory adjustment function, etc.). In the second view 7361 of the three-dimensional environment, as shown in the example in FIG. 7L, the display property of the representation 7350" of the tree is adjusted relative to the representation 7350' of the tree shown in the first view 7340 of the three-dimensional environment in accordance with the operation of the first sensory adjustment function. For example, if the first sensory adjustment function is simulated telescope vision that reduces the focus distance of objects such that they appear closer to the user, as shown in FIG. 7L, the representation 7350" of the tree appears to be located much closer to the viewpoint than the second distance as shown in FIG. 7K (e.g., the adjusted distance is one fifth of the second distance, the adjusted distance is one tenth of the second distance, the adjusted distance is a distance that is selected based on the second distance and/or a preset fraction of the maximum power of the simulated telescope vision, etc.). Similarly, the representation 7348" of the hill also appears to be located much closer to the user than the first distance as shown in FIG. 7K (e.g., the adjusted distance is one fifth of the first distance, the adjusted distance is one tenth of the first distance, the adjusted distance is a distance that is selected based on the first distance and/or a preset fraction of the maximum power of the simulated telescope function, etc.). In this example, the viewpoint or the virtual position of the user in the view 7361 is moved to the position of the window in the view 7340, in accordance with some embodiments. In this example, the viewpoint or the virtual position of the user in the view 7361 is still based on the actual location of the user and/or the display generation component in the physical environment, in accordance with some embodiments.

In some embodiments, the computer, when applying the first sensory adjustment function, selects a target portion of the physical environment based on a location of the user's gaze directed to the currently view of the three-dimensional environment. For example, as shown in FIG. 7K, the computer system detects that the user's gaze 7352 is directed to the representation 7350' of the tree in the first view 7340 of the three-dimensional environment, and selects a portion of the physical environment that includes the tree from the first portion of the physical environment as the second portion of the physical environment to which the first sensory adjustment function is applied.

In some embodiments, the simulated telescope vision is an illustrative example of a first type of sensory adjustment function provided by the computer system, and may be replaced by another type of sensory adjustment function that is provided by the computer system and selected by the user's input.

In FIG. 7M, while the computer system is displaying the second view 7361 of the three-dimensional environment that includes the second representation of the physical environment that has been adjusted in accordance with the operation of the first sensory adjustment function activated by the user's input, the computer system detects a second user input that activates a second sensory adjustment function of the plurality of sensory adjustment functions that is different from the first sensory adjustment function. For example, the computer system detects that the hardware affordance 7356 is activated by a user's input, that a user interface object corresponding to the second sensory adjustment function is activated or selected by a user's input, that a gesture input, voice command, and/or a touch input, etc. meeting the criteria for activating the second sensory adjustment function is provided by the user, etc. In response, the computer system displays a third view 7364 of the three-dimensional environment that includes a third representation of a third portion of the physical environment, where the third portion of the physical environment is included within the second portion of the physical environment (e.g., is all or a sub-portion of the second portion of the physical environment shown in FIG. 7L, or a portion of the physical environment that was shown before the detection of the input that activated the second sensory adjustment function, etc.). In the third view 7364 of the three-dimensional environment, as shown in the example in FIG. 7M, the display property of the representation 7350''' of the tree is further adjusted relative to the representation 7350'' of the tree shown in the second view 7361 of the three-dimensional environment in accordance with the operation of the second sensory adjustment function. For example, if the second sensory adjustment function is simulated heat vision that presents color and/or intensity variations in accordance with the temperature and/or thermal radiation variations, as shown in FIG. 7M, the representation 7350''' of the tree appears to be have a different color and/or intensity relative to the background environment in the third view 7364, and the display property of portions 7366' and 7368' of the representation 7350''' are further adjusted based on the temperature of those portions of the tree relative to other portions of the tree in the physical environment (e.g., as detected by the thermal imaging sensors or other sensors that are in communication with the computer system, as indicated by thermal data transmitted to or retrieved by the computer system from another computer system, etc.). For example, the higher temperature of those portions represented by portions 7366' and 7368' likely reveal small animals or objects that radiate more heat or have higher temperatures than the tree itself. The portions 7366' and 7368' in the representation 7350''' have display properties that are generated based on the operations of both the first sensory adjustment function and the second sensory adjustment function on the original first representation 7350' of the tree as shown in FIG. 7K.

In some embodiments, the computer system, when applying the second sensory adjustment function, selects a target portion of the physical environment based on a location of the user's gaze directed to the currently displayed view of the three-dimensional environment. For example, as shown in FIG. 7L, the computer system detects that the user's gaze 7360 is directed to the representation 7350'' of the tree in the second view 7361 of the three-dimensional environment, and selects a portion of the physical environment that includes the tree from the second portion of the physical environment as the third portion of the physical environment to which the first sensory adjustment function and the second sensory adjustment function are both applied.

In some embodiments, the simulated heat vision is an illustrative example of a second type of sensory adjustment function provided by the computer system, and may be replaced by another type of sensory adjustment function that is provided by the computer system and selected by the user's input.

In some embodiments, a first display property (e.g., resolution, zoom level, magnification, color distribution, intensity distribution, focus distance, etc.) is adjusted relative to a baseline representation of a respective portion of the physical environment (e.g., the portions of the representation 7350' of the tree in FIG. 7K that correspond to the portions 7366' and 7368' in FIG. 7M, another portion of the physical environment, etc.) in accordance with a first type of computer-generated sensory adjustment (e.g., binocular vision, telescope vision, microscope vision, night vision, heat vision, etc.) to obtain a first adjusted representation of the respective portion of the physical environment (e.g., the portions of the representation 7350'' tree in FIG. 7L that correspond to the portions 7366' and 7368' in FIG. 7M, or adjusted representation of another portion of the physical environment, etc.), and a second display property (e.g., resolution, zoom level, magnification, color distribution, intensity distribution, focus distance, etc.) is adjusted relative to the second representation of the physical environment to obtain a third representation of the respective portion of the physical environment (e.g., the portions 7366' and 7368' of the representation 7350' of the tree in FIG. 7M, or further adjusted representation of another portion of the physical environment, etc.) in accordance with the second type of computer-generated sensory adjustment. In some embodiments, the second display property has the same values in the first representation and the second representation in some combinations of the first type and second type of sensory adjustment functions; and the second display property has different values in the first representation and the second representation in some combinations of the first type and second type of sensory adjustment functions.

In some embodiments, the computer system allows the representation of the physical environment to be adjusted further based on a third sensory adjustment function (e.g., the sensory adjustment function that can be activated by interaction with the affordance 7358, a user interface object, a gesture input, a voice command, etc. corresponding to the third sensory adjustment function, etc.). In some embodiments, while displaying the third view 7364 of the three-dimensional environment that includes the third representation of the physical environment, the computer system detects a third user input that corresponds to a request to activate the third type of computer-generated sensory adjustment (e.g., binocular vision, microscope vision, night vision, heat vision, color filter, etc.) that is different from the first type and second type of sensory adjustment functions. In response, the computer system displays a fourth view of the three-dimensional environment that includes a fourth representation of a fourth portion of the physical environment (e.g., all or a portion of the third portion of the physical environment), wherein the fourth representation of the physical environment has the first display property (e.g., resolution, zoom level, magnification, color distribution, intensity distribution, focus distance, etc.) adjusted relative to the first representation of the fourth portion of the physical environment in accordance with the first type of sensory adjustment function, the second display property (e.g., resolution, zoom level, magnification, color distribution, intensity distribution, focus distance, etc.) adjusted relative to the second representation of the fourth portion of the physical environment in accordance with the second type of sensory adjustment function, and a third display property (e.g., resolution, zoom level, magnification, color distribution, intensity distribution, focus distance, etc.) that is adjusted relative to the third representation of the physical environment of the fourth portion of the physical environment in accordance with the third type of sensory adjustment function.

In some embodiments, the first sensory adjustment function includes simulated telescope vision (e.g., binocular vision, monocular vision, telescope vision, etc.) (e.g., reducing focus distance of objects such that they appear closer to the user) for viewing distant physical objects, and the second sensory adjustment function includes simulated microscope vision for magnifying nearby physical objects.

In some embodiments, the first sensory adjustment function includes simulated telescope vision (e.g., reducing focus distance of objects such that they appear closer to the user) for viewing distant physical objects, and the second sensory adjustment function includes simulated night vision (e.g., high sensitivity in low light conditions, brightness of objects are visually enhanced, small variations in brightness are magnified, etc.) for viewing physical objects under low light conditions.

In some embodiments, the first sensory adjustment function includes simulated telescope vision (e.g., reducing focus distance of objects such that they appear closer to the user) for viewing distant physical objects, and the second sensory adjustment function includes modifying a view of physical objects with a filter (e.g., color filter, light frequency filter, intensity filter, a motion filter, etc.).

In some embodiments, the first sensory adjustment function includes simulated telescope vision (e.g., reducing focus distance of objects such that they appear closer to the user) for viewing distant physical objects, and the second sensory adjustment function includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in the physical environment.

In some embodiments, concurrently with displaying the third representation of the physical environment, the computer system outputs sounds that correspond to a portion of the physical environment visible in the third representation of the physical environment, wherein the sounds are selectively enhanced (e.g., increased in volume, with modifications to the amplitudes of some selected frequencies, etc.) relative to sounds from sources outside of the portion of the physical environment.

In some embodiments, concurrently with displaying the third representation of the physical environment, the computer system displays textual output corresponding to speech coming from a portion of the physical environment visible in both the second representation and third representation of the physical environment, wherein the speech is selectively enhanced relative to sounds from sources outside of the portion of the physical environment.

In some embodiments, the first sensory adjustment function includes simulated microscope vision for magnifying nearby physical objects, and the second sensory adjustment function includes simulated heat vision (e.g., high sensitivity to temperature variations, presenting color and/or intensity variations in accordance with temperature and/or thermal radiation variations, etc.) for viewing physical objects with different thermal radiation profiles.

In some embodiments, the first sensory adjustment function includes simulated night vision (e.g., high sensitivity in low light conditions, brightness of objects are visually enhanced, small variations in brightness are magnified, etc.) for viewing physical objects under low light conditions, and the second sensory adjustment function includes simulated telescope vision (e.g., reducing focus distance of objects such that they appear closer to the user) for viewing distant physical objects.

In some embodiments, the first sensory adjustment function includes simulated night vision (e.g., high sensitivity in low light conditions, brightness of objects are visually enhanced, small variations in brightness are magnified, etc.) for viewing physical objects under low light conditions, and the second sensory adjustment function includes simulated microscope vision for magnifying nearby physical objects.

In some embodiments, the first sensory adjustment function includes simulated night vision (e.g., high sensitivity in low light conditions, brightness of objects are visually enhanced, small variations in brightness are magnified, etc.) for viewing physical objects under low light conditions, and the second sensory adjustment function includes simulated heat vision (e.g., high sensitivity to temperature variations, presenting color and/or intensity variations in accordance with temperature and/or thermal radiation variations, etc.) for viewing physical objects with different thermal radiation profiles.

In some embodiments, the first sensory adjustment function includes simulated night vision (e.g., high sensitivity in low light conditions, brightness of objects are visually enhanced, small variations in brightness are magnified, etc.) for viewing physical objects under low light conditions, and the second sensory adjustment function includes and the second type of computer-generated sensory adjustment includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in the physical environment.

In some embodiments, the first sensory adjustment function includes simulated heat vision (e.g., high sensitivity to temperature variations, presenting color and/or intensity variations in accordance with temperature and/or thermal radiation variations, etc.) for viewing physical objects with different thermal radiation profiles and the second sensory adjustment function includes simulated telescope vision (e.g., reducing focus distance of objects such that they appear closer to the user) for viewing distant physical objects.

In some embodiments, the first sensory adjustment function includes simulated heat vision (e.g., high sensitivity to temperature variations, presenting color and/or intensity variations in accordance with temperature and/or thermal radiation variations, etc.) for viewing physical objects with different thermal radiation profiles and the second sensory adjustment function includes simulated microscope vision for magnifying nearby physical objects.

In some embodiments, the first sensory adjustment operation includes simulated heat vision (e.g., high sensitivity to temperature variations, presenting color and/or intensity variations in accordance with temperature and/or thermal radiation variations, etc.) for viewing physical objects with different thermal radiation profiles, and the second sensory adjustment operation includes simulated night vision (e.g., high sensitivity in low light conditions, brightness of objects are visually enhanced, small variations in brightness are magnified, etc.) for viewing physical objects under low light conditions.

In some embodiments, the first sensory adjustment function includes simulated heat vision (e.g., high sensitivity to temperature variations, presenting color and/or intensity variations in accordance with temperature and/or thermal radiation variations, etc.) for viewing physical objects with different thermal radiation profiles, and the second sensory adjustment operation includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in a physical environment.

In some embodiments, the order by which a plurality of selected sensory adjustment functions selected by a user are applied to the baseline representation of a portion of the physical environment is adjusted by the computer system based on one or more preset constrains and are, optionally, different from the order by which these sensory adjustment functions are activated by the user. For example, in some embodiments, adjustments corresponding to simulated telescope vision is performed prior to adjustments corresponding to other types of sensory adjustments, because it would reduce the portion of the physical environment that the other types of sensory adjustment need to be performed for the purposes of presenting the final result to the user. In some embodiments, the computer system observes the order that the different types of sensory adjustment functions are activated by the user, and presents the intermediate result obtained in response to each additional sensory adjustment that is activated by the user.

FIGS. 7N-7P are block diagrams illustrating selectively displaying virtual content that corresponds to a respective type of exercise in a view of a three-dimensional environment in accordance with a determination that the portion of the physical environment in the view of the three-dimensional environment corresponds to the respective type of exercise, in accordance with some embodiments.

In some embodiments, the computer system displays virtual content (e.g., virtual open water 7406, virtual hiking trail 7412, etc.) (e.g., virtual scenery, visual and functional enhancements of the exercise equipment, user interfaces, health and score boards, etc.) that corresponds to a respective type of exercise (e.g., rowing, hiking, etc.) in accordance with a determination that the physical location (e.g., location of the physical object 7404, location of the physical object 7402, etc.) represented in a view of a three-dimensional environment (e.g., view 7408, view 7410, etc.) is associated with the respective type of exercise (e.g., rowing, hiking, etc.). For example, as the user and the display generation component (e.g., user 7002 and display generation component 7100, or another user with another type of display generation component such as an HMD, etc.) move from location to location in the real world (e.g., in the scene 105, or in another physical environment, etc.), the virtual content shown in the view of the three-dimensional environment is adjusted to correspond to the type of exercise that is associated with the current location of the user and the display generation component. In some embodiments, when a location is associated with multiple types of exercise, the computer system selects a type of exercise from the multiple types of exercises that are associated with the location based on other contextual information (e.g., movement of the user, engagement of the user with the objects at the location, etc.), and displays the visual content corresponding to the selected type of exercise.

FIG. 7N shows, in part (A), that a user 7002 is located in a physical environment (e.g., scene 105, or another physical environment, etc.). The user 7002 may be located in a different physical environment that is an outdoor environment or an indoor environment, or moves between an indoor and an outdoor environment, etc. The user 7002 views the physical environment through a field of view provided via the first display generation component (e.g., display generation component 7100, another type of display generation component such as an HMD, etc.). The physical environment includes physical surfaces (e.g., walls 7004 and 7006, floor 7008, other physical surfaces, etc.) and one or more physical objects (e.g., exercise equipment 7402, 7404, other physical objects, etc.). In some embodiments, the physical environment is a building that includes multiple rooms or sections that are separate from one another that cannot be viewed by the user at the same time. In some embodiments, the physical environment includes multiple areas that are separate from each other, such as rooms in separate buildings, different parks, different geographical regions, etc. In some embodiments, the physical environment is an outdoor environment that include outdoor physical objects and surfaces, such as roads, trees, sky, open water, rocks, mountains, vehicles, animals, people, etc. In some embodiments, the computer system stores information and/or implements rules and artificial intelligence to determined one or more types of exercises (e.g., indoor exercise, indoor sports, outdoor exercises, outdoor sports, physical activities that promote health and physical capabilities, physical rehabilitation and therapy, etc.) that are associated with a respective location that is in the user's physical environment (e.g., within the user's field of view through the display generation component, in a threshold vicinity of the user (e.g., within 5 meters, within a few steps, etc.), etc.). In some embodiments, the computer system determines the type of exercise that is associated with a respective location based on the types of physical objects that are present at the respective location. In some embodiments, the computer system determines the type of exercise that is associated with a respective location based on the types of environment or setting that are present at the respective location. In some embodiments, the computer system determines the type of exercise that is associated with a respective location based on other types of markers and signals, or combinations of information that are present at the respective location.

In FIG. 7N, part (B), the computer system displays a first view 7405 of a three-dimensional environment that includes a representation of the physical environment of the user 7002. In some embodiments, the first view 7405 of the three-dimensional environment is a reality view with no virtual elements or minimal virtual elements, as shown in FIG. 7N(B). In this example, the first view 7405 includes representations of physical surfaces (e.g., representations 7004' and 7006' of the walls 7004 and 7006, representation 7008 of the floor 7008, etc.) and representations of physical objects (e.g., representation 7402' of the physical object 7402, representation 7404' of the physical object 7404, etc.), without virtual content. In some embodiments, the first view of the three-dimensional environment is a reality view (e.g., the view 7405 shown in FIG. 7N(B)) with user interface objects for controlling basic functions of the computer system (e.g., application icons for launching different computer-generated experiences, display settings, audio controls, etc.). In some embodiments, the first view of the three-dimensional environment is an augmented reality view displayed with a low-level of immersion (e.g., displaying user interface objects (e.g., an application launch pad, a welcome user interface, a settings user interface) that are not part of a specific application experience (e.g., a health application, a meditation application, a workout application, a game application, etc.), and that on aggregate only occupy a small percentage (e.g., less than 10%, less than 20%, etc.) of the user's field of view or are displayed in confined floating windows, etc. In some embodiments, the representation of the physical environment included in the first view 7405 of the three-dimensional environment is a camera view of a portion of the physical environment. In some embodiments, the portion of the physical environment that is shown in the first view 7405 of the three-dimensional environment changes as the user moves around the physical environment (e.g., when the user wear's the display generation component on his/her head, or holds the display generation component in his/her hand, etc.). In some embodiments, the portion of the physical environment that is shown in the first view 7405 of the three-dimensional environment changes as the display generation component is moved around the physical environment. In some embodiments, the representation of the physical environment included in the first view 7405 of the three-dimensional environment is a view of the physical environment through a transparent portion of the display generation component. In this example, the physical object 7402 is located at a first location within a first portion of the physical environment shown in the first view 7405 of the three-dimensional environment, and the physical object 7404 is located at a second location within the first portion of the physical environment shown in the first view 7405 of the three-dimensional environment. In some embodiments, the first location and the second location are not necessarily within the same view of the three-dimensional environment, and may be located in two separate locations within the same physical environment or in different physical environments that are completely separate from each other. In this example, the physical object 7402 corresponds to equipment or setting corresponding to a first type of exercise (e.g., running, walking, etc.), and the physical object 7402 corresponds to equipment or setting corresponding to a second type of exercise (e.g., rowing, boating, water skiing, etc.).

In FIGS. 7O and 7P, the computer system detects movement of the user 7002 in the physical environment, while displaying the first view 7450 of the three-dimensional environment. In some embodiments, the portion of the physical environment that is visible within the first view of the three-dimensional environment changes as the user moves about in the physical environment. FIG. 7O illustrates a first scenario in which the user 7002 has moved to the first location that includes the physical object 7404 or setting that corresponds to the first type of exercise. FIG. 7O illustrates a second scenario in which the user 7002 has moved to the second location that includes the physical object 7402 or setting that corresponds to the second type of exercise.

In some embodiments, the movement of the user includes movement of the user as a whole to a respective location (e.g., the first location that includes the first physical object 7404, the second location that includes the second physical object 7402, etc.) (e.g., while the user is holding or wearing the display generation component, while a spatial relationship between the display generation component and the user remains such that the user can continue to view the physical environment through the display generation component, etc.). In some embodiments, the movement of the user includes movement of the user that orients the display generation component or the camera associated with the display generation component to capture a view of the respective location (e.g., the first location that includes the first physical object 7404, the second location that includes the second physical object 7402, etc.) (e.g., while the user is holding or wearing the display generation component, while a spatial relationship between the display generation component and the user remains such that the user can continue to view the physical environment through the display generation component, etc.). In some embodiments, the movement of the user further includes movement that corresponds to manipulation of the physical object(s) at the respective location (e.g., turning on a piece of exercise equipment at the respective location, picking up a piece of exercise equipment at the respective location, start to use the exercise equipment at the respective location, etc.).

As illustrated in FIG. 7O, the user has moved to the first location in the physical environment that includes the physical object 7404 that corresponds to the first type of exercise. In this example, the user has also moved into a position relative to the physical object 7404 that enables the user to start using the physical object 7404 for the first type of exercise (e.g., sitting down on the equipment, standing on the equipment, holding one or more portions of the equipment, etc.). In some embodiments, the computer system, optionally, detects that the user has started one or more repetitions of movement that corresponds to the first type of exercise (e.g., rowing the ores, pulling on a gear shift, assuming a starting posture, etc.). In response to detecting the movement of the first user to the first location that includes the physical object 7404 that corresponds to the first type of exercise, and in accordance with a determination that the first location corresponds to the first type of exercise, and, optionally, that the movement of the user meets a first set of criteria (e.g., criteria corresponding to the first location, criteria corresponding to the first type of exercise, etc.), the computer system displays a second view 7408 of the three-dimensional environment, where the second view 7408 includes first virtual content corresponding to the first type of exercise, and a view of the first virtual content replaces at least a portion of the view of the physical environment that includes the first location (e.g., the location that includes the physical object 7404 and does not include the physical object 7402, the location that does not correspond to the second type of exercise, etc.). In some embodiments, the first virtual content completely replaces the view of the physical environment in the second view 7408 of the three-dimensional environment. In some embodiments, the virtual content is displayed overlaying, blocking, or replacing display of the representation of the physical environment in the second view 7408 of the three-dimensional environment.

In some embodiments, the computer system determines that the first location corresponds to the first type of exercise in accordance with a determination that the first location has a first type of exercise equipment (e.g., rowing machines, boat, etc.) corresponding to the first type of exercise. In some embodiments, the computer system determines that the first location corresponds to the first type of exercise in accordance with a determination that the first location is a location designed for (e.g., having appropriate floor surface, structures, etc. for) the first type of exercise (e.g., rowing, meditation, etc.).

As shown in FIG. 7O, part (B), the computer system displays a second view 7408 of the three-dimensional environment, when the user 7002 has moved to the first location that corresponds to the first type of exercise. In some embodiments, the second view 7408 is an augmented reality view with more virtual elements corresponding to a first computer-generated experience corresponding to the first location and the first type of exercise. In some embodiments, the second view 7408 is an augmented reality view showing a preview or start of a first computer-generated experience corresponding to the first location and the first type of exercise. In some embodiments, the second view 7408 is an augmented reality view displayed with a higher-level of immersion (e.g., displaying user interface objects that are part of a first specific application experience corresponding to the first type of exercise (e.g., virtual hiking trails, virtual scenery, score boards, exercise statistics, controls of changing exercise parameters, etc.), that on aggregate occupy a substantial percentage (e.g., greater than 60%, greater than 90%, etc.) of the user's field of view or are displayed in a three-dimensional virtual or augmented reality environment. In this example, the virtual content displayed in the second view of the three-dimensional environment includes virtual open water 7406 that replaced the view of the representations 7004', 7006', and/or 7008' of various portions of the physical environment that are potentially within the field of view provided by the display generation component at the first location. In some embodiment, all portions of the physical environment in the potential field of view provided by the display generation component are replaced or blocked by the display of the virtual content. In some embodiments, a portion of the physical environment such as a portion of the user's body, at least a portion of the exercise equipment, etc. remain visible in the second view 7408 of the three-dimensional environment.

As illustrated in FIG. 7P, the user has moved to the second location in the physical environment that includes the physical object 7402 that corresponds to the second type of exercise. In this example, the user has also moved into a position relative to the physical object 7402 that enables the user to start using the physical object 7402 for the second type of exercise (e.g., sitting down on the equipment, standing on the equipment, holding one or more portions of the equipment, etc.). In some embodiments, the computer system, optionally, detects that the user has started one or more repetitions of movement that corresponds to the second type of exercise (e.g., stepping on the stairs, start pedaling, start walking, etc.). In response to detecting the movement of the user to the second location that includes the physical object 7402 that corresponds to the second type of exercise, and in accordance with a determination that the second location corresponds to the second type of exercise, and, optionally, that the movement of the user meets a second set of criteria (e.g., criteria corresponding to the second location, criteria corresponding to the second type of exercise, etc.), the computer system displays a third view 7412 of the three-dimensional environment, where the third view 7412 includes second virtual content corresponding to the second type of exercise, and a view of the second virtual content replaces at least a portion of the view of the physical environment that includes the second location (e.g., the location that corresponds to the second type of exercise but not the first type of exercise, the location that does not include the physical object 7404, etc.). In some embodiments, the first virtual content completely replaces the view of the physical environment in the third view 7410 of the three-dimensional environment. In some embodiments, the virtual content is displayed overlaying, blocking, or replacing display of at least a portion of the representation of the physical environment.

In some embodiments, the computer system determines that the second location corresponds to the second type of exercise in accordance with a determination that the second location has a second type of exercise equipment (e.g., stairs, steppers, treadmill, etc.) corresponding to the second type of exercise. In some embodiments, the computer system determines that the second location corresponds to the second type of exercise in accordance with a determination that the second location is a location designed for (e.g., having appropriate floor surface, structures, etc. for) the second type of exercise (e.g., hiking, running, etc.).

As shown in FIG. 7P, part (B), the computer system displays a third view 7410 of the three-dimensional environment, when the user 7002 has moved to the second location that corresponds to the second type of exercise. In some embodiments, the third view 7410 is an augmented reality view with more virtual elements corresponding to a second computer-generated experience corresponding to the second location and the second type of exercise. In some embodiments, the third view 7410 is an augmented reality view showing a preview or start of a second computer-generated experience corresponding to the second location and the second type of exercise. In some embodiments, the third view 7410 is an augmented reality view displayed with a higher-level of immersion (e.g., displaying user interface objects that are part of a second specific application experience corresponding to the second type of exercise (e.g., virtual hiking trails, virtual scenery, score boards, exercise statistics, controls of changing exercise parameters, etc.), that on aggregate occupy a substantial percentage (e.g., greater than 60%, greater than 90%, etc.) of the user's field of view or are displayed in a three-dimensional virtual or augmented reality environment. In this example, the virtual content displayed in the third view 7410 of the three-dimensional environment includes virtual hiking trail 7412 that replaced the view of the representations 7004', 7006', and/or 7008' of various portions of the physical environment that are potentially within the field of view provided by the display generation component at the second location. In some embodiment, all portions of the physical environment in the potential field of view provided by the display generation component are replaced or blocked by the display of the virtual content. In some embodiments, a portion of the physical environment such as a portion of the user's body, at least a portion of the exercise equipment, etc. remain visible in the third view 7410 of the three-dimensional environment.

In some embodiments, the computer system determines that the current location corresponds a respective type of exercise in accordance with detection of a respective type of exercise equipment corresponding to the respective type of exercise at the current location. In some embodiments, detection of the respective type of exercise equipment is based on detection of an RFID signal corresponding to the respective type of exercise equipment, detection of an image of the respective type of exercise equipment in a camera feed capturing the current location, detection that the current location matches a registered location for the respective type of exercise equipment, etc.

In some embodiments, in accordance with a determination that the current location of the user corresponds to a location associated with a respective type of exercise, the computer system displays a view of the three-dimensional environment that corresponds to the respective type of exercise, including gradually reducing the visual prominence of the representation of the physical environment in the currently displayed view of the three-dimensional environment, while increasing visual prominence of virtual content corresponding to the respective type of exercise associated with the current location in the view of the three-dimensional environment. In some embodiments, reducing visual prominence of the representation of the physical environment includes ceasing display of more and more portions of the representation of the physical environment, fading out the representation of the physical environment, etc. In some embodiments gradually increasing a visual prominence of virtual content corresponding to the respective type of exercise includes starting to display the virtual content, increasing visibility of the virtual content, increasing a proportion of the field of view of the user occupied by the virtual content, increasing an opacity or brightness of the virtual content, etc. in regions of the view of the three-dimensional environment in which the representation of the physical environment has been gradually reduced.

In some embodiments, a respective location may correspond to multiple types of exercises, and the computer system requires that the user makes some movement corresponding to a respective one of the multiple types of exercises to disambiguate which type of exercise the user wishes to performance and selects the corresponding virtual content for display in the view of the three-dimensional environment at the respective location. For example, in some embodiments, the computer system detects movement corresponding to a respective one of the multiple types of exercises associated with the respective location (e.g., starting a characteristic motion (e.g., starting to walk on a treadmill, stepping on an stair stepper, moving legs back and forth on an elliptical, or starting rowing on a rowing machine, etc.), stepping onto/sitting down on a piece of exercise equipment corresponding to the respective type of exercise (e.g., sitting down on a rowing machine, or weight training machine, etc.), getting into a ready posture corresponding to the respective type of exercise (e.g., standing in a ready posture for hitting a virtual tennis ball, sitting down on the floor to start meditation or yoga, etc.), etc.), and the computer system displays a view of the three-dimensional environment that includes virtual content corresponding to the respective type of exercise.

In some embodiments, the computer system gradually changes the virtual content that is displayed in the view of the three-dimensional environment in accordance with progress of the respective type exercises performed by the user at the respective location. For example, in some embodiments, the view of the real world gradually fades away and/or cease to be displayed, and is gradually replaced by virtual content corresponding to the respective type of exercise. In some embodiments, the computer system gradually increases the amount of virtual content displayed in the field of view of the first user until a respective virtual environment corresponding to the respective type of exercise is fully displayed via the first display generation component (e.g., the second view of the three-dimensional environment includes a virtual environment corresponding to the first type of exercise, the third view of the three-dimensional environment includes a virtual environment corresponding to the second type of exercise, etc.). For example, in some embodiments, when an open gym is a location that is associated with both yoga and dance, after the first user arrives at the open gym, if the first user sits down with a Namaste pose, the computer system displays a virtual ocean view with ocean sounds for the user to practice yoga on a virtual beach; and if the first user stands with a dancer's pose, the computer system displays a virtual stage with dance music for the user to practice a dance.

In some embodiments, when the computer system detects that the user has moved away from a respective location, the computer system ceases to display the virtual content corresponding to the type of exercise associated with the respective location. For example, in FIG. 7O, if the computer system detects that the user 7002 has left the first location that includes the physical object 7404; after the view 7408 is displayed, the computer system ceases to display the view 7408 corresponding to the first type of exercise. In some embodiments, the computer system redisplays the view 7405 which does not include the virtual content that corresponds to either the first type of exercise or the second type of exercise. In some embodiments, when the computer system detects that the user has moved from the first location to the second location, the computer system displays the virtual content 7410 that corresponds to the second type of exercise.

In some embodiments, the computer system displays status information (e.g., progress, duration, speed, force, height, pace, stride length, performance level, scores, number of repetitions completed, etc. during the current session, historic statistics, average statistics for the first user and/or across multiple users, status of others also performing the same type of exercise, etc.) corresponding to the respective type of exercise when displaying a view of the three-dimensional environment that includes virtual content corresponding to the respective type of exercise.

In some embodiments, the computer system displays health information (e.g., real-time biometric data (e.g., heart rate, blood pressure, breathing rate, body temperature, blood sugar level, etc.), weight, BMI, etc.) corresponding to the user when displaying a view of the three-dimensional environment that includes virtual content corresponding to the respective type of exercise.

In some embodiments, the computer system visually presents progress information (e.g., real-time scores, laps completed, laps remaining, duration, number of steps, distance traveled, poses completed, etc.) of a respective type of exercise that is performed by the user when displaying a view of the three-dimensional environment that includes virtual content corresponding to the respective type of exercise.

In some embodiments, the three-dimensional environment that includes the virtual content corresponding to a respective type of exercise is an immersive environment, and includes a spatial range that is greater than that is included in the currently displayed view of the three-dimensional environment. For example, as the user turns his/her head or otherwise change the viewpoint corresponding to the currently displayed view of the three-dimensional environment, different portions of the virtual content is displayed in the currently displayed view of the three-dimensional environment.

In some embodiments, the second and/or third view of the three-dimensional environment includes a virtual representation of the user that is shown to perform a respective type of exercise (e.g., based on previous best records of the first user, based on a preset configuration of the first user for the first type of exercise, etc.) in competition with the user.

In some embodiments, the second and/or third view of the three-dimensional environment includes a virtual representation of at least another user different from the user that is shown to perform the respective type of exercise in competition with the user.

As disclosed herein, in some embodiments, the three-dimensional environment that is displayed via the display generation component is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment. In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user). In some embodiments, when displaying virtual objects or content at positions that correspond to locations of one or more physical objects in the physical environment, at least some of the virtual objects are displayed in placed of (e.g., replacing display of) a portion of the live view (e.g., a portion of the physical environment captured in the live view) of the cameras. In some embodiments, at least some of the virtual object and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of, but not all of, the physical environment visible through the transparent or semi-transparent portion of the display generation component. In some embodiments, at least some of the virtual objects are projected directly onto the user's retina at positions relative to an image of the representation of the physical environment (e.g., as viewed through a camera view of the physical environment, or through a transparent portion of the display generation component, etc.).

In some embodiments, input gestures used in the various examples and embodiments described herein (e.g., with respect to FIGS. 7A-7P, and FIGS. 8-12) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7P are provided below in references to methods 8000, 9000, 10000, 11000, and 12000 described with respect to FIGS. 8-12 below.

Figure 8:
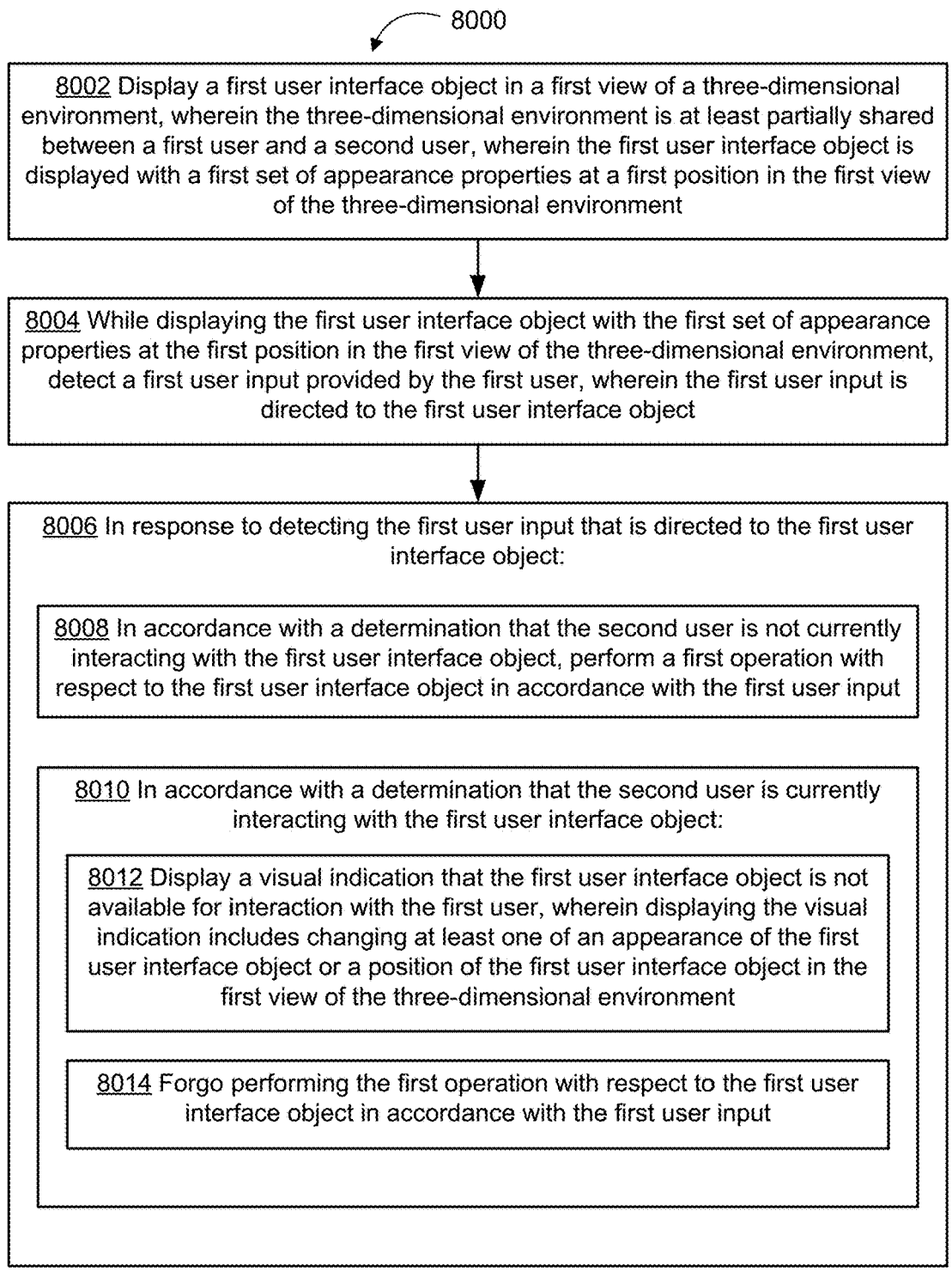
FIG. 8 is a flowchart of a method of supporting interaction with a user interface object in a computer-generated three-dimensional environment that is shared between two or more users, in accordance with some embodiments.

FIG. 8 is a flowchart of a method of supporting interaction with a user interface object in a computer-generated three-dimensional environment that is shared between two or more users, in accordance with some embodiments.

In some embodiments, the method 8000 is performed at a computer system (e.g., a first computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., first computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing.

In the method 8000, the computer system displays (8002) a first user interface object (e.g., user interface object 7016 in FIG. 7B, another user interface object, etc.) (e.g., a representation of an application, a user interface that includes a plurality of user interface objects (e.g., selectable avatars, selectable menu items, selectable device controls, selectable content items, slider controls, buttons, etc.), a virtual three-dimensional object, a control, a control panel that includes multiple controls corresponding to different functions or operations, an information item, a media item, etc.) in a first view of a three-dimensional environment (e.g., first view 7015-1 in FIG. 7B, another first view, etc.), wherein the three-dimensional environment is at least partially shared (e.g., at least a spatial portion of the environment is shared, the environment is shared during at least a period of time, objects in the environment are shared fully or partially (e.g., simultaneously viewable and accessible, simultaneously viewable but not simultaneously accessible, viewable but not accessible when others have control (e.g., said others can be viewing or not viewing the object), etc.) between a first user (e.g., user 7102 in FIGS. 7A-7C) and a second user (e.g., user 7002 in FIGS. 7A-7C) (e.g., when at least a portion of the three-dimensional environment (e.g., the portion shown in the first view of the three-dimensional environment, another portion of the three-dimensional environment, etc.) is displayed for viewing by both the first user and the second user at the same time, and/or when some or all of the virtual objects (e.g., including the first user interface object, another user interface object, etc.) in the three-dimensional environment are concurrently displayed in the three-dimensional environment shown to both the first user and the second user, etc.), wherein the first user interface object is displayed with a first set of appearance properties (e.g., as shown in FIG. 7B) (e.g., the normal appearance (e.g., first shape, first size, first color, first opacity, first level of saturation, first level of luminance, etc.) of the first user interface object as displayed by the second display generation component to the second user) at a first position in the first view of the three-dimensional environment (e.g., first view 7015-1 in FIG. 7B). While displaying the first user interface object with the first set of appearance properties at the first position in the first view of the three-dimensional environment, the computer system detects (8004) a first user input provided by the first user, wherein the first user input is directed to the first user interface object (e.g., detecting the user input includes detecting movement of a portion of the first user to a first location in the physical environment, where the first location in the physical environment corresponds a respective position of the first user interface object in the first view of the three-dimensional environment; detecting the user input includes detecting a gaze input directed to the first user interface object and a control input (e.g., a finger movement gesture, an in air gesture, an input provided by a controller, etc.) that is detected in conjunction with the gaze input; etc.). In response to detecting (8006) the first user input that is directed to the first user interface object and in accordance with a determination that the second user (e.g., user 7002 in FIGS. 7A-7C) is not currently interacting with the first user interface object (e.g., user interface object 7016 in FIGS. 7A-7C) (e.g., the first user interface object does not have a preset spatial relationship to virtual position of the second user in the first view of the three-dimensional environment (e.g., the first user interface object is in not inside the representation of the second user's palm or hand, the first user interface object is outside of the second user's private space that is visible within the first view of the three-dimensional environment, etc.), the second user is not controlling, selecting, moving, modifying, and/or otherwise interacting with the first user interface object through a second computer system that displays a second view of the three-dimensional environment in the at least partially shared three-dimensional environment, etc.), the computer system performs (8008) a first operation with respect to the first user interface object in accordance with the first user input (e.g., showing the first user interface object being grabbed or moved by the first user in accordance with the first user input (e.g., moved toward the user, moved in accordance with the movement of the first user input, etc.), showing a ghost image of the first user interface object being grabbed and/or moving into a representation of the first user's hands, etc.). In some embodiments, the first user interface object continues to be displayed with the first set of appearance properties (e.g., at its original location or in a representation of the first user's hand, etc.) in accordance with a determination that the second user was not interacting with the first user interface object when the first user input was detected. In response to detecting (8006) the first user input that is directed to the first user interface object (e.g., the user interface object 7016 in FIGS. 7A-7C) and in accordance with a determination that the second user is currently interacting with the first user interface object (e.g., the first user interface object has the preset spatial relationship to a virtual position of the second user in the first view of the three-dimensional environment (e.g., the first user interface object is in the representation of the second user's palm or hand, the first user interface object is within the second user's private space that is visible within the first view of the three-dimensional environment, etc.), the second user is controlling, selecting, moving, modifying, and/or otherwise interacting with the first user interface object through the second computer system that displays a second view of the three-dimensional environment in the shared three-dimensional environment, etc.), the computer system displays (8010) a visual indication that the first user interface object is not available for interaction with the first user, wherein displaying the visual indication includes changing at least one of an appearance of the first user interface object or a position of the first user interface object in the first view of the three-dimensional environment (e.g., in FIG. 7C, the appearance of the user interface object 7016 is changed in the first view 7015-1 shown to the first user 7102). In some embodiments, the computer system displays the first user interface object with a second set of appearance properties (e.g., second shape, second size, second color, second opacity, second level of saturation, second level of luminance, etc.) that are different from the first set of appearance properties (e.g., the second set of appearance properties provide a visual indication that the first user interface object is in control of the second user at this moment, and is not available for interacting with the first user), and/or moves the first user interface object out of the way when the first user tries to grab it. In some embodiments, the first user interface object maintains its appearance and/or position in the view of the at least partially shared three-dimensional environment displayed to the second user, as the visual indication only needs to be displayed to the first user. In some embodiments, the visual indication is displayed while the second user is interaction with the first user interface object in the at least partially shared three-dimensional environment. The computer system forgoes (8014) performing the first operation with respect to the first user interface object in accordance with the first user input. In some embodiments, the computer system does not show the first user interface object being grabbed by the representation of the first user or does not show the first user interface object moving in accordance with the movement of the first user input (e.g., object is not moving to avoid being grabbed by the first user's hand, object is not shrinking or changing shape to avoid being grabbed by the representation of the first user, etc.). In some embodiments, the computer system does not show a ghost image of the first user interface object moving into the representation of the first user's hand.

These features are illustrated, for example, in FIGS. 7A-7C, where the first user 7102 and the second user 7002 shares the three-dimensional environment shown respectively via the display generation components 7200 and 7100. When the second user 7002 has control of the first user interface object 7016 (e.g., is interacting with the first user interface object 7016, holds the first user interface object 7016 or a representation thereof via the representation 7028" of the hand 7028 in the second view 7015-2 (also representation 7028' in the first view 7015-1 shown to the first user 7102), etc.), if the first user 7102 makes an attempt to interact with the first user interface object 7016 through a movement of the first user's hand 7102, the computer system of the first user 7102 changes an appearance of the first user interface object 7016 in the first view 7015-1 shown via the first display generation component 7200, and does not perform an operation corresponding to the first user interface object 7016. In contrast, if the second user 7002 is not interacting with the first user interface object 7016, then the computer system performs the first operation in accordance with the movement of the first user's hand 7202. This is indirectly illustrated by the interaction between the second user 7002 and the first user interface object 7016 in FIG. 7B, where the first user 7102 does not have control or is not interacting with the first user interface object 7016 (e.g., consider reversal of the roles of the first user and the second user in that scenario).

In some embodiments, the computer system changes the appearance of the first user interface object as the visual indication that the first user interface object is not available for interaction with the first user, and changing the appearance of the first user interface object includes changing at least one of the first set of appearance properties of the first user interface object (e.g., increasing a transparency level, reducing color saturation, reducing opacity, blurring, darkening, reducing resolution, shrinking in size, etc. of the first user interface object, optionally, while maintaining appearance of the surrounding environment of the first user interface object (e.g., not changing the visual prominence of the surrounding environment)) to reduce visual prominence of the first user interface object (e.g., in FIG. 7C, the appearance of the user interface object 7016 is changed in the first view 7015-1 shown to the first user 7102). In some embodiments, the compute system changes the appearance of the first user interface object while maintaining a position of the first user interface object in the first view of the three-dimensional environment that is determined independent of the first user input (e.g., the first position, another position determined in response to the interaction between the first user interface object and the second user, another position determined in accordance with preprogramed autonomous movement of the first user interface object (e.g., the first user interface object has a preset movement pattern or preset animated effect, etc.), another position determined in accordance with other events in the computer system, etc.). In some embodiments, in response to detecting the first user input that is directed to the first user interface object, in accordance with a determination that the second user is not currently interacting with the first user interface object, the computer system does not change the appearance of the first user interface object to reduce visual prominence of the first user interface object, and the computer system performs the first operation with respect to the first user interface object in accordance with the first user input (e.g., the appearance and visual prominence of the first user interface object is maintained, or the appearance may be changed as a result of performing the first operation but not with a goal to reduce visual prominence of the first user interface object, etc.).

Changing the appearance of the first user interface object, including changing at least one of the first set of appearance properties of the first user interface object to reduce visual prominence to the first user interface object, as a visual indication that the first user interface object is not available for interaction with the first user, provides improved visual feedback to the users (e.g., improved visual feedback that the first user interface object is not available for interaction with the first user). Providing improved feedback enhances the operability of the device, which, additionally, reduces power usage and improves battery life of the device by enabling the user to use the device more quickly and efficiently.

In some embodiments, the computer system detects termination of the first user input that is directed to the first user interface object (e.g., detecting movement of a portion of the first user away from the first location in the physical environment that corresponds to the respective position of the first user interface object in the first view of the three-dimensional environment, detecting the gaze input that was directed to the first user interface object moving away from the first user interface object, detecting the hand of the first user that provided the first user input moving out of the posture required to maintain the first user input, etc.). In response to detecting the termination of the first user input that is directed to the first user interface object, the computer system restores (e.g., to the level existed immediately prior to detecting the first user input, or prior to changes being made in response to detecting the first user input, etc.) at least one of the first set of appearance properties of the first user interface object that was changed in response to the first user input, to restore the visual prominence of the first user interface object. In some embodiments, the computer system restores the increased transparency level, restores the decreased color saturation, restores the reduced opacity, ceases to blur and/or darken, restores the reduced resolution, restores the reduced size, etc. of the first user interface object, optionally, while maintaining appearance of the surrounding environment of the first user interface object (e.g., not changing the visual prominence of the surrounding environment). For example, in some embodiments, when the first user reaches out his/her hand toward a location that corresponds to a virtual object with which the second user is currently interacting, the virtual object appears to fade out or become dimmer when the first user's hand is at a location in the physical environment that corresponds to the position of the virtual object in the three-dimensional environment. When the first user then subsequently moves his/her hand away from that location, the appearance of the virtual object is restored (e.g., no longer appearing to be faded out or dim). This is illustrated in FIG. 7B (following FIG. 7C), where if the first user 7102 ceases to attempt to interact with the first user interface object 7016, the appearance of the first user interface object 7016 is no longer altered in the first view 7015-1 shown to the first user 7102.

Restoring at least one of the first set of appearance properties of the first user interface object that was changed in response to the first user input, to restore visual prominence of the first user interface object, in response to detecting the termination of the first user input that is directed to the first user interface object, provides improved visual feedback to the users (e.g., improved visual feedback that the first user interface object is available for interaction). Providing improved feedback enhances the operability of the device, which, additionally, reduces power usage and improves battery life of the device by enabling the user to use the device more quickly and efficiently.

In some embodiments, while continuing to detect the first user input (e.g., detecting the portion of the first user remaining at the first location in the physical environment that corresponds to the respective position of the first user interface object in the first view of the three-dimensional environment at a time when the first user input was initially detected, detecting the gaze input that was directed to the first user interface object remaining at the same position in the three-dimensional environment, detecting the hand of the first user that provided the first user input remaining in the required posture for maintain the first user input, etc.), the computer system detects movement of the first user interface object away from the first position in the first view of the three-dimensional environment independent of the detection of the first user input (e.g., in accordance with a user input provided by the second user, in accordance with intrinsic movement pattern of the first user interface object, in response to other events in the computer system that is independent of the first user input, etc.). In response to detecting the movement of the first user interface object away from the first position in the first view of the three-dimensional environment independent of the detection of the first user input, the computer system restores (e.g., to the level existed immediately prior to detecting the first user input, or prior to changes being made in response to detecting the first user input, etc.) at least one of the first set of appearance properties of the first user interface object that was changed in response to the first user input, to restore the visual prominence of the first user interface object. In some embodiments, the computer system restores the increased transparency level, restores the decreased color saturation, restores the reduced opacity, ceases to blur and/or darken, restores the reduced resolution, restores the reduced size, etc. of the first user interface object, optionally, while maintaining appearance of the surrounding environment of the first user interface object (e.g., not changing the visual prominence of the surrounding environment). For example, in some embodiments, when the first user reaches out his/her hand toward a location that corresponds to a virtual object with which the second user is currently interacting, the virtual object appears to fade out or become dimmer when the first user's hand is at a location in the physical environment that corresponds to the position of the virtual object in the three-dimensional environment. When the first user interface object is then subsequently moved away (e.g., moved by the second user, according to its own movement pattern, according to other system-generated events unrelated to the first user input, etc.) from its current position and away from the position that corresponds to the current location of the first user's hand, the appearance of the virtual object is restored (e.g., no longer appearing to be faded out or dim).

Restoring at least one of the first set of appearance properties of the first user interface object that was changed in response to the first user input, to restore the visual prominence of the first user interface object, in response to detecting the movement of the first user interface object away from the first position in the first view of the three-dimensional environment independent of the detection of the first user input, provides improved visual feedback to the users (e.g., improved visual feedback that the first user interface object has been moved away from the first position). Providing improved feedback enhances the operability of the device, which, additionally, reduces power usage and improves battery life of the device by enabling the user to use the device more quickly and efficiently.

In some embodiments, displaying the visual indication that the first user interface object is not available for interaction with the first user includes maintaining changes to the appearance of the first user interface object made in response to the first user input until the second user ceases to interact with the first user interface object. For example, the changed appearance of the user interface object 7016 will be maintained even after the first user 7102 ceases his attempt to interact with the first user interface object 7016, until the second user 7002 no longer controls the first user interface object 7016 in exclusion of the first user 7102. For example, in some embodiments, once the visual indication is displayed in response to detecting the first user input and in accordance with the determination that the second user was interacting with the first user interface object at the time that the first user input is initially detected, the computer system continues to display the visual indication (e.g., the changed appearance of the first user interface object, changed position, etc.) in accordance with a determination that the second user is still interacting with the first user interface object (e.g., the second user continues to keep the virtual object at a position that corresponds to the location of the second user's palm or hand, and/or continues to select, modify, or otherwise interact with the virtual object through the operation of the computer system of the second user, etc.).

In some embodiments, the visual indication continues to be displayed even when the computer system detects that the first user input has been terminated and that the first user is not currently providing any input to attempt to interact with the first user interface object. In some embodiments, the visual indication is maintained for a period of time, irrespective of whether the first user input is maintained or if the first user continues to attempt to interact with the first user interface object, but not necessarily until the second user has stopped interacting with the first user interface object. In some embodiments, the computer system of the first user determines that the second user is no longer interacting with the first user interface object, and in response to detecting that the second user is no longer interacting with the first user interface object, the computer system ceases to display the visual indication that the first user interface object is no available for interaction with the first user (e.g., the computer system ceases to display the first user interface object in the faded or dimmed state, and restores the original appearance properties of the first user interface object that had been changed in response to the detection of the first user input). In some embodiments, the persistent visual indication that the first user interface object is still within the control of the second user and/or is not available for interaction with the first user helps the first user to know when the device is ready to respond to another attempt to interact with the first user interface object and avoid repeated failures in trying to interact with the first user interface object.

Maintaining changes to the appearance of the first user interface object made in response to the first user input until the second user ceases to interact with the first user interface object provides improved visual feedback to the users (e.g., improved visual feedback that the second user is interacting with the first user interface object, improved visual feedback that the first user interface object is not available for interaction with the first user, etc.). Providing improved feedback enhances the operability of the device, which, additionally, reduces power usage and improves battery life of the device by enabling the user to use the device more quickly and efficiently.

In some embodiments, in response to detecting the first user input that is directed to the first user interface object (e.g., user interface object 7016 in FIGS. 7B-7C) and in accordance with a determination that the second user (e.g., user 7002 in FIGS. 7B-7C) is not currently interacting with the first user interface object (e.g., the first user interface object does not have a preset spatial relationship to a virtual position of the second user in the first view of the three-dimensional environment (e.g., the first user interface object is in not inside the representation of the second user's palm or hand, the first user interface object is outside of the second user's private space that is visible within the first view of the three-dimensional environment, etc.), the second user is not controlling, selecting, moving, modifying, and/or otherwise interacting with the first user interface object through second computer system that displays a second view of the three-dimensional environment in the at least partially shared three-dimensional environment, etc.), the computer system displays the first user interface object at a second position in the first view of the three-dimensional environment, wherein the second position is selected in accordance with a current location of a hand of the first user (e.g., user 7102 in FIGS. 7B-7C, or another user, etc.). In some embodiments, the second position is selected to correspond to the current location of the first user's hand (e.g., hand 7202 in FIGS. 7B-7C, or another hand, etc.) providing the first user input (e.g., overlays, replaces display of, modifying the appearance of, etc. the representation of the first user's hand), or the second position is selected to correspond to a position in the three-dimensional environment or a location in the physical environment that is pointed to or indicated by the first user input, etc.

In some embodiments, the computer system shows the first user interface object being grabbed by the representation of the hand of the first user in the first view of the three-dimensional environment, shows the first user interface object moving in a direction that corresponds to a movement direction of the first user input provided by the first user's hand (e.g., upward movement of the user's hand causes the virtual object to be lifted up from a representation of a table top, upward movement of the user's hand causes the virtual object to jump up from the representation of a table top and land in the representation of the user's hand, etc.), shows the first user interface object (e.g., user interface object 7016 in FIGS. 7B-7C, or another user interface object, etc.) moving to a position indicated by the first user's hand (e.g. a flick and point gesture by the first user's hand causes the virtual object to move up from its original position and move to the position indicated by the pointing finger of the first user's hand, etc.), etc. In response to detecting the first user input that is directed to the first user interface object and while displaying the first user interface object at the second position that is selected in accordance with the current location of the hand of the first user (e.g., while the first user interface object is displayed at the position that corresponds to the representation of the first user's hand (e.g., appears to be held by the first user's hand), while the first user interface object is displayed hovering at a position that is selected by the first user input, etc.), the computer system detects movement of the hand of the first user (e.g., the user 7102, or another user, etc.) that corresponds to a throwing gesture of the hand of the first user. In some embodiments, the computer system detects the first user's hand moving from a location close to the first user to another location farther away from the first user, and, optionally toward a location that corresponds to a position of the representation of the second user. In some embodiments, the computer system detects the first user flicking an index finger away from the first user, optionally toward a location that corresponds to a position of the representation of the second user, and/or detecting the first user performing tossing motion or throwing motion using his/her hand. In some embodiments, detecting the throwing gesture includes detecting a quick acceleration of the hand followed by a quick deceleration. In some embodiments, detecting the throwing gesture includes detecting a closed hand opening (and optionally, in conjunction with detecting the quick deceleration). In response to detecting the first user input that is directed to the first user interface object and in response to detecting the movement of the hand of the first user that corresponds to the throwing gesture of the hand of the first user, the computer system moves the first user interface object in the first view of the three-dimensional environment in a first direction that corresponds to a direction of the movement of the hand of the first user and rotating the first user interface object during movement of the first user interface object. In some embodiments, as the first user interface object moves in the direction that corresponds to the direction of the throwing gesture, the first user interface object also rotates around a virtual center of weight (e.g., a geometric center, another point in or out of the first user interface object depending on the object simulated by the first user interface object, etc.) of the first user interface object (e.g., to simulate conservation of angular momentum during the linear motion of the first user interface object, to simulate a physical effect of the throwing gesture on the first user interface object, to show a predefined user-facing side of the first user interface object toward the second user at the destination end of the throwing gesture, to land on a representation of a physical surface or on a virtual surface with a predefined upright orientation, etc.).

In some embodiments, when the second user has been interacting with the first user interface object and subsequently performs the throwing gesture to throw away the first user interface object in the three-dimensional environment, the computer system shows the first user interface object moving in the first view of the three-dimensional environment in a second direction that corresponds to a direction of the movement of the hand of the second user and rotating the first user interface object during movement of the first user interface object (e.g., as the first user interface object moves in the direction of the throwing gesture, the first user interface object also rotates around a virtual center of weight of the first user interface object (e.g., to simulate conservation of angular momentum during the linear motion of the first user interface object, to simulate a physical effect of the throwing gesture on the first user interface object, to show a predefined user-facing side of the first user interface object toward the first user at the destination end of the throwing gesture, to land on a representation of a physical surface or on a virtual surface with a predefined upright orientation, etc.)).

Moving the first user interface object in the first view of the three-dimensional environment in a first direction that corresponds to a direction of the movement of the hand of the first user, and rotating the first user interface object during movement of the first user interface object, in response to detecting the movement of the hand of the first user that corresponds to the throwing gesture of the hand of the first user, provides improved visual feedback to the users (e.g., improved visual feedback that the computer system has detected the throwing gesture of the hand of the first user, improved visual feedback that the first user interface object is being moved, etc.). Providing improved feedback enhances the operability of the device, which, additionally, reduces power usage and improves battery life of the device by enabling the user to use the device more quickly and efficiently.

In some embodiments, rotating the first user interface object (e.g., user interface object 7016, or another user interface object, etc.) during movement of the first user interface object includes: in accordance with a determination that the direction of the movement of the hand of the first user points toward a representation of the second user in the first view of the three-dimensional environment, rotating the first user interface object in a first manner (e.g., rotate the first user interface object by a first amount in a first rotational direction, by a second amount in a second rotational direction, and/or by a third amount in a third rotational direction, etc.) such that the first user interface object has a first preset orientation in the three-dimensional environment when arriving at a destination position in the three-dimensional environment (e.g., the position of the representation of the second user's hand, a representation of a surface associated with the second user, etc.) that is selected in accordance with the movement of the hand of the first user in the physical environment. In some embodiments, the first preset orientation is different from the orientation that the first user interface object had when the first user interface object started the movement in response to the throwing gesture of the first user. In some embodiments, the first preset orientation is an orientation in which a preset front-facing side of the first user interface object faces toward the representation of the second user. In some embodiments, the first preset orientation is an orientation in which the first user interface object is upright when caught by and/or when resting on the representation of the hand of the second user, etc. In some embodiments, when the second user has been interacting with the first user interface object and subsequently performs the throwing gesture in the direction that corresponds to the direction of the representation of the first user, the computer system, in accordance with a determination that the direction of the movement of the hand of the second user points toward the viewpoint of the first view of the three-dimensional environment, rotates the first user interface object (e.g., by a first amount in a first rotational direction, by a second amount in a second rotational direction, and/or by a third amount in a third rotational direction, etc.) in a respective manner such that the first user interface object has the first preset orientation (e.g., the first preset orientation is different from the orientation that the first user interface object had when the first user interface object started the movement in response to the throwing gesture of the second user, the first preset orientation is an orientation in which a preset front-facing side of the first user interface object faces toward a representation of the first user, or the first preset orientation is an orientation in which the first user interface object is upright when caught by and/or when resting on the representation of the hand of the first user, etc.) relative to the three-dimensional environment when arriving at a destination position in the three-dimensional environment that is selected in accordance with the movement of the hand of the second user in the physical environment.

Rotating the first user interface object in a first manner such that the first user interface has a first preset orientation in the three-dimensional environment when arriving at a destination position in the three-dimensional environment that is selected in accordance with the movement of the hand of the first user in the physical environment, reduces the number of inputs to display the first user interface object with the desired orientation at the destination position (e.g., the users do not need to perform additional gestures to rotate the first user interface object to the desired orientation (e.g., for viewing) after the first user interface object is rotated during the movement of the first user interface object). Reducing the number of inputs needed to perform an operation enhances the operability of the device, which, additionally, reduces power usage and improves battery life of the device by enabling the user to use the device more quickly and efficiently.

In some embodiments, rotating the first user interface object during movement of the first user interface object includes: in accordance with a determination that the direction of the movement of the hand of the first user (e.g., first user 7102 in FIGS. 7A-7C, another user, etc.) points toward a representation of a first surface (e.g., a physical surface (e.g., a wall, a tabletop, the seat of a couch, etc.), a virtual surface (e.g., a virtual shelf, a virtual wall, a virtual couch, etc.), etc.) in the first view (e.g., first view 7015-1 in FIGS. 7B-7C, another view, etc.) of the three-dimensional environment, rotating the first user interface object (e.g., first user interface object 7016 in FIGS. 7B-7C, or another user interface object, etc.) in a second manner (e.g., rotate the first user interface object by a first amount in a first rotational direction, by a second amount in a second rotational direction, and/or by a third amount in a third rotational direction, etc.) such that the first user interface object has a second preset orientation relative to the representation of the first surface in the three-dimensional environment when arriving at a destination position on the representation of the first surface that is selected in accordance with the movement of the hand of the first user in the physical environment. In some embodiments, the second preset orientation is different from the orientation that the first user interface object had when the first user interface object started the movement in response to the throwing gesture of the first user. In some embodiments, the second preset orientation is an orientation in which a preset front-facing side of the first user interface object faces toward a representation of the first user. In some embodiments, the second preset orientation is an orientation in which the first user interface object is upright when landing on the representation of the first surface, etc.

In some embodiments, when the second user has been interacting with the first user interface object and subsequently performs the throwing gesture in the direction that corresponds to the direction of the representation of the first surface, the computer system, in accordance with a determination that the direction of the movement of the hand of the second user points toward the representation of the first surface in the three-dimensional environment, rotates the first user interface object (e.g., by a first amount in a first rotational direction, by a second amount in a second rotational direction, and/or by a third amount in a third rotational direction, etc.) in a respective manner such that the first user interface object has the second preset orientation relative to the representation of the first surface in the three-dimensional environment when arriving at a destination position on the representation of the first surface that is selected in accordance with the movement of the hand of the second user in the physical environment. In some embodiments, irrespective of which user made the throwing gesture in the direction of the representation of the first surface, the first user interface object is rotated during its movement toward the representation of the first surface in a respective manner such that the first user interface object lands on the representation of the first surface with a preset spatial relationship (e.g., orientation, location, etc.) relative to the representation of the first surface. For example, in some embodiments, when the first user interface object is a virtual picture frame, the virtual picture frame rotates while being thrown toward the representation of a table, and lands on the table with an upright orientation facing the user that performed the throwing gesture. In some embodiments, when the virtual picture frame is thrown toward the representation of a wall, the virtual picture frame rotates during movement toward the representation of the wall and lands on the representation of the wall with its back parallel to the representation of the wall. In some embodiments, when the virtual picture frame is thrown toward the second user by the first user, the virtual picture frame rotates to have its front side face toward the representation of the second user when the virtual picture frame lands on the representation of the palm of the second user.

Rotating the first user interface object in a second manner such that the first user interface object has a second preset orientation relative to the representation of the first surface in the three-dimensional environment when arriving at a destination position on the representation of the first surface that is selected in accordance with the movement of the hand of the first user in the physical environment, reduces the number of inputs needed to display the first user interface object with the desired orientation on the first surface (e.g., the users do not need to perform additional gestures to rotate the first user interface object to the desired orientation (e.g., for viewing) after the first user interface object is rotated during the movement of the first user interface object). Reducing the number of inputs needed to perform an operation enhances the operability of the device, which, additionally, reduces power usage and improves battery life of the device by enabling the user to use the device more quickly and efficiently.

In some embodiments, the computer system changes the position of the first user interface object (e.g., user interface object 7016 in FIGS. 7B-7C, or another user interface object, etc.) in the first view (e.g., 7015-1 in FIG. 7C, or another view, etc.) of the three-dimensional environment as the visual indication that the first user interface object is not available for interaction with the first user, and changing the position of the first user interface object in the first view of the three-dimensional environment includes moving the first user interface object from the first position to maintain at least a preset distance between the first user interface object and a representation of a hand of the first user that provided the first user input (e.g., the first user interface object appears to move in one or more directions to avoid the representation of the hand of the first user that tries to grab the first user interface object). In some embodiments, the movement of the first user interface object is accompanied by changes made to the appearance of the first user interface object (e.g., the first user interface object appears to be faded or dimmed while moving to avoid the representation of the hand of the first user getting too close to itself). In some embodiments, in response to detecting the first user input that is directed to the first user interface object, in accordance with a determination that the second user is not currently interacting with the first user interface object, the computer system does not move the first user interface object from the first position until the representation of the first user's hand reaches the first position, and the computer system then moves the first user interface object away from the first position or manipulates the first user interface object in accordance with the subsequent movement of the hand from the first position (e.g., the subsequent movement of the first user interface object is not to avoid the hand, but to move with the hand or to follow the hand). In some embodiments, in response to detecting the first user input that is directed to the first user interface object, in accordance with a determination that the second user is not currently interacting with the first user interface object, the computer system moves the first user interface object from the first position toward the representation of the first user's hand until the positions of the first user interface object and the representation of the hand overlap, and the computer system then moves the first user interface object or manipulates the first user interface object in accordance with the subsequent movement of the hand (e.g., the first user interface object moves with the representation of the hand or follows the representation of the hand).

Moving the first user interface object from the first position to maintain at least a preset distance between the first user interface object and a representation of a hand of the first user that provided the first user input, as the visual indication that the first user interface object is not available for interaction with the first user, provides improved visual feedback to the users (e.g., improved visual feedback that the first user interface object is not available for interaction with the first user). Providing improved feedback enhances the operability of the device, which, additionally, reduces power usage and improves battery life of the device by enabling the user to use the device more quickly and efficiently.

In some embodiments, performing the first operation with respect to the first user interface object (e.g., user interface object 7016 in FIGS. 7B-7C, or another user interface object, etc.) in accordance with the first user input includes moving the first user interface object toward a representation of a hand of the first user (e.g., the hand 7202 in FIGS. 7B-7C, or another hand, etc.) (e.g., the hand that is providing the first user input, a hand of the first user that is different from the hand that provided the first user input, either hand of the first user, etc.). In some embodiments, the computer system shows the first user interface object moving toward the representation of the hand as the hand moves toward the first user interface object to indicate that the first user interface object is available to be grabbed by the first user's hand. In some embodiments, the movement of the first user interface object stops when the position of the first user interface object overlaps with the position of the representation of the hand, and the computer system then moves the first user interface object or manipulates the first user interface object in accordance with the subsequent movement of the hand, if any. In some embodiments, the movement of the first user interface object is only for a limited distance away from the first position (e.g., the first user interface object moves toward the representation of the first user's hand a little bit when the representation of the first user's hand approaches the first user interface object to within a threshold distance of the first position), and the movement provides visual feedback to the first user that the first user interface object is available for interaction with the first user (e.g., when the first user provides the correct selection gesture, in response to the representation of the first user's hand moving closer and grabbing the first user interface object, etc.).

Moving the first user interface object toward a representation of a hand of the first user in accordance with a determination that the second user is not currently interacting with the first user interface object, provides improved visual feedback to the users (e.g., improved visual feedback that the user interface object is available for interaction with the first user, improved visual feedback that the computer system is performing the operation with respective to the first user interface object, etc.). Providing improved feedback enhances the operability of the device, which, additionally, reduces power usage and improves battery life of the device by enabling the user to use the device more quickly and efficiently.

In some embodiments, performing the first operation with respect to the first user interface object (e.g., user interface object 7016, or another user interface object, etc.) in accordance with the first user input includes: in accordance with a determination that the first user input includes (e.g., is, includes, starts with, ends with, etc.) a predefined selection gesture, selecting the first user interface object as a target for a subsequent input (e.g., a drag gesture while the pinch gesture is maintained, a flick gesture while the pinch gesture is maintained, a drag gesture after the predefined selection gesture is terminated, etc.) received from the first user (e.g., user 7102 in FIGS. 7A-7C, or another user, etc.). In some embodiments, the selection gesture is a pinch gesture that includes touch-down of an index finger on a thumb of the same hand (optionally, followed by lifting off of the index finger from the thumb, or flick of the wrist connected to the hand, or translation of the whole hand, etc.), a gesture that includes an index finger and a thumb of the same hand pulling apart from each other from a touching posture, a pinch gesture, a pinch and drag gesture, a pinch and flick gesture, etc. In some embodiments, if the first user's hand gets near a location that corresponds to a position near the first user interface object and performs the predefined selection gesture, the computer system generates visual feedback to indicate that the first user interface object is not available for interaction with the first user in accordance with a determination that the second user is currently interacting with the first user interface object, and the computer system does not select the first user interface object for subsequent interaction with the first user. If the computer system determines that the second user is not currently interacting with the first user interface object, the computer system does not display the visual feedback and selects the first user interface object for subsequent interaction with the first user.

Selecting the first user interface object as a target for a subsequent input received from the first user, in accordance with a determination that the first user input includes a predefined selection gesture, provides additional control options without cluttering the UI with additional displayed controls (e.g., additional displayed controls for selecting the first user interface object). Providing additional control options without cluttering the UI with additional displayed controls enhances the operability of the device, which, additionally, reduces power usage and improves battery life of the device by enabling the user to use the device more quickly and efficiently.

In some embodiments, in conjunction with selecting the first user interface object (e.g., user interface object 7016 in FIGS. 7B-7C, or another user interface object, etc.) as a target for a subsequent input received from the first user (e.g., in response to detecting at least a portion of the first user input, in response to detecting the predefined selection gesture provided by the first user while the second user is not currently interacting with the first user interface object, etc.), the computer system displays a representation of the first user interface object at a position that corresponds to a location of a hand of the first user (e.g., the hand that performed the predefined selection gesture or a hand of the first user that is different from the hand the performed the first predefined selection gesture, either hand of the first user, etc.) (e.g., the representation or ghost image of the first user interface object is display near or at the position of the representation of the first user's hand, on the palm portion of the representation of the first user's hand, etc.), while maintaining the first user interface object at the first position in the first view of the three-dimensional environment (e.g., the first user interface object remains at its original location, but can be "remotely" controlled by the first user in accordance with interaction between the first user and the representation of the first user interface object). In some embodiments, the representation of the first user interface object is a duplicate of the first user interface object, an image of the first user interface object that is more translucent than the first user interface object, a reduced version of the first user interface object that has a subset of the characteristics (e.g., a simplified internal structure, an outline, etc.) and/or functions of the first user interface object (e.g., with reduced user interface elements, removal of textual content, etc.), etc. In some embodiments, when the first user interface object is selected in response to the selection gesture performed by the first user, a ghost image of the first user interface object is displayed at a position that corresponds to the location of the hand of the first user (e.g., floating above the representation of the first user's hand, on the representation of the user's palm, etc.).

Selecting the first user interface object as a target for a subsequent input received from the first user in conjunction with displaying a representation of the first user interface object at a position that corresponds to a location of a hand of the first user, while maintaining the first user interface object at the first position in the first view of the three-dimensional environment, provides improved visual feedback to the users (e.g., improved visual feedback that the first user interface object is now a target for a subsequent input received from the first user). Providing improved feedback enhances the operability of the device, which, additionally, reduces power usage and improves battery life of the device by enabling the user to use the device more quickly and efficiently.

In some embodiments, after the first operation is performed with respect to the first user interface object in accordance with the first user input (e.g., a representation of the first user interface object is displayed near the first position along with the first user interface object, a representation of the first user interface object (e.g., user interface object 7016 in FIGS. 7B-7C, or another user interface object, etc.) moves near a position of the representation of the first user's hand (e.g., representation 7202' in the first view 7015-1 in FIGS. 7B-7C, or another representation of the hand 7202, etc.), the first user interface object moves toward the position of the first user, etc., to indicate that the first user interface object is ready for interaction with the first user, etc.), the computer system detects a second user input directed to the first user interface object (e.g., detecting a predefined pinch gesture directed to a position of the representation of the first user interface object, detecting a predefined pinch gesture directed to a position of the first user interface object, detecting a gaze input directed to the position of the representation of the first user interface object in conjunction with detecting a predefined selection input, detecting a gaze input directed to a position of the first user interface object in conjunction with detecting a predefined selection input, etc.). In response to detecting the second user input, in accordance with a determination that the second user input includes (e.g., is, includes, starts with, ends with, etc.) a predefined selection gesture, the computer system selects the first user interface object as a target for a subsequent input (e.g., a drag gesture while the pinch gesture is maintained, a flick gesture while the pinch gesture is maintained, a drag gesture after the predefined selection gesture is terminated, etc.) received from the first user.

In some embodiments, the selection gesture is a pinch gesture that includes touch-down of an index finger on a thumb of the same hand (optionally, followed by lifting off of the index finger from the thumb, or flick of the wrist connected to the hand, or translation of the whole hand, etc.), a gesture that includes an index finger and a thumb of the same hand pulling apart from each other from a touching posture, a pinch gesture, a pinch and drag gesture, a pinch and flick gesture, etc. In some embodiments, performing the first operation with respect to the first user interface object (e.g., user interface object 7106 in FIGS. 7B-7C, or another user interface object, etc.) in accordance with the first user input includes displaying (e.g., at a second position that is different from the first position at which the first user interface object is displayed, and/or that is different from a position of a representation of the hand of the first user that provided the first user input, etc.) a representation of the first user interface object while maintaining the first user interface object at the first position in the first view of the three-dimensional environment. In some embodiments, the representation of the first user interface object is a duplicate of the first user interface object, an image of the first user interface object that is more translucent than the first user interface object, a reduced version of the first user interface object that has a subset of the characteristics (e.g., a simplified internal structure, an outline, etc.) and/or functions of the first user interface object (e.g., with reduced user interface elements, removal of textual content, etc.), etc. In some embodiments, the representation of the first user interface object is displayed slightly offset from the first user interface object (e.g., floating above, in front of, etc. of the first user interface object in the first view of the three-dimensional environment, not at a position that corresponds to the location of the first user's hand, etc.). In some embodiments, the representation of the first user interface object moves toward the representation of the first user's hand, but stays outside of the representation of the first user's hand.

Selecting the first user interface object as a target for a subsequent input received from the first user, after the first operation is performed and in accordance with a determination that the second user input includes a predefined gesture, provides additional control options without cluttering the UI with additional displayed controls (e.g., additional displayed controls for selecting the first user interface object). Providing additional control options without cluttering the UI with additional displayed controls enhances the operability of the device, which, additionally, reduces power usage and improves battery life of the device by enabling the user to use the device more quickly and efficiently.

In some embodiments, performing the first operation with respect to the first user interface object (e.g., user interface object 7106 in FIGS. 7B-7C, or another user interface object) in accordance with the first user input includes displaying (e.g., at a second position that is different from the first position at which the first user interface object is displayed, and/or that is different from a position of a representation of the hand of the first user that provided the first user input) a representation of the first user interface object (e.g., a duplicate of the first user interface object, an image of the first user interface object that is more translucent than the first user interface object, a reduced version of the first user interface object that has a subset of the characteristics (e.g., a simplified internal structure, or an outline) and/or functions of the first user interface object (e.g., with reduced user interface elements, or reduced textual content)) while maintaining the first user interface object at the first position in the first view of the three-dimensional environment. In some embodiments, the representation of the first user interface object is displayed slightly offset from the first user interface object (e.g., floating above, in front of, etc. of the first user interface object in the first view of the three-dimensional environment, not at a position that corresponds to the location of the first user's hand, etc.). In some embodiments, the representation of the first user interface object moves toward the representation of the first user's hand, but stays outside of the representation of the first user's hand. Displaying a representation of the first user interface object while maintaining the first user interface object at the first position in the first view of the three-dimensional environment provides improved visual feedback to the users (e.g., improved visual feedback that the computer system is performing the first operation with respect to the first user interface object in accordance with the first user input). Providing improved feedback enhances the operability of the device, which, additionally, reduces power usage and improves battery life of the device by enabling the user to use the device more quickly and efficiently.

In some embodiments, the representation of the first user interface object (e.g., user interface object 7106 in FIGS. 7B-7C, or another user interface object, etc.) is initially displayed at a position that is away from a representation of a hand of the first user (e.g., the hand 7202 in FIGS. 7B-7C, or another hand, etc.) (e.g., the hand that provided the first user input, another hand of the first user, etc.), and the computer system moves the representation of the first user interface object from the position that is away from the representation of the hand of the first user (e.g., the hand that provided the first user input, the other hand of the first user, etc.) to a position of the representation of the hand of the first user (e.g., showing the representation of the first user interface object flying from its initial display position to a position of the representation of the first user's hand, onto the representation of the user's palm, etc.) in accordance with a determination that the first user interface object is selected by a subsequent user input provided by the first user. In some embodiments, the computer system moves the representation of the first user interface object in response to detecting a second user input directed to the first user interface object (e.g., detecting a predefined pinch gesture directed to the representation of the first user interface object, detecting a predefined pinch gesture directed to the first user interface object, detecting a gaze input directed to the representation of the first user interface object in conjunction with detecting a predefined selection input, or detecting a gaze input directed to the first user interface object in conjunction with detecting a predefined selection input) that meets selection criteria, or that includes a selection gesture. Moving the representation of the first user interface object from the position that is away from the representation of the hand of the first user to a position of the representation of the hand of the first user in accordance with a determination that the first user interface object is selected by a subsequent user input provided by the first user, provides improved visual feedback to the first user (e.g., improved visual feedback that the first user interface object is selected by the subsequent user input provided by the first user). Providing improved feedback enhances the operability of the device, which, additionally, reduces power usage and improves battery life of the device by enabling the user to use the device more quickly and efficiently.

In some embodiments, while displaying the representation of the first user interface object (e.g., the representation of the first user interface object was displayed in response to detecting the first user input (e.g., detecting the first user's hand moving near a location that corresponds to the position of the first user interface object in the three-dimensional environment)), the computer system detects movement of a hand of the first user (e.g., the hand 7202, or another hand of the user 7102, etc.) (e.g., the hand that provided the first user input, a hand of the first user that is different from the hand that provided the first user input, etc.). In response to detecting the movement of the hand of the first user (e.g., the hand that provided the first user input, a hand of the first user that is different from the hand that provided the first user input, etc.) and in accordance with a determination that the movement of the hand of the first user meets preset criteria for identifying an initial portion of a preset selection gesture, the computer system changes an appearance of the representation of the first user interface object (e.g., the user interface object 7016 in FIGS. 7B-7C, or another user interface object, etc.) (e.g., changing the shape, size, color, opacity, level of details, etc., optionally, to make the representation of the first user interface object more closely resemble the appearance of the first user interface object, etc.). In some embodiments, the appearance of the representation of the first user interface object continues to change when the movement of the first user's hand continue to conform to the required progress of the selection gesture. In some embodiments, in response to detecting that the movement of the hand of the first user does not meet the preset criteria for identifying the initial portion of the preset selection gesture, the computer system does not change the appearance of the representation of the first user interface object or change the appearance in a different manner to indicate to the first user that the preset selection gesture is not being detected. In some embodiments, in response to detecting that the movement of the first user's hand is no longer conforming to the required progress of the preset selection gesture, the computer system ceases to change the appearance of the representation of the first user interface object, and restores the appearance of the first user interface object or ceases to display the representation of the first user interface object.

Changing an appearance of the representation of the first user interface object in accordance with a determination that the movement of the hand of the first user meets preset criteria for identifying an initial portion of a preset selection gesture, provides improved visual feedback to the first user (e.g., improved visual feedback that the computer system has detected movement of the hand of the first user that meets the preset criteria). Providing improved feedback enhances the operability of the device, which, additionally, reduces power usage and improves battery life of the device by enabling the user to use the device more quickly and efficiently.

In some embodiments, while displaying the representation of the first user interface object (e.g., user interface object 7106 in FIGS. 7B-7C, or another user interface object, etc.) at the position of the representation of the hand of the first user (e.g., hand 7202 in FIGS. 7B-7C, or another hand, etc.) (e.g., after showing the representation of the first user interface object flying from its initial display position to the position of the representation of the first user's hand, onto the representation of the user's palm, etc.) and in accordance with a determination that the first user interface object is selected by the first user, the computer system detects a third user input interacting with the representation of the first user interface object (e.g., third input is an input provided by the hand that provided the first user input, the hand that selected the representation of the first user interface object, a hand of the first user that is different from the hand that provided the first user input, or a hand of the first user that is different from the hand that selected the representation of the first user interface object, etc.). In response to detecting the third user input, the computer system displays visual feedback for the third user input through at least one of movement of the representation of the first user interface object and changing appearance of the representation of the first user interface object, and the computer system performs a second operation with respect to the first user interface object in accordance with the third user input. In some embodiments, the visual feedback corresponds to a second operation that is to be performed with respect to the first user interface object. In some embodiments, the visual feedback corresponds to direct manipulation of the representation of the first user interface object in accordance with the movement of the hand of the first user that is at a location that corresponds to the position of the representation of the first user interface object. In some embodiments, performing the second operation includes activating a control on the first user interface object, moving the first user interface object in three-dimensional space, playing back of media item represented by the first user interface object, launching an application represented by the first user interface object, and/or starting a communication session with another user represented by the first user interface object, etc.

Displaying visual feedback for the third user input through at least one of movement of the representation of the first user interface object and changing appearance of the representation of the first user interface object, and performing a second operation with respect to the first user interface object in accordance with the third user input, in response to detecting the third user input interacting with the representation of the first user interface object, provides improved visual feedback to the users (e.g., improved visual feedback that the computer system has detected the third user input, and/or improved visual feedback that the computer system is performing the second operation with respect to the first user interface object). Providing improved feedback enhances the operability of the device, which, additionally, reduces power usage and improves battery life of the device by enabling the user to use the device more quickly and efficiently.

In some embodiments, the computer system updates the position of the representation of the first user interface object (e.g., user interface object 7106 in FIGS. 7B-7C, or another user interface object, etc.) in accordance with movement of the hand of the first user such that the representation of the first user interface object maintains an existing spatial relationship with (e.g., stays fixed to, follows, etc.) the updated position of the representation of the hand of the first user (e.g., hand 7202 in FIGS. 7B-7C, or another hand, etc.) (e.g., while the first user interface remains at the first position in the first view of the three-dimensional environment). In some embodiments, the representation of the first user interface object remains displayed at a position at or near the representation of the hand of the first user, irrespective of whether the first user actually interacts with the representation of the first user interface object. In some embodiments, the representation of the first user interface object is displayed at a position that corresponds to the location of the palm of the hand of the first user, and ceases to be displayed when the representation of the hand is not in the currently displayed view of the three-dimensional environment, or when the hand of the first user is closed. In some embodiments, the representation of the first user interface object is redisplayed when the representation of the hand of the first user, or when the representation of the palm of the hand is visible again in the currently displayed view of the three-dimensional environment. The first user can interact with the representation of the first user interface object as long as the first user has not specifically relinquished control of the first user interface object (e.g., by providing a throwing gesture toward the second user, or toward a shared portion of the three-dimensional environment (e.g., a representation of a wall or a table top, etc.), etc.). In some embodiments, the first user relinquishes control of the first user interface object when the first user closes his/her hand so that the representation of the first user interface object is no longer displayed in the currently displayed view of the three-dimensional environment (e.g., the first user has to regain control by starting over again with another selection input while the second user is not interacting with the first user interface object).

Updating the position of the representation of the first user interface object in accordance with movement of the hand of the first user such that the representation of the first user interface object maintains an existing spatial relationship with the updated position of the representation of the hand of the first user provides improved visual feedback to the users (e.g., improved visual feedback that the first user interface object is selected by a subsequent user input provided by the first user). Providing improved feedback enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, and 12000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 9000, 10000, 11000, and 12000). For brevity, these details are not repeated here.

Figure 9A:
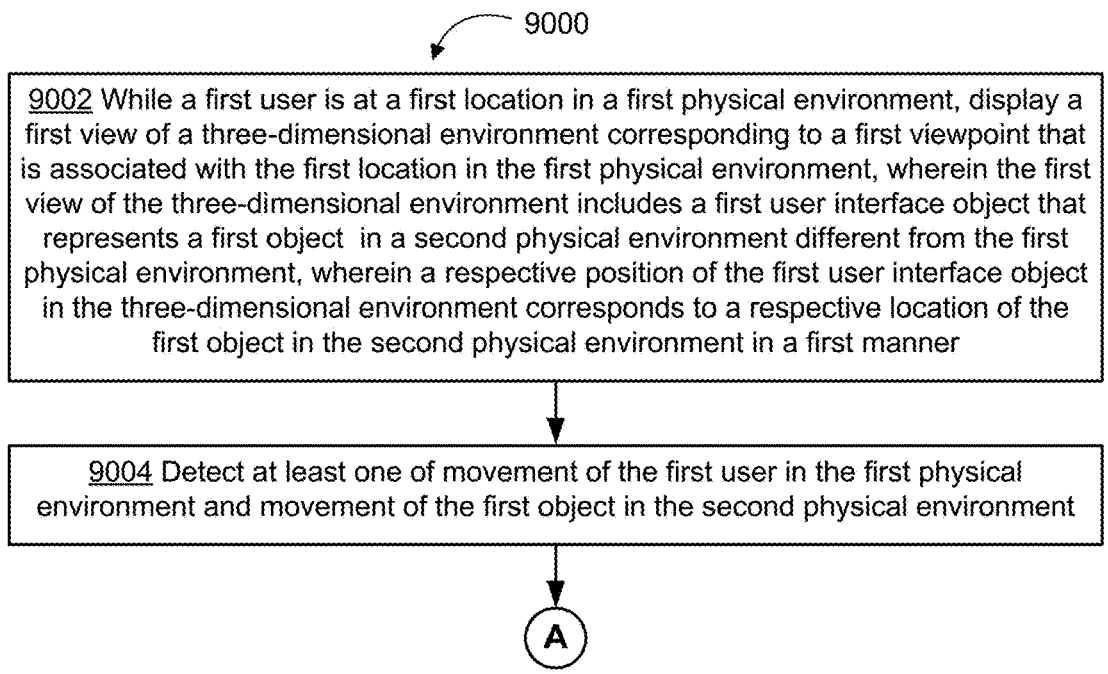

FIGS. 9A-9B are a flowchart of a method of displaying a representation of a physical object relative to a viewpoint of a currently displayed view of a three-dimensional environment in different manners, where the viewpoint moves in accordance with movement of the user in a first physical environment, the representation of the physical object moves in accordance with movement of the physical object in a second physical environment different from the first physical environment, and where a change in the manner of displaying the representation is triggered in response to a spatial relationship between the representation of the physical object and the viewpoint meeting preset criteria, in accordance with some embodiments.

In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing.

In the method 9000, while a first user (e.g., user 7002 in FIGS. 7D-7F, or another user) is at a first location in a first physical environment (e.g., scene 105-*a* in FIGS. 7D-7F, or another physical environment, etc.), the computer system displays (9002) a first view of a three-dimensional environment (e.g., a view 7304-*a* in FIG. 7D) (e.g., a virtual three-dimensional environment, an augmented reality environment, a three-dimensional mixed reality environment, etc.) corresponding to a first viewpoint that is associated with the first location in the first physical environment (e.g., the first viewpoint is a virtual position that corresponds to the location of the user's eyes or face when the first user is at the first location in the physical environment, the first viewpoint corresponds to a first viewing perspective toward the three-dimensional environment, etc.), wherein the first view of the three-dimensional environment includes a first user interface object (e.g., representation 7102'-a of the second user 7102 in FIGS. 7D-7F, or another representation of another physical object, etc.) (e.g., an avatar for a second user that is different from the first user, a virtual representation of a moving physical object (e.g., an animal, a vehicle, a flying drone, an opponent in a multiplayer game, etc.)) that represents a first object (e.g., a second user, a moving physical object (e.g., an animal, a flying drone, an opponent in a game, etc.), etc.) in a second physical environment (e.g., scene 105-b in FIGS. 7D-7F, or another physical environment, etc.) different from the first physical environment (e.g., the first physical environment and the second physical environment are in two different rooms, at two different geographical locations, etc., where the first user and the second user are out of physical reach of each other (e.g., no risk of physical collision) when respectively located in the first physical environment and the second physical environment), wherein a respective position of the first user interface object in the three-dimensional environment corresponds to a respective location of the first object in the second physical environment in a first manner (e.g., movement distance and movement direction of the first object (e.g., the second user, an animal, a flying drone, etc.) in the second physical environment are respectively mapped to movement distance and movement direction of the first user interface object in the three-dimensional environment in accordance with a first preset object-mapping relationship (e.g., a linear mapping relationship, and/or in the same type of coordinate system with the same cardinal directions, etc.), movement distance and movement direction of the respective position corresponding to the viewpoint of the currently displayed view of the three-dimensional environment (e.g., the viewpoint of the first user, the virtual position of the first user in the three-dimensional environment, etc.) are respectively mapped to movement distance and movement direction of the first user in the first physical environment in accordance with a first preset user-mapping relationship (e.g., a linear mapping relationship, and/or in the same type of coordinate system with the same cardinal directions, etc.), etc.). In some embodiments, the correspondence in the first manner is the default correspondence (e.g., reality-mimicking correspondence, a correspondence that also applies to movement of one part of the first user to another part of first user in front of the first user, etc.) between the motion and location in the real-world and the motion and locations in the three-dimensional environment. In some embodiments, the three-dimensional environment is a virtual environment or augmented reality environment that is at least partially shared between the first user and the second user, where the first user and the second user may view the same portion of the three-dimensional environment from two different viewpoints relative to the three-dimensional environment.

In some embodiments, the three-dimensional environment is not a shared environment. In some embodiments, the three-dimensional environment is a virtual three-dimensional environment. In some embodiments, the three-dimensional environment is an augmented reality environment that includes a representation of the first physical environment (e.g., a camera view or transparent pass-through view of the first physical environment, etc.) and optionally a representation of a physical object (e.g., the second user, an animal, a flying drone, etc.) in the second physical environment (e.g., without including a representation of the second physical environment). In some embodiments, the three-dimensional environment is an augmented reality view that includes a representation of the second physical environment (e.g., a camera view or transparent pass-through view of the second physical environment, a video recording captured at the second physical environment, etc.) with a camera view or recorded image of the first object removed and replaced by the first user interface object (e.g., so that the position of the first user interface object can be modified computationally or digitally relative to the representation of the second physical environment in the augmented reality environment shown via the first display generation component). In some embodiments, the movement of the first user as a whole in the first physical environment (e.g., walking, running, riding a bike, jumping upward, riding an elevator, etc. in the first physical environment, instead of merely moving the first user's head or arms without moving the whole person in the first physical environment) causes a corresponding change in the viewpoint of the currently displayed view of the three-dimensional environment (e.g., translation of the viewpoint relative to the three-dimensional environment in a corresponding direction and/or with a corresponding distance, etc.); and movement of the first object (e.g., the second user as a whole, an animal, a flying drone, etc.) in the second physical environment (e.g., walking, running, riding a bike, jumping upward, riding an elevator, flying, etc.) causes movement of the first user interface object in a corresponding direction and/or with a corresponding distance, etc. in the three-dimensional environment.

In some embodiments, when the movement and/or position of the first user interface object is determined based on the movement and/or location of the first object in the second physical environment in the first manner (e.g., without regard to the current location and/or movement history of the first user in the first physical environment), the first user interface object may end up at a position in the three-dimensional environment that will be within a threshold distance of the viewpoint of the currently displayed view of the three-dimensional environment shown via the first display generation component (e.g., the viewpoint determined in accordance with the current location and movement history of the first user in the first physical environment). In some embodiments, having the first user interface object displayed within the threshold distance of the virtual position of the viewpoint of the currently displayed view of the three-dimensional environment would result in the first user interface object appearing very large, unnatural, and/or intrusive to the personal space of the viewer of the three-dimensional environment (e.g., the first user). In some embodiments, the currently displayed view of the three-dimensional environment shown via the first display generation component does not visibly include a virtual representation of the first user's body (e.g., the virtual position of the first user relative to the three-dimensional environment is reflected by the currently displayed view itself and the corresponding viewpoint). In some embodiments, the currently displayed view of the three-dimensional environment shown via the first display generation component visibly includes a virtual representation of a portion of the first user's body (e.g., the view includes at the bottom of the view a representation of the first user's outline, the first user's hands or feet in front of the first user's eyes, the view includes the first user's avatar whose position in the three-dimensional environment is determined based on the movement and/or current location of the first user in the first physical environment in the first manner and stays stationary relative to the display (e.g., has a fixed spatial relationship with the viewpoint of the currently displayed view of the three-dimensional environment), etc.).

In the method 9000, the computer system detects (9004) at least one of (e.g., only one of, only of the first user, only of the first object (e.g., the second user, an animal, a flying drone, etc.), or both of, etc.) movement of the first user (e.g., first user 7002 in FIGS. 7D-7F) in the first physical environment (e.g., movement from a first location to a second location, in a first direction (e.g., forward, backward, leftward, rightward, upward, downward, in the 2 o'clock direction, in the 10 o'clock direction, etc.), by a first distance, and/or with a first speed, etc. in the first physical environment) and movement of the first object (e.g., the second user 7102 in FIGS. 7D-7F, or another physical object, etc.) in the second physical environment (e.g., movement from a third location to a fourth location, in a second direction (e.g., forward, background, leftward, rightward, upward, downward, in the 3 o'clock direction, in the 8 o'clock direction, etc.), by a second distance, and/or with a second speed, etc.). In some embodiments, detecting the movement of the first user is performed directly using sensors collocated with the first user and the first display generation component, and, optionally, detecting the movement of the first object in the second physical environment is performed indirectly (e.g., through the sensors collocated with the first object in the second physical environment, through receipt of an updated position of the first user interface object transmitted from the computer system used at the second physical environment (e.g., used by the second user, or another user different from the first and second users, etc.), where the computer system has updated the position of the first user interface object in accordance with the first manner (e.g., according to the preset first reality-mimicking mapping relationship), etc.).

In the method 9000, in response to detecting (9006) the at least one of movement of the first user in the first physical environment and movement of the first object in the second physical environment (e.g., in response to detecting only the movement of the first user, in response to detecting only the movement of the first object, in response to detecting either one of the movement of the user or the object, in response to detecting both the movement of the user and the movement of the object, etc.): the computer system displays (9008) a second view of the three-dimensional environment corresponding to a second viewpoint (e.g., view 7304-*a'* in FIG. 7E, view 7304-*a"* in FIG. 7F, etc.) (e.g., the second viewpoint is the same as the first viewpoint if the first user has not moved in the first physical environment, and the second viewpoint is different from the first viewpoint if the first user has moved in the first physical environment (e.g., the movement of the first user in the physical environment is mapped to movement of the first user within the three-dimensional environment, which causes shifting of the viewpoint of the view of the three-dimensional environment first user that is displayed to the first user), etc.); and the computer system displays (9010) the first user interface object (e.g., representation 7102'-*a* in FIGS. 7E and 7F) in the second view of the three-dimensional environment (e.g., view 7304-*a'* in FIG. 7E, view 7304-*a"* in FIG. 7F, etc.). Displaying the first user interface object includes: in accordance with a determination that the respective position of the first user interface object in the three-dimensional environment that corresponds to the respective location of the first object in the second physical environment in the first manner (e.g., determined in accordance with a reality-mimicking manner, with the preset first mapping relationship, etc.) (e.g., the same previous position of the first user interface object in the three-dimensional environment if the first user interface object has been substantially stationary in the three-dimensional environment; a different position in the three-dimensional environment if the first user interface object has been moving in the three-dimensional environment, etc.) is more than a threshold distance (e.g., more than an arm's length, more than a preset radius of a personal space for the first user in the three-dimensional environment, outside of a preset boundary surface surrounding a virtual position of the first user in the three-dimensional environment (e.g., the virtual surface of the representation of the first user, a bounding box surrounding the virtual position of the first user), etc.) from a respective position in the three-dimensional environment that corresponds to the second viewpoint associated with the second view of the three-dimensional environment (e.g., the respective position is the virtual position of the first user in the three-dimensional environment (e.g., a visible position, or an invisible position in the currently displayed view of the three-dimensional environment), the respective position is the virtual position of the head of the first user or his/her virtual representation in the three-dimensional environment, the respective position is one of one or more positions on a boundary surface surrounding a virtual position of the first user or his/her virtual representation in the three-dimensional environment, etc.), displaying (9012) the first user interface object at a first display position in the second view of in the three-dimensional environment, wherein the first display position is the respective position of the first user interface object in the three-dimensional environment. This is a scenario illustrated in FIG. 7E, for example, where the display position of the representation 7102'-*a* of the second user is the same as the respective position of the representation 7102'-*a* calculated in accordance with the first manner. For example, in some embodiments, the first display position is determined based on the current location and/or movement history of the first object (e.g., the second user, an animal, a flying drone, etc.) in the second physical environment in the first manner (e.g., independent of the current location and/or movement history of the first user in the first physical environment, in accordance with the first preset mapping relationship, etc.); the first display position is the position of the first user interface object when the first user interface object has not gotten too close to the viewpoint of the currently displayed view of the three-dimensional environment (or has not gotten too close to the virtual position of first user and/or too close to the position of the virtual representation of the first user in the three-dimensional environment, etc.) so as to appear too large, unnatural, and/or invasive to the personal space of the first user, etc.

Displaying the first user interface object further includes: in accordance with a determination that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment, displaying (9014) the first user interface object at a second display position in the second view of the three-dimensional environment, wherein the second display position is offset from the respective position (e.g., shifted sideways, shifted by more than a threshold distance in a respective direction (e.g., sideways, upward, downward, etc.), shifted by more than the threshold distance in a sideway direction (e.g., left, right, etc.) relative to the currently displayed view of the three-dimensional environment, shifted by more than the threshold distance in an upward direction relative to the currently displayed view of the three-dimensional environment, etc.) of the first user interface object in the three-dimensional environment (e.g., the second display position is determined based on not only the current location and/or movement history of the first object (e.g., the second user, an animal, a flying drone, etc.) in the second physical environment, but also the current location and/or movement history of the first user in the first physical environment; the second display position is determined in accordance with a second manner different from the first manner; the second display position is shifted from the default position of the first user interface object when the first user interface object has gotten too close to the viewpoint of the currently displayed view of the three-dimensional environment, so that the first user interface object does not appear too large, unnatural, and/or invasive to the personal space of the first user, etc.). This is a scenario illustrated in FIG. 7F, for example, where the display position of the representation 7102'-a of the second user is offset from the respective position of the representation 7102'-a calculated in accordance with the first manner and is calculated in accordance with a second manner.

In some embodiments, to determine the position of the first user interface object in accordance with the second manner different from the first manner, the movement distance and movement direction of the first object (e.g., the second user, an animal, a flying drone, etc.) in the second physical environment are respectively mapped to movement distance and movement direction of the first user interface object in the three-dimensional environment in accordance with a second preset object-mapping relationship (e.g., a non-linear mapping relationship, a linear-mapping relationship with an additional linear or non-linear offset amount that is based on the current position, the movement distance, and/or movement direction of the respective position corresponding to the viewpoint of the currently displayed view of the three-dimensional environment (e.g., the viewpoint of the first user, the virtual position of the first user in the three-dimensional environment, etc.) and/or the current position, the movement distance and/or movement direction of the first user interface object in the three-dimensional environment. In some embodiments, the correspondence in the second manner includes a modification to the default correspondence (e.g., reality-mimicking correspondence) between the motion and location in the real-world and the motion and locations in the three-dimensional environment, with the purpose to avoid having the first user interface object appear too close in the first user's view of the three-dimensional environment (e.g., a visual-collision-avoidance correspondence). In some embodiments, the direction and amount by which the second display position of the first user interface object is shifted or offset from the default display position (e.g., the position determined in accordance with the reality mimicking correspondence, in accordance with the first preset mapping relationship, etc.) is determined in accordance with the size and/or shape of the first object and/or the size and/or shape of the first user, a size and/or shape of a bounding box associated with the first user, a size and/or shape associated with a bounding box of the first object, and/or a size and/or shape of a virtual representation of the first user in the three-dimensional environment, etc. In a first example, in some embodiments, the first object is a second user, and when the first user and/or the second user walk within their respective physical environments such that the respective position of the virtual representation of the second user in the currently displayed view of the three-dimensional environment (as calculated in accordance with the first, reality-mimicking mapping relationship) is beyond the threshold distance of the viewpoint corresponding to the currently displayed view, the virtual representation of the second user is displayed at the respective position calculated in accordance with the first, reality-mimicking mapping relationship in the currently displayed view of the three-dimensional environment (e.g., based on the current location and movement history of the second user in the second physical environment without consideration of the current location and movement history of the first user in the first physical environment). However, when the first user and/or the second user walk within their respective physical environment such that the respective position of the virtual representation of the second user in the currently displayed view of the three-dimensional environment as calculated in accordance with the first, reality-mimicking mapping relationship would fall within the threshold distance of the viewpoint corresponding to the currently displayed view, the displayed position of the virtual representation of the second user is shifted from the respective position (e.g., a position that is calculated based on the current location and movement history of the second user in the second physical environment without consideration of the current location and movement history of the first user in the first physical environment) such that the virtual representation of the second user would not appear to bump into the first user and/or overwhelm the view of the first user from the viewing perspective of the first user, and/or would not overlap with the virtual representation of the first user in the three-dimensional environment (e.g., visible virtual representation, or a virtual representation that is not visible in the currently displayed view of the three-dimensional environment, etc.). In some embodiments, even though the displayed position of the representation of the second user is shifted in the view of the three-dimensional environment, the respective position of the representation of the second user in the three-dimensional environment is not shifted (it is just not visually reflected in the displayed view of the three-dimensional environment shown to the first user). The above features are illustrated, for example, in FIGS. 7D-7F, in accordance with some embodiments. In FIG. 7E, for example, in the view 7304-a' shown to the first user 7002, the display position of the representation 7102'-a of the second user 7102 is the same as the respective position of the representation 7102'-a calculated in accordance with a first type of correspondence between positions in the three-dimensional environment and the locations in the second physical environment of the second user 7102. This is the usual scenario, where the representation 7102'-a of the second user 7102 is not within a threshold distance of the viewpoint of the first view 7304-a shown to the first user 7002 (the left view in FIG. 7E). In FIG. 7F, for example, in the view 7034-a" shown to the first user 7002, the display position of the representation 7102'-a is offset from the respective position of the representation 7102'-a calculated in accordance with the first type of correspondence, because the respective position would place the representation 7102'-a of the second user too close to the viewpoint of the first view 7304-a" shown to the first user 7002. Therefore, in the scenario shown in FIG. 7F, the representation 7102'-a is shown to be on the right side of the representation 7002'-a of the first user 7002, even though the respective position of the representation 7102'-a of the second user is in fact straight in front of the representation 7002'-a in the first view 7304-a".

In some embodiments, detecting the at least one of movement of the first user (e.g., user 7002 in FIGS. 7D-7F, or another user, etc.) in the first physical environment (e.g., scene 105-*a* in FIGS. 7D-7F, or another scene, etc.) and movement of the first object (e.g., user 7102 in FIGS. 7D-7F, or another person or object, etc.) in the second physical environment (e.g., scene 105-*b* in FIGS. 7D-7F, or another scene, etc.) includes detecting first movement of the first user (e.g., user 7002 in FIGS. 7D-7F, or another user, etc.) in the first physical environment while the first object (e.g., user 7102 in FIGS. 7D-7F, or another person or object, etc.) remains stationary in the second physical environment. During the first movement of the first user in the first physical environment (e.g., during movement of the first user as a whole that causes movement of the viewpoint toward a representation of a stationary second user or virtual object in the three-dimensional environment): in accordance with the determination that the respective position of the first user interface object in the three-dimensional environment that corresponds to the respective location of the first object in the second physical environment in the first manner (e.g., a stationary position in the three-dimensional environment that corresponds to the stationary location of the first object in the second physical environment during the first movement of the first user) is more than the threshold distance from the respective position in the three-dimensional environment that corresponds to a viewpoint associated with a currently displayed view of the three-dimensional environment (e.g., the representation of the second user or virtual object is outside of a threshold range of the first user's viewpoint or virtual position in the three-dimensional environment), the first user interface object is displayed at the respective position of the first user interface object in the three-dimensional environment that corresponds to the respective location of the first object in the second physical environment in the first manner (e.g., the appearance and location of the first user interface object may vary visually to the first user (e.g., appearing with different sizes or in different portions of the field of view of the first user,) due to the changing viewpoint, while the respective three-dimensional position of the first user interface object in the three-dimensional environment does not change). During the first movement of the first user in the first physical environment (e.g., during movement of the first user as a whole that causes movement of the viewpoint toward a representation of a stationary second user or virtual object in the three-dimensional environment): in accordance with the determination that the respective position of the first user interface object in the three-dimensional environment that corresponds to the respective location of the first object in the second physical environment in the first manner (e.g., a stationary position in the three-dimensional environment that corresponds to the stationary location of the first object in the second physical environment during the first movement of the first user) is not more than (e.g., equal to, less than, etc.) the threshold distance from the respective position in the three-dimensional environment that corresponds to the viewpoint associated with the currently displayed view of the three-dimensional environment (e.g., the representation of the second user or virtual object will be within the threshold range of the first user's viewpoint or virtual position in the three-dimensional environment, if not otherwise shifted away), the first user interface object is displayed at an adjusted position (e.g., a position that is offset from the respective position that is determined based on the reality-mimicking mapping relationship, a position that is outside of the threshold distance from the virtual representation of the first user or the viewpoint of the currently displayed view of the three-dimensional environment, etc.) in the three-dimensional environment while the first object remains stationary in the second physical environment, wherein the adjusted position in the three-dimensional environment corresponds to the respective location of the first object in the second physical environment in a second manner different from the first manner. For example, in some embodiments, even though the first object remains stationary in the second physical environment, the first user interface object appears to make an autonomous movement in the currently displayed view of the three-dimensional environment in response to the movement of the first user (e.g., a movement in the first physical environment that corresponds to a movement of the viewpoint or virtual representation of the first user toward the respective position of the first user interface object in the three-dimensional environment). In a more specific example, when the first user makes a movement in the first physical environment that corresponds to a movement of the virtual representation of the first user toward a representation of a second user or a virtual object in the three-dimensional environment, if the virtual representation of the first user gets to within a threshold distance of the representation of the second user or the virtual object, the representation of the second user or the virtual object automatically moves out of the way from the virtual representation of the first user to avoid bumping into the virtual representation of the first user, even if the second user or virtual object remains stationary in the second physical environment. The representation of the second user and virtual object is restored to their default position calculated using the default reality-mimicking mapping relationship after the condition for triggering the collision avoidance offset is no longer met. In some embodiments, the first user interface object is an avatar representing a second user that is in a virtual conference call with the first user; when the first user walks in a direction that corresponds to movement in the three-dimensional environment toward the avatar of the second user, the avatar of the second user moves out of the way as the avatar gets too close to the virtual position of the first user. This is done even if the second user has not moved in his/her own environment.

Detecting first movement of the first user in the first physical environment while the first object remains stationary in the second physical environment, and displaying the first user interface object at the respective position of the first user interface object in the three-dimensional environment that corresponds to the respective location of the first object in the second physical environment in the first manner in accordance with the determination that the respective position of the first user interface object in the three-dimensional environment that corresponds to the respective location of the first object in the second physical environment in the first manner is more than the threshold distance from the respective position in the three-dimensional environment that corresponds to a viewpoint associated with a currently displayed view of the three-dimensional environment, and displaying the first user interface object at an adjusted position in the three-dimensional environment corresponding to the respective location of the first object in the second physical environment in a second manner different from the first manner, while the first object remains stationary in the second physical environment, in accordance with the determination that the respective position of the first user interface object in the three-dimensional environment that corresponds to the respective location of the first object in the second physical environment in the first manner is not more than the threshold distance from the respective position in the three-dimensional environment that corresponds to the viewpoint associated with the currently displayed view of the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, detecting the at least one of movement of the first user (e.g., user 7002 in FIGS. 7D-7F, or another user, etc.) in the first physical environment (e.g., scene 105-*a* in FIGS. 7D-7F, or another scene, etc.) and movement of the first object (e.g., user 7102 in FIGS. 7D-7F, or another person or object, etc.) in the second physical environment (e.g., scene 105-*b*, or another scene, etc.) includes detecting second movement of the first object in the second physical environment while the first user remains stationary in the first physical environment. During the second movement of the first object in the second physical environment (e.g., during movement of the first object (e.g., a second user, an animal, a flying drone, etc.) as a whole that causes movement of the first user interface object in the three-dimensional environment): in accordance with the determination that the respective position of the first user interface object in the three-dimensional environment that corresponds to the respective location of the first object in the second physical environment in the first manner (e.g., a new position in the three-dimensional environment that corresponds to the new location of the first object in the second physical environment during the second movement of the first object) is more than the threshold distance from the respective position in the three-dimensional environment that corresponds to a viewpoint associated with a currently displayed view of the three-dimensional environment (e.g., the representation of the second user or virtual object is outside of a threshold range of the first user's viewpoint or virtual position in the three-dimensional environment), the first user interface object is displayed at (e.g., the first user interface object is shown to move to) an updated position (e.g., a position that is the respective position that is determined based on the reality-mimicking mapping relationship, a position that is outside of the threshold distance from the virtual representation of the first user or the viewpoint of the currently displayed view of the three-dimensional environment, etc.) in the three-dimensional environment (e.g., while the viewpoint of the currently displayed view of the three-dimensional environment remains stationary), wherein the updated position in the three-dimensional environment corresponds to an updated location of the first object in the second physical environment as a result of the second movement in the first manner (e.g., the appearance and displayed position of the first user interface object change due to the change in the respective three-dimensional position of the first user interface object in the three-dimensional environment, while the viewpoint of the currently displayed view is maintained). During the second movement of the first object in the second physical environment (e.g., during movement of the first object (e.g., a second user, an animal, a flying drone, etc.) as a whole that causes movement of the first user interface object in the three-dimensional environment): in accordance with the determination that the respective position of the first user interface object in the three-dimensional environment that corresponds to the respective location of the first object in the second physical environment in the first manner (e.g., a new position in the three-dimensional environment that corresponds to the new location of the first object in the second physical environment during the second movement of the first object) is not more than (e.g., equal to, less than, etc.) the threshold distance from the respective position in the three-dimensional environment that corresponds to the viewpoint associated with the currently displayed view of the three-dimensional environment (e.g., the representation of the second user or virtual object will be within the threshold range of the first user's viewpoint or virtual position in the three-dimensional environment, if not otherwise shifted away), the first user interface object is displayed at (e.g., the first user interface object is shown to move to) an adjusted updated position (e.g., a position that is offset from the respective position that is determined based on the reality-mimicking mapping relationship, a position that is outside of the threshold distance from the virtual representation of the first user or the viewpoint of the currently displayed view of the three-dimensional environment, etc.) in the three-dimensional environment while the first object remains stationary in the second physical environment, wherein the adjusted updated position in the three-dimensional environment corresponds to the updated location of the first object in the second physical environment in a second manner different from the first manner. For example, in some embodiments, when the second user or virtual object moves in a direction in the second physical environment that corresponds to a movement toward the viewpoint of the currently displayed view or the virtual position of the first user in the three-dimensional environment, the first user interface object appears to be under the influence of a simulated physical force such as magnetic or electrostatic repulsion that pushes it away from and/or that prevents it from getting too close to the viewpoint or the virtual position of the first user when the representation of the second user or virtual object is about to cross the threshold distance of the viewpoint or the virtual position of the first user in the three-dimensional environment. The representation of the second user and virtual object is restored to their original movement path calculated using the default reality-mimicking mapping relationship after the condition for triggering the visual collision avoidance offset is no longer met. In some embodiments, the first user interface object is a floating talking avatar representing a second user that is in a virtual conference call with the first user; when the second user walks in a direction that corresponds to movement in the three-dimensional environment toward the virtual position of the first user, the floating talking avatar of the second user moves around the virtual position of the first user and does not ever get too close to the virtual position of the first user. This is a modification performed on top of the usual movement calculated based on the default mapping relationship between movement of the second user in the second physical environment and movement of the second user's avatar in the three-dimensional environment.

Detecting second movement of the first object in the second physical environment while the first user remains stationary in the first physical environment, and displaying the first user interface object at the respective position of the first user interface object in the three-dimensional environment that corresponds to the respective location of the first object in the second physical environment in the first manner in accordance with the determination that the respective position of the first user interface object in the three-dimensional environment that corresponds to the respective location of the first object in the second physical environment in the first manner is more than the threshold distance from the respective position in the three-dimensional environment that corresponds to a viewpoint associated with a currently displayed view of the three-dimensional environment, and displaying the first user interface object at an adjusted position in the three-dimensional environment corresponding to the respective location of the first object in the second physical environment in a second manner different from the first manner, while the first user remains stationary in the second physical environment, in accordance with the determination that the respective position of the first user interface object in the three-dimensional environment that corresponds to the respective location of the first object in the second physical environment in the first manner is not more than the threshold distance from the respective position in the three-dimensional environment that corresponds to the viewpoint associated with the currently displayed view of the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, detecting the at least one of movement of the first user (e.g., user 7002 in FIGS. 7D-7F, or another user, etc.) in the first physical environment (e.g., scene 105 in FIGS. 7D-7F, or another scene, etc.) and movement of the first object (e.g., user 7102 in FIGS. 7D-7F, or another person or object, etc.) in the second physical environment (e.g., scene 105-*b*, or another scene, etc.) includes concurrently detecting third movement of the first user (e.g., movement of the first user 7002 along path 7300 in FIGS. 7D-7F, or movement along another path, etc.) in the first physical environment and fourth movement of the first object (e.g., movement of the second user 7102 or object represented by 7102 along path 7302 in FIGS. 7D-7F, or movement along another path, etc.) in the second physical environment. In some embodiments, detecting the third movement of the first user in the first physical environment is performed using sensors collocated with the first user, and detecting the fourth movement of the first object is performed, optionally, using sensors collocated with the first object and/or in accordance with unadjusted updated positions of the first user interface object received from another computer system. During at least one of the third movement of the first user in the first physical environment and the fourth movement of the first object in the second physical environment (e.g., during movement of the first object (e.g., a second user, an animal, a flying drone, etc.) as a whole that causes movement of the first user interface object in the three-dimensional environment and movement of the first user as a whole that causes movement of the viewpoint of the currently displayed view of the three-dimensional environment and/or movement of the virtual position of the first user in the three-dimensional environment): in accordance with the determination that the respective position of the first user interface object in the three-dimensional environment that corresponds to the location of the first object in the second physical environment in the first manner (e.g., a new position in the three-dimensional environment that corresponds to the new location of the first object in the second physical environment during the fourth movement of the first object) is more than the threshold distance from the respective position in the three-dimensional environment that corresponds to a viewpoint associated with a currently displayed view (e.g., updated according to the third movement of the first user in the first physical environment in accordance with a reality-mimicking mapping relationship) of the three-dimensional environment (e.g., the representation of the second user or virtual object is outside of a threshold range of the first user's viewpoint or virtual position in the three-dimensional environment that has been updated due to the third movement of the first user), the first user interface object is displayed at (e.g., shown to move to) an updated position (e.g., a position that is the respective position that is determined based on the reality-mimicking mapping relationship, a position that is outside of the threshold distance from the virtual representation of the first user or the viewpoint of the currently displayed view of the three-dimensional environment, etc.) in the three-dimensional environment (e.g., while the viewpoint of the currently displayed view of the three-dimensional environment is being updated in accordance with the third movement of the first user), wherein the updated position in the three-dimensional environment corresponds to an updated location of the first object in the second physical environment as a result of the fourth movement in the first manner (e.g., the appearance and location of the first user interface object vary visually to the first user due to the change in the respective three-dimensional position of the first user interface object in the three-dimensional environment, while the viewpoint of the currently displayed view is updated in accordance with the third movement of the first user). During at least one of the third movement of the first user in the first physical environment and the fourth movement of the first object in the second physical environment (e.g., during movement of the first object (e.g., a second user, an animal, a flying drone, etc.) as a whole that causes movement of the first user interface object in the three-dimensional environment and movement of the first user as a whole that causes movement of the viewpoint of the currently displayed view of the three-dimensional environment and/or movement of the virtual position of the first user in the three-dimensional environment): in accordance with the determination that the respective position of the first user interface object in the three-dimensional environment that corresponds to the location of the first object in the second physical environment in the first manner (e.g., a new position in the three-dimensional environment that corresponds to the new location of the first object in the second physical environment during the second movement of the first object) does not exceed (e.g., equal to, less than, etc.) the threshold distance from the respective position in the three-dimensional environment that corresponds to the viewpoint associated with the currently displayed view (e.g., updated according to the third movement of the first user in the first physical environment in accordance with a reality-mimicking mapping relationship) of the three-dimensional environment (e.g., the representation of the second user or virtual object will be within the threshold range of the first user's viewpoint or virtual position in the three-dimensional environment, if not otherwise shifted away), the first user interface object is displayed at (e.g., shown to move to) an adjusted updated position (e.g., a position that is offset from the respective position that is determined based on the reality-mimicking mapping relationship, a position that is outside of the threshold distance from the virtual representation of the first user or the viewpoint of the currently displayed view of the three-dimensional environment, etc.) in the three-dimensional environment, wherein the adjusted updated position in the three-dimensional environment corresponds to the location of the first object in the second physical environment in a third manner (e.g., taking into account both the fourth movement of the first object and the third movement of the first user) different from the first manner (and, optionally, different from the second manner). For example, in some embodiments, when the second user or virtual object moves in a direction in the second physical environment that corresponds to a movement toward the viewpoint of the currently displayed view or the virtual position of the first user in the three-dimensional environment and/or the first user moves in a direction in the first physical environment that corresponds to a movement toward the representation of the second user or the virtual object in the three-dimensional environment, the first user interface object appears to be under the influence of another force that pushes it away from and/or that prevents it from getting too close to the viewpoint or the virtual position of the first user when the representation of the second user or virtual object is about to cross the threshold distance of the changing viewpoint or the virtual position of the first user in the three-dimensional environment. The representation of the second user and virtual object is restored to their original movement path calculated using the default reality-mimicking mapping relationship after the condition for triggering the collision avoidance offset is no longer met. In some embodiments, the virtual position of the first user or the viewpoint of the currently displayed view of the three-dimensional environment corresponds to the location of the first user in the first physical environment in the first manner (e.g., a reality-mimicking manner, a preset first mapping relationship, etc.), irrespective of the movement and current location of the second user or virtual object in the second physical environment. In some embodiments, the first user interface object is a floating talking avatar representing a second user that is in a virtual conference call with the first user; when the first user and the second user respectively walk within their physical environment, the virtual positions of the first user and the second user in the three-dimensional environment are determined based on the movement of the first user and the second user in accordance with some preset default mapping relationships respectively applied to the first user and the second user. For example, the virtual positions of the first user and the second user are confined to the same common virtual space, even though the first user or the second user may have executed significant movement distances in their respective physical environments. In the event that, the default mapping would result in a visual collision of the virtual positions of the first user and the second user in the three-dimensional environment, the floating talking avatar of the second user (when viewed via the first display generation component by the first user) moves out of the way as the floating talking avatar gets too close to the virtual position of the first user. At the same time, the floating talking avatar of the first user (when viewed via the second display generation component by the second user) moves out of the way as the floating talking avatar gets too close to the virtual position of the second user.

Concurrently detecting third movement of the first user in the first physical environment and fourth movement of the first object in the second physical environment, and displaying the first user interface object at the respective position of the first user interface object in the three-dimensional environment that corresponds to the respective location of the first object in the second physical environment in the first manner in accordance with the determination that the respective position of the first user interface object in the three-dimensional environment that corresponds to the location of the first object in the second physical environment in the first manner is more than the threshold distance from the respective position in the three-dimensional environment that corresponds to a viewpoint associated with a currently displayed view of the three-dimensional environment, and displaying the first user interface object at an adjusted position in the three-dimensional environment corresponding to the respective location of the first object in the second physical environment in a third manner different from the first manner, in accordance with the determination that the respective position of the first user interface object in the three-dimensional environment that corresponds to the location of the first object in the second physical environment in the first manner does not exceed the threshold distance from the respective position in the three-dimensional environment that corresponds to the viewpoint associated with the currently displayed view of the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, the first object is a second user (e.g., the second user 7102 in FIGS. 7D-7F, or another user, etc.) that is located in the second physical environment (e.g., scene 105-b in FIGS. 7D-7F), and the first user (e.g., the first user 7002) and the second user (e.g., the second user 7102) at least partially shares (e.g., both users can concurrently view, access, and/or interact with at least a portion of) the three-dimensional environment (e.g., the environment viewed via the display generation components 7100 and 7200 in FIGS. 7D-7F). For example, the second user is provided with a view of the three-dimensional environment via a second display generation component in communication with a second computer system. The location of the second user in the second physical environment are detected by one or more sensors that are in communication with the second computer system. In some embodiments, the second computer system sends and the first computer system receives data representing the second physical environment, and the first computer system and the second computer system both display a representation of the second physical environment (e.g., a camera view or pass-through view of the second physical environment). In some embodiments, the first computer system sends and the second computer system receives data representing the first physical environment, and the first computer system and the second computer system both display a representation of the first physical environment (e.g., a camera view or pass-through view of the first physical environment). In some embodiments, the first computer system and the second computer system both display a representation of a virtual environment (e.g., a virtual conference room, a gaming world, etc.) or a representation of a third physical environment (e.g., a physical environment of a third user that is different from the first user and the second user, and that is also sharing the three-dimensional environment with the first user and the second user, etc.) different from the first physical environment and the second physical environment. In some embodiments, when the display position of the second user is modified with the visual collision avoidance shifts/offset (e.g., in the second manner, with the second, collision-avoidance mapping relationship, etc.) in the view of the three-dimensional environment provided to the first user via the first display generation component, the view of the three-dimensional environment provided to the second user via a second display generation component shows instead that the displayed position of the first user is modified with the visual collision avoidance shift/offset while the viewpoint of the three-dimensional environment that is based on the second user's location does not have such a shift or offset.

Displaying the first user interface object at the respective position of the first user interface object in the three-dimensional environment, in accordance with the determination that the respective position of the first user interface object in the three-dimensional environment that corresponds to the respective location of the first object in the second physical environment in the first manner is more than the threshold distance from the respective position in the three-dimensional environment that corresponds to a viewpoint associated with a currently displayed view of the three-dimensional environment, and displaying the first user interface object at a second display position in the second view of the three-dimensional environment offset from the respective position of the first user interface object in the three-dimensional environment, in accordance with the determination that the respective position of the first user interface object in the three-dimensional environment that corresponds to the respective location of the first object in the second physical environment in the first manner is not more than the threshold distance from the respective position in the three-dimensional environment that corresponds to the viewpoint associated with the currently displayed view of the three-dimensional environment, wherein the first object is a second user that is located in the second physical environment, and the first user and the second user at least partially shares the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, in a third view of the three-dimensional environment (e.g., the view 7304-b shown in FIG. 7F(B)) that is displayed via a second display generation component (e.g., display generation component 7200, or another display generation component, etc.) to the second user (e.g., user 7102, or another user, etc.), in accordance with a determination that a respective position of a second user interface object (e.g., the representation 7002'-b in FIG. 7F, another representation, etc.) (e.g., an avatar of the first user, a talking-head representing the first user, etc.) in the three-dimensional environment that corresponds to a respective location of the first user (e.g., user 7002 in FIGS. 7D-7F, another user, etc.) in the first physical environment (e.g., scene 105-a in FIGS. 7D-7F) in the first manner (e.g., determined in accordance with a reality-mimicking manner, with the preset first mapping relationship, etc.) does not exceed the threshold distance from a respective position in the three-dimensional environment that corresponds to a third viewpoint associated with the third view of the three-dimensional environment (e.g., the virtual position of the second user in the three-dimensional environment), the computer system displays the second user interface object (e.g., representation 7002'-b of the first user 7002) at a modified position in the third view of the three-dimensional environment, wherein the modified position is offset from the respective position of the second user interface object in the three-dimensional environment that corresponds to the respective location of the first user in the first physical environment in the first manner (e.g., determined in accordance with a reality-mimicking manner, with the preset first mapping relationship, etc.) (e.g., as shown in FIG. 7F(B), the representation 7002'-b of the first user 7002 is displayed to the right of the representation 7102'-b in the view 7304-b" shown to the second user 7102, even though the position of the representation 7102'-b of the first user 7002 should be straight in front of the representation 7102'-b in the view 7304-b").

Displaying the second user interface object at a modified position in the third view of the three-dimensional environment that is offset from the respective position of the second user interface object in the three-dimensional environment that corresponds to the respective location of the first user in the first physical environment in the first manner, in accordance with a determination that a respective position of a second user interface object in the three-dimensional environment that corresponds to a respective location of the first user in the first physical environment in the first manner does not exceed the threshold distance from a respective position in the three-dimensional environment that corresponds to a third viewpoint associated with the third view of the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, the first object is a physical object that is located in the second physical environment (e.g., user 7102 in FIGS. 7D-7F can represents a physical object that is not another user using the display generation component 7200, in some embodiments). In some embodiments, the three-dimensional environment includes representations of other physical objects in a different physical environment from that of the viewer of the three-dimensional environment. For example, in some embodiments, the three-dimensional environment is optionally part of a simulated nature walk on a hiking trail for the first user, and includes a real-time camera feed or recorded video of the physical environment on the hiking trail at a different physical location from the physical environment of the first user. As the first user is walking in the first physical environment and experiencing the simulated nature walk with a view of the physical environment from the hiking trail, if a physical object, such as a wild bird, a flying drone, or another hiker, is also moving in the physical environment surrounding the hiking trail such that a respective position of the physical object would overlap with or be within a threshold distance of the virtual position of the first user (e.g., a position corresponding to the viewpoint of the view of the hiking trail currently shown to the first user, or a position of a virtual representation of the first user in the view, etc.) without visual collision avoidance adjustment, the experience of the first user would be disrupted by the visual collision (e.g., the first user would feel like that the physical object ran through his/her head or body, and/or would fear that such a sensation or experience would occur, etc.). By automatically adjusting the displayed position of the representation of the physical object in such a scenario, so that, the visual collision would be avoided, the first user would be able to experience the simulated nature walk more comfortably and smoothly. In another example, the first object is a stationary object, such as a big rock on the hiking trail or a person sitting in the middle of the hiking trail. In some embodiments, the first user interface object is automatically moved out of the way (e.g., through digital image editing means) when the virtual position of the first user approaches the position of the big rock or sitting person in the view of the hiking trail. In some embodiments, in accordance with a determination that the first object is a stationary physical object (e.g., throughout the experience), the first computer system optionally ceases to display the first user interface object briefly when it is too close to the virtual position of the first user in the currently displayed view of the three-dimensional environment.

Displaying the first user interface object at the respective position of the first user interface object in the three-dimensional environment, in accordance with the determination that the respective position of the first user interface object in the three-dimensional environment that corresponds to the respective location of the first object in the second physical environment in the first manner is more than the threshold distance from the respective position in the three-dimensional environment that corresponds to a viewpoint associated with a currently displayed view of the three-dimensional environment, and displaying the first user interface object at a second display position in the second view of the three-dimensional environment offset from the respective position of the first user interface object in the three-dimensional environment, in accordance with the determination that the respective position of the first user interface object in the three-dimensional environment that corresponds to the respective location of the first object in the second physical environment in the first manner is not more than the threshold distance from the respective position in the three-dimensional environment that corresponds to the viewpoint associated with the currently displayed view of the three-dimensional environment, wherein the first object is a physical object that is located in the second physical environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, the first user interface object (e.g., representation 7102'-*a* of the second user 7102 in FIGS. 7D-7F) is an object that is floating (e.g., unattached to and/or touching another object or surface) in the three-dimensional environment (e.g., a floating talking-head avatar of the second user, a representation of a flying bird, a representation of a flying drone, etc.). In some embodiments, representations of inanimate objects in the currently displayed view of the three-dimensional environment also have corresponding visual collision-avoidance movement in a similar manner. When the first user moves to cause the virtual position corresponding to the viewpoint of the currently displayed view of the three-dimensional environment to approach a floating virtual lantern or a virtual representation of a digital assistant, the floating virtual lantern or the virtual representation of the digital assistant automatically move out of the way to the side in the currently displayed view of the three-dimensional environment. Displaying the first user interface object at the respective position of the first user interface object in the three-dimensional environment, in accordance with the determination that the respective position of the first user interface object in the three-dimensional environment that corresponds to the respective location of the first object in the second physical environment in the first manner is more than the threshold distance from the respective position in the three-dimensional environment that corresponds to a viewpoint associated with a currently displayed view of the three-dimensional environment, and displaying the first user interface object at a second display position in the second view of the three-dimensional environment offset from the respective position of the first user interface object in the three-dimensional environment, in accordance with the determination that the respective position of the first user interface object in the three-dimensional environment that corresponds to the respective location of the first object in the second physical environment in the first manner is not more than the threshold distance from the respective position in the three-dimensional environment that corresponds to the viewpoint associated with the currently displayed view of the three-dimensional environment, wherein the first user interface object is an object that is floating in the three-dimensional environment, displays the first user interface object at an appropriate position when a set of conditions has been met without requiring further user input (e.g., further user input to adjust the position of the first user interface object). Performing an operation when a set of conditions has been met without requiring further user input enhances the operability of the device, which, additionally, reduces power usage and improves battery life of the device by enabling the user to use the device more quickly and efficiently.

In some embodiments, in accordance with a determination that the three-dimensional environment is displayed with a first level of realism, the first user interface object (e.g., representation 7102'-*a* of the second user 7102 in FIGS. 7D-7F) is displayed with a first set of display properties (e.g., first resolution, first number of dimensions, first level of clarity, first color palette, without lighting effect, etc.) that corresponds to the first level of realism; and in accordance with a determination that the three-dimensional environment is displayed with a second level of realism that is different from (e.g., greater than, less than, etc.) the first level of realism, the first user interface object is displayed with a second set of display properties (e.g., second resolution, second number of dimensions, second level of clarity, second color palette, with lighting effect, etc.) that corresponds to the second level of realism, the second set of display properties are different from (e.g., greater than, less than, adding to, subtracting from, etc.) the first set of display properties. For example, in some embodiments, when the three-dimensional environment is a virtual three-dimensional environment, the first user interface object is a three-dimensional virtual model of the second user with fixed talking animation; and when the three-dimensional environment is an augmented reality environment, the first user interface object is a more realistic three-dimensional model of the second user with facial expressions and talking animations that are generated in accordance with real-time video image of the second user. In some embodiments, the computer system switches from displaying the three-dimensional environment with a first level of realism to a second level of realism in response to a user's request (e.g., the first user, the second user, etc.) to switch from a virtual mode to an augmented reality mode of the shared experience. In some embodiments, the first user interface object is a two-dimensional image of the second user floating in the three-dimensional environment when the three-dimensional environment has simple, flat and opaque surfaces; and the first user interface object becomes a three-dimensional model of the second user with more exquisite facial features and lighting effects when the three-dimensional environment is switched to a more realistic virtual rendering of a physical environment. In some embodiments, automatically matching the level of realism of the first user interface object and/or how the first user interface object is rendered in the three-dimensional environment to the level of realism of the three-dimensional environment and/or how the three-dimensional environment is rendered makes the first user interface object appear a natural, unobtrusive part of the three-dimensional environment, thereby improving the viewing experience of the first user.

Displaying the first user interface object with a first set of display properties that corresponds to a first level of realism, in accordance with a determination that the three-dimensional environment is displayed with the first level of realism, and displaying the first user interface object with a second set of display properties, different from the first set of display properties, that corresponds to the second level of realism, in accordance with a determination that the three-dimensional environment is displayed with a second level of realism that is different from the first level of realism, provides improved visual feedback to the user (e.g., improved visual feedback regarding which level of realism the three-dimensional environment is displayed with). Providing improved feedback enhances the operability of the device, which, additionally, reduces power usage and improves battery life of the device by enabling the user to use the device more quickly and efficiently.

In some embodiments, the second display position in the second view of the three-dimensional environment (e.g., the display position of the representation 7102'-a of the second user 7102 in view 7304-a" shown to the first user 7002) is displaced from the respective position of the first user interface object (e.g., representation 7102'-a of the second user 7102) in the three-dimensional environment that corresponds to the respective location of the first object (e.g., the second user 7102 in FIG. 7F, or another object, etc.) in the second physical environment (e.g., scene 105-b, or another scene, etc.) in the first manner by a first displacement amount, wherein the first displacement amount (e.g., having a first direction, and/or a first magnitude, etc.) does not correspond to movement of the first object in the second physical environment (e.g., movement along path 7302 in FIGS. 7D-7F, or movement along another path) in the first manner. In some embodiments, the first displacement amount does not correspond to the movement of the first object in the second physical environment at all, or the first displacement amount corresponds to the movement of the first object in the second physical environment in a respective manner different from the first manner, etc.

Displaying the first user interface object at a second display position in the second view of the three-dimensional environment, wherein the second display position in the second view of the three-dimensional environment is displaced from the respective position of the first user interface object in the three-dimensional environment that corresponds to the respective location of the first object in the second physical environment in the first manner by a first displacement amount that does not correspond to movement of the first object in the second physical environment in the first manner, in accordance with a determination that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment, provides improved visual feedback to the user (e.g., improved visual feedback that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment). Providing improved feedback enhances the operability of the device, which, additionally, reduces power usage and improves battery life of the device by enabling the user to use the device more quickly and efficiently.

In some embodiments, the first displacement amount has a direction that is determined in accordance with a spatial relationship (e.g., distance, and relative positions, etc.) between a viewpoint of the currently displayed view of the three-dimensional environment (e.g., viewpoint of view 7304-a" in FIG. 7F) and the respective position of the first user interface object (e.g., representation 7102'-a of the second user 7102 in FIG. 7F, or another representation, etc.) in the three-dimensional environment that corresponds to the respective location of the first object (e.g., second user 7102 in FIGS. 7D-7F, or another user or object, etc.) in the second physical environment (e.g., scene 105-b, or another scene, etc.) in the first manner.

Displaying the first user interface object at a second display position in the second view of the three-dimensional environment, wherein the second display position in the second view of the three-dimensional environment is displaced from the respective position of the first user interface object in the three-dimensional environment that corresponds to the respective location of the first object in the second physical environment in the first manner by a first displacement amount that has a direction that is determined in accordance with a spatial relationship between a viewpoint of the currently displayed view of the three-dimensional environment and the respective position of the first user interface object in the three-dimensional environment that corresponds to the respective location of the first object in the second physical environment in the first manner, provides improved visual feedback to the user (e.g., improved visual feedback regarding the spatial relationship between the viewpoint of the currently displayed view and the respective position of the first user interface object). Providing improved feedback enhances the operability of the device, which, additionally, reduces power usage and improves battery life of the device by enabling the user to use the device more quickly and efficiently.

In some embodiments, the second display position in the second view of the three-dimensional environment (e.g., view 7304-a" in FIG. 7F(A), or another view, etc.) is displaced from the respective position of the first user interface object (e.g., representation 7102'-a of the second user, another representation, etc.) in the three-dimensional environment that corresponds to the respective location of the first object (e.g., second user 7102, another user or object, etc.) in the second physical environment (e.g., scene 105-b, another scene, etc.) in the first manner by a second displacement amount (e.g., same as the first displacement amount, different from the first displacement amount, etc.), wherein the second displacement amount has a direction that is different from (e.g., perpendicular or orthogonal, to the left of, to the right of, pointing upward from, etc.) a forward direction toward the respective position in the three-dimensional environment that corresponds to the second viewpoint associated with the second view of the three-dimensional environment (e.g., as shown in FIG. 7F(A), the representation 7102'-a is shifted to the side of the viewpoint, even though its position should be right in front of the viewpoint in the view 7304-a" shown to the first user 7002). For example, in some embodiments, irrespective of from which direction the first user interface object is approaching and reaching the respective position that corresponds to the viewpoint associated with the currently displayed view of the three-dimensional environment (e.g., the second view, or another view displayed later, etc.), the first user interface object is diverted to the side or above the respective position that corresponds to the viewpoint associated with the currently displayed view, so that the displayed position of the first user interface object does not enter a restricted space surrounding the respective position corresponding to the viewpoint, even if the respective position of the first user interface object calculated based on the movement of the first user and/or the first object in their respective physical environments in accordance with the default unadjusted manner (e.g., the first manner, the reality-mimicking manner, according to a first preset mapping relationship, etc.) gets even closer or passes through the respective viewpoint associated with the currently displayed view of the three-dimensional environment. In some embodiments, it is as if there were an invisible glass wall at a threshold distance in front of the respective position that corresponds to the viewpoint of the currently displayed view of the three-dimensional environment that causes the first user interface object to slide to the side or upward along the invisible glass wall until the respective position of the first user interface object calculated based on the current location and movement history of the first user and the first object in the first manner is no longer within the threshold distance of the respective position that corresponds to the viewpoint of the currently displayed view of the three-dimensional environment. This implementation helps to avoid the first user interface object from crossing the first user's viewpoint or virtual representation of the first user face on.

Displaying the first user interface object at a second display position in the second view of the three-dimensional environment, wherein the second display position in the second view of the three-dimensional environment is displaced from the respective position of the first user interface object in the three-dimensional environment that corresponds to the respective location of the first object in the second physical environment in the first manner by a second displacement amount, wherein the second displacement amount has a direction that is different from a forward direction toward the respective position in the three-dimensional environment that corresponds to the second viewpoint associated with the second view of the three-dimensional environment, provides improved visual feedback to the user (e.g., improved visual feedback that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment). Providing improved feedback enhances the operability of the device, which, additionally, reduces power usage and improves battery life of the device by enabling the user to use the device more quickly and efficiently.

In some embodiments, the second display position in the second view (e.g., view 7304-a" in FIG. 7F) of the three-dimensional environment is displaced from the respective position of the first user interface object (e.g., representation 7102'-a of the second user, another representation, etc.) in the three-dimensional environment that corresponds to the respective location of the first object (e.g., user 7102 in FIG. 7F, another user or object, etc.) in the second physical environment (e.g., scene 105-b, or another scene, etc.) in the first manner by a third displacement amount (e.g., same as the first displacement amount, different from the first displacement amount, etc.), wherein the third displacement amount has a direction that is different from (e.g., perpendicular or orthogonal, to the left of, to the right of, pointing upward from, etc.) a direction of approach between (e.g., pointing toward a common center of) the first user interface object and the respective position in the three-dimensional environment that corresponds to the second viewpoint associated with the second view of the three-dimensional environment (e.g., as shown in FIG. 7F(A), the representation 7102'-a is shifted to the side of the viewpoint, even though it should move straight through the viewpoint in the view 7304-a" shown to the first user 7002). For example, in some embodiments, depending on from which direction the first user interface object is approaching and reaching the respective position that corresponds to the viewpoint associated with the currently displayed view of the three-dimensional environment (e.g., the second view, or another view displayed later, etc.), the third displacement amount causes the first user interface object to be diverted to from its direction of approach to the side or above the respective position that corresponds to the viewpoint associated with the currently displayed view, so that the displayed position of the first user interface object does not enter a restricted space surrounding the respective position corresponding to the viewpoint, even if the respective position of the first user interface object calculated based on the movement of the first user and/or the first object in their respective physical environments gets even closer or passes through the respective viewpoint associated with the currently displayed view of the three-dimensional environment. In some embodiments, it is as if there were an invisible glass dome surrounding the respective position that corresponds to the viewpoint of the currently displayed view of the three-dimensional environment that causes the first user interface object to slide to the side or upward along the invisible glass dome until the respective position of the first user interface object calculated based on the current location and movement history of the first user and the first object is no longer within the threshold distance of the respective position that corresponds to the viewpoint of the currently displayed view of the three-dimensional environment. This implementation helps to avoid the first user interface object from crossing the first user's viewpoint or virtual representation of the first user from any directions (e.g., face on, from the side, etc.).

Displaying the first user interface object at a second display position in the second view of the three-dimensional environment, wherein the second display position in the second view of the three-dimensional environment is displaced from the respective position of the first user interface object in the three-dimensional environment that corresponds to the respective location of the first object in the second physical environment in the first manner by a third displacement amount that has a direction that is different from a direction of approach between the first user interface object and the respective position in the three-dimensional environment that corresponds to the second viewpoint associated with the second view of the three-dimensional environment, provides improved visual feedback to the user (e.g., improved visual feedback that the respective position of the first user interface object in the three-dimensional environment that corresponds to the respective location of the first object in the second physical environment in the first manner is less than the threshold distance from the respective position in the three-dimensional environment that corresponds to the second viewpoint associated with the second view of the three-dimensional environment). Providing improved feedback enhances the operability of the device, which, additionally, reduces power usage and improves battery life of the device by enabling the user to use the device more quickly and efficiently.

In some embodiments, at least one of a magnitude and a direction of a displacement between the second display position in the second view of the three-dimensional environment (e.g., view 7304-*a*" in FIG. 7F, or another view, etc.) and the respective position of the first user interface object (e.g., representation 7102'-*a* in FIG. 7F, or another representation) in the three-dimensional environment that corresponds to the respective location of the first object (e.g., user 7102 in FIG. 7F, or another user or object, etc.) in the second physical environment in the first manner is based on (e.g., the displacement is dynamically adjusted in direction and/or magnitude in accordance with a magnitude and/or direction of a change in the magnitude and/or direction of, or in accordance with an absolute values of a magnitude and/or direction of, etc.) a spatial relationship (e.g., relative direction and/or distance, etc.) between the respective position of the first user interface object in the three-dimensional environment that corresponds to the respective location of the first object in the second physical environment in the first manner and the respective position in the three-dimensional environment that corresponds to the second viewpoint associated with the second view of the three-dimensional environment.

Displaying the first user interface object at a second display position in the second view of the three-dimensional environment, wherein at least one of a magnitude and a direction of a displacement between the second display position in the second view of the three-dimensional environment and the respective position of the first user interface object in the three-dimensional environment that corresponds to the respective location of the first object in the second physical environment in the first manner is based on a spatial relationship between the respective position of the first user interface object in the three-dimensional environment that corresponds to the respective location of the first object in the second physical environment in the first manner and the respective position in the three-dimensional environment that corresponds to the second viewpoint associated with the second view of the three-dimensional environment, provides improved visual feedback to the user (e.g., improved visual feedback regarding the spatial relationship between the respective position of the first user interface object and the respective position in the three-dimensional environment that corresponds to the second viewpoint associated with the second view of the three-dimensional environment). Providing improved feedback enhances the operability of the device, which, additionally, reduces power usage and improves battery life of the device by enabling the user to use the device more quickly and efficiently.

It should be understood that the particular order in which the operations in FIGS. 9A-9B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, and 12000) are also applicable in an analogous manner to method 9000 described above with respect to FIGS. 9A-9B. For example, the gestures, gaze inputs, physical objects, user interface objects, controls, movements, criteria, three-dimensional environment, display generation component, surface, representation of physical object, virtual objects, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 10000, 11000, and 12000). For brevity, these details are not repeated here.

Figure 10:
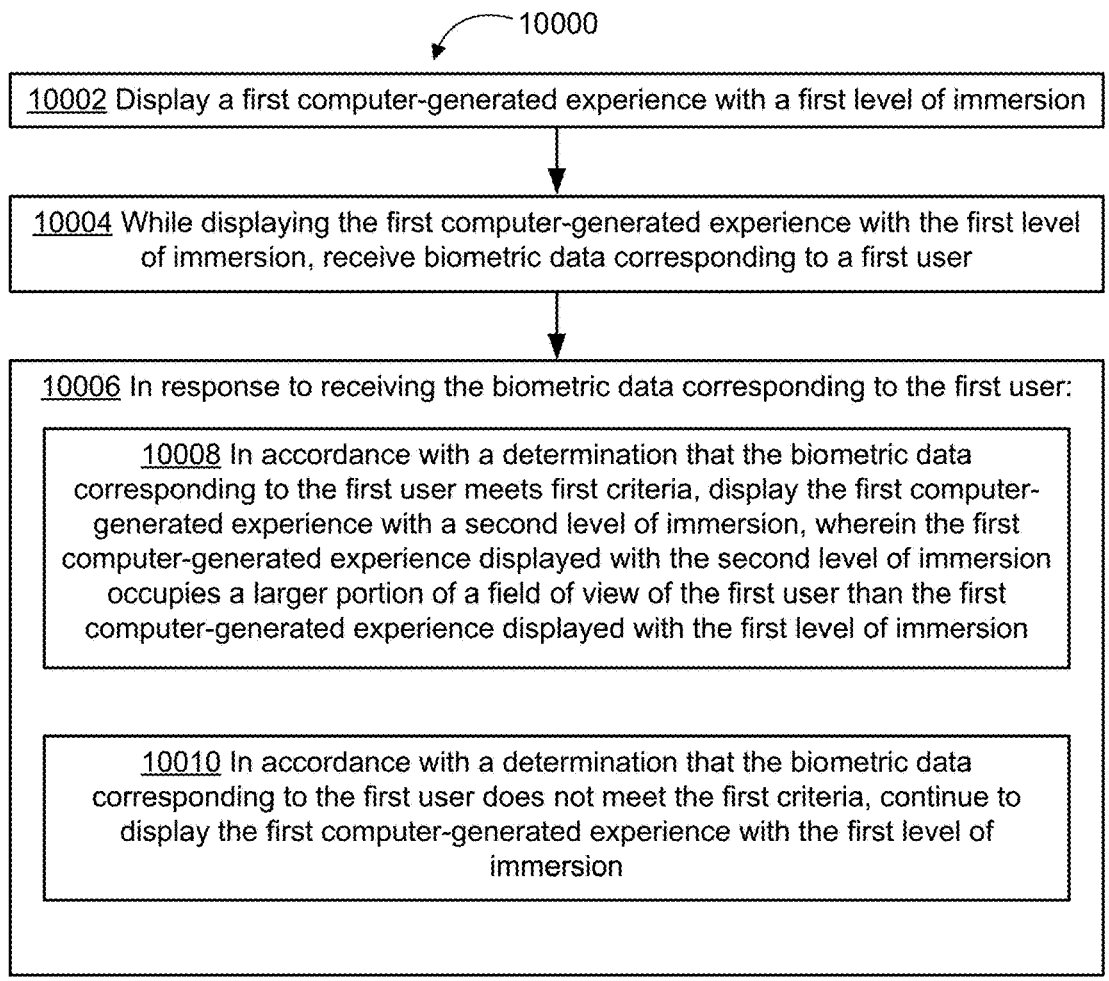
FIG. 10 is a flowchart of a method of changing a level of immersion with which an environment of a computer-generated experience is displayed in accordance with changing biometric data of a user that is received by the computer system, in accordance with some embodiments.

FIG. 10 is a flowchart of a method of changing a level of immersion with which an environment of a computer-generated experience is displayed in accordance with changing biometric data of a user that is received by the computer system, in accordance with some embodiments.

In some embodiments, the method 10000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, the method 10000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing.

In the method 10000, the computer system displays (10002) a first computer-generated experience (e.g., an application user interface, a virtual experience, an augmented reality experience, a mixed reality experience, etc.) with a first level of immersion (e.g., displaying a two-dimensional application user interface, displaying a two-dimensional view of a three-dimensional environment, displaying a window or viewpoint into a three-dimensional environment that occupies a small first portion of the field of view of the user, displaying the computer-generated experience with non-spatial audio, etc.) (e.g., as illustrated in FIG. 7G, where a minimal amount of virtual content of the computer-generated experience is displayed, and the representation of the physical environment dominates the view 7316). While displaying the first computer-generated experience with the first level of immersion, the computer system receives (10004) (e.g., in real-time, through one or more biometric sensors (e.g., various suitable medical devices, vibration sensors, cameras, thermal sensors, chemical sensors, etc.) connected to or pointed at the first user, etc.) biometric data corresponding to a first user (e.g., the user 7002 in FIGS. 7G-7J) (e.g., corresponding to the physiological state of the first user at a first point or period in time). In some embodiments, the biometric data does not include non-transient characteristics of humans (e.g., fingerprint, iris pattern and color, facial features, voiceprint, etc.) that do not typically change over a period of time that an average user is engaged with the computer-generated experience. In some embodiments, the biometric data includes heart rate, breathing rate, body temperature, serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc. In response to receiving (10006) the biometric data corresponding to the first user (e.g., corresponding to the physiological state of the first user at the first point or period in time) (e.g., periodically received data, or continuously received data, etc.) and in accordance with a determination that the biometric data corresponding to the first user (e.g., corresponding to the physiological state of the first user at the first point or period in time) (e.g., the most recently received biometric data, the biometric data received over a most recent time period of a preset duration, etc.) meets first criteria, the computer system displays (10008) the first computer-generated experience with a second level of immersion (e.g., the second level of immersion provides a more immersive experience than the first level of immersion, the second level of immersion provides a less immersive experience than the first level of immersion, etc.), wherein the first computer-generated experience displayed with the second level of immersion occupies a larger portion of a field of view (e.g., a wider angular range in the lateral direction, a wider angular range in the vertical direction, a larger viewport size, etc.) of the first user than the first computer-generated experience displayed with the first level of immersion (e.g., the first computer-generated experience occupying a larger portion of the field of view of the first user, optionally, provides a more immersive experience to the first user than when the first computer-generated experience occupies a smaller portion of the field of view of the first user). In some embodiments the first criteria include: preset criteria for indicating that the first user is mentally and emotionally ready to enter a more immersive experience, preset criteria for indicating that the first is getting ready to exit to a less immersive experience, etc. This is illustrated in FIG. 7J, where the view 7334 includes virtual content of the computer-generated experience that occupy a greater spatial extent than the view 7316 shown in FIG. 7G, for example. In some embodiments, the computer system determines that the biometric data meets the preset criteria in accordance with a determination that the heart rate is lower than a first threshold heart rate, the breathing rate is lower than a first threshold breathing rate, the blood pressure is lower than a first threshold blood pressure, movement of the user is below a first threshold amount of movement during the threshold amount of time, body temperature of the user is lower than a first threshold body temperature, a metric of stress level is below a first threshold stress level, a metric corresponding to user's mood indicates that the user is relaxed and happy, etc. In some embodiments, the first level of immersion and the second level of immersion, optionally, differ in the amount of virtual elements present in the user's view of the computer-generated experience, in the number of physical surfaces that remain visible in the computer-generated experience, in the audio output modes used for playing the sound effect of the computer-generated experience, in the level of realism depicted by the computer-generated experience, in the number of dimensionality depicted by the computer-generated experience, and/or in the number of functions and interactions made available in the computer-generated experience, etc. In the method 10000, in response to receiving the biometric data corresponding to the first user and in accordance with a determination that the biometric data corresponding to the first user does not meet the first criteria (e.g., the heart rate is greater than the first threshold heart rate, the blood pressure is higher than the first threshold blood pressure, the movement of the user is more than the first threshold amount of movement during the threshold amount of time, the body temperature of the user is higher than the first threshold body temperature, the metric of stress level is above the first threshold stress level, the metric corresponding to the user's mood indicates that the user is agitated and unhappy, etc.), the computer system continues (10010) to display the first computer-generated experience with the first level of immersion. This is illustrated in FIG. 7G, where the biometric data may fluctuate below the threshold indicator 7326, and the view 7316 is maintained. In some embodiments, optionally, the first computer-generated experience includes visual and audio guidance (e.g., music, scenery, inspirational messages, guided medication recording, visual, audio, or verbal instructions on breathing, etc.) helping the first user to enter into a state in which the corresponding biometric data received from the first user will meet the first criteria. These features are illustrated in FIGS. 7G-7J, for example, where the visual balance between virtual content and the representation of the physical environment are gradually and/or abruptly changed in accordance with changes in the biometric data corresponding to the user 7002. The visual balance and relative visual prominence between virtual content and the representation of the physical environment represents a level of immersion with which the computer-generated experience is provided to the user.

In some embodiments, while displaying the first computer-generated experience with the second level of immersion, the computer system receives (e.g., in real-time, through one or more biometric sensors (e.g., various suitable medical devices, vibration sensors, cameras, thermal sensors, chemical sensors, etc.) connected to or pointed at the first user, etc.) first updated biometric data corresponding to the first user (e.g., corresponding to the physiological state of the first user at a second point or period in time that is later than the first point or period in time, after the computer system has transitioned into displaying the first computer-generated experience with the second level of immersion). In some embodiments, the first updated biometric data includes: first updated values for the heart rate, breathing rate, body temperature, serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc., that are received after a period of time. In the method 10000, in response to receiving the first updated biometric data corresponding to the first user (e.g., corresponding to the physiological state of the first user at the second point or period in time that is later than the first point or period in time) and in accordance with a determination that the first updated biometric data corresponding to the first user (e.g., corresponding to the physiological state of the first user at the second point or period in time that is later than the first point or period in time) meets second criteria different from (e.g., more restrictive than, more difficult to meet, etc.) the first criteria, the computer system displays the first computer-generated experience with a third level of immersion (e.g., the third level of immersion provides a more immersive experience than the second level of immersion, the third level of immersion provides a less immersive experience than the second level of immersion, etc.), wherein the first computer-generated experience displayed with the third level of immersion occupies a larger portion of the field of view of the first user than the first computer-generated experience displayed with the second level of immersion (e.g., the first computer-generated experience occupying an even larger portion of the field of view of the first user, optionally, provides a more immersive experience to the first user than when the first computer-generated experience occupies a less large portion of the field of view of the first user). In some embodiments, the first level of immersion, the second level of immersion, and the third level of immersion, optionally, differ in the amount of virtual elements present in the user's view of the computer-generated experience, in the number of physical surfaces that remain visible in the computer-generated experience, in the audio output modes used for playing the sound effect of the computer-generated experience, in the level of realism depicted by the computer-generated experience, in the number of dimensionality depicted by the computer-generated experience, and/or in the number of functions and interactions made available in the computer-generated experience, etc. In the method 10000, in response to receiving the first updated biometric data corresponding to the first user and in accordance with a determination that the first updated biometric data corresponding to the first user meets the first criteria and does not meet the second criteria (e.g., the heart rate is less than the first threshold heart rate but greater than the second threshold heart rate, the blood pressure is less than the first threshold blood pressure but greater than the second threshold blood pressure, the movement of the user is less than the first threshold amount of movement but greater than a second threshold amount of movement during the threshold amount of time, the body temperature of the user is less than the first threshold body temperature but greater than the second threshold temperature, the metric of stress level is lower than the threshold stress level but above the second threshold stress level, the metric corresponding to the user's mood indicates that the user is relaxed and happy but not yet focused and peaceful, etc.), the computer system continues to display the first computer-generated experience with the second level of immersion. In some embodiments, optionally, the first computer-generated experience includes visual and audio guidance (e.g., music, scenery, inspirational messages, guided medication recording, visual, audio, or verbal instructions on breathing, etc.) helping the first user to enter into a state in which the corresponding biometric data received from the first user will meet the second criteria. In some embodiments, the first, second, and third levels of immersion correspond to increasing amount of virtual content that is present in the computer-generated environment and/or decreasing amount of representations of the surrounding physical environment present in the computer-generated environment. In some embodiments, first, second, and third levels of immersion correspond to different modes of content display that have increasing image fidelity and/or spatial extent (e.g., angular extent, spatial depth, etc.) for the computer-generated content, and decreasing image fidelity and/or spatial extent for representations of the surrounding physical environment. In some embodiments, the first level of immersion is a pass-through mode where the physical environment is fully visible to the user through the first display generation component (e.g., as a camera view of the physical environment or through a transparent portion of the first display generation component)) and the computer-generated environment includes the pass-through view of the physical environment with a minimal amount of virtual elements concurrently visible as the view of the physical environment or including virtual elements that are peripheral (e.g., indicators and controls displayed in the peripheral region of the display) to the user's view of the physical environment. In some embodiments, the second level of immersion is a mixed reality mode where the pass-through view of the physical environment is augmented with virtual elements generated by the computing system and have positions in the computer-generated environment that correspond to the central portion of the user's view of the physical environment and/or have positions in the computer-generated environment that correspond to locations and objects in the physical environment (e.g., the virtual content is integrated with the physical environment in the view of the computer-generated environment). In some embodiments, the third level of immersion of a virtual reality mode in which that user's view of the physical environment is completely replaced or blocked by the view of virtual content provided by the first display generation component. In some embodiments, there are four different levels of immersion, where the first level of immersion corresponds to the pass-through mode of the first display generation component, the second level of immersion includes two sub-levels A and B that correspond to two separate sub-modes of the first display generation component (e.g., second level—A where a user interface or user interface objects are displaying in the main portion of the user's field of view while the pass-through view of the physical environment is displayed in the background of the user interface or user interface objects; and second level—B where virtual elements are integrated with representations of physical objects in the physical environment in an augmented reality view of the physical environment), and the third level of immersion corresponds to virtual reality mode of the first display generation component.

Displaying the first computer-generated experience with a third level of immersion that occupies a larger portion of the field of view of the first user than the first computer-generated experience displayed with the second level of immersion, in accordance with a determination that the first updated biometric data corresponding to the first user meets second criteria different from the first criteria, and continuing to display the first computer-generated experience with the second level of immersion in accordance with a determination that the first updated biometric data corresponding to the first user meets the first criteria and does not meet the second criteria, displays the first computer-generated experience with the third level of immersion when a set of conditions has been met without requiring further user input (e.g., further user input to change the level of immersion). Performing an operation when a set of conditions has been met without requiring further user input enhances the operability of the device, which, additionally, reduces power usage and improves battery life of the device by enabling the user to use the device more quickly and efficiently.

In some embodiments, while displaying the first computer-generated experience with a respective level of immersion (e.g., the second level of immersion, the third level of immersion, etc.), the computer system receives second updated biometric data corresponding to the first user (e.g., corresponding to the physiological state of the first user at a third point or period in time that is later than the first point or period in time and/or the second point or period in time, after the computer system has transitioned into displaying the first computer-generated experience with the respective level of immersion from another, less immersive, level of immersion), wherein the first computer-generated experience displayed with respective level of immersion occupies a larger portion of the field of view of the first user than the first level of immersion (e.g., the respective level of immersion is the second level of immersion, or the third level of immersion). In some embodiments, the second updated biometric data includes second updated values for the heart rate, breathing rate, body temperature, serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc., that are received after a period of time. In response to receiving the second updated biometric data corresponding to the first user (e.g., corresponding to the physiological state of the first user at the third point or period in time that is later than the first point or period in time and/or the second point or period in time) and in accordance with a determination that the second updated biometric data corresponding to the first user (e.g., corresponding to the physiological state of the first user at the second point or period in time that is later than the first point or period in time) does not meet respective criteria (e.g., the first criteria, the second criteria, etc.) that were met to transition into displaying the first computer-generated experience with the respective level of immersion (e.g., the second level of immersion, the third level of immersion, etc.), the computer system displays the first computer-generated experience with a lower level of immersion (e.g., the first level of immersion, the second level of immersion, etc.) that is used prior to displaying the first computer-generated experience with the respective level of immersion (e.g., the second level of immersion, the third level of immersion, etc.). In some embodiments, changing the level of immersion of the computer-generated environment displayed via the first display generation component includes: in accordance with a determination that the currently received biometric data no longer meets the second criteria but still meets the first criteria, switching from displaying the computer-generated environment with the third level of immersion (e.g., virtual reality mode) to displaying the computer-generated environment with the second level of immersion (e.g., a mixed reality mode, or a temporary pass-through mode optionally with concurrent display of the virtual reality content). In some embodiments, when the computer-generated environment is currently displayed with the second level of immersion, and the computer system detects that the current biometric data no longer meets the first criteria and does not meet the second criteria, the computing system switches from displaying the computer-generated environment with the second level of immersion to displaying the computer-generated environment with the first level of immersion (e.g., switching from the mixed reality mode (e.g., the sub-mode A of the mixed reality mode) to the complete pass-through mode, or causing display of a graphical user interface (e.g., a home screen, an application launching user interface) or user interface objects (e.g., application launch icons, representations of content items and experiences, etc.) to be displayed in the main portion of the user's field of view). For example, in FIG. 7J, after the computer-generated experience is displayed with a high level of immersion in response to the biometric data 7312 meeting the preset threshold indicated by indicator 7326, the computer system optionally returns to any of the states shown in FIGS. 7G-7I, when the biometric data no longer meets the preset threshold, in accordance with some embodiments.

Displaying the first computer-generated experience with a lower level of immersion that is used prior to displaying the first computer-generated experience with the respective level of immersion, in accordance with a determination that the second updated biometric data corresponding to the first user does not meet respective criteria that were met to transition into displaying the first computer-generated experience with the respective level of immersion, displays the first computer-generated experience with the appropriate level of immersion when as set of conditions has been met without requiring further user input (e.g., further user input to select the level of immersion). Performing an operation when a set of conditions has been met without requiring further user input enhances the operability of the device, which, additionally, reduces power usage and improves battery life of the device by enabling the user to use the device more quickly and efficiently.

In some embodiments, the biometric data (e.g., biometric data 7312 in FIGS. 7G-7J) includes a respiration rate of the first user and the first criteria include a criterion that is met when the respiration rate of the first user is below a first threshold respiration rate in order for the first criteria to be met. In some embodiments, the biometric data such as the respiration rate is used as an indication of whether the first user is ready to enter a deeper immersive experience provided by the computer system and receive fewer stimuli from the physical environment surrounding the first user. In some embodiments, a lower respiration rate, optionally, in combination with other types of biometric data, is used to indicate that the user is getting ready to move to the next stage of a guided meditation provided by the computer-generated experience. In some embodiments, the biometric data include other types of physiological data, and the first criteria include respective threshold values for respective ones of the other types of physiological data. In some embodiments, the respective threshold values for at least a threshold number of biometric data types have to be met in order for the first criteria to be met. In some embodiments, the second criteria include a criterion that is met when the respiration rate of the first user is below a second threshold respiration rate that is lower than the first respiration rate in order for the second criteria to be met. In some embodiments, different, not necessarily lower, values for the different types of biometric data are used for the thresholds in the second criteria.

Displaying the first computer-generated experience with a second level of immersion in accordance with a determination that the biometric data, including the respiration rate of the first user, corresponding to the first user meets first criteria requiring the respiration rate of the first user be below a first threshold respiration rate, and continuing to display the first computer-generated experience with the first level of immersion in accordance with a determination that the biometric data, including the respiration rate of the first user, corresponding to the first user does not meet the first criteria requiring the respiration rate of the first user be below a first threshold respiration rate, displays the first computer-generated experience with the appropriate level of immersion when a set of conditions has been met without requiring further user input (e.g., further user input to select the level of immersion). Performing an operation when a set of conditions has been met without requiring further user input enhances the operability of the device, which, additionally, reduces power usage and improves battery life of the device by enabling the user to use the device more quickly and efficiently.

In some embodiments, the first criteria include a requirement that the biometric data (e.g., biometric data 7312 in FIGS. 7G-7J, other biometric data, etc.) satisfy one or more preset threshold values (e.g., threshold indicated by indicator 7326, other thresholds, etc.) for at least a threshold amount of time in order for the first criteria to be met. For example, in some embodiments, the biometric data includes a respiration rate of the first user and/or a heart rate of the first user, and the first criteria are met when the average respiration rate of the first user has remained below 15 breaths per minute for at least three minutes and/or the average heart rate of the first user has remained below 65 beats per minute for at least five minutes. In another example, the biometric data includes a blood pressure of the first user and/or an oxygenation level of the first user, and the first criteria are met when the average blood pressure of the first user has remained with a first range (e.g., +/−10) of 120/80 for at least ten minutes and/or the oxygenation level of the first user has remained above 99.9% for at least three minutes.

Displaying the first computer-generated experience with a second level of immersion in accordance with a determination that the biometric data corresponding to the first user meets first criteria requiring the biometric data satisfy one or more preset threshold values for at least a threshold amount of time, and continuing to display the first computer-generated experience with the first level of immersion in accordance with a determination that the biometric data, including the respiration rate of the first user, corresponding to the first user does not meet the first criteria requiring the biometric data satisfy one or more preset threshold values for at least a threshold amount of time, displays the first computer-generated experience with the appropriate level of immersion when a set of conditions has been met without requiring further user input (e.g., further user input to select the level of immersion). Performing an operation when a set of conditions has been met without requiring further user input enhances the operability of the device, which, additionally, reduces power usage and improves battery life of the device by enabling the user to use the device more quickly and efficiently.

In some embodiments, displaying the first computer-generated experience with the first level of immersion includes displaying virtual content (e.g., virtual content of the first computer-generated experience that, optionally, is changing over time) at respective first positions that correspond to locations of one or more first portions of a physical environment (e.g., the virtual content overlays, replaces display of, or blocking a view of, etc. a representation of the first portions of the physical environment (e.g., a single continuous portion, or multiple separate, disjointed portions, etc.) that would have been in the user's field of view if the virtual content were not displayed) (e.g., displaying an augmented reality view of the physical environment, or displaying complete pass-through view of the physical environment with a few user interface objects, etc.), while maintaining display of (e.g., at respective second positions) a representation of one or more second portions (different from the first portions) of the physical environment (e.g., portions of the physical environment remain visible (e.g., adjacent to the virtual content, as surrounding background to the virtual content, etc.) to the user through the display generation component). In some embodiments, displaying the first computer-generated experience with the first level of immersion includes displaying virtual content in a virtual window or screen that is overlaid on, replaces display of, or blocking a view of, etc. a representation of a physical environment (e.g., a camera view, a pass-through view through a transparent display, etc.). In some embodiments, displaying the first computer-generated experience with the first level of immersion includes displaying virtual content at positions that correspond to a location of a first physical surface (e.g., a real window, a wall, a tabletop, etc.) or a first number of (e.g., less than all) physical surfaces (e.g., all the walls but not the ceiling and floor; all the walls, ceiling, and floor, but not furniture; tabletop but not walls, etc.) in the physical environment. Displaying the first computer-generated experience with the second level of immersion includes displaying virtual content (e.g., virtual content of the first computer-generated experience that, optionally, is changing overtime) at the respective first positions that correspond to the locations of the one or more first portions (e.g., portions near the center of the user's field of view) of the physical environment and at respective second positions that correspond to at least some of the one or more second portions (e.g., portions farther away from the center of the user's field of view) of the physical environment (e.g., fewer portions of the physical environment remain visible to the user through the display generation component with the second level of immersion). In some embodiments, displaying the first computer-generated experience with the second level of immersion includes displaying virtual content in a three-dimensional environment with virtual objects that are overlaid on, replace display of, or block a view of, etc. more or wider portions of a representation of a physical environment (e.g., a camera view, a pass-through view through a transparent display, etc.). In some embodiments, displaying the first computer-generated experience with the second level of immersion includes displaying virtual content at positions that correspond to locations of more physical surfaces and/or more types of physical surfaces (e.g., real window, wall, tabletop, furniture, etc.) in the physical environment. In some embodiments, displaying the first computer-generated experience with the third level of immersion includes displaying a virtual environment without displaying a representation of any portion of the physical environment (e.g., displaying a virtual reality environment). In some embodiments, the virtual environment still corresponds to the physical environment, e.g., locations and spatial relationships of virtual objects and surfaces in the virtual environment still correspond to locations and spatial relationships of at least some physical objects and surfaces in the physical environment. In some embodiments, the virtual environment does not correspond to the physical environment, except to a minimum extent (e.g., direction of gravity and orientation of the floor, etc.). In some embodiments, the first computer-generated experience displayed with the first level of immersion is an augmented reality experience and the first computer-generated experience displayed with the second level of immersion is a virtual experience.

Displaying the first computer-generated experience with a first level of immersion, including displaying virtual content at respective first positions that correspond to locations of one or more first portions of a physical environment, while maintaining display of a representation of one or more second portions of the physical environment, and displaying the first computer-generated experience with the second level of immersion, including displaying virtual content at the respective first positions that correspond to the locations of the one or more first portions of the physical environment and at respective second positions that correspond to at least some of the one or more second portions of the physical environment, provides improved visual feedback to the user (e.g., improved visual feedback regarding the current level of immersion). Providing improved feedback enhances the operability of the device, which, additionally, reduces power usage and improves battery life of the device by enabling the user to use the device more quickly and efficiently.

In some embodiments, in response to receiving the biometric data (e.g., biometric data 7312 in FIGS. 7G-7J, or other biometric data) corresponding to the first user (e.g., corresponding to the physiological state of the first user at the first point or period in time) (e.g., periodically received data, or continuously received data, etc.) and in accordance with a determination that a change in the biometric data corresponding to the first user (e.g., corresponding to the physiological state of the first user at the first point or period in time) (e.g., the most recently received biometric data, the biometric data received over a most recent time period of a preset duration, etc.) is progressing toward meeting the first criteria (e.g., the heart rate is slowing down to approach the first threshold heart rate, the breathing rate is slowing down to approach the first threshold breathing rate, the body temperature is reducing to approach the first threshold body temperature, the serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc., are changing with a trend that, if continued, will cause the first criteria to be met), the computer system gradually reduces visual emphasis of (e.g., blurring, darkening, blocking, replacing, overlaying, etc.) at least a portion of a representation of a physical environment that had been visible via the first display generation component while the first computer-generated experience was displayed with the first level of immersion, wherein displaying the first computer-generated experience with the second level of immersion includes displaying virtual content of the first computer-generated experience at a position corresponding to the portion of the representation of the physical environment such that the portion of the representation of the physical environment ceases to be visible via the first display generation component. For example, in some embodiments, when the first computer-generated experience is displayed with the first level of immersion, a representation of a physical wall facing the first user (e.g., a pass-through view or camera view of the wall) is blocked, replaced, or overlaid by a virtual wall (e.g., with virtual wallpaper), a virtual window (e.g., with virtual view), virtual scenery (e.g., an open ocean view, an open landscape, etc.), a virtual desktop, a virtual movie screen, etc., while other physical walls, ceiling, floor, furniture in the room are still visible to the user through the display generation component. When the biometric data received from the first user meets the first criteria, the computer system gradually blurs out and/or darkens the portions of the representation of the physical environment that are still visible, and replaces them with virtual content (e.g., expansion of the existing virtual content, adding new virtual content, etc.). In some embodiments, the computer system displays the virtual content, such as virtual wallpaper, virtual room decor, virtual scenery, virtual movie screen, virtual desktop, etc., which gradually replaces the blurred and/or darkened portions of the representation of the physical environment (e.g., fading in from behind the portions of the representation of the physical environment, or creeping in from surrounding regions of the portions of the representation of the physical environment, etc.). When the transition is completed, the user's field of view of the first computer-generated experience has been expanded and less of the physical environment is visible via the display generation component.

Gradually reducing visual emphasis of at least a portion of a representation of a physical environment that had been visible via the first display generation component while the first computer-generated experience was displayed with the first level of immersion, and displaying the first computer-generated experience with the second level of immersion, including displaying virtual content of the first computer-generated experience at a position corresponding to the portion of the representation of the physical environment such that the portion of the representation of the physical environment ceases to be visible via the first display generation component, in accordance with a determination that a change in the biometric data corresponding to the first user is progressing toward meeting the first criteria, provides improved visual feedback to the user (e.g., improved visual feedback that the biometric data corresponding to the first user is progressing towards meeting the first criteria, improved visual feedback regarding the relative progress of the biometric data corresponding to the first user towards meeting the first criteria, etc.). Providing improved feedback enhances the operability of the device, which, additionally, reduces power usage and improves battery life of the device by enabling the user to use the device more quickly and efficiently.

In some embodiments, in response to receiving the biometric data (e.g., biometric data 7312 in FIGS. 7G-7J, or other biometric data, etc.) corresponding to the first user (e.g., corresponding to the physiological state of the first user at the first point or period in time) (e.g., periodically received data, or continuously received data, etc.) and in accordance with a determination that a change in the biometric data corresponding to the first user (e.g., corresponding to the physiological state of the first user at the first point or period in time) (e.g., the most recently received biometric data, the biometric data received over a most recent time period of a preset duration, etc.) is progressing toward meeting the first criteria (e.g., the heart rate is slowing down to approach the first threshold heart rate, the breathing rate is slowing down to approach the first threshold breathing rate, the body temperature is reducing to approach the first threshold body temperature, the serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc., are changing with a trend that, if continued, will cause the first criteria to be met), the computer system changes a visual property of (e.g., blurring, darkening, blocking, replacing, overlaying, etc.) at least a portion of a representation of a physical environment that had been visible via the first display generation component while the first computer-generated experience was displayed with the first level of immersion by an amount that corresponds to the change in the biometric data corresponding to the first user. For example, in some embodiments, when the first computer-generated experience is displayed with the first level of immersion, a representation of a physical wall facing the first user (e.g., a pass-through view or camera view of the wall) is blocked, replaced, or overlaid by a virtual wall (e.g., with virtual wallpaper), a virtual window (e.g., with virtual view), virtual scenery (e.g., an open ocean view, an open landscape, etc.), a virtual desktop, a virtual movie screen, etc., while other physical walls, ceiling, floor, furniture in the room are still visible to the user through the display generation component. When the biometric data received from the first user changes with a trend toward meeting the first criteria, the computer system gradually intensifies the amount of blurring and/or darkening applied to the area of the user's field of view that are not yet covered by virtual content. Optionally, if the biometric data changes with an opposite trend, the amount of blurring and/or darkening is gradually reduced and the clarity of the view of the physical environment in those areas improves again.

Changing a visual property of at least a portion of a representation of a physical environment that had been visible via the first display generation component while the first computer-generated experience was displayed with the first level of immersion by an amount that corresponds to the change in the biometric data corresponding to the first user, in accordance with a determination that a change in the biometric data corresponding to the first user is progressing toward meeting the first criteria, provides improved visual feedback to the user (e.g., improved visual feedback that the biometric data corresponding to the first user is progressing toward meeting the first criteria, improved visual feedback regarding the relative progress of the biometric data corresponding to the first user towards meeting the first criteria, etc.). Providing improved feedback enhances the operability of the device, which, additionally, reduces power usage and improves battery life of the device by enabling the user to use the device more quickly and efficiently.

In some embodiments, in response to receiving the biometric data (e.g., biometric data 7312 in FIGS. 7G-7J, or other biometric data, etc.) corresponding to the first user (e.g., corresponding to the physiological state of the first user at the first point or period in time) (e.g., periodically received data, or continuously received data, etc.) and in accordance with a determination that a change in the biometric data corresponding to the first user (e.g., corresponding to the physiological state of the first user at the first point or period in time) (e.g., the most recently received biometric data, the biometric data received over a most recent time period of a preset duration, etc.) is progressing toward meeting the first criteria (e.g., the heart rate is slowing down to approach the first threshold heart rate, the breathing rate is slowing down to approach the first threshold breathing rate, the body temperature is reducing to approach the first threshold body temperature, the serum concentration of certain chemical, medication, hormones, etc., blood pressure, brain waves, focus level, pupil size, metabolic rate, blood sugar level, one or more types of biometric data that may vary over time during a user's engagement with the computer-generated experience, one or more types of biometric data that may vary through the user's own actions (e.g., meditation, breathing pattern change, exercise, etc., as opposed to direct interaction with user interface elements or controls provided by the computer system) during the user's engagement with the computer-generated experience, one or more types of composite metrics of multiple types of biometric data that correspond to a user's mood, happiness, and/or stress level, etc., are changing with a trend that, if continued, will cause the first criteria to be met), the computer system expands display of virtual content onto (e.g., blocking, replacing, overlaying, etc.) at least a portion of a representation of a physical environment that had been visible via the first display generation component while the first computer-generated experience was displayed with the first level of immersion by an amount that corresponds to the change in the biometric data corresponding to the first user. For example, in some embodiments, when the first computer-generated experience is displayed with the first level of immersion, a representation of a physical wall facing the first user (e.g., a pass-through view or camera view of the wall) is blocked, replaced, or overlaid by a virtual wall (e.g., with virtual wallpaper), a virtual window (e.g., with virtual view), virtual scenery (e.g., an open ocean view, an open landscape, etc.), a virtual desktop, a virtual movie screen, etc., while representations of other physical walls, ceiling, floor, furniture in the room are still displayed to the user via the display generation component. When the biometric data received from the first user changes with a trend toward meeting the first criteria, the computer system gradually expands the area of the user's field of view that is covered by virtual content to block more of the view of the surrounding physical environment. Optionally, if the biometric data changes with an opposite trend, the previously blocked/covered area is gradually restored and revealing the view of the physical environment in those areas again.

Expanding display of virtual content onto at least a portion of a representation of a physical environment that had been visible via the first display generation component while the first computer-generated experience was displayed with the first level of immersion by an amount that corresponds to the change in the biometric data corresponding to the first user, in accordance with a determination that a change in the biometric data corresponding to the first user is progressing toward meeting the first criteria, provides improved visual feedback to the user (e.g., improved visual feedback that the biometric data corresponding to the first user is progressing toward meeting the first criteria, improved visual feedback regarding the relative progress of the biometric data corresponding to the first user towards meeting the first criteria, etc.). Providing improved feedback enhances the operability of the device, which, additionally, reduces power usage and improves battery life of the device by enabling the user to use the device more quickly and efficiently.

In some embodiments, the first criteria include a criterion that the first user (e.g., user 7002 in FIGS. 7G-7J, or another user, etc.) makes less than a threshold amount of movement of a first type (e.g., less than the preset threshold amount of movement of the first type during a threshold amount of time, less than a threshold cumulative amount of movement of the first type, less than an absolute amount of movement of the first type, etc.) (e.g., movement of the first type includes movement of the head, movement of the center of the body, movement of limbs, and/or movement of the eyes, etc.) when the biometric data (e.g., biometric data 7312 in FIGS. 7G-7J, or other biometric data, etc.) is being received in order for the first criteria to be met. For example, in some embodiments, in order ensure that the biometric data that is received is valid and/or ensure that the first user intends to settle down to enter into a more immersive level of the computer-generated experience, the first user is required to remain substantially still when the biometric data is received and evaluated. In some embodiments, if more than the threshold amount of movement of the first user is detected during the threshold amount of time, the computer system does not (e.g., forgoes, ceases, reverses, etc.) display of the first computer-generated experience with the second level of immersion (or another next level of immersion) even if the biometric data meets the requirements specified for the biometric data (e.g., the threshold values for breathing rate, heart rate, etc.) in the first criteria.

Displaying the first computer-generated experience with a second level of immersion in accordance with a determination that the biometric data corresponding to the first user meets first criteria requiring that the first user makes less than a threshold amount of movement of a first type when the biometric data is being received, and continuing to display the first computer-generated experience with the first level of immersion in accordance with a determination that the biometric data, including the respiration rate of the first user, corresponding to the first user does not meet the first criteria requiring that the first user makes less than a threshold amount of movement of a first type when the biometric data is being received, displays the first computer-generated experience with the appropriate level of immersion when a set of conditions has been met without requiring further user input (e.g., further user input to select the level of immersion). Performing an operation when a set of conditions has been met without requiring further user input enhances the operability of the device, which, additionally, reduces power usage and improves battery life of the device by enabling the user to use the device more quickly and efficiently.

In some embodiments, while displaying the first computer-generated experience with the second level of immersion, the computer system detects movement of a first type (e.g., movement of the head, movement of the center of the body, movement of limbs, movement of the eyes, etc.) being performed by the first user (e.g., user 7002 in FIGS. 7G-7J, another user, etc.). In response to detecting the movement of the first type being performed by the first user and in accordance with a determination that the movement of the first type exceeds a preset threshold amount of movement (e.g., more than the preset threshold amount of movement during a threshold amount of time, more than an accumulative amount movement, more than an absolute amount of movement, etc.), the computer system redisplays the first computer-generated experience with the first level of immersion. For example, in some embodiments, after the biometric data received from the first user met the first criteria and while the first computer-generated experience is displayed with the second level of immersion, if the first user moves by more than a threshold amount in one or more preset ways (e.g., the first user stood up, moves his/her head, stretches his arms, moved his gaze, etc.), the computer system interprets the first user's movement as an intention to exit the more immersive experience, and returns to a previously displayed, less immersive level of the computer-generated experience. This feature is useful when the first user is using the computer-generated experience for meditation or sleep, and movement of the first user allows the user to return to normal state. In some embodiments, in order ensure that the biometric data that is received is valid and/or ensure that the first user intends to settle down to enter into a more immersive level of the computer-generated experience, the first user is required to remain substantially still when the biometric data is received and evaluated. In some embodiments, if more than the threshold amount of movement of the first user is detected during the threshold amount of time, the computer system ceases or reverses display of the first computer-generated experience with the second level of immersion (or whatever the next level of immersion is), irrespective of whether the biometric data still meets the requirements specified for the biometric data (e.g., the threshold values for breathing rate, heart rate, etc.) in the first criteria.

Redisplaying the first computer-generated experience with the first level of immersion in response to detecting movement of a first type being performed by the first user, and in accordance with a determination that the movement of the first type exceeds a preset threshold amount of movement, redisplays the first computer-generated experience with the first level of immersion when a set of conditions has been met without requiring further user input (e.g., further user input to select the first level of immersion). Performing an operation when a set of conditions has been met without requiring further user input enhances the operability of the device, which, additionally, reduces power usage and improves battery life of the device by enabling the user to use the device more quickly and efficiently.

In some embodiments, while displaying the first computer-generated experience with the second level of immersion (e.g., as shown in FIG. 7J), the computer system detects movement of a first type (e.g., movement of the head, movement of the center of the body, movement of limbs, movement of the eyes, etc.) being performed by the first user (e.g., user 7002 in FIG. 7J). In response to detecting the movement of the first type being performed by the first user and in accordance with a determination that the movement of the first type exceeds a preset threshold amount of movement (e.g., more than the preset threshold amount of movement during a threshold amount of time, more than an accumulative amount movement, more than an absolute amount of movement, etc.), the computer system switches from displaying the first computer-generated experience with the second level of immersion with a first viewpoint to displaying the first computer-generated experience with the second level of immersion with a second viewpoint different from the first viewpoint (e.g., the change in the viewpoint of the first computer-generated experience with the second level of immersion corresponds to the movement of the first type that is performed by the first user). For example, once the more immersive experience has been triggered by the change in the biometric data, the first user can move around in the physical environment, turn his/her head, or gaze at different directions, to change the viewpoint from which the view of the virtual environment is displayed.

Switching from displaying the first computer-generated experience with the second level of immersion with a first viewpoint to displaying the first computer-generated experience with the second level of immersion with a second viewpoint different from the first viewpoint, in response to detecting movement of a first type being performed by the first user and in accordance with a determination that the movement of the first type exceeds a preset threshold amount of movement, switches the displayed viewpoint when a set of conditions has been met without requiring further user input (e.g., further user input to change from the first to the second viewpoint). Performing an operation when a set of conditions has been met without requiring further user input enhances the operability of the device, which, additionally, reduces power usage and improves battery life of the device by enabling the user to use the device more quickly and efficiently.

In some embodiments, a transition from displaying the first computer-generated experience (e.g., the computer-generated experience shown via the first display generation component 7100 in FIGS. 7G-7J, another computer-generated experience, etc.) with the first level of immersion to displaying the first computer-generated experience with the second level of immersion is a discrete transition (e.g., abrupt changes that simultaneously replace, block the view of, and/or overlaying on, large portions of the representation of the physical environment with virtual content, without gradual blurring or fading in, without incremental changes along one or more directions across positions corresponding to physical surfaces, etc.) that is made at a point in time that corresponds to a time that the first criteria are met. For example, in some embodiments, the first computer-generated experience is displayed with the first level of immersion for an extended period of time before the first criteria are met, and there is a clear and abrupt visual change that is shown when the first computer-generated experience displayed with the second level of immersion replaces the first computer-generated experience displayed with the first level of immersion, upon the first criteria being met by the biometric data.

Transitioning from displaying the first computer-generated experience with the first level of immersion to displaying the first computer-generated experience with the second level of immersion with a discrete transition that is made at a point in time that corresponds to a time that the first criteria are met provides improved visual feedback to the user (e.g., improved visual feedback that the computer system has transitioned from the first level of immersion to the second level of immersion, improved visual feedback that the first criteria has been met, etc.). Providing improved feedback enhances the operability of the device, which, additionally, reduces power usage and improves battery life of the device by enabling the user to use the device more quickly and efficiently.

In some embodiments, the first computer-generated experience displayed with the first level of immersion depicts a first virtual environment and the first computer-generated experience displayed with the second level of immersion depicts a second virtual environment that has more virtual depth than the first virtual environment (e.g., the first virtual environment has virtual content on a flat, two-dimensional, surface; and the second virtual environment has virtual content at different depths from the first user's viewpoint). Displaying the first computer-generated experience with the first level of immersion that depicts a first virtual environment, and displaying the first computer-generated experience with the second level of immersion that depicts a second virtual environment that has more virtual depth than the first virtual environment, provides improved visual feedback to the user (e.g., improved visual feedback regarding whether the computer system is displaying the first or second level of immersion). Providing improved feedback enhances the operability of the device, which, additionally, reduces power usage and improves battery life of the device by enabling the user to use the device more quickly and efficiently.

In some embodiments, displaying the first computer-generated experience with the first level of immersion includes displaying the first computer-generated experience with at least a first visual characteristic (e.g., movement of a first virtual object, changes in lighting, etc.) that changes in accordance with a change in the biometric data received while displaying the first computer-generated experience with the first level of immersion, and displaying the first computer-generated experience with the second level of immersion includes displaying the first computer-generated experience with at least a second visual characteristic (e.g., movement of the first virtual object, changes in lighting, etc.) that changes in accordance with a change in the biometric data received while displaying the first computer-generated experience with the second level of immersion. For example, in some embodiments, the first computer-generated experience displayed with the first level of immersion shows a viewport into a virtual forest night scene, virtual trees are dimly illuminated by the moon and stars on a dark virtual sky. In accordance with a change in the biometric data received from the first user, such as a decrease in breathing rate and/or an increase in oxygenation level, the illumination level shown in the virtual forest increases accordingly, and the virtual dark sky gradually turns brighter and redder simulating arrival of dawn. When the first criteria are met by the biometric data, the first computer-generated experience displayed with the second level of immersion shows an expanded area in the user's field of view being occupied by the virtual forest (e.g., the virtual forest expands around the user, and surrounds the viewpoint corresponding to the currently displayed view of the three-dimensional environment), and the day breaks in the virtual scene with the edge of the sun visible on the virtual horizon. In accordance with further changes in the biometric data received from the first user, such as a continued decrease in breathing rate (e.g., down to a threshold level) and/or a continued increase in oxygenation level (e.g., up to a threshold level), the illumination level shown in the virtual forest continues to increase accordingly, and the virtual sky gradually turns brighter simulating arrival of daytime. In another example, the first computer-generated experience displayed with the first level of immersion shows a virtual ocean view with crashing waves at a position in an augmented reality environment that corresponds to a location of a first physical wall surface in front of the first user. In accordance with a change in the biometric data received from the first user, such as a decrease in breathing rate and/or a decrease in heart rate, the frequency and/or magnitude of the ocean waves decrease accordingly. When the first criteria are met by the biometric data, the first computer-generated experience displayed with the second level of immersion shows an expanded area in the user's field of view being occupied by the ocean scene (e.g., the virtual ocean view extends to positions that corresponds to the locations of two side walls as well). In accordance with further changes in the biometric data received from the first user, such as a continued decrease in breathing rate (e.g., down to a threshold level) and/or a continued decrease in heart rate (e.g., down to a threshold level), the frequency and/or magnitude of the virtual ocean waves continue to decrease accordingly.

Displaying the first computer-generated experience with the first level of immersion, including displaying the first computer-generated experience with at least a first visual characteristic that changes in accordance with a change in the biometric data received while displaying the first computer-generated experience with the first level of immersion, and displaying the first computer-generated experience with the second level of immersion, including displaying the first computer-generated experience with at least a second visual characteristic that changes in accordance with a change in the biometric data received while displaying the first computer-generated experience with the second level of immersion, provides improved visual feedback to the user (e.g., improved visual feedback regarding whether the computer system is displaying the first or second level of immersion, improved visual feedback regarding changes in the biometric data corresponding to the first user, etc.). Providing improved feedback enhances the operability of the device, which, additionally, reduces power usage and improves battery life of the device by enabling the user to use the device more quickly and efficiently.

In some embodiments, in response to receiving the biometric data (e.g., biometric data 7312 in FIGS. 7G-7J, other biometric data, etc.) corresponding to the first user (e.g., corresponding to the physiological state of the first user (e.g., user 7002 in FIGS. 7G-7J, another user, etc.) at the first point or period in time) (e.g., periodically received data, or continuously received data, etc.), and in accordance with a determination that the biometric data corresponding to the first user (e.g., corresponding to the physiological state of the first user at the first point or period in time) (e.g., the most recently received biometric data, the biometric data received over a most recent time period of a preset duration, etc.) meets the first criteria (e.g., as shown in FIG. 7J, the biometric data meets the threshold indicated by indicator 7326), the computer system changes an audio output mode from a first audio output mode to a second audio output mode (e.g., from stereo sound to surround sound, from head-locked audio to spatial audio, etc.), wherein the first audio output mode has fewer computationally-controlled variables (e.g., volume of each sound source, phase of each sound source, number of sound sources, activation sequence of available sound sources, etc.) than the second audio output mode.

Changing an audio output mode from a first audio output mode to a second audio output mode that has more computationally controlled variables that the first audio output mode, in accordance with a determination that the biometric data corresponding to the first user meets the first criteria, provides improved audio feedback to the user (e.g., improved audio feedback that the computer system has transitioned from the first level of immersion to the second level of immersion, improved audio feedback that the biometric data corresponding to the first user has met the first criteria, etc.). Providing improved feedback enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, and 12000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 11000, and 12000). For brevity, these details are not repeated here.

Figure 11:
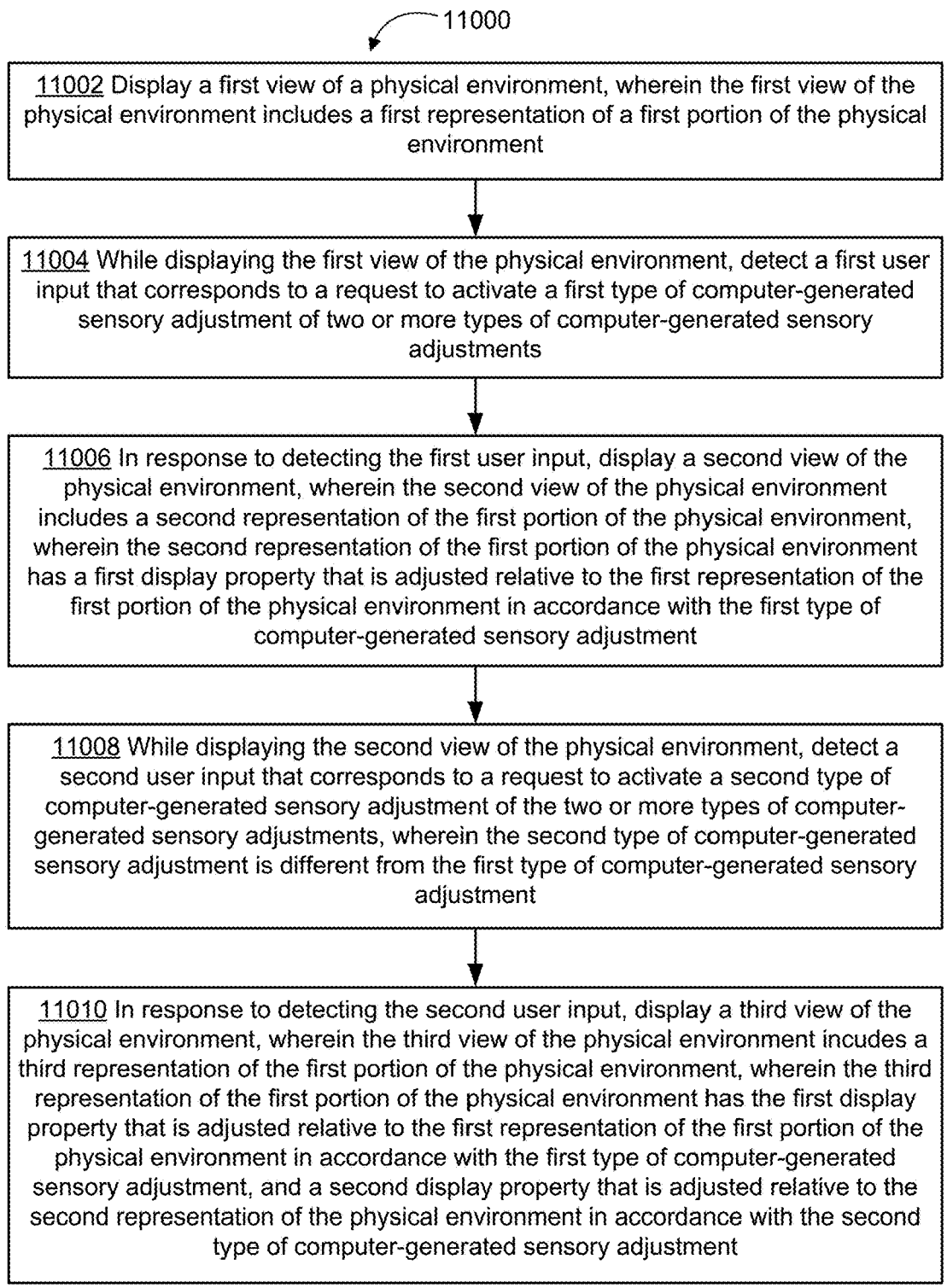
FIG. 11 is a flowchart of a method of aggregating the effects of multiple types of the sensory adjustment provided by a computer system when displaying a view of an environment that includes a representation of a physical environment, in accordance with some embodiments.

FIG. 11 is a flowchart of a method of aggregating the effects of multiple types of the sensory adjustment provided by a computer system when displaying a view of an environment that includes a representation of a physical environment, in accordance with some embodiments.

In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing.

The computer system displays (11002) a first view (e.g., view 7340 in FIG. 7K, or another view, etc.) of a physical environment, wherein the first view of the physical environment includes a first representation (e.g., representations 7350', 7348', etc. in FIG. 7K) of a first portion of the physical environment (e.g., the first representation is a regular color or B/W camera view of the first portion of the physical environment, a view of the physical environment through a pass-through portion of the display generation component, etc.) (e.g., the first representation is a baseline representation that is displayed without one or more types of computer-generated sensory enhancement). While displaying the first view of the physical environment, the computer system detects (11004) a first user input (e.g., selection of a first user interface control, activation of a first hardware button in a first manner, performance of a first predefined gesture input, utterance of a first preset voice command, etc.) that corresponds to a request to activate a first type of computer-generated sensory adjustment (e.g., binocular, heat vision, microscope, etc.) of two or more types of computer-generated sensory adjustments (e.g., binocular vision, heat vision, microscope vision, night vision, super hearing, etc.). In response to detecting the first user input, the computer system displays (11006) a second view of the physical environment (e.g., second view 7361 shown in FIG. 7L, or another view, etc.), wherein the second view of the physical environment includes a second representation (e.g., representations 7350", 7348", etc. in FIG. 7L) of the first portion of the physical environment, wherein the second representation of the first portion of the physical environment has a first display property (e.g., resolution, zoom level, magnification, color distribution, intensity distribution, focus distance, etc.) that is adjusted relative to the first representation of the first portion of the physical environment in accordance with the first type of computer-generated sensory adjustment (e.g., binocular vision, microscope vision, heat vision, night vision, etc.). In some embodiments, the representation of the first portion of the physical environment is changed relative to the baseline representation in terms of the size, resolution, focus distance, magnification of the subject matter captured in the representation as well as the distributions of colors and light intensities due to the enhancement and/suppression of different portions of a light and/or color spectrum by the applied sensory adjustment. In the example shown in FIG. 7K-7L, the representations 7350" and 7348" are enlarged and/or moved closer to the viewpoint of the view 7361, as compared to the representations 7350' and 7348' in the view 7340. While displaying the second view of the physical environment (e.g., the view 7361 in FIG. 7L, or another view, etc.), the computer system detects (11008) a second user input (e.g., selection of a second user interface control, activation of the first hardware button in a second manner, activation of a second hardware button in the first manner, performance of a second predefined gesture input, utterance of a first preset voice command, etc.) that corresponds to a request to activate a second type of computer-generated sensory adjustment of the two or more types of computer-generated sensory adjustments, wherein the second type of computer-generated sensory adjustment is different from the first type of computer-generated sensory adjustment. In response to detecting the second user input, the computer system displays (11010) a third view (e.g., view 7364, or another view, etc.) of the physical environment, wherein the third view of the physical environment incudes a third representation (e.g., representations 7350' and 7348', etc.) of the first portion of the physical environment, wherein the third representation of the first portion of the physical environment has the first display property (e.g., resolution, zoom level, magnification, color distribution, intensity distribution, focus distance, etc.) that is adjusted relative to the first representation of the first portion of the physical environment in accordance with the first type of computer-generated sensory adjustment (e.g., binocular vision, microscope vision, night vision, heat vision, etc.), and a second display property (e.g., resolution, zoom level, magnification, color distribution, intensity distribution, focus distance, etc.) that is adjusted relative to the second representation of the physical environment (e.g., the second display property have the same values in the first representation and the second representation in some combinations of the first type and second type of sensory enhancements; the second display property have different values in the first representation and the second representation in some combinations of the first type and second type of sensory enhancements) in accordance with the second type of computer-generated sensory adjustment (e.g., binocular vision, microscope vision, night vision, heat vision, color filter, etc.). In the example shown in FIG. 7K-7M, the representations 7350"' and 7348" are enlarged and/or moved closer to the viewpoint of the view 7361, as compared to the representations 7350' and 7348' in the view 7340; and the representations 7350"' and 7348' are changed in color and intensity, as compared to the representations 7350" and 7348".

In some embodiments, while displaying the third view (e.g., view 7364 in FIG. 7M, or another view, etc.) of the physical environment, the computer system detects a third user input that corresponds to a request to activate a third type of computer-generated sensory adjustment (e.g., adjustment function corresponding to affordance 7358 in FIG. 7M, another adjustment function that has not yet been activated, etc.) (e.g., binocular vision, microscope vision, night vision, heat vision, color filter, etc.) of the two or more types of computer-generated sensory adjustments, wherein the third type of computer-generated sensory adjustment is different from the first type of computer-generated sensory adjustment and the second type of computer-generated sensory adjustment, and in response to detecting the third user input, the computer system displays a fourth view of the physical environment, wherein the fourth view of the physical environment incudes a fourth representation of the first portion of the physical environment, wherein the fourth representation of the first portion of the physical environment has the first display property (e.g., resolution, zoom level, magnification, color distribution, intensity distribution, focus distance, etc.) that is adjusted relative to the first representation of the first portion of the physical environment in accordance with the first type of computer-generated sensory adjustment (e.g., binocular vision, microscope vision, night vision, heat vision, color filter, etc.), the second display property (e.g., resolution, zoom level, magnification, color distribution, intensity distribution, focus distance, etc.) that is adjusted relative to the second representation of the physical environment in accordance with the second type of computer-generated sensory adjustment (e.g., binocular vision, microscope vision, night vision, heat vision, color filter, etc.), and a third display property (e.g., resolution, zoom level, magnification, color distribution, intensity distribution, focus distance, etc.) that is adjusted relative to the third representation of the physical environment in accordance with the third type of computer-generated sensory adjustment (e.g., binocular vision, microscope vision, night vision, heat vision, color filter, etc.).

Displaying a fourth view of the physical environment including a fourth representation of the first portion of the physical environment with the first display property that is adjusted relative to the first representation of the first portion of the physical environment in accordance with the first type of computer-generated sensory adjustment, in response to detecting the third user input that corresponds to a request to activate a third type of computer-generated sensory adjustment of the two or more types of computer-generated sensory adjustments, provides additional control options without cluttering the UI with additional displayed controls (e.g., additional displayed controls for selecting and/or activating the first, second, or third type of computer-generated sensory adjustment). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated telescope vision (e.g., illustrated in FIGS. 7K-7L) (e.g., binocular vision, monocular vision, telescope vision, etc.) (e.g., reducing focus distance of objects such that they appear closer to the user) for viewing distant physical objects, and the second type of computer-generated sensory adjustment includes simulated microscope vision for magnifying nearby physical objects. In some embodiments, displaying the first representation of the physical environment includes displaying a representation of a distant physical object at a first virtual position (e.g., with corresponding size and display resolution for that virtual position in the three-dimensional environment displayed via the first display generation component) that corresponds to the location of the distant physical object in the physical environment. For example, the first representation of the distant physical object also appears far away in the first representation of the physical environment, as the distant physical object appears in the physical environment. Displaying the second representation of the physical environment includes displaying a representation of the distant physical object at a second virtual position that is closer to the viewpoint or virtual position of the user than the first virtual position (e.g., with corresponding size and display resolution for the second virtual position in the three-dimensional environment displayed via the first display generation component). For example, the second representation of the distant physical object appears less far away in the second representation of the physical environment, and occupies a larger portion of the user's field of view of the second representation of the physical environment. Displaying the third representation of the physical environment includes displaying a representation of the distant physical object at a third virtual position that is optionally even closer to the viewpoint or virtual position of the user than the second virtual position and with a positive magnification (e.g., 100 times, 20 times, etc.) relative to the size of the second representation of the distant physical object (e.g., the distant physical object appear to be magnified at the second or third virtual position). In an example usage scenario, the display generation component first displays a camera view of a tree a first distance (e.g., 30 meters, 50 meters, etc.) away; then with telescope view activated, the display generation component displays a telescope view of the tree at a virtual position that is a second distance (e.g., 5 meters, 10 meters, etc.) away from the viewpoint corresponding to the currently displayed representation of the physical environment; and with telescope view and microscope view both activated, the display generation component displays a magnified view of at least a portion of the tree (e.g., 30× magnification, 100× magnification, etc.) at the current virtual position (e.g., 5 meters, 10 meters, etc. away). In some embodiments, the camera view, the telescope view, and the microscope view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated telescope vision for viewing distant physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated telescope vision for viewing distant physical objects, and a second display property that is adjusted relative to the second representation of the physical environment in accordance with simulated microscope vision for magnifying nearby physical objects, in response to detecting the second user input, provides additional control options without cluttering the UI with additional displayed controls (e.g., additional displayed controls for selecting or switching between simulated telescope vision for viewing distant objects, and simulated microscope vision for magnifying nearby physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated telescope vision (e.g., illustrated in 7K-7L) (e.g., reducing focus distance of objects such that they appear closer to the user) for viewing distant physical objects, and the second type of computer-generated sensory adjustment includes simulated night vision (e.g., high sensitivity in low light conditions, brightness of objects are visually enhanced, small variations in brightness are magnified, etc.) for viewing physical objects under low light conditions. In some embodiments, displaying the first representation of the physical environment includes displaying a representation of a distant physical object at a first virtual position (e.g., with corresponding size and display resolution for that virtual position in the three-dimensional environment displayed via the first display generation component) that corresponds to the location of the distant physical object in the physical environment under low light conditions. For example, the first representation of the distant physical object also appears far away in the first representation of the physical environment, as the distant physical object appears in the physical environment, and the first representation of the physical environment appears dark and objects are not clearly discernable due to the low light condition of the physical environment. Displaying the second representation of the physical environment includes displaying a representation of the distant physical object at a second virtual position that is closer to the viewpoint or virtual position of the user than the first virtual position (e.g., with corresponding size and display resolution for the second virtual position in the three-dimensional environment displayed via the first display generation component), but still under low light conditions. For example, the second representation of the distant physical object appears less far away in the second representation of the physical environment, and occupies a larger portion of the user's field of view of the second representation of the physical environment, but the second representation of the physical environment still appears dark and objects are not clearly discernable due to the low light condition of the physical environment. Displaying the third representation of the physical environment includes displaying a representation of the distant physical object at the second virtual position with enhanced brightness and/or contrast (e.g., enhanced with images from low light cameras, or enhanced digitally by combining multiple photos and/or using machine learning, etc.). In an example usage scenario, the display generation component first displays a camera view of a tree a first displace (e.g., 30 meters, 50 meters, etc.) away during nighttime; then with telescope view activated, the display generation component displays a telescope view of the tree at a virtual position that is a second distance (e.g., 5 meters, 10 meters, etc.) away from the viewpoint corresponding to the currently displayed representation of the physical environment but the whole scene is still dark due to the low light condition of the night; and with telescope view and night vision both activated, the display generation component displays a brightened and high contrast image of the tree at the current virtual position (e.g., 5 meters, 10 meters, etc. away). In some embodiments, the camera view, the telescope view, and the night vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated telescope vision for viewing distant physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated telescope vision for viewing distant physical objects, and a second display property that is adjusted relative to the second representation of the physical environment in accordance with simulated night vision for viewing physical objects under low light conditions, provides additional control options without cluttering the UI with additional displayed controls (e.g., additional displayed controls for selecting or switching between simulated telescope vision for viewing distant objects, and simulated night vision for viewing physical objects under low light conditions). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated telescope vision (e.g., illustrated in 7K-7L) (e.g., reducing focus distance of objects such that they appear closer to the user) for viewing distant physical objects, and the second type of computer-generated sensory adjustment includes simulated heat vision (e.g., illustrated in 7L-7M) (e.g., high sensitivity to temperature variations, presenting color and/or intensity variations in accordance with temperature and/or thermal radiation variations, etc.) for viewing physical objects with different thermal radiation profiles. In some embodiments, displaying the first representation of the physical environment includes displaying a representation of a distant physical object at a first virtual position (e.g., with corresponding size and display resolution for that virtual position in the three-dimensional environment displayed via the first display generation component) that corresponds to the location of the distant physical object in the physical environment. For example, the first representation of the distant physical object also appears far away in the first representation of the physical environment, as the distant physical object appears in the physical environment. Displaying the second representation of the physical environment includes displaying a representation of the distant physical object at a second virtual position that is closer to the viewpoint or virtual position of the user than the first virtual position (e.g., with corresponding size and display resolution for the second virtual position in the three-dimensional environment displayed via the first display generation component). For example, the second representation of the distant physical object appears less far away in the second representation of the physical environment, and occupies a larger portion of the user's field of view of the second representation of the physical environment. Displaying the third representation of the physical environment includes displaying a representation of the distant physical object at the second virtual position with its thermal radiation profile or temperature map. In an example usage scenario, the display generation component first displays a camera view of a tree a first distance (e.g., 30 meters, 50 meters, etc.) away; then with telescope view activated, the display generation component displays a telescope view of the tree at a virtual position that is a second distance (e.g., 5 meters, 10 meters, etc.) away from the viewpoint corresponding to the currently displayed representation of the physical environment; and with telescope view and heat vision both activated, the display generation component displays a heat map of the tree at the current virtual position (e.g., 5 meters, 10 meters, etc. away) showing a bright profile of a squirrel hidden among the tree leaves. In some embodiments, the camera view, the telescope view, and the heat vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated telescope vision for viewing distant physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated telescope vision for viewing distant physical objects, and a second display property that is adjusted relative to the second representation of the physical environment in accordance with simulated heat vision for viewing physical objects with different thermal radiation profiles, provides additional control options without cluttering the UI with additional displayed controls (e.g., additional displayed controls for selecting or switching between simulated telescope vision for viewing distant objects, and simulated heat vision for viewing physical objects with different thermal radiation profiles). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated telescope vision (e.g., illustrated in 7K-7L) (e.g., reducing focus distance of objects such that they appear closer to the user) for viewing distant physical objects, and the second type of computer-generated sensory adjustment includes modifying a view of physical objects with a filter (e.g., color filter, light frequency filter, intensity filter, a motion filter, etc.). In some embodiments, displaying the first representation of the physical environment includes displaying a representation of a distant physical object at a first virtual position (e.g., with corresponding size and display resolution for that virtual position in the three-dimensional environment displayed via the first display generation component) that corresponds to the location of the distant physical object in the physical environment. For example, the first representation of the distant physical object also appears far away in the first representation of the physical environment, as the distant physical object appears in the physical environment. Displaying the second representation of the physical environment includes displaying a representation of the distant physical object at a second virtual position that is closer to the viewpoint or virtual position of the user than the first virtual position (e.g., with corresponding size and display resolution for the second virtual position in the three-dimensional environment displayed via the first display generation component). For example, the second representation of the distant physical object appears less far away in the second representation of the physical environment, and occupies a larger portion of the user's field of view of the second representation of the physical environment. Displaying the third representation of the physical environment includes displaying a representation of the distant physical object at the second virtual position with some of the colors, and/or intensities, etc. filtered out. In some embodiments, when a motion filter is applied, parts of the second representation of the physical environment that do not have motion are filtered out, highlighting parts with motion (e.g., movement of leaves, animals, people, etc.). In an example usage scenario, the display generation component first displays a camera view of a tree a first distance (e.g., 30 meters, 50 meters, etc.); then with telescope view activated, the display generation component displays a telescope view of the tree at a virtual position that is a second distance (e.g., 5 meters, 10 meters, etc.) away from the viewpoint corresponding to the currently displayed representation of the physical environment; and with telescope view and color/intensity/motion filters both activated, the display generation component displays a filtered image of the tree at the current virtual position (e.g., 5 meters, 10 meters, etc. away) showing a bright orange colored hat and safety vest on a faint de-saturated image of the tree (color filter applied), or a filtered image of the tree at the current virtual position (e.g., 5 meters, 10 meters, etc. away) showing visual highlighting of a camouflaged insect moving on a faint de-saturated image of the tree. In some embodiments, the camera view, and the telescope view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated telescope vision for viewing distant physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated telescope vision for viewing distant physical objects, and a second display property that is adjusted relative to the second representation of the physical environment in accordance with a filter that modifies a view of physical objects, provides additional control options without cluttering the UI with additional displayed controls (e.g., additional displayed controls for selecting or switching between simulated telescope vision for viewing distant objects, and the filter that modifies a view of physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated telescope vision (e.g., illustrated in 7K-7L) (e.g., reducing focus distance of objects such that they appear closer to the user) for viewing distant physical objects, and the second type of computer-generated sensory adjustment includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in a physical environment. In some embodiments, displaying the first representation of the physical environment includes displaying a representation of a distant physical object at a first virtual position (e.g., with corresponding size and display resolution for that virtual position in the three-dimensional environment displayed via the first display generation component) that corresponds to the location of the distant physical object in the physical environment. For example, the first representation of the distant physical object also appears far away in the first representation of the physical environment, as the distant physical object appears in the physical environment. Displaying the second representation of the physical environment includes displaying a representation of the distant physical object at a second virtual position that is closer to the viewpoint or virtual position of the user than the first virtual position (e.g., with corresponding size and display resolution for the second virtual position in the three-dimensional environment displayed via the first display generation component). For example, the second representation of the distant physical object appears less far away in the second representation of the physical environment, and occupies a larger portion of the user's field of view of the second representation of the physical environment. Displaying the third representation of the physical environment includes displaying a representation of the distant physical object at the second virtual position with visual identification of a localized sound source in the physical environment on or in the vicinity of the representation of the distant physical object, wherein the enhanced audio output corresponding to the sound from the localized sound source is output with the display of the third representation of the physical environment. In an example usage scenario, the display generation component first displays a camera view of a tree a first distance (e.g., 30 meters, 50 meters, etc.) away during nighttime; then with telescope view activated, the display generation component displays a telescope view of the tree at a virtual position that is a second distance (e.g., 5 meters, 10 meters, etc.) away from the viewpoint corresponding to the currently displayed representation of the physical environment; and with telescope view and enhanced hearing both activated, the display generation component displays a circle overlaid on the image of the tree at the current virtual position (e.g., 5 meters away, 3 meters away, etc.) indicating a position of a bird singing in the tree. The localized chirping sound from the bird is played back along with the view of the three at the second distance (e.g., 5 meters, 10 meters, etc.) away from the viewpoint, optionally, with a spatial audio output mode. In some embodiments, the camera view, the telescope view, and the localized sounds of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated telescope vision for viewing distant physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated telescope vision for viewing distant physical objects, and a second display property that is adjusted relative to the second representation of the physical environment in accordance with selective audio adjustment for sounds corresponding to a subset of physical objects in a physical environment, provides additional control options without cluttering the UI with additional displayed controls (e.g., additional displayed controls for selecting or switching between simulated telescope vision for viewing distant objects, and selective audio adjustment for sounds corresponding to a subset of physical objects in a physical environment). Providing additional control options without cluttering the UI with additional displayed controls enhances the operability of the device, which, additionally, reduces power usage and improves battery life of the device by enabling the user to use the device more quickly and efficiently.

In some embodiments, concurrently with displaying the third representation of the physical environment (e.g., the representation shown in FIG. 7M, or another representation, etc.), the computer system outputs sounds that correspond to a first portion of the physical environment (e.g., portions 7366″ and 7368″ in FIG. 7M, or another portion, etc.) visible in the third representation of the physical environment, wherein the sounds are selectively enhanced (e.g., increased in volume, with modifications to the amplitudes of some selected frequencies, etc.) relative to sounds from sources outside of the first portion of the physical environment. In an example scenario, two trees are visible in the first representation of the physical environment along with audio output of sounds captured from the entire physical environment; when the first tree is viewed with the telescope view and enhanced hearing activated, the sound of bird chirping in the first tree are enhanced (e.g., made louder) relative to the sound of squirrels rustling in the second tree, and played with spatial audio to have a virtual position corresponding to the virtual position of the first tree. Outputting sounds that correspond to a first portion of the physical environment visible in the second representation of the physical environment, wherein the sounds are selectively enhanced relative to sounds from sources outside of the first portion of the physical environment, concurrently with displaying the third representation of the physical environment, provides improved audio feedback to the user (e.g., improved audio feedback regarding the first portion of the physical environment). Providing improved feedback enhances the operability of the device, which, additionally, reduces power usage and improves battery life of the device by enabling the user to use the device more quickly and efficiently.

In some embodiments, concurrently with displaying the third representation of the physical environment, the computer system displays textual output corresponding to speech coming from a first portion of the physical environment (e.g., portions 7366″ and 7368″ in FIG. 7M, or another portion, etc.) visible in both the second representation and third representation of the physical environment, wherein the speech is selectively enhanced relative to sounds from sources outside of the first portion of the physical environment. In an example scenario, a tree and a house are visible in the first representation of the physical environment along with audio output of sounds captured from the entire physical environment; when the house is viewed with the telescope view and enhanced hearing activated, the sound of speech from the house are enhanced (e.g., made louder and more clear, etc.) relative to the sound of bird chirping in the tree, and textual output, such as subtitles, transcriptions, translations, are displayed. In some embodiments, the speech sounds are replaced with corresponding audio translations. Displaying textual output corresponding to speech coming from a first portion of the physical environment visible in both the second representation and third representation of the physical environment, wherein the speech is selectively enhanced relative to sounds from sources outside of the first portion of the physical environment, concurrently with displaying the third representation of the physical environment, provides improved visual feedback to the user (e.g., improved visual feedback regarding speech coming from the first portion of the physical environment). Providing improved feedback enhances the operability of the device, which, additionally, reduces power usage and improves battery life of the device by enabling the user to use the device more quickly and efficiently.

In some embodiments, the first type of computer-generated sensory adjustment includes simulated microscope vision for magnifying nearby physical objects, and the second type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles. In an example usage scenario, the display generation component first displays a camera view of a microchip in a mobile phone; then with microscope view activated, the display generation component displays a magnified view of the microchip; and with microscope view and heat vision both activated, the display generation component displays a heat map of the microchip at the current magnification level, showing high temperature areas relative to low temperature areas on the microchip. In some embodiments, the camera view, the microscope view, and the heat vision view of the same portion of a physical object are, optionally, captured by different cameras and/or sensors, or, optionally, enhanced with computational techniques. Displaying a second view of the physical environment that includes a second representation of the first portion of the physical environment, wherein the second representation of the first portion of the physical environment has a first display property that is adjusted relative to the first representation of the first portion of the physical environment in accordance with simulated microscope vision for magnifying nearby physical objects, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated microscope vision for magnifying nearby physical objects, and a second display property that is adjusted relative to the second representation of the physical environment in accordance with simulated heat vision for viewing physical objects with different thermal radiation profiles, provides additional control options without cluttering the UI with additional displayed controls (e.g., additional displayed controls for selecting or switching between simulated microscope vision for magnifying nearby physical objects, and simulated heat vision for viewing physical objects with different thermal radiation profiles). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated night vision (e.g., high sensitivity in low light conditions, brightness of objects are visually enhanced, small variations in brightness are magnified, etc.) for viewing physical objects under low light conditions, and the second type of computer-generated sensory adjustment includes simulated telescope vision (e.g., illustrated in FIG. 7K-7L) (e.g., reducing focus distance of objects such that they appear closer to the user) for viewing distant physical objects. In an example usage scenario, the display generation component first displays a camera view of a tree a first distance (e.g., 30 meters, 60 meters, etc.) away at night, and the details of the tree are barely visible due to the low light conditions; then with night vision activated, the display generation component displays a brightened and high contrast image of the camera view showing the tree at the first distance (e.g., 30 meters, 60 meters, etc.) away; and with night vision and telescope view both activated, the display generation component displays the brightened and high contrast image of the tree at a virtual position 5 meters away.

Displaying a second view of the physical environment that includes a second representation of the first portion of the physical environment, wherein the second representation of the first portion of the physical environment has a first display property that is adjusted relative to the first representation of the first portion of the physical environment in accordance with simulated night vision for viewing physical objects under low light conditions, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated night vision for viewing physical objects under low light conditions, and a second display property that is adjusted relative to the second representation of the physical environment in accordance with simulated telescope vision for viewing distant physical objects, provides additional control options without cluttering the UI with additional displayed controls (e.g., additional displayed controls for selecting or switching between simulated night vision for viewing physical objects under low light conditions, and simulated telescope vision for viewing distant physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated night vision (e.g., high sensitivity in low light conditions, brightness of objects are visually enhanced, small variations in brightness are magnified, etc.) for viewing physical objects under low light conditions, and the second type of computer-generated sensory adjustment includes simulated microscope vision for magnifying nearby physical objects. In an example usage scenario, the display generation component first displays a camera view of a table top in a dark room. The details of the room are barely visible due to the low light conditions; then with night vision activated, the display generation component displays a brightened and high contrast image of the room showing some coins on top of the table; and with night vision and microscope view both activated, the display generation component displays the brightened and high contrast image of the coins magnified showing details of the coins. In some embodiments, the microscope images of the coins are optionally captured at a different time from that of the night vision images, and/or from the camera view of the table top. The information from different types of sensors are cameras are combined to generate the third representation of the physical environment. In some embodiments, information (e.g., size of the coins, characteristics of images on the coins, etc.) extracted from the first representation and/or second representation of the physical environment are used as the basis to obtain (e.g., from online sources, image databases, etc.) additional information (e.g., types of the coins, year of the coins, materials of the coins, etc.) about the details of the physical environment to generate the third representation of the physical environment (e.g., showing more details of the coins that are not captured by the first representation and the second representation).

Displaying a second view of the physical environment that includes a second representation of the first portion of the physical environment, wherein the second representation of the first portion of the physical environment has a first display property that is adjusted relative to the first representation of the first portion of the physical environment in accordance with simulated night vision for viewing physical objects under low light conditions, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated night vision for viewing physical objects under low light conditions, and a second display property that is adjusted relative to the second representation of the physical environment in accordance with simulated microscope vision for magnifying nearby physical objects, provides additional control options without cluttering the UI with additional displayed controls (e.g., additional displayed controls for selecting or switching between simulated night vision for viewing physical objects under low light conditions, and simulated microscope vision for magnifying nearby physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated night vision (e.g., high sensitivity in low light conditions, brightness of objects are visually enhanced, small variations in brightness are magnified, etc.) for viewing physical objects under low light conditions, and the second type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles. In an example usage scenario, the display generation component first displays a camera view of a tree in the night. The details of the tree are barely visible due to the low light conditions; then with night vision activated, the display generation component displays a brightened and high contrast image of the tree showing two nests; and with night vision and heat vision both activated, the display generation component displays the brightened and high contrast image of the nests, with one nest having a different color and/or light intensity from the other nest, indicating that one nest has been inhabited by an animal recently and the other is not. In some embodiments, the camera view, the night vision view, and the heat vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated night vision for viewing physical objects under low light conditions, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated night vision for viewing physical objects under low light conditions, and a second display property that is adjusted relative to the second representation of the physical environment in accordance with simulated heat vision for viewing physical objects with different thermal radiation profiles, provides additional control options without cluttering the UI with additional displayed controls (e.g., additional displayed controls for selecting or switching between simulated night vision for viewing physical objects under low light conditions, and simulated heat vision for viewing physical objects with different thermal radiation profiles). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated night vision (e.g., high sensitivity in low light conditions, brightness of objects are visually enhanced, small variations in brightness are magnified, etc.) for viewing physical objects under low light conditions, and the second type of computer-generated sensory adjustment includes and the second type of computer-generated sensory adjustment includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in a physical environment. In some embodiments, displaying the first representation of the physical environment includes displaying a representation of a physical object in a low light condition. Displaying the second representation of the physical environment includes displaying a brightened and high contrast image of the dark room with normal audio output of sound captured from the whole room. Displaying the third representation of the physical environment includes displaying the same brightened and high contrast image of the dark room with a localized sound source identified and visually highlighted in the image, and with enhanced audio output corresponding to the sound from the localized sound source. In an example usage scenario, the display generation component first displays a camera view of the dark room with no discernable sound; then with night vision activated, the display generation component displays an enhanced brightness and high contrast view of the dark room showing furniture and appliances in the room; and with night vision and enhanced hearing both activated, the display generation component displays a circle overlaid on the brightened and high contrast image of the dark room indicating a position of a refrigerator which low frequency vibration sounds can be heard. The localized sound from the refrigerator is enhanced and played back along with the night vision view of the room, optionally, with a spatial audio output mode and with enhancement of the frequencies in the vibrations of the refrigerator. In some embodiments, the camera view, the telescope view, and the localized sounds of the same portion of a physical object are, optionally, captured by different cameras and/or sensors, or, optionally, enhanced with computational techniques. In some embodiments, a user input is detected selecting the source of sound (e.g., a tap on the refrigerator in the night vision view, another input selecting another sound source, etc.) for which enhanced audio is requested.

Displaying a second view of the physical environment that includes a second representation of the first portion of the physical environment, wherein the second representation of the first portion of the physical environment has a first display property that is adjusted relative to the first representation of the first portion of the physical environment in accordance with simulated night vision for viewing physical objects under low light conditions, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated night vision for viewing physical objects under low light conditions, and a second display property that is adjusted relative to the second representation of the physical environment in accordance with selective audio adjustment for sounds corresponding to a subset of physical objects in a physical environment, provides additional control options without cluttering the UI with additional displayed controls (e.g., additional displayed controls for selecting or switching between simulated night vision for viewing physical objects under low light conditions, and selective audio adjustment for sounds corresponding to a subset of physical objects in a physical environment). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles and the second type of computer-generated sensory adjustment includes simulated telescope vision (e.g., illustrated in FIGS. 7K-7L) (e.g., reducing focus distance of objects such that they appear closer to the user) for viewing distant physical objects. In an example usage scenario, the display generation component first displays a camera view of a forest; then with heat vision activated, one area of the forest in the heat vision view appears to have a higher temperature than other areas of the forest in the heat vision view, and the area of the forest with the higher temperature is a first distance (e.g., 50 meters, 100 meters, etc.) away in the heat vision view. When the heat vision view and the binocular view are both activated, the display generation component displays a telescope view of the area with the higher temperature at a virtual position that is a second distance (e.g., 5 meters, 10 meters, etc.) away from the viewpoint corresponding to the currently displayed representation of the physical environment. The heat map of the area with the higher temperature displayed at the virtual position at the second distance (e.g., 5 meters, 10 meters, etc.) away shows a representation of a smoldering dead tree trunk. In some embodiments, the camera view, the telescope view, and the heat vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated heat vision for viewing physical objects with different thermal radiation profiles, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated heat vision for viewing physical objects with different thermal radiation profiles, and a second display property that is adjusted relative to the second representation of the physical environment in accordance with simulated telescope vision for viewing distant physical objects, provides additional control options without cluttering the UI with additional displayed controls (e.g., additional displayed controls for selecting or switching between simulated heat vision for viewing physical objects with different thermal radiation profiles, and simulated telescope vision for viewing distant physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles and the second type of computer-generated sensory adjustment includes simulated microscope vision for magnifying nearby physical objects. In an example usage scenario, the display generation component first displays a camera view of an internal structure of a mobile device; then with heat vision activated, one area of the internal structure of the mobile device appears to have a higher temperature than other areas of the structure in the heat vision view, and the area of the structure with the higher temperature is shown with a modified color. When the heat vision view and the microscope view are both activated, the display generation component displays a magnified view of the area with the higher temperature. In some embodiments, the camera view, the telescope view, and the heat vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated heat vision for viewing physical objects with different thermal radiation profiles, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated heat vision for viewing physical objects with different thermal radiation profiles, and a second display property that is adjusted relative to the second representation of the physical environment in accordance with simulated microscope vision for magnifying nearby physical objects, provides additional control options without cluttering the UI with additional displayed controls (e.g., additional displayed controls for selecting or switching between simulated heat vision for viewing physical objects with different thermal radiation profiles, and simulated microscope vision for magnifying nearby physical objects). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles, and the second type of computer-generated sensory adjustment includes simulated night vision (e.g., high sensitivity in low light conditions, brightness of objects are visually enhanced, small variations in brightness are magnified, etc.) for viewing physical objects under low light conditions. In an example usage scenario, the display generation component first displays a camera view of a house in the night. The details of the house are barely visible due to the low light conditions; then with heat vision activated, the display generation component displays that one area of the heat vision view appear to have a higher temperature than other parts of the heat vision view, but it is unclear what structural portion of the house hosts the high temperature area; and with night vision and heat vision both activated, the display generation component displays the brightened and high contrast image of the house, showing the high temperature area inside a downspout running down the front side of the house. In some embodiments, the camera view, the night vision view, and the heat vision view of the same portion of a physical object are, optionally, captured by different cameras and/or sensors, or, optionally, enhanced with computational techniques.

Displaying a second view of the physical environment that includes a second representation of the first portion of the physical environment, wherein the second representation of the first portion of the physical environment has a first display property that is adjusted relative to the first representation of the first portion of the physical environment in accordance with simulated heat vision for viewing physical objects with different thermal radiation profiles, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated heat vision for viewing physical objects with different thermal radiation profiles, and a second display property that is adjusted relative to the second representation of the physical environment in accordance with simulated night vision for viewing physical objects under low light conditions, provides additional control options without cluttering the UI with additional displayed controls (e.g., additional displayed controls for selecting or switching between simulated heat vision for viewing physical objects with different thermal radiation profiles, and simulated night vision for viewing physical objects under low light conditions). Providing additional control options without cluttering the UI with additional displayed controls enhances the operability of the device, which, additionally, reduces power usage and improves battery life of the device by enabling the user to use the device more quickly and efficiently.

In some embodiments, the first type of computer-generated sensory adjustment includes simulated heat vision (e.g., illustrated in FIGS. 7L-7M) (e.g., high sensitivity to temperature variations, presenting color and/or intensity variations in accordance with temperature and/or thermal radiation variations, etc.) for viewing physical objects with different thermal radiation profiles, and the second type of computer-generated sensory adjustment includes selective audio enhancement (e.g., enhancing volume, selectively enhancing/suppressing certain sound frequencies, etc.) for sounds corresponding to a subset of physical objects (e.g., a selected subset of all sound producing physical objects, physical objects that are in the center of the current field of view, etc.) in a physical environment. In an example usage scenario, the display generation component first displays a camera view of a house in the night. The details of the house are barely visible due to the low light conditions; then with heat vision activated, the display generation component displays that one area of the heat vision view appear to have a higher temperature than other parts of the heat vision view, but it is unclear what structural portion of the house hosts the high temperature area; and with night vision and heat vision both activated, the display generation component displays the brightened and high contrast image of the house, showing the high temperature area inside a downspout running down the front side of the house; and with night vision and enhanced hearing both activated, the display generation component displays a circle overlaid on the high temperature area indicating a position of sound source (e.g., a nest of snoring rodents). The localized sound from the highlighted sound source is enhanced and played back along with the heat vision view of the house, optionally, with a spatial audio output mode and with enhancement of the sound from the sound source. In some embodiments, the camera view, the heat vision view, and the localized sounds of the same portion of a physical object are, optionally, captured by different cameras and/or sensors, or, optionally, enhanced with computational techniques. In some embodiments, a user input is detected selecting the source of sound (e.g., a tap on the hot spot in the night vision view) for which enhanced audio is requested.

Displaying a second view of the physical environment that includes a second representation of the first portion of the physical environment, wherein the second representation of the first portion of the physical environment has a first display property that is adjusted relative to the first representation of the first portion of the physical environment in accordance with simulated heat vision for viewing physical objects with different thermal radiation profiles, in response to detecting the first user input, and displaying a third view of the physical environment that includes a third representation of the first portion of the physical environment, wherein the third representation of the first portion of the physical environment has the first display property that is adjusted relative to the first representation of the first portion of the physical environment in accordance with simulated heat vision for viewing physical objects with different thermal radiation profiles, and a second display property that is adjusted relative to the second representation of the physical environment in accordance with selective audio adjustment for sounds corresponding to a subset of physical objects in a physical environment, provides additional control options without cluttering the UI with additional displayed controls (e.g., additional displayed controls for selecting or switching between simulated heat vision for viewing physical objects with different thermal radiation profiles, and selective audio adjustment for sounds corresponding to a subset of physical objects in a physical environment). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, and 12000) are also applicable in an analogous manner to method 11000 described above with respect to FIG. 11. For example, the gestures, gaze inputs, physical objects, user interface objects, controls, movements, criteria, three-dimensional environment, display generation component, surface, representation of physical object, virtual objects, and/or animations described above with reference to method 11000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, and 12000). For brevity, these details are not repeated here.

Figure 12:
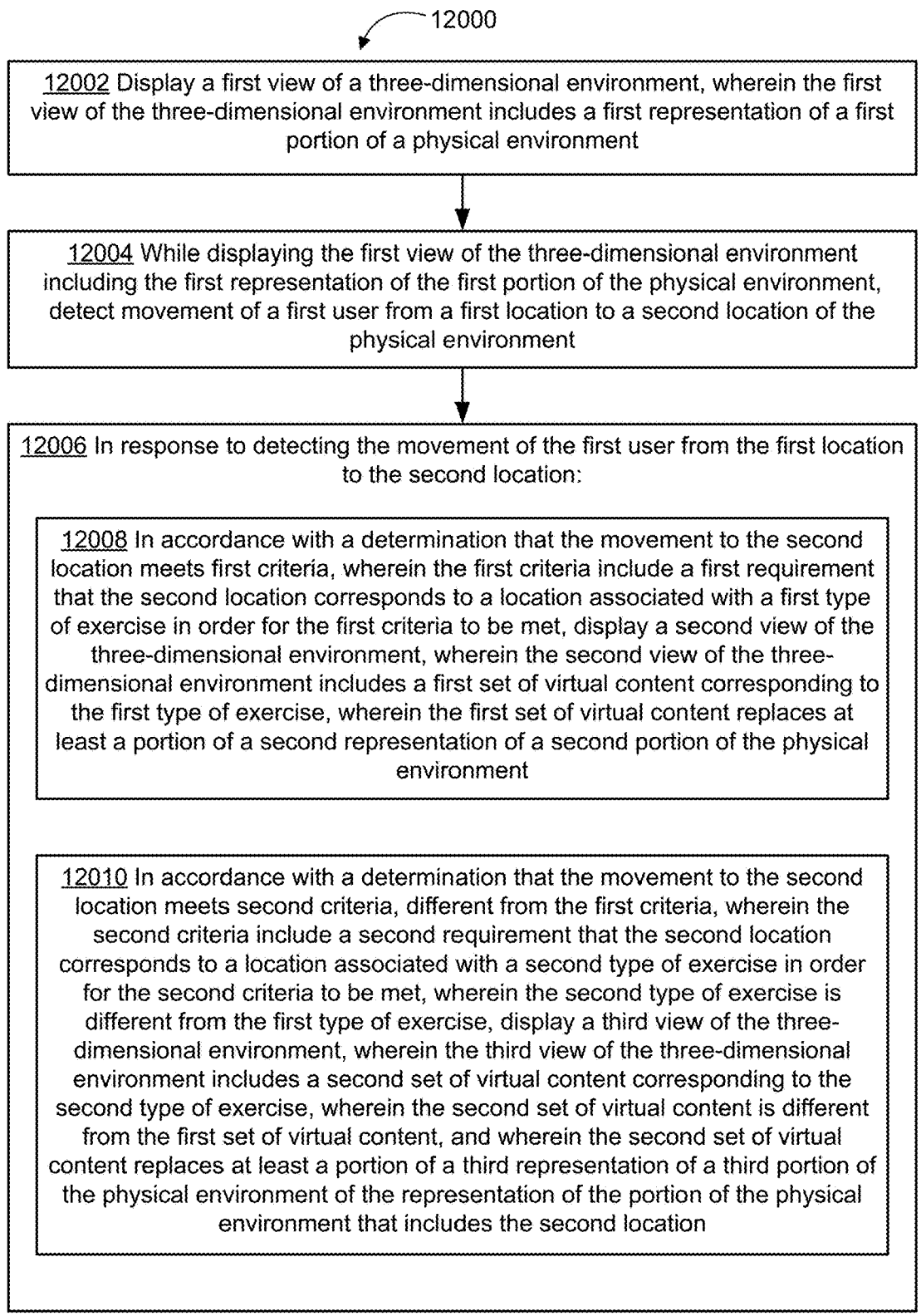
FIG. 12 is a flowchart of a method of selectively displaying virtual content that corresponds to a respective type of exercise in a view of a three-dimensional environment in accordance with a determination that the portion of the physical environment in the view of the three-dimensional environment corresponds to the respective type of exercise, in accordance with some embodiments.

FIG. 12 is a flowchart of a method of selectively displaying virtual content that corresponds to a respective type of exercise in a view of a three-dimensional environment in accordance with a determination that the portion of the physical environment in the view of the three-dimensional environment corresponds to the respective type of exercise, in accordance with some embodiments.

In some embodiments, the method 12000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In some embodiments, the method 12000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing.

The computer system displays (12002) a first view (e.g., view 7405 in FIG. 7N(B), another view, etc.) of a three-dimensional environment (e.g., scene 105 in FIG. 7N(A), another physical environment, etc.) (e.g., a reality view with no virtual elements or minimal virtual elements, a reality view with user interface objects for controlling basic functions of the computer system (e.g., application icons for launching different computer-generated experiences, display settings, audio controls, etc.), an augmented reality view displayed with a low-level of immersion (e.g., displaying user interface objects (e.g., an application launch pad, a welcome user interface, a settings user interface) that are not part of a specific application experience (e.g., a health app, a meditation app, a workout app, a game app, etc.), and that on aggregate only occupy a small percentage (e.g., less than 10%, less than 20%, etc.) of the user's field of view or are displayed in confined floating windows, etc.), etc.), wherein the first view of the three-dimensional environment includes a first representation of a first portion of a physical environment (e.g., the first representation is a regular camera view of the first portion of the physical environment surrounding the user that is in a physical spatial relationship with the first display generation component to view the three-dimensional environment via the first display generation component, a view of the physical environment through a pass-through portion of the first display generation component, etc.). While displaying the first view of the three-dimensional environment including the first representation of the first portion of the physical environment, the computer system detects (12004) movement of a first user (e.g., user 7002 in FIGS. 7N-7P, another user, etc.) from a first location (e.g., location of user 7002 in FIG. 7N(A), another location, etc.) to a second location (e.g., location of user 7002 in FIG. 7O(A), location of user 7002 in FIG. 7P(A), another location, etc.) of the physical environment (e.g., movement of the first user as a whole (e.g., walking, climbing, etc.) while wearing an HMD that serves as the first display generation component, movement of the first user carrying a mobile device with a display or projector that serves as the first display generation component (e.g., movement of the user's arm that causes movement of the mobile device and display, movement of the user as a whole carrying the mobile device with the display) from a first location to a second location in the physical environment, etc.). In response to detecting (12006) the movement of the first user from the first location to the second location and in accordance with a determination that the movement to the second location meets first criteria, wherein the first criteria include a first requirement that the second location corresponds to a location associated with a first type of exercise (e.g., the location has a first type of exercise equipment (e.g., rowing machines, stairs, treadmill, climbing wall, stationary bikes, weight training machines, punching bags, etc.), the location is a location designed for (e.g., having appropriate floor surface, mat, pool, walls, structures, etc.) a first type of exercise (e.g., swimming, rowing, meditation, yoga, lifting, kicking, walking, running, dancing, climbing, playing tennis, playing basketball, doing gymnastics, etc.), etc.) in order for the first criteria to be met, the computer system displays (12008) a second view (e.g., view 7408 in FIG. 7O(B), or another view, etc.) of the three-dimensional environment (e.g., an augmented reality view with more virtual elements corresponding to a first specific computer-generated experience corresponding to the current location, an augmented reality view showing a preview or start of a first computer-generated experience corresponding to the current location, an augmented reality view displayed with a higher-level of immersion (e.g., displaying user interface objects that are part of a first specific application experience (e.g., virtual hiking trails, virtual scenery, score boards, exercise statistics, controls of changing exercise parameters, etc.), that on aggregate occupy a substantial percentage (e.g., greater than 60%, greater than 90%, etc.) of the user's field of view or are displayed in a three-dimensional virtual or augmented reality environment, etc.), etc.), wherein the second view of the three-dimensional environment includes a first set of virtual content corresponding to the first type of exercise (e.g., virtual open water 7406 in FIG. 7O(B), other virtual content, etc.) (e.g., hiking trail scenery for a treadmill exercise program, a lake scene for a rowing machine exercise, an arena for kickboxing, a virtual cliff side for climbing wall exercise, a virtual tennis court for a virtual tennis game, and/or user interface controls, scores, statistics, etc. for the first type of exercise, etc.), wherein the first set of virtual content replaces at least a portion of a second representation of a second portion of the physical environment (e.g., the location of the user 7002 in FIG. 7O(A), another location, etc.) (e.g., the virtual content corresponding to the first type of exercise is displayed overlaying, blocking the view of, replacing display of, etc.) of the representation of the portion of the physical environment (e.g., the view of the actual equipment for the first type of exercise or the room designed for the first type of exercise, etc.) including the second location). In some embodiments, the above requirement is an only requirement for the first criteria to be met. In some embodiments, the above requirement is a requirement alternative to one or more other requirements in the first criteria that don't have to all be met in order for the first criteria to be met. In some embodiments, the above requirement is a requirement in addition to one or more other requirements in the first criteria that all have to be met in order for the first criteria to be met. In some embodiments, as an alternative condition (or an additional condition), the user has to perform an action associated with the exercise, for example starting a characteristic motion (e.g., starting to walk on a treadmill, step on an stair stepper, move legs back and forth on an elliptical, or start rowing on a rowing machine), or stepping onto/sitting down on a piece of exercise equipment), in order for the first criteria to be met. In the method 12000, in response to detecting the movement of the first user from the first location to the second location in accordance with a determination that the movement to the second location meets second criteria, different from the first criteria, wherein the second criteria include a second requirement that the second location corresponds to a location associated with a second type of exercise (e.g., the location has a second type of exercise equipment (e.g., rowing machines, stairs, treadmill, climbing wall, weight training machines, punching bags, etc.), the location is a location designed for (e.g., having appropriate floor surface, mat, pool, walls, structures, etc.) a second type of exercise (e.g., swimming, rowing, meditation, yoga, lifting, kicking, walking, running, dancing, climbing, playing tennis, playing basketball, doing gymnastics, etc.), etc.) in order for the second criteria to be met, wherein the second type of exercise is different from the first type of exercise, the computer system displays (12010) a third view (e.g., view 7410 in FIG. 7P(B), or another view, etc.) of the three-dimensional environment (e.g., an augmented reality view with more virtual elements corresponding to a second specific computer-generated experience corresponding to the current location, an augmented reality view showing a preview or start of a second computer-generated experience corresponding to the current location, an augmented reality view displayed with a higher-level of immersion (e.g., displaying user interface objects that are part of a second specific application experience (e.g., virtual hiking trails, virtual scenery, score boards, exercise statistics, controls of changing exercise parameters, etc.), that on aggregate occupy a substantial percentage (e.g., greater than 60%, greater than 90%, etc.) of the user's field of view or are displayed in a three-dimensional virtual or augmented reality environment, etc.), etc.), wherein the third view of the three-dimensional environment includes a second set of virtual content corresponding to the second type of exercise (e.g., hiking trail scenery for a treadmill exercise program, a lake scene for a rowing machine exercise, an arena for kickboxing, a virtual cliff side for climbing wall exercise, a virtual tennis court for a virtual tennis game, and/or user interface controls, scores, statistics, etc. for the second type of exercise, etc.), wherein the second set of virtual content is different from the first set of virtual content (e.g., a virtual hiking trail vs. a virtual lake scene; a virtual tennis court vs. a virtual boxing ring; a virtual meadow for medication vs. a virtual stage for dancing, etc.), and wherein the second set of virtual content (e.g., virtual hiking trail 7412 in FIG. 7P(B), other virtual content, etc.) replaces at least a portion of a third representation of a third portion of the physical environment (e.g., the virtual content corresponding to the second type of exercise is displayed overlaying, blocking the view of, replacing display of, etc. of the representation of the portion of the physical environment (e.g., the view of the actual equipment for the first type of exercise or the room designed for the first type of exercise, etc.)) that includes the second location (e.g., the location of the user 7002 in FIG. 7P(A), another location, etc.). In some embodiments, the above requirement is an only requirement for the first criteria to be met. In some embodiments, the above requirement is a requirement alternative to one or more other requirements in the first criteria that don't have to all be met in order for the first criteria to be met. In some embodiments, the above requirement is a requirement in addition to one or more other requirements in the first criteria that all have to be met in order for the first criteria to be met. In some embodiments, as an alternative condition (or an additional condition), the user has to perform an action associated with the exercise, for example starting a characteristic motion (e.g., starting to walk on a treadmill, step on an stair stepper, move legs back and forth on an elliptical, or start rowing on a rowing machine), or stepping onto/sitting down on a piece of exercise equipment), in order for the first criteria to be met. These features are illustrated in FIGS. 7N-7P, where when the user 7002 moves from location to location, depending on the current location of the user 7002, the computer system determines which type of exercise is associated with the current location of the user 7002. If the current location is associated with a first type of exercise (e.g., location that includes object 7404), the computer system displays virtual content 7408 (FIG. 7O) that corresponds to the first type of exercise (e.g., rowing, boating, etc.). If the current location is associated a second type of exercise (e.g., location that includes object 7402), the computer system displays virtual content 7410 (FIG. 7P) that corresponds to the second type of exercise (e.g., hiking, walking, etc.).

In some embodiments, the computer system determines that the second location corresponds to a location associated with the first type of exercise in accordance with detection of a first type of exercise equipment (e.g., object 7404 in FIG. 7O, other equipment, etc.) at the second location (e.g., detecting an RFID signal corresponding to the first type of exercise equipment at the second location, detecting an image of the first type of exercise equipment at the second location in a camera feed capturing the second location, detecting that the second location matches a registered location for the first type of exercise equipment, etc.) (e.g., the first type of exercise equipment is different from the second type of exercise equipment and does not correspond to the second type of exercise). The computer system determines that the second location corresponds to a location associated with the second type of exercise in accordance with detection of a second type of exercise equipment (e.g., object 7402 in FIG. 7P, other equipment, etc.) at the second location (e.g., detecting an RFID signal corresponding to the second type of exercise equipment at the second location, detecting an image of the second type of exercise equipment at the second location in a camera feed capturing the second location, detecting that the second location is a registered location for the second type of exercise equipment, etc.), wherein the second type of exercise equipment is different from the first type of exercise equipment and does not correspond to the first type of exercise. For example, when the first user walks to a location in front of a treadmill, the HMD displays a virtual hiking trail that blocks, replaces display of, or overlays the representation of the treadmill within the user's field of view provided via the first display generation component; and when the first user walks to a location in front of a rowing machine, the HMD displays a virtual lake scene that blocks, replaces display of, or overlays the representation of the rowing machine within the user's field of view provided via the first display generation component. In some embodiments, the virtual content that is provided by the first display generation component is automatically (e.g., without user inputs that specifically selects the virtual content or program using a user interface element or voice command) changed between reality view, different augmented reality views with different virtual scenes, and/or different virtual environments, etc., when the first user moves from location to location (e.g., from the entrance of the gym to in front of the treadmill, from in front of the treadmill to in front of the rowing machine, etc.).

Displaying a second view of the three-dimensional environment that includes a first set of virtual content corresponding to the first type of exercise, in accordance with a determination that the movement to the second location meets first criteria requiring that the second location corresponds to a location associated with a first type of exercise, wherein the computer system determines that the second location corresponds to a location associated with the first type of exercise in accordance with detection of a first type of exercise equipment at the second location, and displaying a third view of the three-dimensional environment includes a second set of virtual content, different from the first set of virtual content, corresponding to the second type of exercise, in accordance with a determination that the movement to the second location meets second criteria, different from the first criteria, requiring that the second location corresponds to a location associated with a second type of exercise, wherein the computer system determines that the second location corresponds to a location associated with the second type of exercise in accordance with detection of a second type of exercise equipment at the second location, displays the appropriate set of virtual content when a set of conditions has been met without requiring further user input (e.g., further user input to select the set of virtual content corresponding to the first or second type of exercise). Performing an operation when a set of conditions has been met without requiring further user input enhances the operability of the device, which, additionally, reduces power usage and improves battery life of the device by enabling the user to use the device more quickly and efficiently.

In some embodiments, displaying the second view (e.g., view 7408 in FIG. 7O, or view 7410 in FIG. 7P, another view, etc.) of the three-dimensional environment in response to detecting the movement of the first user from the first location to the second location in the physical environment includes gradually reducing the second representation of the second portion of the physical environment (e.g., a portion of the scene 105 that includes the object 7404 in FIG. 7O, and a portion of the scene 105 that includes the object 7402 in FIG. 7P, etc.) (e.g., ceasing display of more and more portions of the representation of the second portion of the physical environment, fading out the representation of the second portion of the physical environment, etc.), and gradually increasing a prominence of virtual content corresponding to the first type of exercise (e.g., starting to display the virtual content, increasing visibility of the virtual content, increasing a proportion of the field of view of the user occupied by the virtual content, increasing an opacity or brightness of the virtual content, etc.) in regions of the second view of the three-dimensional environment in which the second representation of the second portion of the physical environment has been gradually reduced. In some embodiments, displaying the third view of the three-dimensional environment in response to detecting the movement of the first user from the first location to the second location in the physical environment includes: gradually reducing the representation of the third portion of the physical environment (e.g., ceasing display of more and more portions of the representation of the third portion of the physical environment, fading out the representation of the third portion of the physical environment, etc.), and gradually increasing virtual content corresponding to the second type of exercise (e.g., displaying, increasing visibility of the virtual content, etc.) in regions of the third view of the three-dimensional environment in which the representation of the third portion of the physical environment has been gradually reduced. For example, in some embodiments, when the first user is standing in front of a treadmill and/or stepped onto the treadmill, the user's view of the physical environment (e.g., the hardware control panel of the treadmill, the wall in front of the user, the other exercise machines in the same room, etc.) is gradually altered, with more and more portions of the representation of the physical environment fading away and/or replaced with virtual content corresponding to the treadmill exercise (e.g., hiking trail scenery, virtual paved path around a virtual lake, etc.). Eventually, when the user starts walking on the treadmill, the entire field of view of the user is filled with the virtual scenery of the mountain trail or lakeside path. In some embodiments, the virtual content is a virtual three-dimensional environment, and the user can view different portions of the virtual three-dimensional environment by turning his/her head around, or up and down, while walking on the treadmill.

Gradually reducing the second representation of the second portion of the physical environment, and gradually increasing prominence of virtual content corresponding to the first type of exercise in regions of the second view of the three-dimensional environment in which the second representation of the second portion of the physical environment has been gradually reduced, provides improved visual feedback to the user (e.g., improved visual feedback that the computer system has detected the movement of the first user from the first location to the second location in the physical environment). Providing improved feedback enhances the operability of the device, which, additionally, reduces power usage and improves battery life of the device by enabling the user to use the device more quickly and efficiently.

In some embodiments, the first criteria include a third requirement that the movement of the first user from the first location to the second location is followed by a first predefined movement corresponding to the first type of exercise (e.g., sitting on the object 7404 in FIG. 7O, stepping on object 7402 in FIG. 7P) (e.g., starting a characteristic motion (e.g., starting to walk on a treadmill, stepping on an stair stepper, moving legs back and forth on an elliptical, or starting rowing on a rowing machine, etc.), stepping onto/sitting down on a piece of exercise equipment corresponding to the first type of exercise (e.g., sitting down on a rowing machine, or weight training machine, etc.), getting into a ready posture corresponding to the first type of exercise (e.g., standing in a ready posture for hitting a virtual tennis ball, sitting down on the floor to start meditation or yoga, etc.), etc.) in order for the first criteria to be met. In some embodiments, the second criteria include a fourth requirement that the movement of the first user from the first location to the second location is followed by a second predefined movement corresponding to the second type of exercise, wherein the second predefined movement is different from the first type of movement. In some embodiments, the second predefined movement is the same as the first predefined movement. For example, the predefined movement for starting a virtual environment for kickboxing is optionally the same as the predefined movement requirement for starting a virtual environment for boxing. For example, the predefined movement for starting a virtual environment for ballet is optionally different from the predefined movement requirement for starting a virtual environment for modern dance. In some embodiments, the computer system does not start to display the virtual content corresponding to the first type of exercise until the first predefined movement corresponding to the first type of exercise is detected, even if the first user is at the second location and the second location is a location corresponding to the first type of exercise. In some embodiments, the computer system displays a visual prompt for the first user to provide the first predefined movement to trigger display of the virtual content associated with the first type of exercise when the first user is detected at the second location and the second location is a location associated with the first type of exercise.

Displaying a second view of the three-dimensional environment that includes a first set of virtual content corresponding to the first type of exercise, in accordance with a determination that the movement to the second location meets first criteria, wherein the first criteria include a third requirement that the movement of the first user from the first location to the second location is followed by a first predefined movement corresponding to the first type of exercise, provides additional control options without cluttering the UI with additional displayed controls (e.g., additional displayed controls for displaying the first set of virtual content corresponding to the first type of exercise, additional displayed controls for forgoing display of the first set of virtual content corresponding to the first type of exercise, etc.). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the movement of the first user from the first location to the second location and in accordance with a determination that the movement to the second location meets third criteria, different from the first criteria and the second criteria, wherein the third criteria include a requirement that the second location corresponds to a location associated with a third type of exercise different from the first type of exercise and the second type of exercise (e.g., the second location optionally is associated with both the first type of exercise and the third type of exercise), and that the movement of the first user from the first location to the second location is followed by a third predefined movement corresponding to the third type of exercise (e.g., starting a characteristic motion (e.g., starting to walk on a treadmill, stepping on an stair stepper, moving legs back and forth on an elliptical, or starting rowing on a rowing machine, etc.), stepping onto/sitting down on a piece of exercise equipment corresponding to the respective type of exercise (e.g., sitting down on a rowing machine, or weight training machine, etc.), getting into a ready posture corresponding to the respective type of exercise (e.g., standing in a ready posture for hitting a virtual tennis ball, sitting down on the floor to start meditation or yoga, etc.), etc.) in order for the third criteria to be met, wherein the third predefined movement is different from the first predefined movement, the computer system displays a fourth view of the three-dimensional environment (e.g., an augmented reality view with more virtual elements corresponding to a third specific computer-generated experience corresponding to the current location, an augmented reality view showing a preview or start of a third computer-generated experience corresponding to the current location, an augmented reality view displayed with a higher-level of immersion (e.g., displaying user interface objects that are part of a third specific application experience (e.g., virtual hiking trails, virtual scenery, score boards, exercise statistics, controls of changing exercise parameters, etc.), that on aggregate occupy a substantial percentage (e.g., greater than 60%, greater than 90%, etc.) of the user's field of view or are displayed in a three-dimensional virtual or augmented reality environment, etc.), etc.). The fourth view of the three-dimensional environment includes a third set of virtual content corresponding to the third type of exercise (e.g., hiking trail scenery for a treadmill exercise program, a lake scene for a rowing machine exercise, an arena for kickboxing, a virtual cliff side for climbing wall exercise, a virtual tennis court for a virtual tennis game, and/or user interface controls, scores, statistics, etc. for the third type of exercise, etc.). The third set of virtual content is different from the first set of virtual content and the second set of virtual content, and wherein the third set of virtual content replaces at least a portion of the second representation of the second portion of the physical environment (e.g., the second location corresponds to both the first type of exercise and the third type of exercise, and whether the first set of virtual content or the third set of virtual content is displayed depends on whether the first predefined movement or the third predefined movement is detected while the first user is at the second location).

Displaying a fourth view of the three-dimensional environment that includes a third set of virtual content, different from the first set of virtual content and the second set of virtual content, corresponding to the third type of exercise, in accordance with a determination that the movement to the second location meets third criteria, different from the first criteria and the second criteria, requiring that the second location corresponds to a location associated with a third type of exercise different from the first type of exercise and the second type of exercise, and that the movement of the first user from the first location to the second location is followed by a third predefined movement, different from the first predefined movement, corresponding to the third type of exercise, provides additional control options without cluttering the UI with additional displayed controls (e.g., additional displayed controls for displaying the first set of virtual content corresponding to the first type of exercise, additional displayed controls for displaying the third set of virtual content corresponding to the third type of exercise, etc.). Providing additional control options without cluttering the UI with additional displayed controls enhances the operability of the device, which, additionally, reduces power usage and improves battery life of the device by enabling the user to use the device more quickly and efficiently.

In some embodiments, the computer system gradually increases an amount of virtual content displayed in a field of view of the first user (e.g., in the view shown in FIGS. 7O(B) and 7P(B), etc.) in accordance with at least one of a progress or duration of a predefined movement corresponding to a respective type of exercise (e.g., the first type of exercise, the second type of exercise, the third type of exercise, etc.) associated with the second location. For example, in some embodiments, the view of the real world gradually fades away and/or cease to be displayed, and is gradually replaced by virtual content corresponding to the respective type of exercise. In some embodiments, the computer system gradually increases the amount of virtual content displayed in the field of view of the first user until a respective virtual environment corresponding to the respective type of exercise is fully displayed via the first display generation component (e.g., the second view of the three-dimensional environment includes a virtual environment corresponding to the first type of exercise, the third view of the three-dimensional environment includes a virtual environment corresponding to the second type of exercise, etc.). For example, in some embodiments, when an open gym is a location that is associated with both yoga and dance, after the first user arrives at the open gym, if the first user sits down with a Namaste pose, the computer system displays a virtual ocean view with ocean sounds for the user to practice yoga on a virtual beach; and if the first user stands with a dancer pose, the computer system displays a virtual stage with dance music for the first user to practice a dance.

Gradually increasing an amount of virtual content displayed in a field of view of the first user in accordance with at least one of a progress or duration of a predefined movement corresponding to a respective type of exercise associated with the second location, provides improved visual feedback to the user (e.g., improved visual feedback regarding the progress or duration of the predefined movement corresponding to the respective type of exercise associated with the second location). Providing improved feedback enhances the operability of the device, which, additionally, reduces power usage and improves battery life of the device by enabling the user to use the device more quickly and efficiently.

In some embodiments, while displaying a respective view of the three-dimensional environment (e.g., augmented reality view, virtual reality view, etc.) that corresponds to a respective type of exercise (e.g., the first type of exercise, the second type of exercise, the third type of exercise, etc.) associated with the second location, the computer system detects movement of the first user that corresponds to a request to end the respective type of exercise associated with the second location (e.g., detecting the first user stopping the respective type of exercise, standing up, getting off the equipment, taking off the HMD, and/or walking away from the second location, etc.). In response to detecting the movement of the first user that corresponds to a request to end the respective type of exercise associated with the second location, the computer system detects a fifth view of the three-dimensional environment that includes a representation of at least a fourth portion of the physical environment, wherein the representation of at least the fourth portion of the physical environment occupies a portion of the field of view of the first user in which a respective set of virtual content that corresponds to the respective type of exercise had been displayed while the first user was at the second location. For example, when the movement of the first user that corresponds to the request to end the current exercise is detected, the virtual scene corresponding to the current exercise ceases to be displayed (e.g., fade away, or cease to be displayed immediately, etc.) revealing the representation of the physical environment again. In some embodiments, when the user 7002 moves away from the object 7404 and have not reached the object 7402 in the scene 105, neither view 7408 nor view 7410 in FIGS. 7O and 7P are displayed, and a representation of the physical environment such as that shown in FIG. 7N is displayed.

Displaying a fifth view of the three-dimensional environment that includes a representation of at least a fourth portion of the physical environment, wherein the representation of at least the fourth portion of the physical environment occupies a portion of the field of view of the first user in which a respective set of virtual content that corresponds to the respective type of exercise had been displayed while the first user was at the second location, in response to detecting the movement of the first user that corresponds to a request to end the respective type of exercise associated with the second location, displays the fifth view of the three-dimensional environment when a set of conditions has been met without requiring further user input (e.g., further user input to display the fifth view of the three-dimensional environment). Performing an operation when a set of conditions has been met without requiring further user input enhances the operability of the device, which, additionally, reduces power usage and improves battery life of the device by enabling the user to use the device more quickly and efficiently.

In some embodiments, the computer system displays status information (e.g., progress, duration, speed, force, height, pace, stride length, performance level, scores, number of repetitions completed, etc. during the current session, historic statistics, average statistics for the first user and/or across multiple users, status of others also performing the same type of exercise, etc.) corresponding to the first type of exercise when the second view (e.g., view 7408 in FIG. 7O, view 7410 in FIG. 7P, another view, etc.) of the three-dimensional environment is displayed. In some embodiments, the status information corresponding to the first type of exercise is overlaid on a portion of the virtual scene corresponding to the first type of exercise. In some embodiments, the status information is displayed in response to a request of the first user that is detected while the virtual scene corresponding to the first type of exercise is displayed without the status information. In some embodiments, the second view of the three-dimensional environment evolves throughout the performance of the first type of exercise by the first user. In some embodiments, the status information is continuously updated throughout the performance of the first type of exercise by the first user (e.g., overlaying the changing second view of the three-dimensional environment). In some embodiments, the status information is displayed in response to detecting that values of one or more performance parameters have met preset threshold values (e.g., a target speed or distance is achieved, a threshold score is reached, etc.).

Displaying status information corresponding to the first type of exercise when the second view of the three-dimensional environment is displayed provides improved visual feedback to the user (e.g., improved visual feedback regarding the first type of exercise, improved visual feedback that the movement of the user to the second position satisfies the first criteria, improved visual feedback that the computer system is displaying the second view of the three-dimensional environment, etc.). Providing improved feedback enhances the operability of the device, which, additionally, reduces power usage and improves battery life of the device by enabling the user to use the device more quickly and efficiently. In some embodiments, the computer system displays health information (e.g., real-time biometric data (e.g., heart rate, blood pressure, breathing rate, body temperature, blood sugar level, etc.), weight, BMI, etc.) corresponding to the first user when the second view (e.g., view 7408 in FIG. 7O, view 7410 in FIG. 7P, another view, etc.) of the three-dimensional environment is displayed. In some embodiments, the health information corresponding to the first user is overlaid on a portion of the virtual scene corresponding to the first type of exercise. In some embodiments, the health information is displayed in response to a request of the first user that is detected while the virtual scene corresponding to the first type of exercise is displayed without the health information. In some embodiments, the second view of the three-dimensional environment evolves throughout the performance of the first type of exercise by the first user. In some embodiments, the health information is continuously updated throughout the performance of the first type of exercise by the first user (e.g., overlaying the changing second view of the three-dimensional environment). In some embodiments, the health information is displayed in response to detecting that values of one or more health parameters have met preset threshold values (e.g., a target heart rate is achieve, a threshold blood pressure is reached, etc.).

Displaying health information corresponding to the first user when the second view of the three-dimensional environment is displayed provides improved visual feedback to the user (e.g., improved visual feedback related to the first type of exercise, improved visual feedback that the movement of the user to the second position satisfies the first criteria, improved visual feedback that the computer system is displaying the second view of the three-dimensional environment, etc.). Providing improved feedback enhances the operability of the device, which, additionally, reduces power usage and improves battery life of the device by enabling the user to use the device more quickly and efficiently.

In some embodiments, the computer system visually presents progress information (e.g., real-time scores, laps completed, laps remaining, duration, number of steps, distance traveled, poses completed, etc.) of the first type of exercise that is performed by the first user when the second view (e.g., view 7408 in FIG. 7O, view 7410 in FIG. 7P, another view, etc.) of the three-dimensional environment is displayed. In some embodiments, the progress information is visually represented by the visual changes occurring in the virtual scene that is presented to the first user (e.g., virtual milestones on a virtual hiking trail, number of virtual shooting targets that are shown in the down position, score boards as part of the virtual game arena, the stillness of the water on a virtual lake represents the level of deep mediation that is achieved, etc.). In some embodiments, the progress information corresponding to the performance of the first type of exercise by the first user is overlaid on a portion of the virtual scene corresponding to the first type of exercise. In some embodiments, the progress information is displayed in response to a request of the first user that is detected while the virtual scene corresponding to the first type of exercise is displayed without the progress information. In some embodiments, the second view of the three-dimensional environment evolves throughout the performance of the first type of exercise by the first user. In some embodiments, the progress information is continuously updated throughout the performance of the first type of exercise by the first user (e.g., overlaying the changing second view of the three-dimensional environment). In some embodiments, the progress information is displayed in response to detecting that values of one or more progress parameters have met preset threshold values (e.g., a target distance is achieve, a threshold score is reached, an exercise routine is completed, etc.).

Visually presenting progress information of the first type of exercise that is performed by the first user when the second view of the three-dimensional environment is displayed provides improved visual feedback to the user (e.g., improved visual feedback related to progress information of the first type of exercise). Providing improved feedback enhances the operability of the device, which, additionally, reduces power usage and improves battery life of the device by enabling the user to use the device more quickly and efficiently.

In some embodiments, in accordance with a determination that the first user is facing a first direction in the physical environment, the computer system displays a first subset of the first set of virtual content corresponding to the first type of exercise without displaying a second subset of the first set of virtual content, and in accordance with a determination that the first user is facing a second direction in the physical environment different from the first direction (e.g., opposite from the first direction, at a non-zero angle from the first direction, etc.), the computer system displays the second subset of the first set of virtual content (e.g., virtual open water 7406 not shown in view 7408 in FIG. 7O, virtual mountain trail 7412 not shown in view 7410 in FIG. 7P, etc.) corresponding to the first type of exercise without displaying the second subset of the first set of virtual. For example, in some embodiments, the second view of the three-dimensional environment is an immersive view with virtual objects in directions all around the first user (e.g., spanning an angle that is wider than the user's field of view, so when the user turns his/her head around, he/she sees different portions of the virtual environment). In some embodiments, the computer system outputs sound effects using an immersive audio output mode, such as a surround sound mode, or spatial audio mode that provide localized sound at positions corresponding to sound producing virtual objects (e.g., cheering crowds, ocean waves, a virtual coach, etc.) in the virtual environment.

Displaying a first subset of the first set of virtual content corresponding to the first type of exercise without displaying a second subset of the first set of virtual content in accordance with a determination that the first user is facing a first direction in the physical environment, and displaying the second subset of the first set of virtual content corresponding to the first type of exercise without displaying the second subset of the first set of virtual in accordance with a determination that the first user is a second direction in the physical environment different from the first direction, displays an appropriate subset of the first set of virtual content corresponding to the first type of exercise when a set of conditions has been met without requiring further user input (e.g., further user input to navigate through the first set of virtual content corresponding to the first type of exercise). Performing an operation when a set of conditions has been met without requiring further user input enhances the operability of the device, which, additionally, reduces power usage and improves battery life of the device by enabling the user to use the device more quickly and efficiently.

In some embodiments, the first type of exercise is a rowing exercise, the second location is a location with a piece of rowing exercise equipment (e.g., object 7404, other rowing equipment, etc.) present, and the second view (e.g., view 7408 in FIG. 7O) of the three-dimensional environment includes a virtual scene with open water (e.g., virtual open water 7406 in FIG. 7O). In some embodiments, the first criteria further includes a requirement that the first user sits down in the rowing exercise equipment and puts his/her hands on the ores of the rowing exercise equipment (e.g., as shown in FIG. 7O(A)) in order for the first criteria to be met. In some embodiments, the second type of exercise is a walking exercise, and the second location is a location with a treadmill (e.g., object 7402, or other walking equipment, etc.), and the third view (e.g., view 7410 in FIG. 7P) of the three-dimensional environment includes a virtual scene showing an outdoor walking path (e.g., virtual trail 7412 in FIG. 7P) (e.g., a hiking trail, a lake side path, a city street, etc.). In some embodiments, the second criteria further includes a requirement that the first user steps onto the treadmill and takes at least one step. Displaying a second view of the three-dimensional environment that includes a virtual scene with open water, wherein the first type of exercise is a rowing exercise and the second location is a location with a rowing exercise equipment present, provides improved visual feedback to the user (e.g., improved visual feedback that the first type of exercise is a rowing exercise, improved visual feedback that rowing exercise equipment is present at the second location, etc.). Providing improved feedback enhances the operability of the device, which, additionally, reduces power usage and improves battery life of the device by enabling the user to use the device more quickly and efficiently.

In some embodiments, in response to detecting the movement of the first user (e.g., 7002 in FIGS. 7O-7P) from the first location to the second location: in accordance with a determination that the second location corresponds to a location associated with a fifth type of exercise and a sixth type of exercise: in accordance with a determination that the movement of the first user from the first location to the second location is followed by engagement with a respective type of equipment associated with the fifth type of exercise by the first user at the second location, the computer system displays a sixth view of the three-dimensional environment, wherein the sixth view of the three-dimensional environment includes a fifth set of virtual content corresponding to the fifth type of exercise (e.g., volleyball, tennis, elliptical machine, etc.), wherein the fifth set of virtual content is different from the first set of virtual content and the second set of virtual content, and wherein the fifth set of virtual content replaces at least a portion of a fifth representation of a fifth portion of the physical environment. In some embodiments, in response to detecting the movement of the first user from the first location to the second location: in accordance with a determination that the movement of the first user from the first location to the second location is followed by engagement with a respective type of equipment associated with the sixth type of exercise by the first user at the second location, the computer system displays a seventh view of the three-dimensional environment, wherein the seventh view of the three-dimensional environment includes a sixth set of virtual content corresponding to the sixth type of exercise (e.g., basketball, fencing, exercise bike, etc.), wherein the sixth set of virtual content is different from the first set of virtual content, the second set of virtual content, and the fifth set of virtual content, and wherein the sixth set of virtual content replaces at least a portion of the fifth representation of the fifth portion of the physical environment (e.g., the fifth portion of the physical environment is associated with both the fifth type of exercise and the sixth type of exercise). This is illustrated in FIGS. 7O and 7P, where when the user 7002 moves from one location that includes the object 7404 that corresponds to a first type of exercise (e.g., rowing, boating, etc.) to another location that includes the object 7402 that corresponds to a second type of exercise (e.g., hiking, walking, etc.), the virtual content (e.g., virtual open water 7406, or other virtual content, etc.) in the view 7408 is replaced with the virtual content (e.g., hiking trail 7412, or other virtual content, etc.) in the view 7410, in accordance with some embodiments.

Displaying a sixth view of the three-dimensional environment, wherein the sixth view of the three-dimensional environment includes a fifth set of virtual content corresponding to the fifth type of exercise, in accordance with a determination that the movement of the first user from the first location to the second location is followed by engagement with a respective type of equipment associated with the fifth type of exercise by the first user at the second location, and displaying a seventh view of the three-dimensional environment, wherein the seventh view of the three-dimensional environment includes a sixth set of virtual content corresponding to the sixth type of exercise, in accordance with a determination that the movement of the first user from the first location to the second location is followed by engagement with a respective type of equipment associated with the sixth type of exercise by the first user at the second location, displays an appropriate view of the three-dimensional environment with a respective set of virtual content corresponding to the respective type of exercise when a set of conditions has been met without requiring further user input (e.g., further user input to select or navigate between views of the three-dimensional environment and/or sets of virtual content corresponding to respective types of exercises). Performing an operation when a set of conditions has been met without requiring further user input enhances the operability of the device, which, additionally, reduces power usage and improves battery life of the device by enabling the user to use the device more quickly and efficiently.

In some embodiments, the second view (e.g., view 7408, view 7410, etc. in FIGS. 7O-7P) of the three-dimensional environment includes a virtual representation of the first user (e.g., user 7002 in FIGS. 7N-7P, or another user, etc.) that is shown to perform the first type of exercise (e.g., based on previous best records of the first user, based on a preset configuration of the first user for the first type of exercise, etc.) in competition with the first user. In some embodiments, the third view of the three-dimensional environment includes a virtual representation of the first user that is shown to perform the second type of exercise (e.g., based on previous best records of the first user, based on a preset configuration of the first user for the second type of exercise, etc.) in competition with the first user. Displaying the second view of the three-dimensional environment, including a virtual representation of the first user that is shown to perform the first type of exercise in competition with the first user, provides improved visual feedback to the user (e.g., improved visual feedback regarding the first type of exercise, improved visual feedback regarding characteristics of the first user's performance of the first type of exercise, etc.). Providing improved feedback enhances the operability of the device, which, additionally, reduces power usage and improves battery life of the device by enabling the user to use the device more quickly and efficiently.

In some embodiments, the second view (e.g., view 7408, view 7410 in FIGS. 7O-7P, etc.) of the three-dimensional environment includes a virtual representation of at least a second user different from the first user (e.g., user 7002 in FIGS. 7N-7P, or another user, etc.) that is shown to perform the first type of exercise in competition with the first user. In some embodiments, the third view of the three-dimensional environment includes a virtual representation of at least a second user different from the first user that is shown to perform the second type of exercise in competition with the first user. Displaying the second view of the three-dimensional environment, including a virtual representation of at least a second user different from the first user that is shown to perform the first type of exercise in competition with the first user, provides improved visual feedback to the user (e.g., improved visual feedback that at least the second user is also performing the first type of exercise, improved visual feedback regarding the user's performance of the first type of exercise relative to the second user's performance of the first type of exercise, etc.). Providing improved feedback enhances the operability of the device, which, additionally, reduces power usage and improves battery life of the device by enabling the user to use the device more quickly and efficiently.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, and 11000) are also applicable in an analogous manner to method 12000 described above with respect to FIG. 12. For example, the gestures, gaze inputs, physical objects, user interface objects, controls, movements, criteria, three-dimensional environment, display generation component, surface, representation of physical object, virtual objects, and/or animations described above with reference to method 12000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, and 11000). For brevity, these details are not repeated here.

The operations described above with reference to FIGS. 8, 9A-9B, 10, 11, and 12 are, optionally, implemented by components depicted in FIGS. 1-6. In some embodiments, aspects/operations of methods 8000, 9000, 10000, 11000, and 12000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at a computer system that is in communication with a first display generation component and one or more first input devices:
displaying a first computer-generated experience that includes displaying one or more virtual elements in a three-dimensional environment with a first appearance;
while displaying the one or more virtual elements in the three-dimensional environment with the first appearance, receiving biometric data corresponding to respiration of a first user; and
in response to receiving the biometric data corresponding to the respiration of the first user:
in accordance with a determination that the biometric data corresponding to the respiration of the first user meets first criteria, displaying the one or more virtual elements in the three-dimensional environment with a second appearance that is different from the first appearance; and
in accordance with a determination that the biometric data corresponding to the first user does not meet the first criteria, continuing to display the one or more virtual elements in the three-dimensional environment with the first appearance.

2. The method of claim 1, including:
while displaying the one or more virtual elements in the three-dimensional environment with the second appearance, receiving first updated biometric data corresponding to updated respiration of the first user; and
in response to receiving the first updated biometric data corresponding to the updated respiration of the first user:
in accordance with a determination that the first updated biometric data corresponding to the updated respiration of the first user meets second criteria different from the first criteria, displaying the one or more virtual elements with a third appearance that is different from the second appearance; and
in accordance with a determination that the first updated biometric data corresponding to the updated respiration of the first user meets the first criteria and does not meet the second criteria, continuing to display the one or more virtual elements with the second appearance.

3. The method of claim 1, including:
while displaying the one or more virtual elements with a respective appearance of at least the second appearance and a third appearance different from the second appearance, receiving updated biometric data corresponding to updated respiration of the first user, wherein the respective appearance is different from the first appearance; and
in response to receiving the updated biometric data corresponding to updated respiration of the first user:
in accordance with a determination that the updated biometric data corresponding to the updated respiration of the first user does not meet respective criteria that were met to transition into displaying the one or more virtual elements in the three-dimensional environment with the respective appearance, displaying the one or more virtual elements with a respective appearance of the one or more virtual elements that is used prior to displaying the one or more virtual elements in the three-dimensional environment with the respective appearance.

4. The method of claim 1, wherein the biometric data includes a respiration rate of the first user and the first criteria include a criterion that is met when the respiration rate of the first user is below a first threshold respiration rate in order for the first criteria to be met.

5. The method of claim 1, wherein the first criteria include a requirement that the biometric data satisfy one or more preset threshold values for at least a threshold amount of time in order for the first criteria to be met.

6. The method of claim 1, wherein:
displaying the one or more virtual elements in the three-dimensional environment with the first appearance includes displaying virtual content at respective first positions that correspond to locations of one or more first portions of a physical environment, while maintaining display of a representation of one or more second portions of the physical environment; and
displaying the one or more virtual elements in the three-dimensional environment with the second appearance includes displaying virtual content at the respective first positions that correspond to the locations of the one or more first portions of the physical environment and at respective second positions that correspond to at least some of the one or more second portions of the physical environment.

7. The method of claim 1, including:
in response to receiving the biometric data corresponding to the respiration of the first user and in accordance with a determination that a change in the biometric data corresponding to the respiration of the first user is progressing toward meeting the first criteria:
gradually reducing visual emphasis of at least a portion of a representation of a physical environment that had been visible via the first display generation component while the one or more virtual elements are displayed with the first appearance, wherein displaying the one or more virtual elements in the three-dimensional environment with the second appearance includes displaying virtual content of the first computer-generated experience at a position corresponding to the portion of the representation of the physical environment such that the portion of the representation of the physical environment ceases to be visible via the first display generation component.

8. The method of claim 1, including:
in response to receiving the biometric data corresponding to the respiration of the first user and in accordance with a determination that a change in the biometric data corresponding to the respiration of the first user is progressing toward meeting the first criteria:
changing a visual property of at least a portion of a representation of a physical environment that had been visible via the first display generation component while the one or more virtual elements are displayed with the first appearance in the three-dimensional environment by an amount that corresponds to the change in the biometric data corresponding to the respiration of the first user.

9. The method of claim 1, including:
in response to receiving the biometric data corresponding to the respiration of the first user and in accordance with a determination that a change in the biometric data corresponding to the respiration of the first user is progressing toward meeting the first criteria:
expanding display of virtual content onto at least a portion of a representation of a physical environment that had been visible via the first display generation component while the one or more virtual elements were displayed with the first appearance, by an amount that corresponds to the change in the biometric data corresponding to the respiration of the first user.

10. The method of claim 1, wherein the first criteria include a criterion that the first user makes less than a threshold amount of movement of a first type when the biometric data is being received in order for the first criteria to be met.

11. The method of claim 1, including:
while displaying the first computer-generated experience including displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, redisplaying the one or more virtual elements with the first appearance.

12. The method of claim 1, including:
while displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, switching from displaying the one or more virtual elements with the second appearance with a first viewpoint to displaying the one or more virtual elements with the second appearance with a second viewpoint different from the first viewpoint.

13. The method of claim 1, wherein a transition from displaying the one or more virtual elements in the three-dimensional environment with the first appearance to displaying the one or more virtual elements in the three-dimensional environment with the second appearance is a discrete transition that is made at a point in time that corresponds to a time that the first criteria are met.

14. The method of claim 1, wherein the first computer-generated experience displayed with the one or more virtual elements having the first appearance depicts a first virtual environment and the first computer-generated experience displayed with the one or more virtual elements having the second appearance depicts a second virtual environment that has more virtual depth than the first virtual environment.

15. The method of claim 1, wherein:
displaying the one or more virtual elements in the three-dimensional environment with the first appearance includes displaying the first computer-generated experience with at least a first visual characteristic that changes in accordance with a change in the biometric data received while displaying the one or more virtual elements with the first appearance; and
displaying the one or more virtual elements in the three-dimensional environment with the second appearance includes displaying the first computer-generated experience with at least a second visual characteristic that changes in accordance with a change in the biometric data received while displaying the one or more virtual elements with the second appearance.

16. The method of claim 1, including:
in response to receiving the biometric data corresponding to the respiration of the first user:
in accordance with a determination that the biometric data corresponding to the respiration of the first user meets the first criteria, changing an audio output mode from a first audio output mode to a second audio output mode, wherein the first audio output mode has fewer computationally-controlled variables than the second audio output mode.

17. A computer system, comprising:
a first display generation component;
one or more input devices;
one or more processors; and
memory storing one or more programs, wherein the one or more programs are configured to be executed by the one or more processors, the one or more programs including instructions for:
displaying a first computer-generated experience that includes displaying one or more virtual elements in a three-dimensional environment with a first appearance;
while displaying the one or more virtual elements in the three-dimensional environment with the first appearance, receiving biometric data corresponding to respiration of a first user; and
in response to receiving the biometric data corresponding to the respiration of the first user:
in accordance with a determination that the biometric data corresponding to the respiration of the first user meets first criteria, displaying the one or more virtual elements in the three-dimensional environment with a second appearance that is different from the first appearance; and
in accordance with a determination that the biometric data corresponding to the respiration of the first user does not meet the first criteria, continuing to display the one or more virtual elements with the first appearance.

18. The computer system of claim 17, wherein the one or more programs include instructions for:
while displaying the one or more virtual elements in the three-dimensional environment with the second appearance, receiving first updated biometric data corresponding to updated respiration of the first user; and
in response to receiving the first updated biometric data corresponding to the updated respiration of the first user:
in accordance with a determination that the first updated biometric data corresponding to the updated respiration of the first user meets second criteria different from the first criteria, displaying the one or more virtual elements with a third appearance that is different from the second appearance; and
in accordance with a determination that the first updated biometric data corresponding to the updated respiration of the first user meets the first criteria and does not meet the second criteria, continuing to display the one or more virtual elements with the second appearance.

19. The computer system of claim 17, wherein the one or more programs include instructions for:
while displaying the one or more virtual elements with a respective appearance of at least the second appearance and a third appearance different from the second appearance, receiving updated biometric data corresponding to updated respiration of the first user, wherein the respective appearance is different from the first appearance; and
in response to receiving the updated biometric data corresponding to updated respiration of the first user:
in accordance with a determination that the updated biometric data corresponding to the updated respiration of the first user does not meet respective criteria that were met to transition into displaying the one or more virtual elements in the three-dimensional environment with the respective appearance, displaying the one or more virtual elements with a respective appearance of the one or more virtual elements that is used prior to displaying the one or more virtual elements in the three-dimensional environment with the respective appearance.

20. The computer system of claim 17, wherein the biometric data includes a respiration rate of the first user and the first criteria include a criterion that is met when the respiration rate of the first user is below a first threshold respiration rate in order for the first criteria to be met.

21. The computer system of claim 17, wherein the first criteria include a requirement that the biometric data satisfy one or more preset threshold values for at least a threshold amount of time in order for the first criteria to be met.

22. The computer system of claim 17, wherein:
displaying the one or more virtual elements in the three-dimensional environment with the first appearance includes displaying virtual content at respective first positions that correspond to locations of one or more first portions of a physical environment, while maintaining display of a representation of one or more second portions of the physical environment; and
displaying the one or more virtual elements in the three-dimensional environment with the second appearance includes displaying virtual content at the respective first positions that correspond to the locations of the one or more first portions of the physical environment and at respective second positions that correspond to at least some of the one or more second portions of the physical environment.

23. The computer system of claim 17, wherein the one or more programs include instructions for:
in response to receiving the biometric data corresponding to the respiration of the first user and in accordance with a determination that a change in the biometric data corresponding to the respiration of the first user is progressing toward meeting the first criteria:
gradually reducing visual emphasis of at least a portion of a representation of a physical environment that had been visible via the first display generation component while the one or more virtual elements are displayed with the first appearance, wherein displaying the one or more virtual elements in the three-dimensional environment with the second appearance includes displaying virtual content of the first computer-generated experience at a position corresponding to the portion of the representation of the physical environment such that the portion of the representation of the physical environment ceases to be visible via the first display generation component.

24. The computer system of claim 17, wherein the one or more programs include instructions for:
in response to receiving the biometric data corresponding to the respiration of the first user and in accordance with a determination that a change in the biometric data corresponding to the respiration of the first user is progressing toward meeting the first criteria:
changing a visual property of at least a portion of a representation of a physical environment that had been visible via the first display generation component while the one or more virtual elements are displayed with the first appearance in the three-dimensional environment by an amount that corresponds to the change in the biometric data corresponding to the respiration of the first user.

25. The computer system of claim 17, wherein the one or more programs include instructions for:
in response to receiving the biometric data corresponding to the respiration of the first user and in accordance with a determination that a change in the biometric data corresponding to the respiration of the first user is progressing toward meeting the first criteria:
expanding display of virtual content onto at least a portion of a representation of a physical environment that had been visible via the first display generation component while the one or more virtual elements were displayed with the first appearance, by an amount that corresponds to the change in the biometric data corresponding to the respiration of the first user.

26. The computer system of claim 17, wherein the first criteria include a criterion that the first user makes less than a threshold amount of movement of a first type when the biometric data is being received in order for the first criteria to be met.

27. The computer system of claim 17, wherein the one or more programs include instructions for:
while displaying the first computer-generated experience including displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, redisplaying the one or more virtual elements with the first appearance.

28. The computer system of claim 17, wherein the one or more programs include instructions for:
while displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, switching from displaying the one or more virtual elements with the second appearance with a first viewpoint to displaying the one or more virtual elements with the second appearance with a second viewpoint different from the first viewpoint.

29. The computer system of claim 17, wherein a transition from displaying the one or more virtual elements in the three-dimensional environment with the first appearance to displaying the one or more virtual elements in the three-dimensional environment with the second appearance is a discrete transition that is made at a point in time that corresponds to a time that the first criteria are met.

30. The computer system of claim 17, wherein the first computer-generated experience displayed with the one or more virtual elements having the first appearance depicts a first virtual environment and the first computer-generated experience displayed with the one or more virtual elements having the second appearance depicts a second virtual environment that has more virtual depth than the first virtual environment.

31. The computer system of claim 17, wherein:
displaying the one or more virtual elements in the three-dimensional environment with the first appearance includes displaying the first computer-generated experience with at least a first visual characteristic that changes in accordance with a change in the biometric data received while displaying the one or more virtual elements with the first appearance; and
displaying the one or more virtual elements in the three-dimensional environment with the second appearance includes displaying the first computer-generated experience with at least a second visual characteristic that changes in accordance with a change in the biometric data received while displaying the one or more virtual elements with the second appearance.

32. The computer system of claim 17, wherein the one or more programs include instructions for:
in response to receiving the biometric data corresponding to the respiration of the first user:
in accordance with a determination that the biometric data corresponding to the respiration of the first user meets the first criteria, changing an audio output mode from a first audio output mode to a second audio output mode, wherein the first audio output mode has fewer computationally-controlled variables than the second audio output mode.

33. A non-transitory computer readable storage medium storing one or more programs, the one or more programs comprising instructions that, when executed by a computer system that includes a first display generation component and one or more input devices, cause the computer system to perform operations, including:
displaying a first computer-generated experience that includes displaying one or more virtual elements in a three-dimensional environment with a first appearance;
while displaying the one or more virtual elements in the three-dimensional environment with the first appearance, receiving biometric data corresponding to respiration of a first user; and
in response to receiving the biometric data corresponding to the respiration of the first user:
in accordance with a determination that the biometric data corresponding to the respiration of the first user meets first criteria, displaying the one or more virtual elements in the three-dimensional environment with a second appearance that is different from the first appearance; and
in accordance with a determination that the biometric data corresponding to the respiration of the first user does not meet the first criteria, continuing to display the one or more virtual elements with the first appearance.

34. The non-transitory computer readable storage medium of claim 33, wherein the one or more programs include instructions that, when executed by the computer system, cause the computer system to perform operations, including:
while displaying the one or more virtual elements in the three-dimensional environment with the second appearance, receiving first updated biometric data corresponding to updated respiration of the first user; and
in response to receiving the first updated biometric data corresponding to the updated respiration of the first user:
in accordance with a determination that the first updated biometric data corresponding to the updated respiration of the first user meets second criteria different from the first criteria, displaying the one or more virtual elements with a third appearance that is different from the second appearance; and
in accordance with a determination that the first updated biometric data corresponding to the updated respiration of the first user meets the first criteria and does not meet the second criteria, continuing to display the one or more virtual elements with the second appearance.

35. The non-transitory computer readable storage medium of claim 33, wherein the one or more programs include instructions that, when executed by the computer system, cause the computer system to perform operations, including:
while displaying the one or more virtual elements with a respective appearance of at least the second appearance and a third appearance different from the second appearance, receiving updated biometric data corresponding to updated respiration of the first user, wherein the respective appearance is different from the first appearance; and
in response to receiving the updated biometric data corresponding to updated respiration of the first user:
in accordance with a determination that the updated biometric data corresponding to the updated respiration of the first user does not meet respective criteria that were met to transition into displaying the one or more virtual elements in the three-dimensional environment with the respective appearance, displaying the one or more virtual elements with a respective appearance of the one or more virtual elements that is used prior to displaying the one or more virtual elements in the three-dimensional environment with the respective appearance.

36. The non-transitory computer readable storage medium of claim 33, wherein the biometric data includes a respiration rate of the first user and the first criteria include a criterion that is met when the respiration rate of the first user is below a first threshold respiration rate in order for the first criteria to be met.

37. The non-transitory computer readable storage medium of claim 33, wherein the first criteria include a requirement that the biometric data satisfy one or more preset threshold values for at least a threshold amount of time in order for the first criteria to be met.

38. The non-transitory computer readable storage medium of claim 33, wherein:
displaying the one or more virtual elements in the three-dimensional environment with the first appearance includes displaying virtual content at respective first positions that correspond to locations of one or more first portions of a physical environment, while maintaining display of a representation of one or more second portions of the physical environment; and
displaying the one or more virtual elements in the three-dimensional environment with the second appearance includes displaying virtual content at the respective first positions that correspond to the locations of the one or more first portions of the physical environment and at respective second positions that correspond to at least some of the one or more second portions of the physical environment.

39. The non-transitory computer readable storage medium of claim 33, wherein the one or more programs include instructions that, when executed by the computer system, cause the computer system to perform operations, including:
in response to receiving the biometric data corresponding to the respiration of the first user and in accordance with a determination that a change in the biometric data corresponding to the respiration of the first user is progressing toward meeting the first criteria:
gradually reducing visual emphasis of at least a portion of a representation of a physical environment that had been visible via the first display generation component while the one or more virtual elements are displayed with the first appearance, wherein displaying the one or more virtual elements in the three-dimensional environment with the second appearance includes displaying virtual content of the first computer-generated experience at a position corresponding to the portion of the representation of the physical environment such that the portion of the representation of the physical environment ceases to be visible via the first display generation component.

40. The non-transitory computer readable storage medium of claim 33, wherein the one or more programs include instructions that, when executed by the computer system, cause the computer system to perform operations, including:
in response to receiving the biometric data corresponding to the respiration of the first user and in accordance with a determination that a change in the biometric data corresponding to the respiration of the first user is progressing toward meeting the first criteria:
changing a visual property of at least a portion of a representation of a physical environment that had been visible via the first display generation component while the one or more virtual elements are displayed with the first appearance in the three-dimensional environment by an amount that corresponds to the change in the biometric data corresponding to the respiration of the first user.

41. The non-transitory computer readable storage medium of claim 33, wherein the one or more programs include instructions that, when executed by the computer system, cause the computer system to perform operations, including:
in response to receiving the biometric data corresponding to the respiration of the first user and in accordance with a determination that a change in the biometric data corresponding to the respiration of the first user is progressing toward meeting the first criteria:
expanding display of virtual content onto at least a portion of a representation of a physical environment that had been visible via the first display generation component while the one or more virtual elements were displayed with the first appearance, by an amount that corresponds to the change in the biometric data corresponding to the respiration of the first user.

42. The non-transitory computer readable storage medium of claim 33, wherein the first criteria include a criterion that the first user makes less than a threshold amount of movement of a first type when the biometric data is being received in order for the first criteria to be met.

43. The non-transitory computer readable storage medium of claim 33, wherein the one or more programs include instructions that, when executed by the computer system, cause the computer system to perform operations, including:
while displaying the first computer-generated experience including displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, redisplaying the one or more virtual elements with the first appearance.

44. The non-transitory computer readable storage medium of claim 33, wherein the one or more programs include instructions that, when executed by the computer system, cause the computer system to perform operations, including:
while displaying the one or more virtual elements with the second appearance, detecting movement of a first type being performed by the first user; and
in response to detecting the movement of the first type being performed by the first user:
in accordance with a determination that the movement of the first type exceeds a preset threshold amount of movement, switching from displaying the one or more virtual elements with the second appearance with a first viewpoint to displaying the one or more virtual elements with the second appearance with a second viewpoint different from the first viewpoint.

45. The non-transitory computer readable storage medium of claim 33, wherein a transition from displaying the one or more virtual elements in the three-dimensional environment with the first appearance to displaying the one or more virtual elements in the three-dimensional environment with the second appearance is a discrete transition that is made at a point in time that corresponds to a time that the first criteria are met.

46. The non-transitory computer readable storage medium of claim 33, wherein the first computer-generated experience displayed with the one or more virtual elements having the first appearance depicts a first virtual environment and the first computer-generated experience displayed with the one or more virtual elements having the second appearance depicts a second virtual environment that has more virtual depth than the first virtual environment.

47. The non-transitory computer readable storage medium of claim 33, wherein:
displaying the one or more virtual elements in the three-dimensional environment with the first appearance includes displaying the first computer-generated experience with at least a first visual characteristic that changes in accordance with a change in the biometric data received while displaying the one or more virtual elements with the first appearance; and
displaying the one or more virtual elements in the three-dimensional environment with the second appearance includes displaying the first computer-generated experience with at least a second visual characteristic that changes in accordance with a change in the biometric data received while displaying the one or more virtual elements with the second appearance.

48. The non-transitory computer readable storage medium of claim 33, wherein the one or more programs include instructions that, when executed by the computer system, cause the computer system to perform operations, including:
in response to receiving the biometric data corresponding to the respiration of the first user:
in accordance with a determination that the biometric data corresponding to the respiration of the first user meets the first criteria, changing an audio output mode from a first audio output mode to a second audio output mode, wherein the first audio output mode has fewer computationally-controlled variables than the second audio output mode.

* * * * *

UNITED STATES PATENT AND TRADEMARK OFFICE
CERTIFICATE OF CORRECTION

PATENT NO. : 11,900,527 B2  
APPLICATION NO. : 18/091119  
DATED : February 13, 2024  
INVENTOR(S) : Rockel et al.

Page 1 of 1

It is certified that error appears in the above-identified patent and that said Letters Patent is hereby corrected as shown below:

On the Title Page

Item (72) Inventors, please delete "Philipp Rockel, San Francisco, CA (US); Gary I. Butcher, Los Gatos, CA (US); Dorian D. Dargan, Oakland, CA (US)" and please insert -- Philipp Rockel, San Francisco, CA (US); Gary I. Butcher, Los Gatos, CA (US); Dorian D. Dargan, Oakland, CA (US); Alan C. Dye, San Francisco, CA (US) --.

Signed and Sealed this  
Twenty-fifth Day of March, 2025

Coke Morgan Stewart  
*Acting Director of the United States Patent and Trademark Office*